US011585899B2

(12) United States Patent
Nicolaescu

(10) Patent No.: US 11,585,899 B2
(45) Date of Patent: Feb. 21, 2023

(54) MODULAR THREE-DIMENSIONAL OPTICAL SENSING SYSTEM

(71) Applicant: Pointcloud Inc., San Francisco, CA (US)

(72) Inventor: Remus Nicolaescu, Menlo Park, CA (US)

(73) Assignee: Pointcloud Inc., San Francisco, CA (US)

( * ) Notice: Subject to any disclaimer, the term of this patent is extended or adjusted under 35 U.S.C. 154(b) by 718 days.

(21) Appl. No.: 16/489,915

(22) PCT Filed: Feb. 28, 2018

(86) PCT No.: PCT/US2018/020271
§ 371 (c)(1),
(2) Date: Aug. 29, 2019

(87) PCT Pub. No.: WO2018/160729
PCT Pub. Date: Sep. 7, 2018

(65) Prior Publication Data
US 2019/0391243 A1 Dec. 26, 2019

Related U.S. Application Data

(60) Provisional application No. 62/608,183, filed on Dec. 20, 2017, provisional application No. 62/573,360, (Continued)

(51) Int. Cl.
*H04B 10/00* (2013.01)
*G01S 7/48* (2006.01)
(Continued)

(52) U.S. Cl.
CPC .......... *G01S 7/4808* (2013.01); *G01S 7/4817* (2013.01); *G01S 7/4911* (2013.01); *G01S 17/32* (2013.01);
(Continued)

(58) Field of Classification Search
CPC combination set(s) only.
See application file for complete search history.

(56) References Cited

U.S. PATENT DOCUMENTS 5,543,805 A * 8/1996 Thaniyavarn ........ H01Q 3/2676
342/368
5,682,229 A * 10/1997 Wangler .................. G01S 17/89
348/31

(Continued)

FOREIGN PATENT DOCUMENTS

CN 1693919 A 11/2005
CN 101598794 A 12/2009
(Continued)

OTHER PUBLICATIONS

"International Application Serial No. PCT US2018 020271, International Preliminary Report on Patentability dated Sep. 12, 2019", 20 pgs.
(Continued)

*Primary Examiner* — Agustin Bello
(74) *Attorney, Agent, or Firm* — Schwegman, Lundberg & Woessner, P.A.

(57) ABSTRACT

Examples of a three-dimensional (3D) optical sensing system for a vehicle include a modular architecture. Light can be transmitted to an optical signal processing module, which can include a photonic integrated circuit (PIC) that can create one or more signals with tailored amplitude, phase, and spectral characteristics. The plurality of optical signals processed by the optical signal processing module can be sent to beam steering units distributed around the vehicle. The steering units can direct a plurality of optical beams towards targets. The return optical signal can be detected by a receiver PIC including an array of sensors and using a direct intensity detection technique or a coherent detection technique. The return optical signal can be converted into an
(Continued)

electrical signal by the array of sensors, which can then be processed by the electronic signal processing unit, and information about the location and speed of the targets can be quantified.

18 Claims, 91 Drawing Sheets

Related U.S. Application Data filed on Oct. 17, 2017, provisional application No. 62/491,443, filed on Apr. 28, 2017, provisional application No. 62/465,197, filed on Mar. 1, 2017.

(51) Int. Cl.
| | |
|---|---|
| G01S 7/481 | (2006.01) |
| G01S 7/4911 | (2020.01) |
| G01S 17/32 | (2020.01) |
| G01S 17/89 | (2020.01) |
| G02F 1/29 | (2006.01) |

(52) U.S. Cl.
CPC .............. *G01S 17/89* (2013.01); *G02F 1/292* (2013.01); *G02F 2203/24* (2013.01); *G02F 2203/50* (2013.01)

(56) References Cited

U.S. PATENT DOCUMENTS

| | | | |
|---|---|---|---|
| 7,421,321 B2 | 9/2008 | Breed | |
| 7,986,397 B1 | 7/2011 | Tiemann et al. | |
| 8,988,754 B2* | 3/2015 | Sun | G02B 6/12033 359/238 |
| 9,104,086 B1* | 8/2015 | Davids | G02B 5/1809 |
| 9,464,883 B2* | 10/2016 | Swanson | G01B 9/02069 |
| 9,753,351 B2* | 9/2017 | Eldada | G01S 7/4817 |
| 9,964,833 B2* | 5/2018 | Eldada | G01S 7/4817 |
| 10,132,610 B2* | 11/2018 | Swanson | H01S 3/1003 |
| 10,261,388 B2* | 4/2019 | Pruessner | G02F 1/2955 |
| 10,330,777 B2* | 6/2019 | Popovich | G06F 3/013 |
| 10,355,452 B2* | 7/2019 | Onaka | G02B 6/4213 |
| 10,527,906 B2* | 1/2020 | Poulton | G02F 1/0147 |
| 10,678,117 B2* | 6/2020 | Shin | G01S 7/4813 |
| 10,809,750 B2* | 10/2020 | Swanson | G02B 6/04 |
| 11,003,045 B2* | 5/2021 | Hosseini | G02F 1/292 |
| 11,092,691 B2* | 8/2021 | Shim | G01S 17/42 |
| 11,243,347 B2* | 2/2022 | Swanson | G02B 6/29302 |
| 2004/0240765 A1 | 12/2004 | Wooten | G02F 1/225 385/2 |
| 2006/0227317 A1* | 10/2006 | Henderson | G01S 17/89 356/28 |
| 2008/0018881 A1 | 1/2008 | Hui et al. | |
| 2008/0114502 A1 | 5/2008 | Breed | |
| 2010/0271614 A1* | 10/2010 | Albuquerque | G01S 7/4811 356/4.01 |
| 2013/0044309 A1* | 2/2013 | Dakin | G01S 17/89 356/4.09 |
| 2014/0240691 A1* | 8/2014 | Mheen | G01S 17/89 356/4.07 |
| 2014/0376000 A1* | 12/2014 | Swanson | H01S 3/1003 356/479 |
| 2014/0376001 A1* | 12/2014 | Swanson | G01N 21/17 356/479 |
| 2018/0039153 A1* | 2/2018 | Hashemi | G02F 1/2955 |
| 2018/0209764 A1* | 7/2018 | Ginsberg | F41G 7/226 |
| 2018/0212676 A1* | 7/2018 | Kim | G01S 17/87 |
| 2019/0033448 A1* | 1/2019 | Molnar | H04N 13/254 |
| 2019/0056634 A1* | 2/2019 | Hosseini | G02F 1/292 |
| 2019/0219888 A1* | 7/2019 | Sun | G02F 1/2955 |
| 2019/0391243 A1* | 12/2019 | Nicolaescu | G01S 17/931 |
| 2020/0110179 A1 | 4/2020 | Talty et al. | |
| 2021/0055625 A1* | 2/2021 | Lajevardi | H01Q 3/36 |
| 2021/0181310 A1* | 6/2021 | Lu | G01S 17/42 |
| 2022/0065997 A1* | 3/2022 | Lo | G01S 7/4817 |
| 2022/0075077 A1* | 3/2022 | Kato | G01S 7/4808 |
| 2022/0120908 A1* | 4/2022 | Kato | G06T 7/00 |
| 2022/0128661 A1* | 4/2022 | Wang | G02B 6/124 |

FOREIGN PATENT DOCUMENTS

| | | |
|---|---|---|
| CN | 105655869 A | 6/2016 |
| CN | 106918814 A | 7/2017 |
| JP | 2006267201 A | 10/2006 |
| JP | 2007057785 A | 3/2007 |
| JP | 2009229806 A | 10/2009 |
| JP | 2014507796 A | 3/2014 |
| JP | 2016105082 A | 6/2016 |
| JP | 2016191817 A | 11/2016 |
| JP | 2020510882 A | 4/2020 |
| TW | I514193 B | 12/2015 |
| TW | 201629556 A | 8/2016 |
| TW | 201843070 A | 12/2018 |
| TW | 201843071 A | 12/2018 |
| TW | 201901184 A | 1/2019 |
| WO | WO-2016201387 A1 | 12/2016 |
| WO | WO-2018160729 A2 | 9/2018 |

OTHER PUBLICATIONS

"Japanese Application Serial No. 2019-568587, Voluntary Amendment filed Jan. 8, 2020", w English claims, 7 pgs.
"International Application Serial No. PCT/US2018/020271, International Search Report dated Oct. 24, 2018", 10 pgs.
"International Application Serial No. PCT/US2018/020271, Invitation to Pay Add'l Fees and Partial Search Report dated Jun. 1, 2018", 13 pgs.
"International Application Serial No. PCT/US2018/020271, Written Opinion dated Oct. 24, 2018", 18 pgs.
Jie, Yang, et al., "A balanced optical heterodyne detection for local-oscillator excess-noise suppression", Proceedings of SPIE, vol. 8552,, (Nov. 29, 2012).
"European Application Serial No. 18710715.6, Notification Regarding Rule 164 and Article 94(3) EPC dated May 4, 2022", 14 pgs.
"European Application Serial No. 1810715.6, Response filed Aug. 22, 2022 to Notification Regarding Rule 164 and Article 94(3) EPC dated May 4, 22", w/ English claims, 41 pgs.
"Japanese Application Serial No. 2019-568587, Notification of Reasons for Refusal dated Dec. 1, 2021", w/ English Translation, 8 pgs.
"Taiwanese Application Serial No. 107106867, Office Action dated Sep. 27, 2021", W/ English Translation, 8 pgs.
"Taiwanese Application Serial No. 107106867, Response Filed Mar. 25, 2022 to Office Action dated Sep. 27, 2021", W/ English Claims, 18 pgs.
"Taiwanese Application Serial No. 107106872, First Office Action dated May 2, 2022", w/English translation, 17 pgs.
"Taiwanese Application Serial No. 107106873, Office Action dated May 2, 2022", W/ English Translation, 16 pgs.
"Taiwanese Application Serial No. 107106873, Office Action dated Jun. 14, 2022", w/ English translation, 15 pgs.
Aflatouni, Firooz, et al., "Nanophotonic coherent imager", Optics Express, 23(4), (2015), 5117-5125.
"Taiwanese Application Serial No. 107106872, Response filed Sep. 30, 2022 to First Office Action dated May 2, 2022", w English claims, 296 pgs.

\* cited by examiner

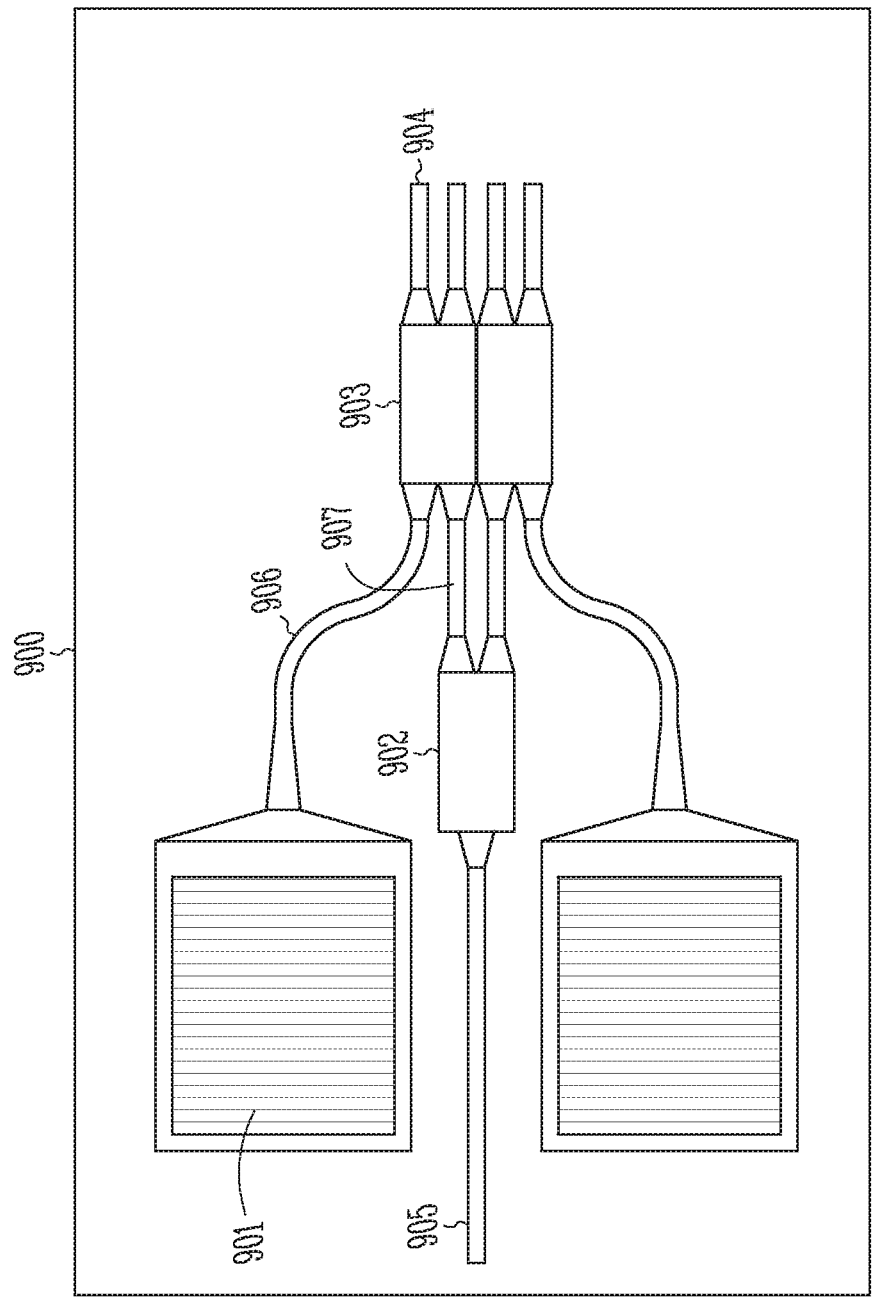

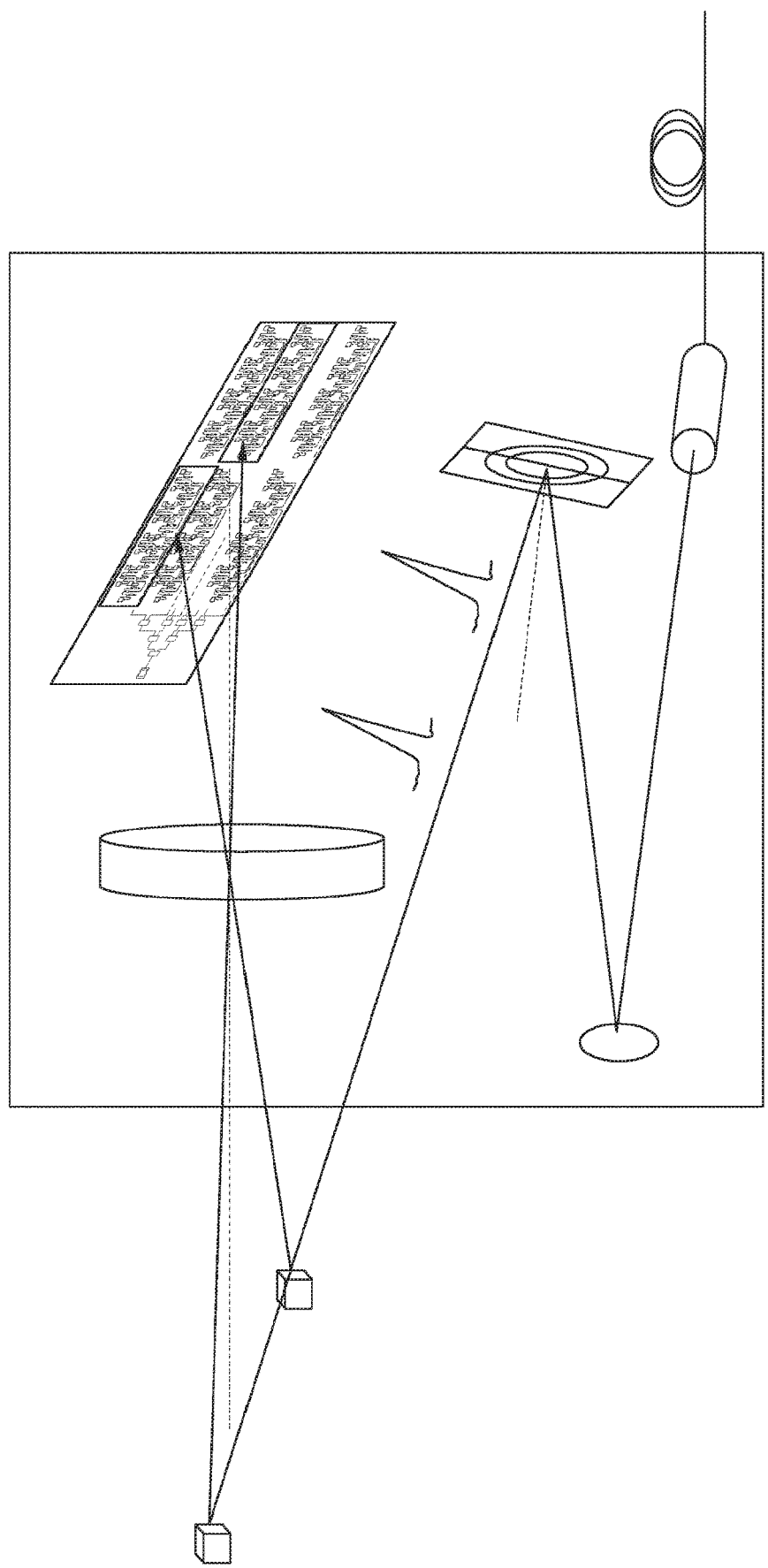

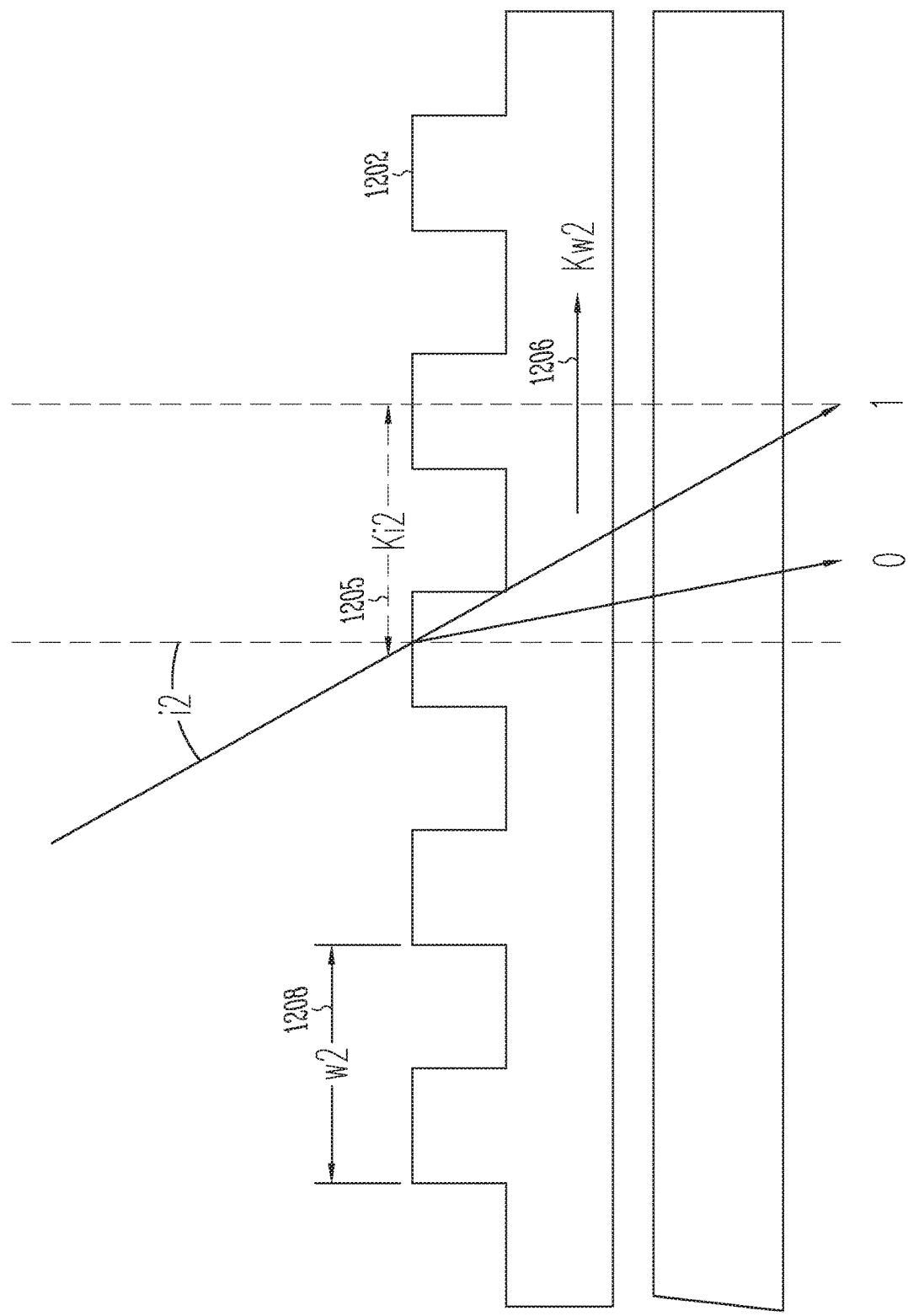

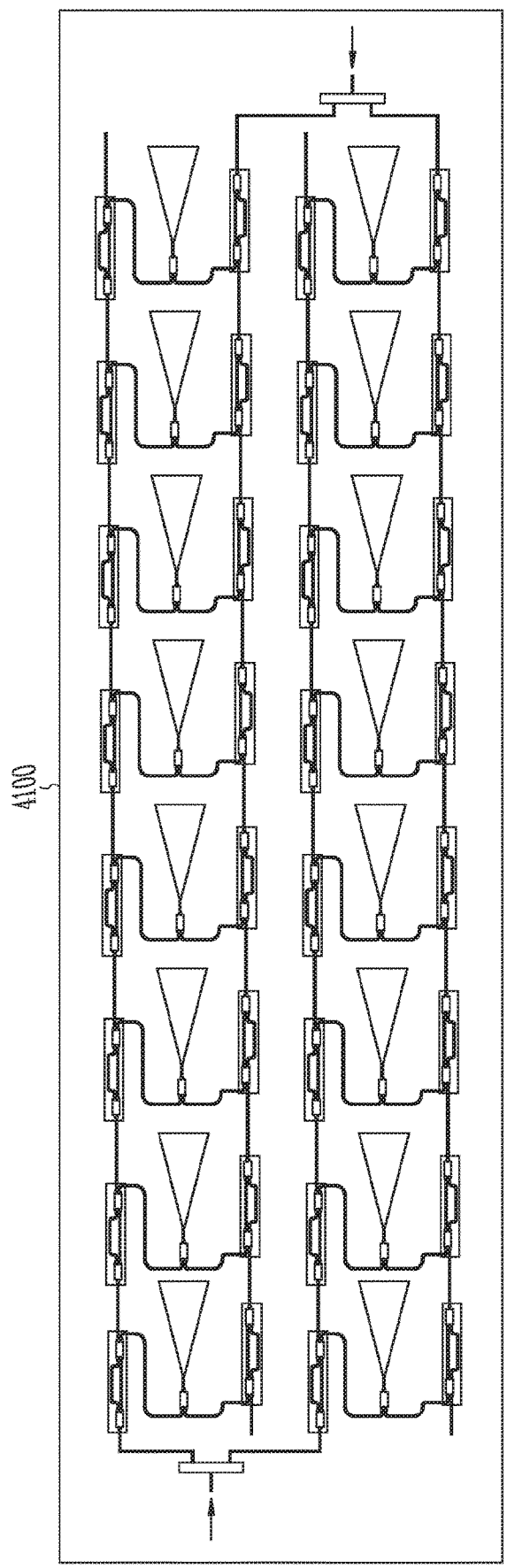

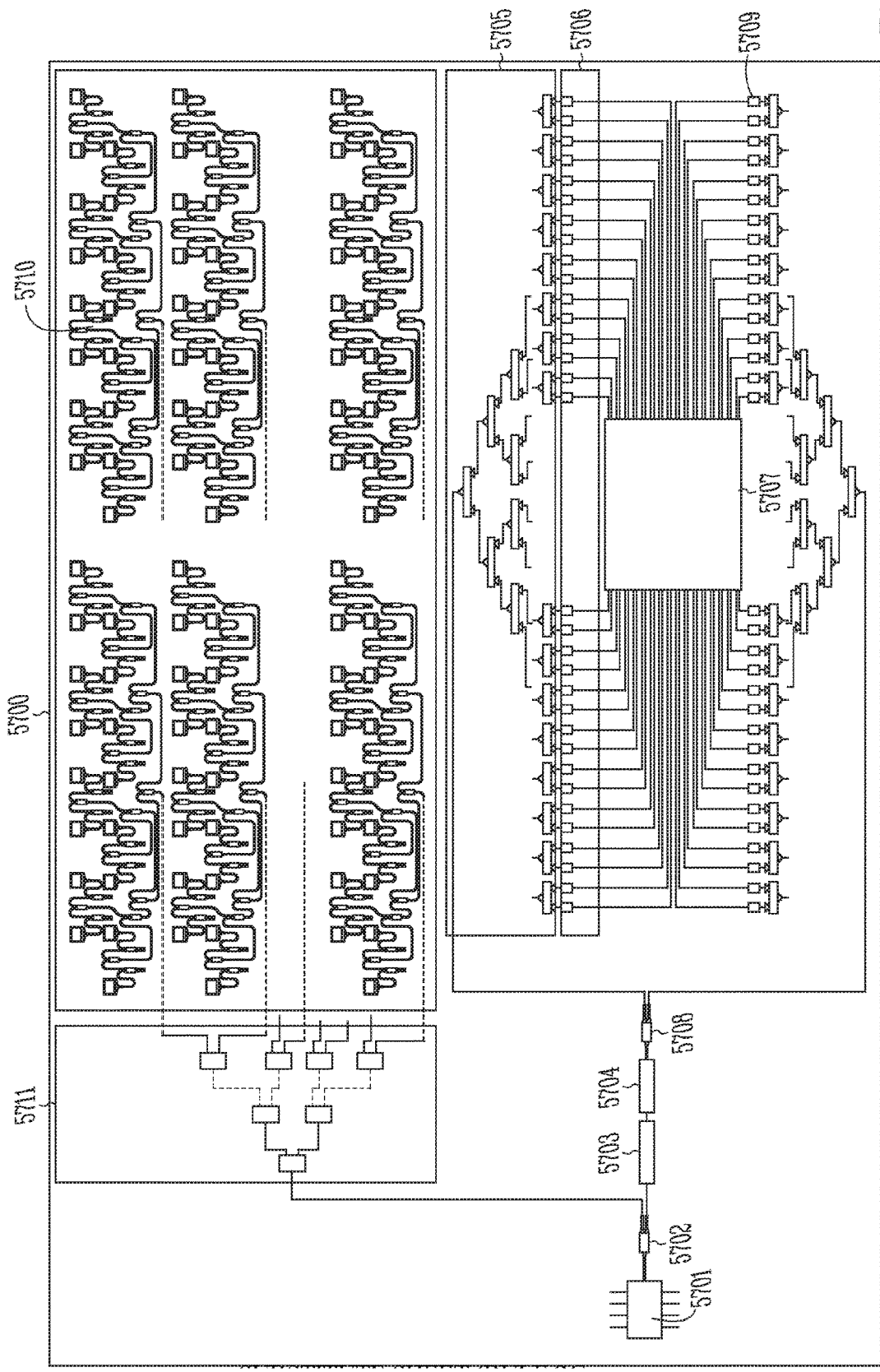

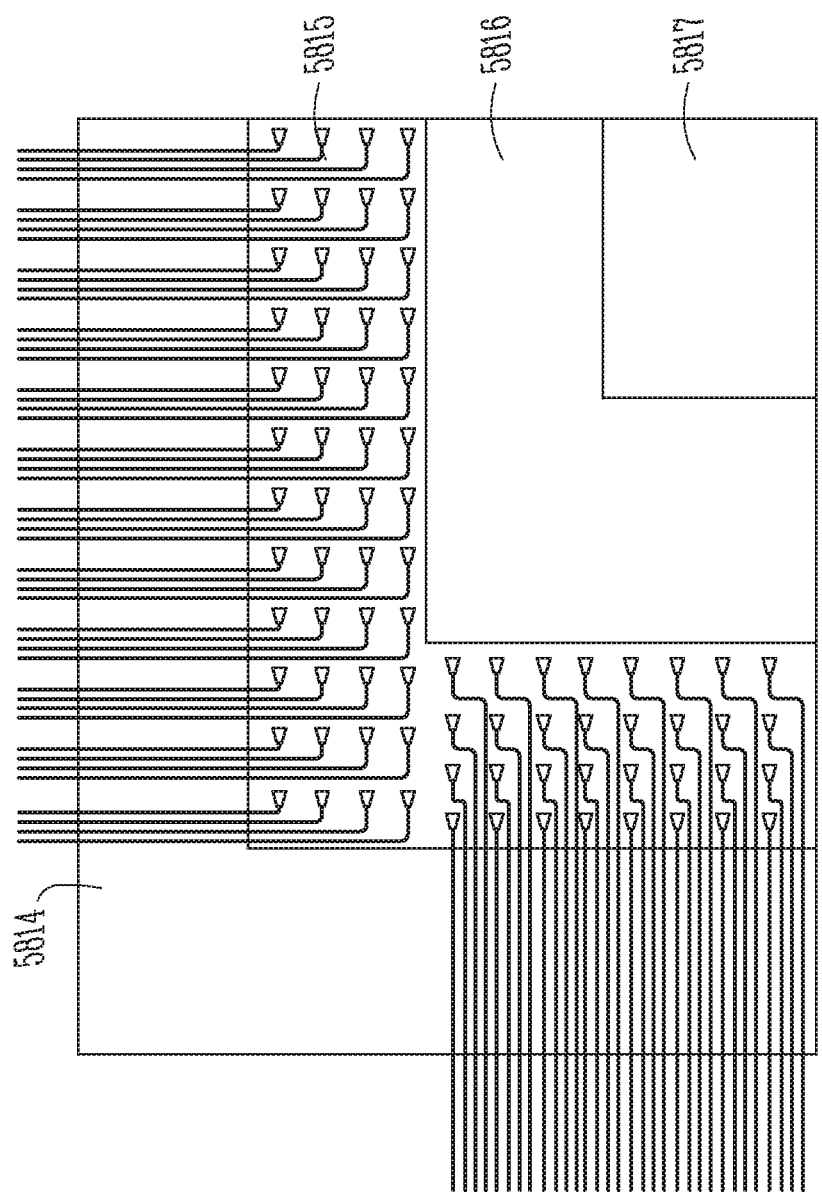

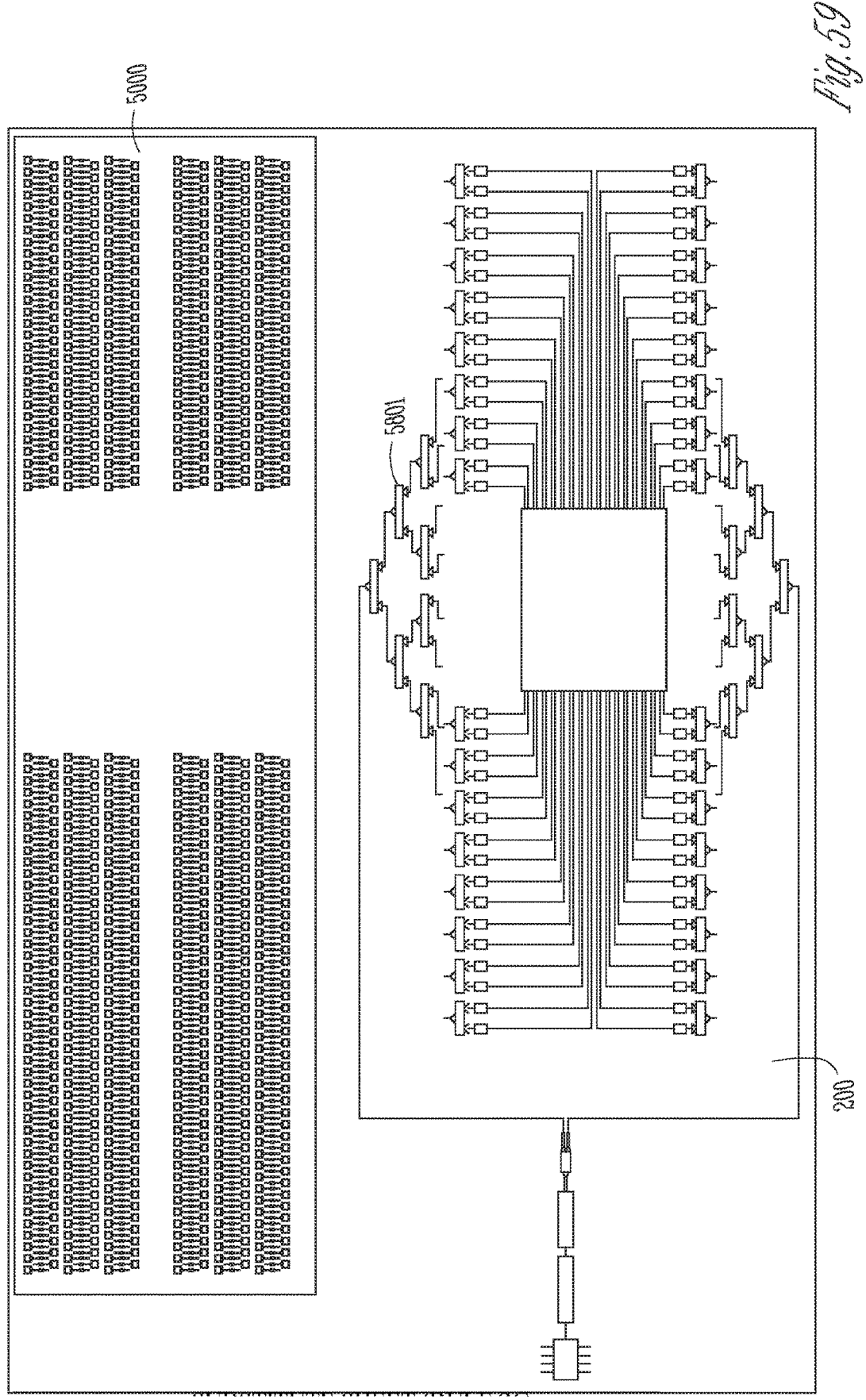

MODULAR THREE-DIMENSIONAL OPTICAL SENSING SYSTEM

CLAIM OF PRIORITY

This application is a U.S. National Stage Filing under 35 U.S.C. 371 from International. Application No. PCT/US2018/020271, filed on Feb. 28, 2018, and published as WO 2018/160729 on Sep. 7, 2018, which claims the benefit of priority of U.S. Provisional Patent Application Ser. No. 62/465,197, filed Mar. 1, 2017, U.S. Provisional Patent Application Ser. No. 62/491,443, filed Apr. 28, 2017, U.S. Provisional Patent Application Ser. No. 62/573,360, filed. Oct. 17, 2017, and U.S. Provisional Patent Application Ser. No. 62/608,183, filed Dec. 20, 2017, which are hereby incorporated by reference herein in their entirety.

FIELD OF THE DISCLOSURE

The disclosure generally relates to photonic integrated circuits, such as for automotive lidar.

BACKGROUND

Examples relate to the general field of light detection and ranging (LIDAR) 3D imaging and more specifically to detailed 3D mapping of the environment for autonomous vehicles.

Two alternative approaches are typically used to measure the coordinates of a remote target and create a 3D image of an object or environment: one based on time of flight measurements of a short pulse or pulse succession emitted by a laser converted to a 3D map, and the second based on a continuous wave laser transmitter which can be phase or frequency modulated, and the distance-correlated phase or frequency shift in the target scattered signal with respect to the original signal can be measured.

Most of the commercial implementations have been done using the time of flight approach using amplitude modulation due to the abundance of nanosecond-pulse-length high-peak-power laser sources necessary to provide the desired range and accuracy. Examples of implementations include approaches such as Velodyne's using a rotating head with mechanically fixed laser/detector pairs all rotating with the head assembly (e.g., High definition LIDAR system, U.S. Pat. No. 8,767,190 B2; see also U.S. Pat. No. 7,969,558), approaches in which the scanning of the beam can be accomplished using a micro-electrical-mechanical system (MEMS) mirror, a galvo mirror, rotating prisms or other opto-mechanical scanning solutions coupled with the use of one or multiple high speed high gain avalanche photodetectors (e.g., Spectrolab's Spectroscan 3D, Riegl VUX1 and a multitude of airborne LIDAR devices). The disadvantage of the above approaches is the large number of discrete parts leading to high cost of manufacturing. An alternative approach which involves a lower number of parts includes the use of detector arrays which can provide pixel level time gating such as the Princeton Lightwave LIDAR cameras (e.g., LIDAR system comprising a single photon detector, US 20150192676A1). The main disadvantage of such a system is the high cost and difficult manufacturing of the specialized InGaAs high speed, high sensitivity detector arrays.

A coherent nanophotonic imager in conjunction with a chirped frequency amplitude modulation technique has been proposed by Aflatouni et al. (Firooz Aflatouni, Behrooz Abiri, Angad Rekhi, and Ali Hajimiri, Nanophotonic Coherent Imager, Optics Express 5117, Vol 23, no. 4 (2015); see also US 20140071249A1) and demonstrated for a small number of pixels for short range, high resolution 3D imaging, though scalability to a large number of pixels has not been addressed.

Another aspect of a 3D imaging system that can be especially critical for longer range high resolution systems can include the ability to control the shape of the outgoing optical beam. For a short-range system using a focal plane array on the receiver side one can use a wide-angle illumination of the entire scene to be captured. As the desired range increases, in order to receive enough scattered photons on each pixel of the focal plane array, the need to reduce the divergence of the outgoing beam and therefore increase the power density on the surface of the target arises. In order to reconcile the need to have a wide field of view of the system and the low divergence necessary to achieve a desired range, the ability to dynamically shape and scan the optical beam over the surface of the target landscape may be necessary. Several approaches have been used commercially or proposed in research papers. They fall typically into two categories: a) one based on a 2 dimensional scanning mirror which scans a low divergence (or collimated) beam over the landscape, the mirrors being either macroscopic driven by piezo drives or Micro Electro Mechanical Systems b) the second can be based on an optical phased array of micro antennas where the shaping and direction of the optical signal can be controlled by adjusting the phase or wavelength of the outbound signals in each of the antennas in the array. Mirror based approaches typically suffer from speed and reliability problems while Optical Phased Arrays have proven technologically very difficult to implement for optical domain electromagnetic waves.

SUMMARY OF THE DISCLOSURE

Examples include an architecture that overcomes traditional LIDAR architectures' deficiencies by using on-chip integration on a mature manufacturing platform, and that addresses scalability and practical integration issues. In addition, a novel all solid state beam steering approach is proposed that has all the speed and reliability advantages of Optical Phased Arrays while being significantly less challenging to implement in an integrated platform. Finally, a novel architecture for an optical phased array is proposed. An exemplary 3D optical sensing system includes a modular architecture with modules connected through a fiber optic network. A fiber linked modular architecture eases integration of the system within the automotive platform as shown in FIG. 1 and removes design constraints as the power and space consuming parts of the system are centrally located in element 11 and do not poorly impact the design elements of the vehicle. The distributed elements 12 are linked to the central element 11 through fiber optic and electrical connections 13.

An optical signal generation module produces laser light with defined spectral and power characteristics. The light can be transmitted via optical fiber to an optical signal processing module, which in an example includes a photonic integrated circuit (PIC), which performs a plurality of passive and active optical functions to create one or multiple signals with tailored amplitude, phase and spectral characteristics. The plurality of optical signals processed by the optical signal processing module are sent via optical fiber to beam steering units distributed around the vehicle. The steering units direct the plurality of optical beams towards targets. Each beam steering unit controls the horizontal and vertical angle of the outgoing optical signal. The return optical signal can be detected by a receiver PIC including an array of sensors and using a coherent detection technique. The optical signal converted into an electrical signal by the array of sensors can be processed by the electronic signal processing unit and information about the location and speed of the targets can be quantified. In an example, the optical signal used can be within the 1530 nm to 1565 nm range to take advantage of higher maximum permissible exposure limits, and low background optical noise. In an example, the transmitter and receiver PICs are implemented using a Silicon Photonics platform. A block diagram description of the modular structure is shown in FIG. 2.

In an aspect, the disclosure can feature a semiconductor photonic circuit for providing a frequency chirped light beam. The semiconductor photonic circuit can include a continuous wave light source coupler, such as for providing a light beam from a light source. The semiconductor photonic circuit can also include a coupling element that can be configured to receive the light beam from the continuous wave light source coupler and divide the light beam into a first portion and a second portion. The semiconductor photonic circuit can also include a first modulator that can be configured to receive, and provide in-phase modulation of, the first portion of the divided light beam. The semiconductor photonic circuit can also include a second modulator in parallel with the first modulator, the second modulator can be configured to receive, and provide quadrature modulation of, the second portion of the divided light beam. The semiconductor photonic circuit can also include an outcoupler that can be configured to receive and combine the outputs of the first modulator and second modulator to form a frequency chirped light beam. The semiconductor photonic circuit can also include a multiplexer that can be configured to receive N portions of a frequency chirped light beam where an individual one of the N portions can be provided by the outcoupler. The semiconductor photonic circuit can also include a demultiplexer that can be configured to receive a light beam and provide the light beam to N different coupling elements. The multiplexer can include a multi-mode interference waveguide or a diffraction grating combined with a star coupler. The semiconductor photonic circuit can also include a bias phase shifter at an output of the outcoupler, the bias phase shifter can be configured to adjust a phase of the frequency chirped light beam. The bias phase shifter can be configured to provide a phase offset between light exiting the first modulator and light exiting the second modulator. The light beam can have a power of less than an onset power for non-linear effects corresponding to a waveguide cross section. The light beam can have a power of less than approximately 50 mW. The photonic circuit can include silicon. The first modulator and the second modulator can include a PN or PIN junction. The semiconductor photonic circuit can also include a tap coupler and photodiode that can be configured to provide a feedback signal that can be used to adjust the bias phase shifter. The first modulator and the second modulator can include a thermo-optic modulator, an injection modulator, or a depletion modulator. A wavelength of the light beam can be in a range from about 1300 nm to 1600 nm. 28. The semiconductor photonic circuit can include a compound semiconductor.

In an aspect, the disclosure can feature a method for providing a frequency chirped light beam. The method can include using a continuous wave light source, such as to provide a light beam. The method can also include coupling the light beam to a planar waveguide and dividing the light beam into a first portion and a second portion. The method can also include modulating the first portion of the divided light beam in-phase. The method can also include modulating the second portion of the divided light beam in-quadrature. The method can also include combining the modulated first portion of the divided light beam and the modulated second portion of the divided light beam to form a frequency chirped light beam. The method can also include providing a phase shift of the combined light beam, such as to adjust a phase of the frequency chirped light beam. The method can also include reducing the relative phase offset between the N modulated light beams of the divided light beam. The method can also include reducing a power of the light beam to less than a power level corresponding to the waveguide cross section at which an onset of nonlinear effects occurs. The method can also include reducing a power of the light beam to less than approximately 50 mw, such as to reduce non-linear losses. The method can also include generating multiple frequency chirps in the frequency chirped light beam simultaneously or sequentially.

In an aspect, the disclosure can feature a semiconductor photonic circuit for providing a frequency chirped light beam. The semiconductor photonic circuit can include a continuous wave light source coupler for providing a light beam from a light source. The semiconductor photonic circuit can also include a plurality of coupling elements, where each individual coupling element can be configured to receive the light beam from the continuous wave light source and divide the light beam into a first portion and a second portion. The semiconductor photonic circuit can also include a plurality of first modulators, wherein an individual one of the plurality of first modulators can be configured to receive, and provide in-phase modulation of, a corresponding first portion of the divided light beam. The semiconductor photonic circuit can also include a plurality of second modulators, wherein an individual one of the plurality of second modulators can be configured to receive, and provide quadrature modulation of, a corresponding second portion of the divided light beam. The semiconductor photonic circuit can also include a plurality of phase shifters, wherein an individual one of the plurality of phase shifters can be configured to adjust a phase of a corresponding frequency chirped light beam prior to recombination. The semiconductor photonic circuit can also include a plurality of outcouplers, wherein an individual one of the plurality of outcouplers can be configured to receive and combine corresponding outputs of a corresponding first modulator and a corresponding second modulator, such as to form a frequency chirped light beam. The individual one of the plurality of outcouplers can include a star coupler having a central portion and a peripheral portion, wherein the central portion can outcouple a central spatial portion of the frequency chirped light beam and a peripheral portion can provide a peripheral spatial portion of the frequency chirped light beam to a receiver. The semiconductor photonic circuit can also include a multiplexer that can be configured to receive M portions of a frequency chirped light beam from the plurality of outcouplers. The semiconductor photonic circuit can also include a demultiplexer that can be configured to receive a light beam and provide the light beam to N different coupling elements, where N can be greater than M. The first portion of the divided light beam and the second portion of the divided light beam can be linearly polarized. The corresponding first portions of the divided light beam and the corresponding second portions of the divided light beam can be linearly polarized. The outcoupler can be configured to provide a first frequency chirped light beam travelling towards a receiver and a second frequency chirped light beam travelling towards a target. An individual one of the plurality of outcouplers can be configured to provide a first frequency chirped light beam travelling towards a receiver and a second frequency chirped light beam travelling towards a target.

In an aspect, the disclosure can feature a semiconductor photonic circuit for providing multiple parallel frequency chirped light beams. The semiconductor photonic circuit can include a continuous wave light source coupler, such as for providing a light beam from a light source. The semiconductor photonic circuit can also include a demultiplexer, such as to separate the light beam into a number of light beams. The semiconductor photonic circuit can also include a plurality of coupling elements, where each individual coupling element can be configured to receive one of the number of light beams and divide the received light beam into a first portion and a second portion. The semiconductor photonic circuit can also include a plurality of first modulators, wherein an individual one of the plurality of first modulators can be configured to receive, and provide in-phase modulation of, a corresponding first portion of the divided light beam. The semiconductor photonic circuit can also include a plurality of second modulators, wherein an individual one of the plurality of second modulators can be configured to receive, and provide quadrature modulation of, a corresponding second portion of the divided light beam. The semiconductor photonic circuit can also include a plurality of phase shifters, wherein an individual one of the plurality of phase shifters can be configured to adjust a phase of a corresponding frequency chirped light beam prior to recombination. The semiconductor photonic circuit can also include a plurality of outcouplers, wherein an individual one of the plurality of outcouplers can be configured to receive and combine corresponding outputs of a corresponding first modulator and a corresponding second modulator to form a frequency chirped light beam. The semiconductor photonic circuit can also include a plurality of continuous wave light couplers, such as for coupling the light out of the photonic integrated circuit and into fiber optic links.

In an aspect, the disclosure can feature a photonic circuit for providing detection of a frequency and a phase of a light beam. The photonic circuit can include a plurality of grating couplers that can be configured to receive a portion of a free space light beam. The photonic circuit can also include a plurality of signal mixers, wherein an individual signal mixer can be configured to receive a portion of the free space light beam from a corresponding grating coupler and a local oscillator light beam, where the individual signal mixer can be configured, such as to provide a first output corresponding to a sum of the free space light beam field and the local oscillator light beam field and a second output corresponding to a difference between the free space light beam field and the local oscillator light beam field. The photonic circuit can also include a plurality of detector pairs each detector pair corresponding to a signal mixer and receiving the light beam from the two outputs of the signal mixer. The plurality of grating couplers and the plurality of signal mixers can be divided into N groups, with each of the N groups having M grating couplers and M signal mixers. A local oscillator signal can be supplied to each of the plurality of signal mixers substantially simultaneously. A local oscillator signal can be sequentially supplied to each of the plurality of signal mixers. The photonic circuit can also include a first detection arm for converting the first output to a first electrical signal and a second detection arm for converting the second output to a second electrical signal. A difference between the first electrical signal and the second electrical signal can be used to provide a detected signal having reduced noise. A grating period, duty cycle, or two-dimensional topology of the plurality of grating couplers can vary with position on the photonic circuit, such as to accommodate different angles of incidence of received free space light. A first subset of the plurality of grating couplers can be configured to couple free space light corresponding to an $m^{th}$ diffraction order and a second subset of the plurality of grating couplers can be configured to couple free space light corresponding to an $n^{th}$ diffraction order. A pair of the plurality of grating couplers can be positioned adjacent to one another and have different orientations. The photonic circuit can include silicon. A wavelength of the light beam can be in a range from about 1300 nm to 1600 nm. The plurality of grating couplers can include a grating period, duty cycle or two-dimensional topology selected to increase coupling for a wavelength range and angular range corresponding to the free space light beam and reduce coupling for light outside the wavelength range and angular range corresponding to the free space light beam.

In an aspect, the disclosure can feature a method for detecting a frequency and a phase of a light beam using a photonic integrated circuit. The method can include receiving a portion of a free space light beam using a grating coupler. The method can also include providing a local oscillator and the received portion of the free space light beam from the grating coupler to a signal mixer. The method can also include providing a first output corresponding to a sum of the free space light beam field and the local oscillator light beam field and a second output corresponding to a difference between the free space light beam field and the local oscillator light beam field. The method can also include providing the local oscillator to a plurality of signal mixers substantially simultaneously. The method can also include sequentially providing the local oscillator to a plurality of signal mixers. The method can also include converting the first output to a first electrical signal and the second output to a second electrical signal, and wherein a difference between the first electrical signal and the second electrical signal can be used to provide a detected signal having reduced noise. The method can also include providing a plurality of grating couplers wherein a grating period, duty cycle or two-dimensional topology of the plurality of grating couplers varies with position on a photonic circuit to accommodate different angles of incidence of received free space light. The method can also include coupling free space light corresponding to an $m^{th}$ diffraction order using the grating coupler and coupling free space light corresponding to an $n^{th}$ diffraction order using another grating coupler adjacent to the grating coupler. The method can also include receiving a corresponding portion of a free space light beam for a subset of the plurality of signal mixers and simultaneously processing electrical signals provided by the subset of the plurality of signal mixers. The method can also include detecting multiple beat frequencies or phases simultaneously or sequentially. The method can also include receiving free space light beams of different wavelengths simultaneously.

In an aspect, the disclosure can feature a photonic-electronic circuit for providing detection of a frequency and a phase of a light beam. The photonic-electronic circuit can include a plurality of grating couplers that can be configured to receive a portion of a free space light beam. The photonic-electronic circuit can also include a plurality of signal mixers, wherein an individual signal mixer can be configured to receive a portion of the free space light beam from a corresponding grating coupler and a local oscillator light beam, the individual signal mixer can be configured to provide a first output corresponding to a sum of the free space light beam field and the local oscillator light beam field and a second output corresponding to a difference between the free space light beam field and the local oscillator light beam field. The photonic-electronic circuit can also include a plurality of detector pairs, wherein an individual detector pair corresponds to a signal mixer and can be configured to receive the two outputs of the signal mixer. The photonic-electronic circuit can also include a plurality of transimpedance amplifiers, wherein an individual one of the plurality of transimpedance amplifiers can be associated with one photodetector. The photonic-electronic circuit can also include a plurality of analog to digital converters, wherein an individual analog to digital converter can be associated with a subset of detectors. The photonic-electronic circuit can also include a readout circuit that can be configured to collect signals from a plurality of rows and columns of the plurality of detector pairs.

In an aspect, the disclosure can feature a semiconductor photonic circuit for providing dynamic steering of a light beam. The photonic circuit can include a spatial arrangement of grating couplers, wherein an individual grating coupler can be configured to receive light from a waveguide and emit the received light towards a refractive optical element, the refractive optical element can be configured to direct the emitted light towards a target region. The photonic circuit can also include one or more optical switches that can be configured to adjust a position of a light beam in the target region by selecting which of the grating couplers in the spatial arrangement of grating couplers receive light from the waveguide. The spatial arrangement of grating couplers can include a number of groups of grating couplers, and each of the groups including grating couplers can have different orientations. An extent of the spatial arrangement of grating couplers can determine a range of adjustment of the position of the light beam in the target region. The spatial arrangement of grating couplers can provide for adjustment of the position of the light beam in the target region in two dimensions. The refractive optical element can include an optical lens having a focal length and position selected to provide a divergence of the light beam of less than about 0.1 degrees. The one or more optical switches can include one or more Mach Zehnder switches or ring based switches. The refractive optical element can adjust a divergence angle of the light beam. The one or more optical switches can include phase shifters using a thermo-optic effect or a PN or PIN junction operating in a depletion mode or an injection mode. The photonic circuit can include silicon. A wavelength of the light beam can be in a range from about 1300 nm to 1600 nm. The spatial arrangement of grating couplers can be configured to simultaneously emit light from more than one of the grating couplers.

The spatial arrangement of grating couplers can be configured to sequentially emit light from more than one of the grating couplers. Intensities of the emitted light beams from different gratings in the spatial arrangement of grating couplers can vary in magnitude to vary signal to noise ratio in a detector. Grating design parameters such as period, duty cycle or two-dimensional topology of the spatial arrangement of grating couplers can vary with position on the semiconductor photonic circuit to vary a mode profile and propagation direction for the of emitted light. Light beams from a plurality of switches can be multiplexed to increase output power through one grating coupler in the spatial arrangement of grating couplers.

In an aspect, the disclosure can feature a method for providing dynamic steering of a light beam. The method can include using a spatial arrangement of grating couplers to emit light towards a refractive optical element. The method can also include directing the light towards a target region using the refractive optical element. The method can also include adjusting a position of a light beam in the target region by selecting which of the grating couplers in the spatial arrangement of grating couplers emits light towards the refractive optical element. The method can also include partitioning the spatial arrangement of grating couplers into groups having different orientations. The method can also include adjusting a position of a light beam in two dimensions by selecting which of the grating couplers in the spatial arrangement of grating couplers emits light towards the refractive optical element. The method can also include selecting a focal length and position of the refractive optical element, such as to provide a divergence of the light beam of less than about 0.1 degrees. The method can also include using a Mach Zehnder switch or a ring based switch to select which of the grating couplers in the spatial arrangement of grating couplers emits light towards the refractive optical element. The method can also include adjusting a divergence angle of the light beam using the refractive optical element.

In an aspect, the disclosure can feature a semiconductor photonic circuit for providing dynamic steering of a frequency chirped light beam. The semiconductor photonic circuit can include a continuous wave light source coupler for providing a light beam from a light source. The semiconductor photonic circuit can also include a coupling element that can be configured to receive the light beam from the continuous wave light source coupler and divide the light beam into a first portion and a second portion. The semiconductor photonic circuit can also include a first modulator that can be configured to receive, and provide in-phase modulation of, the first portion of the divided light beam. The semiconductor photonic circuit can also include a second modulator in parallel with the first modulator, the second modulator can be configured to receive, and provide quadrature modulation of, the second portion of the divided light beam. The semiconductor photonic circuit can also include an outcoupler that can be configured to receive and combine the outputs of the first modulator and second modulator to form a frequency chirped light beam. The semiconductor photonic circuit can also include a spatial arrangement of grating couplers, wherein an individual grating coupler can be configured to receive light from a waveguide and emit the received light towards a refractive optical element, the refractive optical element can be configured to direct the emitted light towards a target region. The semiconductor photonic circuit can also include one or more optical switches that can be configured to adjust a position of a light beam in the target region by selecting grating couplers in the spatial arrangement of grating couplers that receive light from the waveguide. The photonic integrated circuit can include silicon. The photonic integrated circuit can include a compound semiconductor. The wavelength of the light beam can be in a range from about 1300-1600 nm. The continuous wave light source coupler, the coupling element, the first modulator, the second modulator, the outcoupler, the spatial arrangement of grating couplers, and the one or more optical switches can be monolithically integrated. The outcoupler can provide light for one optical switch.

In an aspect, the disclosure can feature a semiconductor photonic circuit for providing dynamic steering of a frequency chirped light beam. The semiconductor photonic circuit can include a continuous wave light source coupler for providing a light beam from a light source. The semiconductor photonic circuit can also include a plurality of coupling elements, each individual coupling element can be configured to receive the light beam from the continuous wave light source and divide the light beam into a first portion and a second portion. The semiconductor photonic circuit can also include a plurality of first modulators, wherein an individual one of the plurality of first modulators can be configured to receive, and provide in-phase modulation of, a corresponding first portion of the divided light beam. The semiconductor photonic circuit can also include a plurality of second modulators, wherein an individual one of the plurality of second modulators can be configured to receive, and provide quadrature modulation of, a corresponding second portion of the divided light beam. The semiconductor photonic circuit can also include a plurality of phase shifters, wherein an individual one of the plurality of phase shifters can be configured to adjust a phase of a corresponding frequency chirped light beam prior to recombination. The semiconductor photonic circuit can also include a plurality of outcouplers, wherein an individual one of the plurality of outcouplers can be configured to receive and combine corresponding outputs of a corresponding first modulator and a corresponding second modulator to form a frequency chirped light beam. The semiconductor photonic circuit can also include a spatial arrangement of grating couplers, wherein an individual grating coupler can be configured to receive light from a waveguide and emit the received light towards a refractive optical element, the refractive optical element can be configured to direct the emitted light towards a target region. The semiconductor photonic circuit can also include one or more optical switches that can be configured to adjust a position of a light beam in the target region by selecting which of the grating couplers in the spatial arrangement of grating couplers receive light from the waveguide. Each of the plurality of outcouplers can provide light for one optical switch. Multiple outcouplers can provide light for the input to one switch. The spatial arrangement of grating couplers can be configured to simultaneously emit light from more than one of the grating couplers.

In an aspect, the disclosure can feature a semiconductor photonic circuit for providing a frequency chirped light beam, and receiving the frequency chirped light beam. The semiconductor photonic circuit can include a continuous wave light source coupler for providing a light beam from a light source. The semiconductor photonic circuit can also include a coupling element that can be configured to receive the light beam from the continuous wave light source coupler and divide the light beam into a first portion and a second portion. The semiconductor photonic circuit can also include a first modulator that can be configured to receive, and provide in-phase modulation of, the first portion of the divided light beam. The semiconductor photonic circuit can also include a second modulator in parallel with the first modulator, the second modulator can be configured to receive, and provide quadrature modulation of, the second portion of the divided light beam. The semiconductor photonic circuit can also include an outcoupler that can be configured to receive and combine the outputs of the first modulator and second modulator to form a frequency chirped light beam. The semiconductor photonic circuit can also include a coupling element that can be configured to direct the optical beam towards a target region via a refractive element. The semiconductor photonic circuit can also include a plurality of grating couplers that can be configured to receive a portion of a free space light beam from the target region. The semiconductor photonic circuit can also include a plurality of signal mixers, wherein an individual signal mixer can be configured to receive a portion of the free space light beam from a corresponding grating coupler and a local oscillator light beam, the individual signal mixer can be configured to provide a first output corresponding to a sum of the free space light beam field and the local oscillator light beam field and a second output corresponding to a difference between the free space light beam field and the local oscillator light beam field. The semiconductor photonic circuit can also include a plurality of detector pairs each detector pair corresponding to a signal mixer and receiving the light beam from the two outputs of the signal mixer. The refractive element can have a wide divergence to simultaneously illuminate the entire scene. The refractive element can have a divergence in a range of about 30 degrees to 50 degrees. The semiconductor photonic circuit can also include a micro electro mechanical (MEMS) mirror or a galvo mirror that can be configured to scan the light beam collimated by the refractive element. A receiver block of M pixels can be configured to receive local oscillator light correlated with the MEMS or galvo mirror steering mechanism, such as to provide the local oscillator to a grating coupler receiving the free space light beam from the target region.

In an aspect, the disclosure can feature a method for dynamically steering a frequency chirped light beam. The method can include using a continuous wave light source to provide a light beam. The method can also include coupling the light beam to a planar waveguide and dividing the light beam into a first portion and a second portion. The method can also include modulating the first portion of the divided light beam in-phase. The method can also include modulating the second portion of the divided light beam in-quadrature. The method can also include combining the modulated first portion of the divided light beam and the modulated second portion of the divided light beam to form a frequency chirped light beam. The method can also include using a spatial arrangement of grating couplers to emit the frequency chirped light beam towards a refractive optical element. The method can also include directing the frequency chirped light beam towards a target region using the refractive optical element. The method can also include adjusting a position of a frequency chirped light beam in the target region by selecting which of the grating couplers in the spatial arrangement of grating couplers emits light towards the refractive optical element.

In an aspect, the disclosure can feature a method for providing a frequency chirped light beam, and detecting a frequency and a phase of a light beam using a photonic integrated circuit. The method can include using a continuous wave light source to provide a light beam. The method can also include coupling the light beam to a planar waveguide and dividing the light beam into a first portion and a second portion. The method can also include modulating the first portion of the divided light beam in-phase. The method can also include modulating the second portion of the divided light beam in-quadrature. The method can also include combining the modulated first portion of the divided light beam and the modulated second portion of the divided light beam to form a frequency chirped light beam. The method can also include using a spatial arrangement of grating couplers to emit the frequency chirped light beam towards a target region via a refractive optical element. The method can also include receiving a portion of a free space light beam from the target region using a grating coupler.

The method can also include providing a local oscillator and the received portion of the free space light beam from the grating coupler to a signal mixer. The method can also include providing a first output corresponding to a sum of the free space light beam field and the local oscillator light beam field and a second output corresponding to a difference between the free space light beam field and the local oscillator light beam field.

In an aspect, the disclosure can feature a semiconductor photonic circuit for providing and receiving a frequency chirped light beam. The semiconductor photonic circuit can include a continuous wave light source coupler for providing a light beam from a light source. The semiconductor photonic circuit can also include a coupling element that can be configured to receive the light beam from the continuous wave light source coupler and divide the light beam into a first portion and a second portion. The semiconductor photonic circuit can include a first modulator that can be configured to receive, and provide in-phase modulation of, the first portion of the divided light beam. The semiconductor photonic circuit can include a second modulator in parallel with the first modulator, the second modulator can be configured to receive, and provide quadrature modulation of, the second portion of the divided light beam. The semiconductor photonic circuit can include an outcoupler that can be configured to receive and combine the outputs of the first modulator and second modulator to form a frequency chirped light beam. The semiconductor photonic circuit can include a spatial arrangement of grating couplers, wherein an individual grating coupler can be configured to receive a frequency chirped light beam from the outcoupler and emit the received light towards a refractive optical element, the refractive optical element can be configured to direct the emitted light towards a target region. The semiconductor photonic circuit can include one or more optical switches that can be configured to adjust a position of a light beam in the target region by selecting which of the grating couplers in the spatial arrangement of grating couplers receive light from the outcoupler. The semiconductor photonic circuit can include a plurality of grating couplers that can be configured to receive a portion of a free space light beam from the target region. The semiconductor photonic circuit can include a plurality of signal mixers, wherein an individual signal mixer can be configured to receive a portion of the free space light beam from a corresponding grating coupler and a local oscillator light beam, the individual signal mixer can be configured to provide a first output corresponding to a sum of the free space light beam field and the local oscillator light beam field and a second output corresponding to a difference between the free space light beam field and the local oscillator light beam field. The semiconductor photonic circuit can include a plurality of detector pairs each detector pair corresponding to a signal mixer and receiving the light beam from the two outputs of the signal mixer. The light beam provided by the light source can have a wavelength in a range from about 1300-1600 nm. All components of the semiconductor photonic integrated circuit can be monolithically integrated. A receiver block of M pixels can be configured to receive local oscillator light correlated with a steering mechanism to provide both local oscillator light and free space light received from the target region. The switch or plurality of switches can be configured such as to maximize the power of the light beam directed in one preferential direction. The one or more optical switches can be configured to provide light to a plurality of grating couplers simultaneously to simultaneously illuminate multiple regions of the target region. An intensity of a light beam corresponding to an illuminated region of the target region can be adjusted based on feedback from the plurality of detector pairs. The semiconductor photonic integrated circuit can include silicon. The semiconductor photonic integrated circuit can include a compound semiconductor.

In an aspect, the disclosure can feature a semiconductor photonic circuit for providing an amplitude modulated light beam, and detection of a plurality of light beams. The semiconductor photonic circuit can include a coupling element that can be configured to receive the light beam from a continuous wave light source. The semiconductor photonic circuit can also include a plurality of amplitude modulators that can be configured to amplitude modulate the received light beam. The semiconductor photonic circuit can also include a coupling element that can be configured to couple the amplitude modulated light beam out of the semiconductor photonic circuit and towards a target region. The semiconductor photonic circuit can also include a plurality of grating couplers that can be configured to receive a portion of a free space light beam from the target region. The semiconductor photonic circuit can also include a plurality of signal amplitude modulators, wherein an individual one of the plurality of signal amplitude modulators can be configured to receive a portion of the free space light beam from a corresponding grating coupler and attenuate the light beam to reduce saturation of a corresponding detector. The semiconductor photonic circuit can include silicon nitride. The semiconductor photonic circuit can include silicon. The semiconductor photonic circuit can include a compound semiconductor. An individual one of the plurality of signal amplitude modulators can be configured to attenuate the light beam, such as to reduce saturation of a corresponding detector and define a time window for gated detection. A feedback loop can be established between a detector and a corresponding signal amplitude modulator, such as to adjust a light beam intensity measured by the detector below a saturation level. The semiconductor photonic circuit can also include a plurality of grating couplers wherein a grating period, duty cycle or two-dimensional topology of the plurality of grating couplers varies with position on the semiconductor photonic circuit to accommodate different angles of incidence of a received free space light beam. The semiconductor photonic circuit can also include a plurality of grating couplers wherein a grating period, duty cycle or two-dimensional topology of the plurality of grating couplers can be selected to increase coupling for a wavelength range and angular range corresponding to the free space light beam and reduce coupling for light outside the wavelength range and angular range corresponding to the free space light beam. A wavelength of the free space light beam can be in a range from about 1300 nm to 1600 nm. The plurality of detectors can include at least one avalanche photodiode detector operating in linear or Geiger mode. An individual one of the plurality of signal amplitude modulators and an individual one of the plurality of amplitude modulators can include a PN or PIN junction or a heating element.

In an aspect, the disclosure can feature a semiconductor photonic circuit for providing an amplitude modulated light beam, and detection of a plurality of optical beams. The semiconductor photonic circuit can include a coupling element that can be configured to receive the light beam from a continuous wave light source. The semiconductor photonic circuit can also include a plurality of amplitude modulators that can be configured to modulate the received light beam and provide an amplitude modulated light beam. The semiconductor photonic circuit can also include a coupling element that can be configured to couple the amplitude modulated light beam out of the semiconductor photonic circuit and towards a target region. The semiconductor photonic circuit can also include a plurality of grating couplers that can be configured to receive a portion of a free space light beam from the target region. The semiconductor photonic circuit can also include a plurality of signal amplitude modulators, wherein an individual signal amplitude modulator can be configured to receive a portion of the free space light beam from a corresponding grating coupler and attenuate the received portion of the free space light beam, such as to reduce saturation of a corresponding detector. The semiconductor photonic circuit can also include a plurality of detectors, wherein an individual detector corresponds to a grating coupler and can be configured to receive a portion of the free space light beam from the grating coupler via a variable optical attenuator. The semiconductor photonic circuit can also include a plurality of transimpedence amplifiers, wherein an individual one of the plurality of transimpedance amplifiers can be associated with one photodetector. The semiconductor photonic circuit can also include a readout circuit that can be configured to collect signals from a plurality of rows and columns of the plurality of detector pairs.

In an aspect, the disclosure can feature a semiconductor photonic circuit for generating a plurality of optical beams having a second wavelength from a plurality of optical beams having a first wavelength through stimulated Raman scattering. The semiconductor photonic circuit can include a coupling element that can be configured to receive the light beam from the continuous wave light source at a first wavelength. The semiconductor photonic circuit can also include a plurality of wavelength selective couplers, wherein an individual one of the wavelength selective couplers can be configured to combine or separate two different wavelengths. The semiconductor photonic circuit can also include a plurality of ring resonators, wherein an individual one of the plurality of ring resonators can be tuned to provide a Q factor of greater than 100,000 at a wavelength corresponding to a Raman shifted harmonic to convert a portion of light at the first wavelength to a second wavelength corresponding to the Raman shifted harmonic. The semiconductor photonic circuit can also include a plurality of demultiplexers, wherein an individual one of the plurality of demultiplexers can be configured to divide a light beam having a wavelength corresponding to the Raman shifted harmonic into a plurality of light beams of the same wavelength. The semiconductor photonic circuit can also include a plurality of amplitude modulators, wherein an individual one of the plurality of amplitude modulators can be configured to receive and modulate a portion of a light beam from a corresponding demultiplexer. The semiconductor photonic circuit can also include a plurality of coupling elements, wherein an individual one of the plurality of coupling elements can be configured to couple the portion of the light beam received from a corresponding amplitude modulator out of the semiconductor photonic circuit and towards a target region. The first wavelength of the light beam can be in a range from about 1300 nm to 1600 nm. An individual one of the plurality of amplitude modulators can include a PN or PIN junction or a heating element. The semiconductor photonic circuit can include silicon nitride. The semiconductor photonic circuit can include silicon. The semiconductor photonic circuit can include a compound semiconductor.

In an aspect, the disclosure can feature a method for providing an amplitude modulated light beam and detecting a received free space light beam from a target region. The method can include providing a light beam and coupling the light beam to a plurality of amplitude modulators in a semiconductor photonic circuit. The method can also include amplitude modulating the light beam using one or more amplitude modulators. The method can also include coupling the amplitude modulated light beam out of the semiconductor photonic circuit and towards a target region. The method can also include receiving a portion of a free space light beam from the target region using one or more grating couplers. The method can also include attenuating the received portion of the free space light beam to reduce saturation of a corresponding detector using one or more signal amplitude modulators.

In an aspect, the disclosure can feature a method for generating a plurality of optical beams having a second wavelength from a plurality of optical beams having a first wavelength through stimulated Raman scattering. The method can include providing a light beam at a first wavelength and coupling the light beam to a wavelength selective coupler configured to combine or separate two different wavelengths. The method can also include tuning ring resonator to provide a Q factor of greater than 100,000 at a wavelength corresponding to a Raman shifted harmonic and using the ring resonator to convert a portion of light at the first wavelength to a second wavelength corresponding to the Raman shifted harmonic. The method can also include dividing a light beam having a wavelength corresponding to the Raman shifted harmonic into a plurality of light beams of the same wavelength. The method can also include amplitude modulating the divided light beam using one or more amplitude modulators. The method can also include coupling a light beam received from the one or more amplitude modulators out of the semiconductor photonic circuit and towards a target region.

In an aspect, the disclosure can feature a semiconductor photonic circuit for providing an optical beam with a continuously variable far field pattern. The semiconductor photonic circuit can include a coupling element that can be configured to receive the light beam from a continuous wave light source. The semiconductor photonic circuit can also include one or more beam splitters that can be configured to split the light beam into N light beams. The semiconductor photonic circuit can also include a plurality of phase modulators that can be configured to control the phase of each of the N light beams. The semiconductor photonic circuit can also include a plurality of evanescent vertical couplers where each coupler can be configured to couple the light beam to a vertically adjacent waveguide layer. The semiconductor photonic circuit can also include a plurality of optical couplers that can be configured to couple the phase modulated light beam out of the semiconductor photonic circuit and towards a target region. The plurality of optical couplers can be divided into M subsets, wherein each of the M subsets can be in a different vertical waveguide layer. The semiconductor photonic circuit can include silicon nitride. The semiconductor photonic circuit can include silicon. The semiconductor photonic circuit can include a compound semiconductor. A wavelength of the free space light beam can be in a range from about 1300 nm to 1600 nm. An individual one of the plurality of phase modulators can include a PN or PIN junction or a heating element. The plurality of optical couplers can include a plurality of pairs of optical couplers, wherein each pair of optical couplers can be separated by less than 4 microns. A number P of the plurality of optical beam splitters can be fixed and the other optical beam splitters in the plurality of optical beam splitters can be variable. Both a phase and an amplitude of the plurality of the light beams to be coupled out of the plurality of the optical couplers towards the target, can be variable. The plurality of optical couplers can have equal or variable separation between each two optical couplers in the plurality of optical couplers. One or more photodetectors and a feedback control loop can provide feedback to the plurality of phase modulators drivers to adjust the relative phases to achieve the desired far field pattern.

In an aspect, the disclosure can feature a semiconductor photonic circuit for providing a frequency chirped optical beam with a continuously variable far field pattern. The semiconductor photonic circuit can include a continuous wave light source coupler for providing a light beam from a light source. The semiconductor photonic circuit can also include a coupling element that can be configured to receive the light beam from the continuous wave light source coupler and divide the light beam into a first portion and a second portion. The semiconductor photonic circuit can also include a first modulator that can be configured to receive, and provide in-phase modulation of, the first portion of the divided light beam. The semiconductor photonic circuit can also include a second modulator in parallel with the first modulator, the second modulator can be configured to receive, and provide quadrature modulation of, the second portion of the divided light beam. The semiconductor photonic circuit can also include an outcoupler that can be configured to receive and combine the outputs of the first modulator and second modulator to form a frequency chirped light beam. The semiconductor photonic circuit can also include one or more beam splitters that can be configured to split the light beam into N light beams. The semiconductor photonic circuit can also include a plurality of phase modulators that can be configured to control the phase of each of the N light beams. The semiconductor photonic circuit can also include a plurality of evanescent vertical couplers, wherein an individual one of the evanescent vertical couplers can be configured to couple the light beam to an adjacent waveguide layer. The semiconductor photonic circuit can also include a plurality of optical couplers that can be configured to couple the phase modulated light beam out of the semiconductor photonic circuit and towards a target region. The plurality of optical couplers can be divided into M subsets, wherein each of the M subsets can be in a different vertical waveguide layer. The semiconductor photonic circuit can include silicon nitride. The semiconductor photonic circuit can include silicon. The semiconductor photonic circuit can include a compound semiconductor. A wavelength of the free space light beam can be in a range from about 1300 nm to 1600 nm. An individual one of the plurality of phase modulators can include a PN or PIN junction or a heating element.

In an aspect, the disclosure can feature a semiconductor photonic circuit for providing a frequency chirped optical beam with a continuously variable far field pattern, and detection of a frequency and a phase of a light beam. The semiconductor photonic circuit can include a continuous wave light source coupler for providing a light beam from a light source. The semiconductor photonic circuit can also include a coupling element that can be configured to receive the light beam from the continuous wave light source coupler and divide the light beam into a first portion and a second portion. The semiconductor photonic circuit can also include a first modulator that can be configured to receive, and provide in-phase modulation of, the first portion of the divided light beam. The semiconductor photonic circuit can also include a second modulator in parallel with the first modulator, the second modulator can be configured to receive, and provide quadrature modulation of, the second portion of the divided light beam. The semiconductor photonic circuit can also include an outcoupler that can be configured to receive and combine the outputs of the first modulator and second modulator to form a frequency chirped light beam. The semiconductor photonic circuit can also include one or more beam splitters that can be configured to split the light beam into N light beams. The semiconductor photonic circuit can also include a plurality of phase modulators that can be configured to control the phase of each of the N light beams. The semiconductor photonic circuit can also include a plurality of evanescent vertical couplers, wherein an individual one of the evanescent vertical couplers can be configured to couple the light beam to an adjacent waveguide layer. The semiconductor photonic circuit can also include a plurality of optical couplers that can be configured to couple the phase modulated light beam out of the semiconductor photonic circuit and towards a target region. The semiconductor photonic circuit can also include a plurality of grating couplers that can be configured to receive a portion of a free space light beam. The semiconductor photonic circuit can also include a plurality of signal mixers, wherein an individual signal mixer can be configured to receive a portion of the free space light beam from a corresponding grating coupler and a local oscillator light beam, the individual signal mixer can be configured to provide a first output corresponding to a sum of the free space light beam field and the local oscillator light beam field and a second output corresponding to a difference between the free space light beam field and the local oscillator light beam field. The semiconductor photonic circuit can also include a plurality of detector pairs each detector pair corresponding to a signal mixer and receiving the light beam from the two outputs of the signal mixer. The plurality of optical couplers can be divided into M subsets, wherein each of the M subsets can be in a different vertical waveguide layer. The semiconductor photonic circuit can include silicon nitride. The semiconductor photonic circuit can include silicon. The semiconductor photonic circuit can include a compound semiconductor. A wavelength of the free space light beam can be in a range from about 1300 nm to 1600 nm. The phase modulators can include a PN or PIN junction or a heating element.

In an aspect, the disclosure can feature a semiconductor photonic circuit for providing a frequency chirped optical beam with a continuously variable far field pattern. The semiconductor photonic circuit can include a continuous wave light source coupler for providing a light beam from a light source. The semiconductor photonic circuit can also include a plurality of coupling elements, each individual coupling element can be configured to receive the light beam from the continuous wave light source and divide the light beam into a first portion and a second portion. The semiconductor photonic circuit can also include a plurality of first modulators, wherein an individual one of the plurality of first modulators can be configured to receive, and provide in-phase modulation of, a corresponding first portion of the divided light beam. The semiconductor photonic circuit can also include a plurality of second modulators, wherein an individual one of the plurality of second modulators can be configured to receive, and provide quadrature modulation of, a corresponding second portion of the divided light beam. The semiconductor photonic circuit can also include a plurality of phase shifters, wherein an individual one of the plurality of phase shifters can be configured to adjust a phase of a corresponding frequency chirped light beam prior to recombination. The semiconductor photonic circuit can also include a plurality of outcouplers, wherein an individual one of the plurality of outcouplers can be configured to receive and combine corresponding outputs of a corresponding first modulator and a corresponding second modulator to form a frequency chirped light beam. The semiconductor photonic circuit can also include one or more beam splitters that can be configured to split the light beam received from the plurality of outcouplers into a plurality of light beams. The semiconductor photonic circuit can also include a plurality of phase modulators that can be configured to control the phase of each of the plurality of light beams. The semiconductor photonic circuit can also include a plurality of evanescent vertical couplers, wherein an individual one of the evanescent vertical couplers can be configured to couple the light beam to an adjacent waveguide layer. The semiconductor photonic circuit can also include a plurality of optical couplers that can be configured to couple the phase modulated light beam out of the semiconductor photonic circuit and towards a target region. The plurality of optical couplers can be divided into M subsets, wherein each of the M subsets can be in a different vertical waveguide layer.

In an aspect, the disclosure can feature a semiconductor photonic circuit for providing an amplitude modulated optical beam with a continuously variable far field pattern. The semiconductor photonic circuit can include a continuous wave light source coupler for providing a light beam from a light source. The semiconductor photonic circuit can also include a plurality of amplitude modulators that can be configured to modulate the received light beam and provide an amplitude modulated light beam. The semiconductor photonic circuit can also include one or more beam splitters that can be configured to split the optical beam received from the plurality of outcouplers into a plurality of light beams. The semiconductor photonic circuit can also include a plurality of phase modulators that can be configured to control the phase of each of the plurality of light beams. The semiconductor photonic circuit can also include a plurality of evanescent vertical couplers, wherein an individual one of the evanescent vertical couplers can be configured to couple the light beam to an adjacent waveguide layer. The semiconductor photonic circuit can also include a plurality of optical couplers that can be configured to couple the phase modulated light beam out of the semiconductor photonic circuit and towards a target region. The plurality of optical couplers can be divided into M subsets, wherein each of the M subsets can be in a different vertical waveguide layer. The continuously variable far field pattern can include a variable shape, variable direction, or variable divergence of the frequency chirped optical beam.

BRIEF DESCRIPTION OF THE DRAWINGS

The present disclosure will now be described, by way of example, with reference to the accompanying drawings, in which:

FIGS. 7A-7D illustrate examples of pixel designs.

FIG. 10 illustrates an example of MEMS based lidar system.

FIGS. 11A-11B illustrate examples of a grating coupler.

FIGS. 41A-41C illustrate an example of photonic integrated circuits.

FIG. 57A-57B illustrate examples of photonic integrated circuits.

FIG. 59 illustrates an example of a photonic integrated circuit.

DETAILED DESCRIPTION

System Block Diagram

Figure 1:
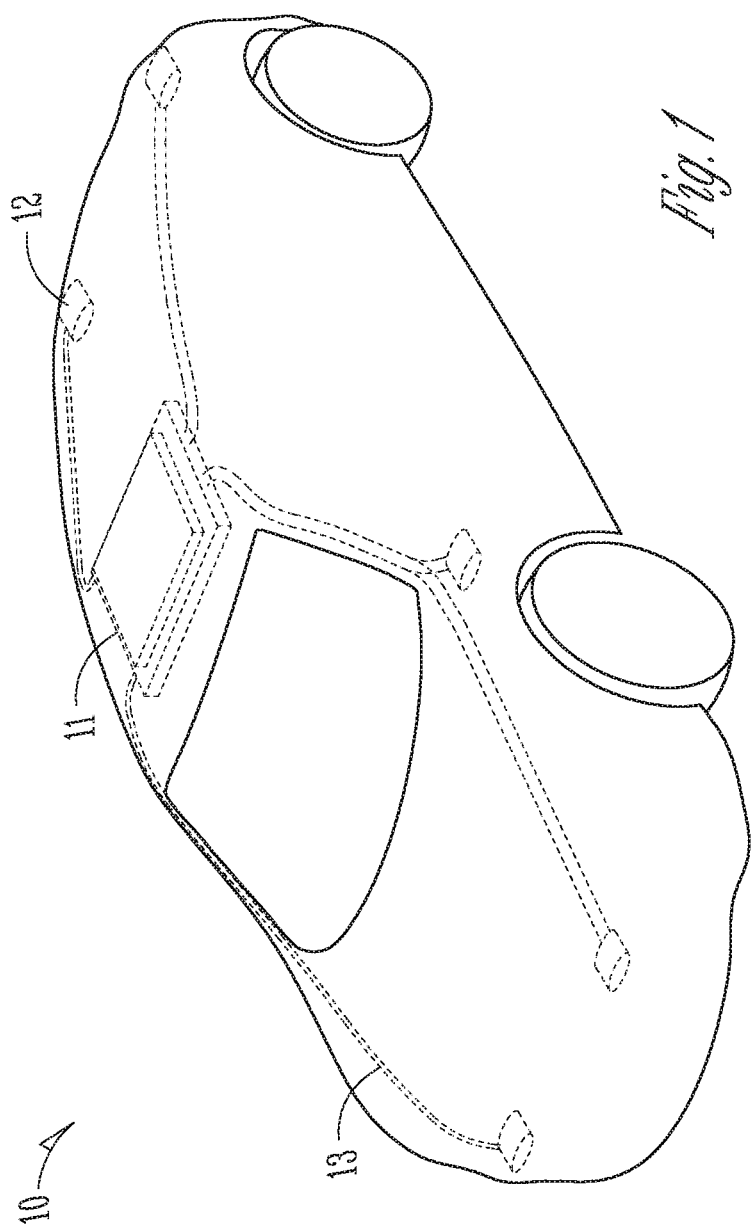
FIG. 1 illustrates an example of an automotive lidar system.
Figure 2:
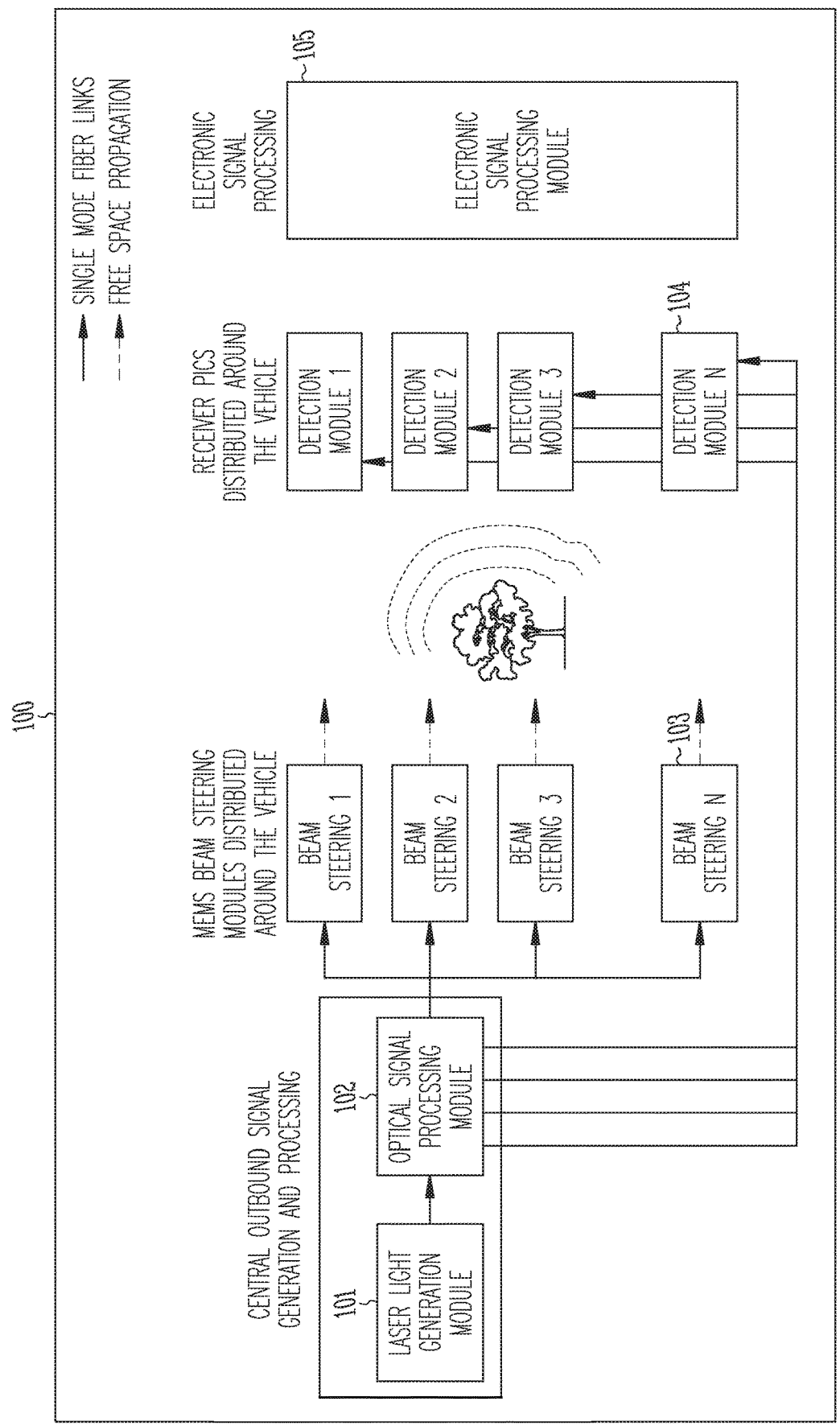
FIG. 2 illustrates an example of a lidar system.

FIG. 2 is a block diagram that illustrates a LIDAR system 100, according to an example. The LIDAR system 100 includes the following: a laser light generation module 101, an optical signal processing module 102, a plurality of beam steering modules 103, a plurality of detection modules 104, and an electronic signal processing module 105. The laser light generation module 101 produces laser light with defined spectral and power characteristics. The light can be transmitted via optical fiber to an optical signal processing module 102, which in an example includes a photonic integrated circuit (PIC), which performs a plurality of passive and active optical functions to create one or multiple optical signals with tailored amplitude, phase and spectral characteristics. Advantages of using a transmitter PIC include the ability to have complex processing of the optical signal and increasingly complex functionality for lower cost and higher performance compared to a multi-components approach. The plurality of optical signals processed by the optical signal processing module are sent via optical fiber to a plurality of beam steering modules 103 distributed around the vehicle. The beam steering modules 103 direct a plurality of optical beams towards targets. Each beam steering module 103 controls the horizontal and vertical angle of the outgoing optical signal. The return optical signal can be detected by a detection module 104, including in an example a PIC 408 containing an array of sensors 503, a local oscillator control and distribution section 504, and using a coherent detection technique. In an example, a return optical signal can be detected by a detection module, including an array of direct intensity detectors. The optical signal converted into an electrical signal by the detection module 104 can be processed by the electronic signal processing unit 105 and information about the location and speed of the targets can be quantified. In an example, the optical signal used can be within the 1530 nm to 1565 nm range to take advantage of higher maximum permissible exposure limits, and low background optical noise. In an example the transmitter and receiver PICs are implemented using a Silicon Photonics platform. A block diagram description of the modular structure integration in the automotive platform is shown in FIG. 1. In an example, the laser light generation module 101, the optical signal processing module 102, and the electronic signal processing module 105 are centrally located in element 11. In an example, each pair of beam steering module 103 and detection module 104 are co-located in element 12 and linked from element 11 through fiber optic and electrical link 13.

Modules:

Laser Light Generation Module

Figure 3:
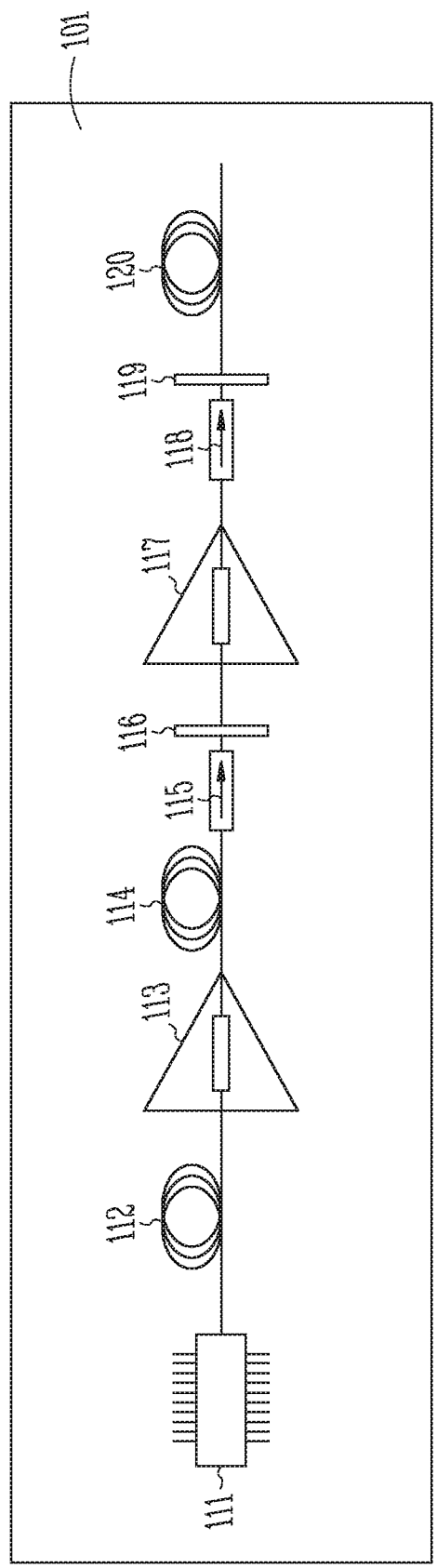
FIG. 3 illustrates an example of a laser light generation module.

As illustrated in FIG. 3, the laser light generation module 101 can include a low optical power master oscillator followed by a one or two stage amplifier. In an example, the master oscillator can be a low power single longitudinal and transverse mode continuous wave diode laser such as a distributed feedback (DFB) laser or distributed Bragg reflector (DBR) laser. The signal from the single mode laser 111 can be coupled into the fiber amplifier 113 through optical fiber 112. The output from the first stage can be guided through fiber 114 through isolator 115 and amplified spontaneous emission (ASE) filter 116 to a second stage of a fiber amplifier 117.

The output of the second stage of the amplifier can be guided through fiber 120 through isolator 118 and ASE filter 119. The first stage of the amplifier can be a single clad or double clad doped fiber amplifier operating in a small signal/high gain regime and the second stage of the amplifier can be a double clad doped fiber amplifier operating in saturation. In an example, the wavelength of operation of the system can be 1550 nm or any other wavelength within the C and L bands of the telecommunications windows. Other wavelengths between 1-2 microns may be used as well. In an example of the system with operation at 1550 nm, the first stage of the fiber amplifier can be an Er or Er/Yb doped fiber amplifier, while the second stage can be an Er/Yb doped fiber amplifier. In an Erbium-doped fiber amplifier designed to provide signal amplification in the vicinity of 1550 nm, the Erbium ion hosted in glass has atomic levels structure to achieve inversion and therefore lasing action in the wavelength band centered around 1550 nm. The lasing emission band (as well as the pump band) are determined by the dopant—in this case the Er ion—and the host material. If a different wavelength of operation is desired, in addition to a change in the wavelength of operation of the laser source, a different dopant ion/glass host combination may be used in the fiber amplifier in order to shift the lasing emission band and therefore amplification window of the fiber amplifier to the desired wavelength. An example of such a different case includes a fiber amplifier using a Thulium ion as a dopant for operation around 1.9 to 2 microns wavelength. In an example, the master laser can be a single longitudinal mode DFB or DBR laser, though other types of laser sources may be used. In various examples, other laser light sources or source configurations may be used in the laser light generation module.

Optical Signal Processing Module

The signal produced by the laser light generation module 101 can be sent through optical fiber 120 to the optical signal processing module 102, which performs a plurality of passive and active optical functions such as multiplexing, de-multiplexing, wavelength selective coupling, beam splitting, directional switching, polarization splitting, polarization rotation, isolation, detection, and laser wavelength conversion, to create multiple optical signals with tailored amplitude, phase, and spectral characteristics. The optical signal processing module has the task of implementing the desired modulation scheme of the amplitude and the phase of the optical electromagnetic field to achieve the desired range, resolution and accuracy of ranging. The module may be made of discrete components or integrated into a photonic integrated platform, or a PIC. Examples of materials systems for integration include Silicon on Insulator, group III and group V semiconductors, and glass on Silicon.

Figure 4A:
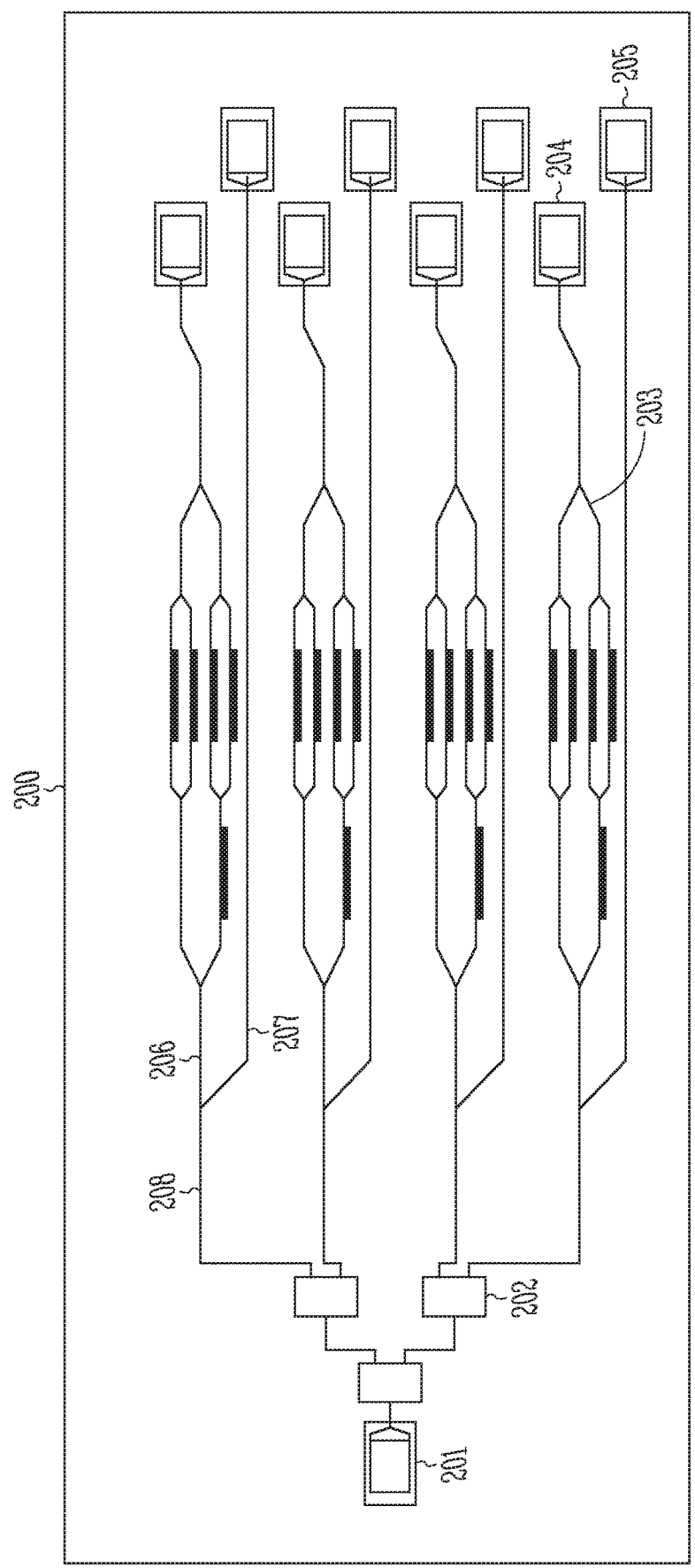
FIGS. 4A-C illustrate examples of photonic integrated circuits.
Figure 4B:
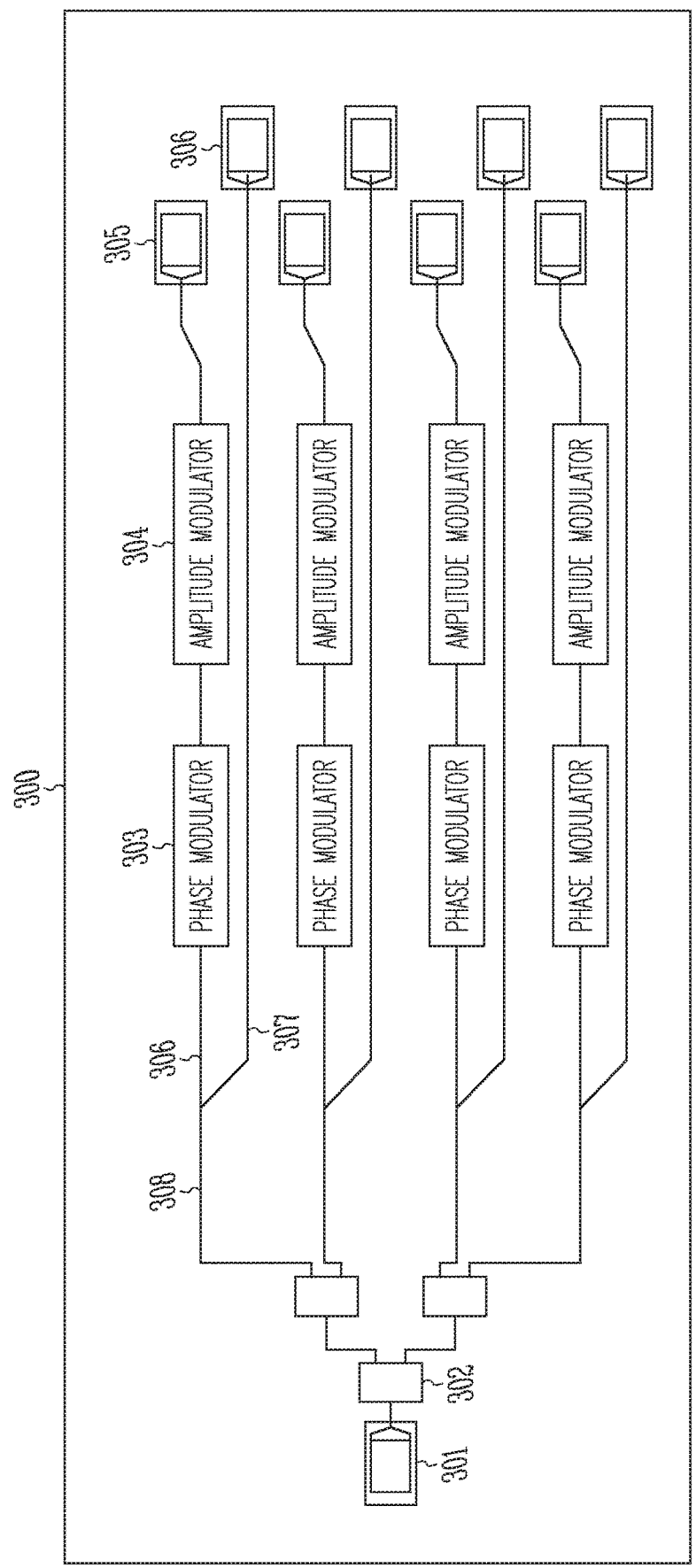
Figure 4C:
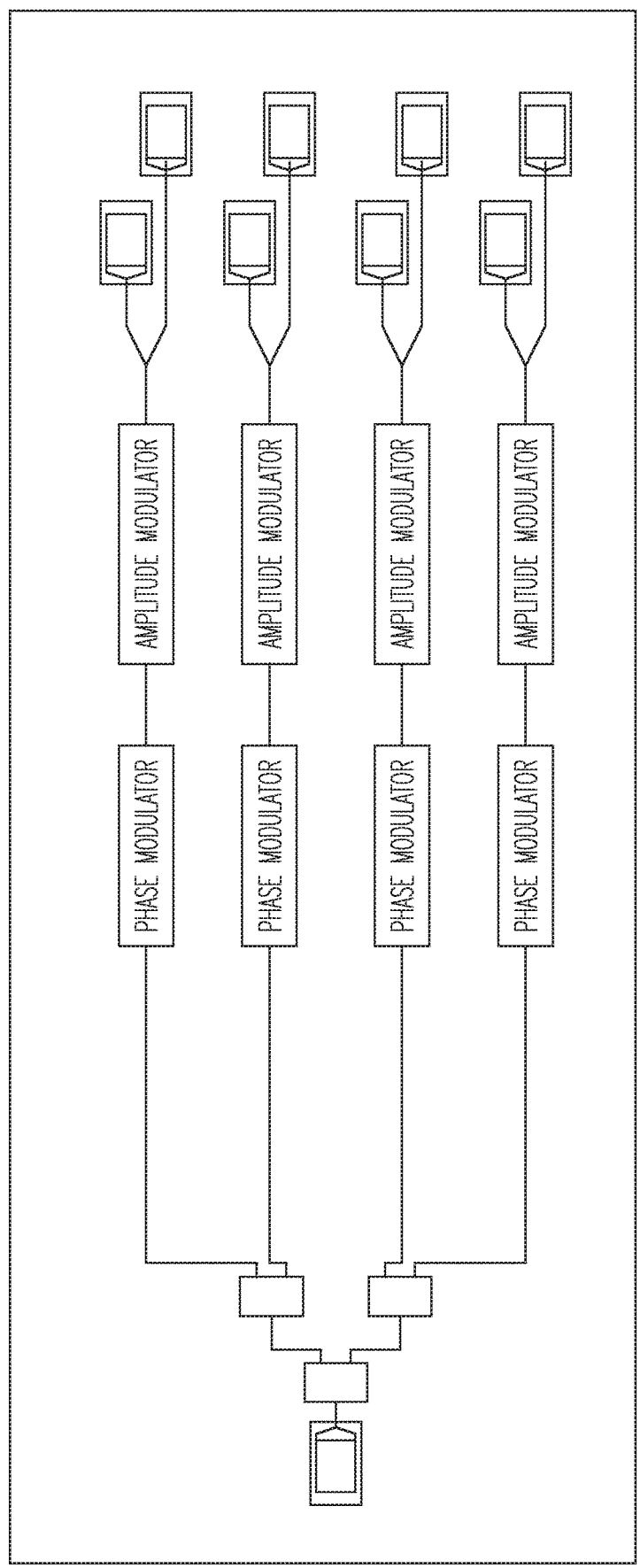

In an example, the optical processing module 102 includes a PIC 200 built using Silicon on Insulator technology. Examples of PICS are illustrated in FIGS. 4A-4C. In an example, the signal can be coupled into the PIC 200 through a grating coupler 201 and can be guided to an array of 1×2 multimode interference (MMI) waveguides 202 which split the input signal into a plurality of signals travelling in multiple waveguides. The signal in each of the waveguides 208 which collect the output of the MMI can be split into a first and a second optical signal travelling in waveguides 206 and 207, respectively. In each pair corresponding to one channel, a phase and an amplitude modulation element 203 can be implemented on one of the waveguides 206 to modulate the first optical signal while the other waveguide 207 has no other component implemented. The phase and amplitude control may be implemented as two sequential separate elements such as 303 and 304 for the PIC example 300 or as one element performing both functions such as the IQ modulator 203 for the PIC example 200. A variety of technologies such as current injection in a Si waveguide, electrically or thermally controlled Mach Zehnder interferometer, IQ modulator configuration, or any other combination that achieves independent phase and amplitude of the light field may be implemented. In an example, a charge controlled Mach Zehnder configuration may be used in order to provide a range of amplitude modulation speeds from a few MHz to 25-30 GHz. Multiple modulation signals of different frequencies may be simultaneously superposed in order to achieve the defined range and resolution. In another example, a charge controlled phase modulator may be used to modulate the phase of the optical field in a frequency range from a few MHz to 25-30 GHz. After the phase and amplitude control elements, the first and second optical signals traveling in waveguides 206 and 207 are coupled out of the PIC through grating couplers 204 and 205 respectively. A schematic for an implementation of the PIC for 4 channels is shown in FIGS. 4A and 4B. Other examples may have more or fewer channels. In other examples, the input and output grating couplers may be replaced by adiabatically tapered waveguide end couplers.

In an example, the transmitter PIC may be implemented in silicon on insulator with the top silicon layer being 220 nm or 480 nm thick, buried oxide layer 2 micron thick, though other substrates such as top Si layers in the range from 500 nm to 10 microns may be used. In another example, different buried oxide thicknesses as well as multilayered designs containing alternating layers of silicon and oxide between the buried oxide and Si epi layer for the gratings sections may be used in order to improve the grating to fiber coupling efficiency. In addition to the described example, any other passive or active optical function such as multiplexers, demultiplexers, wavelength selective couplers, beam splitters, switches, polarization splitters, polarization rotators, isolators, detectors, and laser sources may be implemented in the transmitter PIC either monolithically or through hybrid integration.

In another example, a PIC with a different configuration such as the one described in FIG. 4C may be used in conjunction with a frequency chirp modulation scheme.

Beam Steering Module

Figure 5:
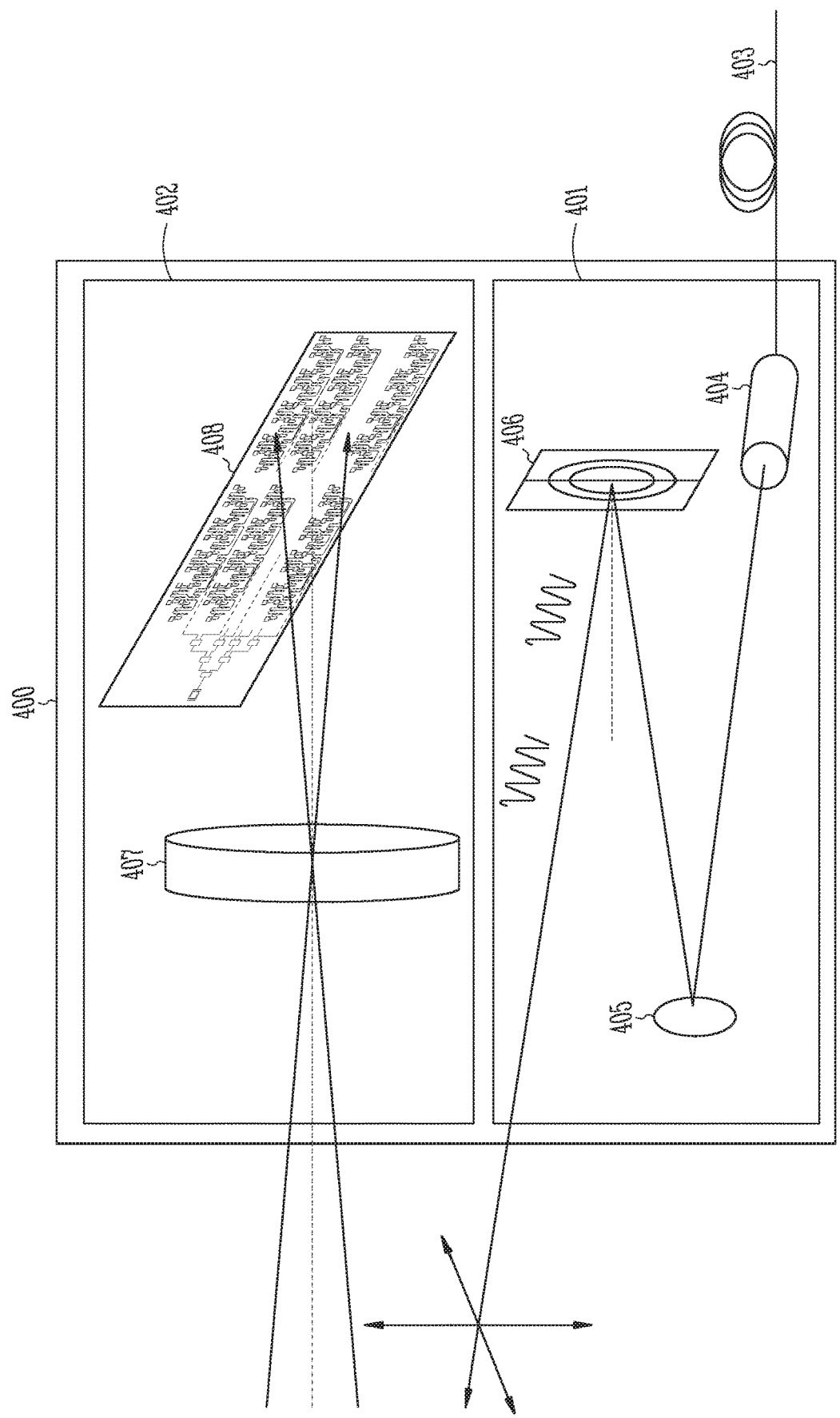
FIG. 5 illustrates an example of a beam steering module.

Each of the multitude of first output optical signals from grating 204 of the Optical Processing module 200 can be sent through the fiber optic 403 to a beam steering module 401 as illustrated in FIG. 5. In an example, the fiber used for transmission can be single mode fiber carrying a 1550 nm laser signal. An example of the beam steering unit is shown in FIG. 5.

The collimator 404 collimates the light coming out of the fiber 403, sends it to a fixed mirror 405 where it can be reflected to MEMS mirror 406. The MEMS mirror 406 executes a rastering or Lissajous pattern in the horizontal and vertical direction. In an example, the frequency on the horizontal axis can be 10 KHz and the frequency on the vertical axis can be 10.2 KHz, and those are both resonant frequencies for the mirror. Other ranges may be used for the horizontal and vertical. In an example, a rastering pattern can be used in which the horizontal axis can be driven at resonance at high frequency such as in the range of 10-30 KHz while the vertical axis can be driven in a quasi-static regime significantly below the resonant frequency such as between 50 and 100 Hz in accordance with the desired frame rate. In another example, both axes are driven at resonance using a sinusoidal function generating a Lissajous pattern. In this case, the driving frequency may be in the range of 10-30 KHz for both the horizontal and vertical axes depending on the physical design of the mirror. The separation between the driving frequencies determines the frame rate. As such, the preferred separation in frequency between the horizontal and vertical axis motion can be in the range of 50-200 Hz in order to achieve the desired frame rate with a larger separation allowing for easier manufacturing of the mirror. The operation in this frequency range could be less susceptible to the car mechanical vibrations. In an example, the vertical angle range can be 25 deg. and the horizontal angle range can be 40 deg. The outbound first optical signal beam can be reflected off targets and a portion of the reflected signal beam can be collected by the lens 407 and focused on the detector array 408.

One or multiple beam steering units may be used in a system each corresponding to one channel.

Detection Module

Optical heterodyne detection is an effective measurement technique in cases when the signal to be detected is very weak and potentially affected by a variety of sources of optical noise. In addition, it enables phase measurements in addition to amplitude. In an optical heterodyne setup, a local oscillator signal at an optical frequency close to that of the signal to be detected can be mixed with the signal to be measured. The result of the mixing can include an oscillating component with a frequency equal to the difference between the two optical signals and which amplitude can be proportional to the power of the local oscillator as described by the formula:

$$I1(t) = \frac{R}{2} * [Ps(t) + PLO(t) + 2 * \sqrt{Ps(t) * PLO} * \cos(\omega IF * t + \theta sig(t) - \theta LO(t))]$$

Where R can be the responsivity of the detector, Ps(t) can be the power of the signal, PLO(t) can be the power of the local oscillator, ωIF can be the frequency difference between the local oscillator and the signal, and θsig(t) and θLO(t) are the time dependent phases of the two optical signals.

The Ps(t) and PLO(t) components oscillate at optical frequencies and therefore are seen by the detector as dc components. The last term oscillates at the lower intermediate frequency ωIF, which may be detected by a detector and can be proportional with PLO, which effectively amplifies the weak Ps(t) signal to be measured.

Figure 6:
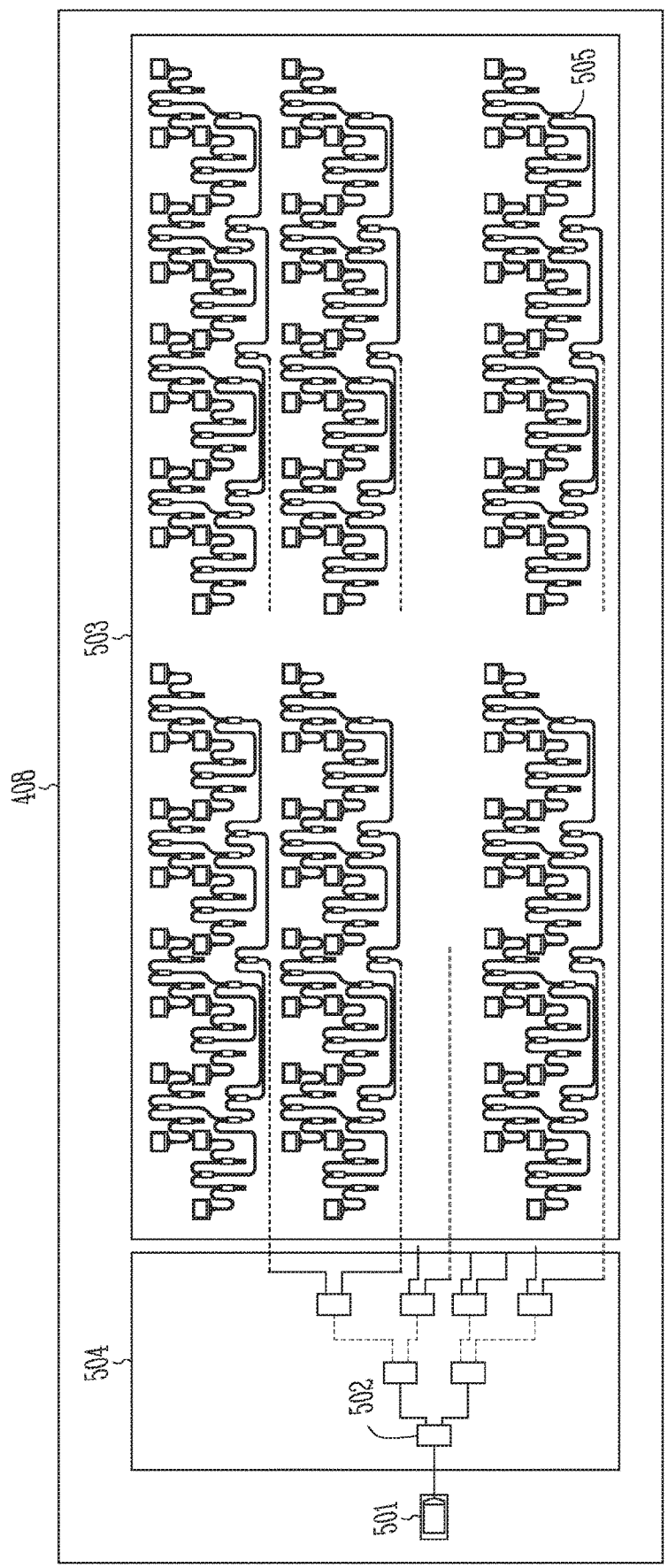
FIG. 6 illustrates an example of a receiver photonic integrated circuit.

The detection module 104 includes in an example 402 a collimating lens or multiple lens imaging assembly 407 and a receiver PIC 408 as illustrated in FIG. 6. The receiver PIC 408 includes an array of N by M pixels 503, a local oscillator distribution and control section 504, which in an example can include an array of switches and a grating coupler 501, as shown in FIG. 6. To provide the desired field of view and resolution, several approaches may be used. One approach used by Aflatouni et al. includes the use a small number of pixels and mechanically shift the imager to sequentially create an image with subsequent processing of the acquired images. Such an approach would not be commercially viable for the high resolution real time image acquisition requirements of autonomous vehicles LIDAR (e.g., several million points per second). In order to achieve the desired resolution and speed, arrays that can capture a high number of pixels simultaneously at frame rates of 50 to 200 Hz are desired. In an example, the receiver PIC 408 includes an array of 512 by 300 pixels. A ratio of 1.5 to 2 for the horizontal vs. the vertical number of pixels can be advantageous in order to correlate with the wider horizontal vs. vertical desired field of view for an automotive application. In other examples, other resolutions may be used such as 854 by 480 or 1024 by 600 as well as non-standard formats as well as different pixel designs such as pixel design examples 600, 700, 800, 900, and the required field of view of the detection module example 402 as illustrated in FIGS. 7A-7D.

Once each of the first optical signals hit a target location as controlled by the corresponding beam steering unit 401, a portion of the signal scattered from a target can be collected by lens 407 and focused on the Pixel array 503 of the receiver PIC 408. A grating coupler 601 couples the return light into the planar circuit.

Each of the second optical signals coming out of the transmitter PIC 200 can be coupled into one of the receiver PICs 408 through a grating coupler 501, and through an adiabatic coupler can be guided from the grating coupler into a single mode waveguide. The second optical signal can be then guided through to the local oscillator distribution and control section 504, which in an example can include a cascade of 1×2 optical switches 502 which provide routing of the second signal to the desired section of the N×M array of pixels 503. In an example, each row of pixels corresponding to the horizontal direction receives the second optical signal from one or multiple outputs of the optical switch array 504. The ensemble of pixels which are connected to one output of the local oscillator distribution and control section 504 form a block and the configuration of the switch array controls which block receives the second optical signal. Each signal from an output of the local oscillator distribution and control section 504 can be split through a tree of 3 dB 1×2 MMI splitters 505 into a number of equal intensity signals as shown in FIG. 6 each going to one cell. Sample cell schematics are shown in FIGS. 7A-7D.

Each cell 600 includes two grating couplers 601, one 1×2 3 dB MMI coupler 602, two 2×2 MMI couplers 603, and 4 waveguide detectors 604. The second signal can be guided through waveguide 605 to the input of the 1×2 MMI coupler 602 and split equally by the coupler. The output of the 1×2 coupler 602 can be collected by waveguides 607 and can be input into one of the input ports of the 2×2 MMI coupler 603. The scattered first signal received by the detector can be coupled into the PIC though the grating couplers 601 and guided to the other input of the 2×2 MMI coupler 603 through waveguide 606. The 2×2 MMI coupler 603 serves to mix the scattered from the target first signal and the second signal into the two output waveguides of the 2×2 MMI coupler. The output of the 2×2 couplers can be guided into waveguide detectors 604 one on each output of the 2×2 MMIs 603 as shown in FIG. 7. In a coherent detection technique, the use of two detectors in a balanced detection configuration eliminates the dc component and therefore maximizes the signal photocurrent. More specifically, electric fields for the optical field incident on the two detectors are described by:

$$E1 = \frac{Es + ELO}{\sqrt{2}}$$

$$E2 = \frac{Es - ELO}{\sqrt{2}}$$

where Es and ELO are the signal and local oscillator electric field and E1 and E2 are the electric fields on the two detectors.

The photocurrents on the two photodetectors are given by:

$$I1(t) = \frac{R}{2} * \left[Ps(t) + PLO(t) + 2 * \sqrt{Ps(t) * PLO} * \cos(\omega IF * t + \theta sig(t) - \theta LO(t))\right]$$

$$I2(t) = \frac{R}{2} * \left[Ps(t) + PLO(t) - 2 * \sqrt{Ps(t) * PLO} * \cos(\omega IF * t + \theta sig(t) - \theta LO(t))\right]$$

The photocurrent resulting after subtracting the photocurrents of the two detectors can be given by:

$$I(t) = I1(t) - I2(t) = 2R\sqrt{Ps(t)*PLO} * \cos(\omega IF*t + \theta sig(t) - \theta LO(t))$$

where R can be the detector responsivity, Ps(t) and PLO(t) are the signal and local oscillator optical power respectively, ωIF can be the modulation frequency of the optical signal, and θsig(t) and θLO(t) are the time dependent phases of the optical field. One can see that after subtracting one photodetector photocurrent from the other, the fast oscillating terms Ps(t) and PLO(t), which are seen by the detectors as constant (dc) components of the optical signal, cancel each other, and the result can be a signal photocurrent oscillating at the ωIF intermediate frequency and with amplitude 2R $\sqrt{Ps(t)*PLO}$. In addition to the amplification effect of the higher power PLO component, the amplitude can be doubled, therefore increasing the detection sensitivity.

Figure 7A:
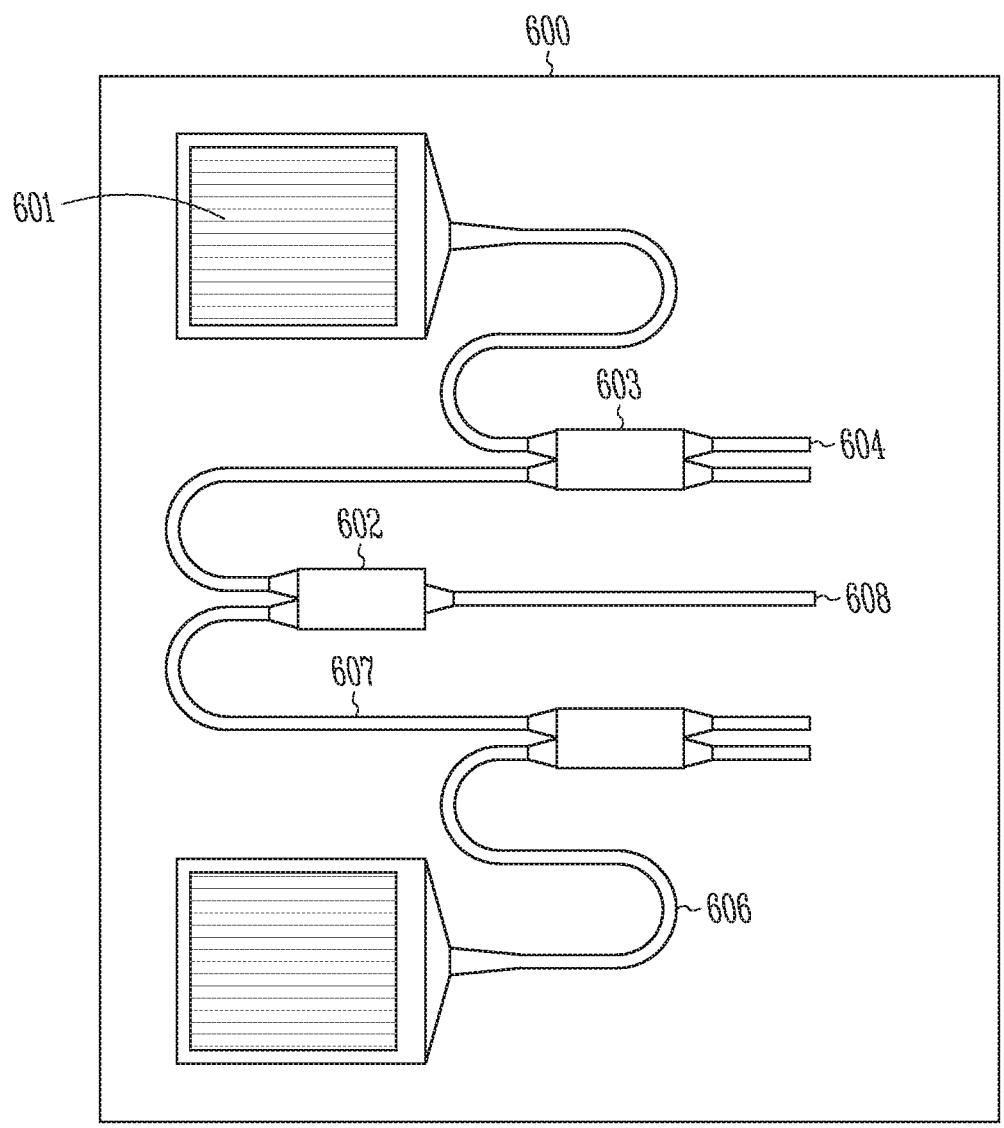
Figure 7B:
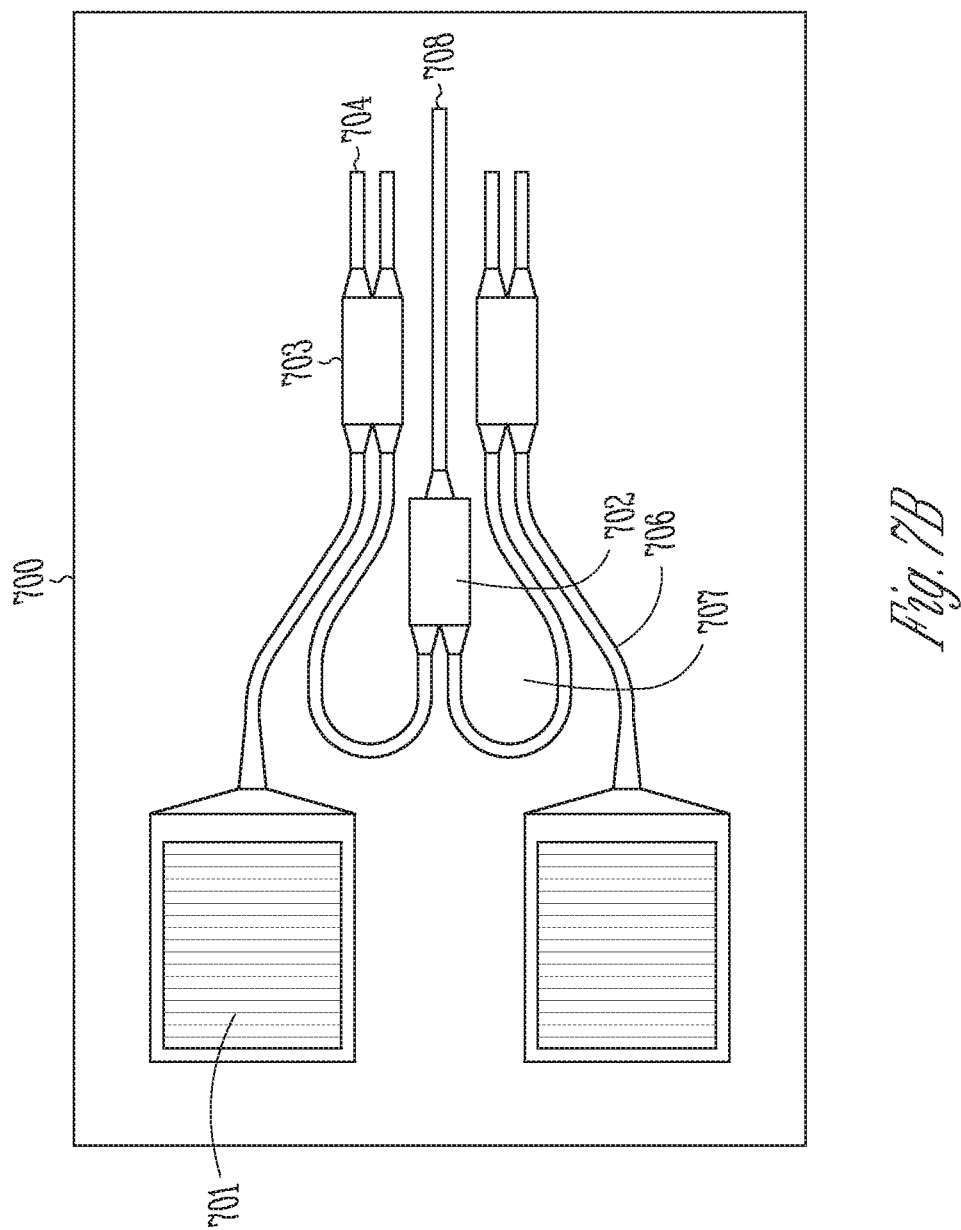
Figure 7C:
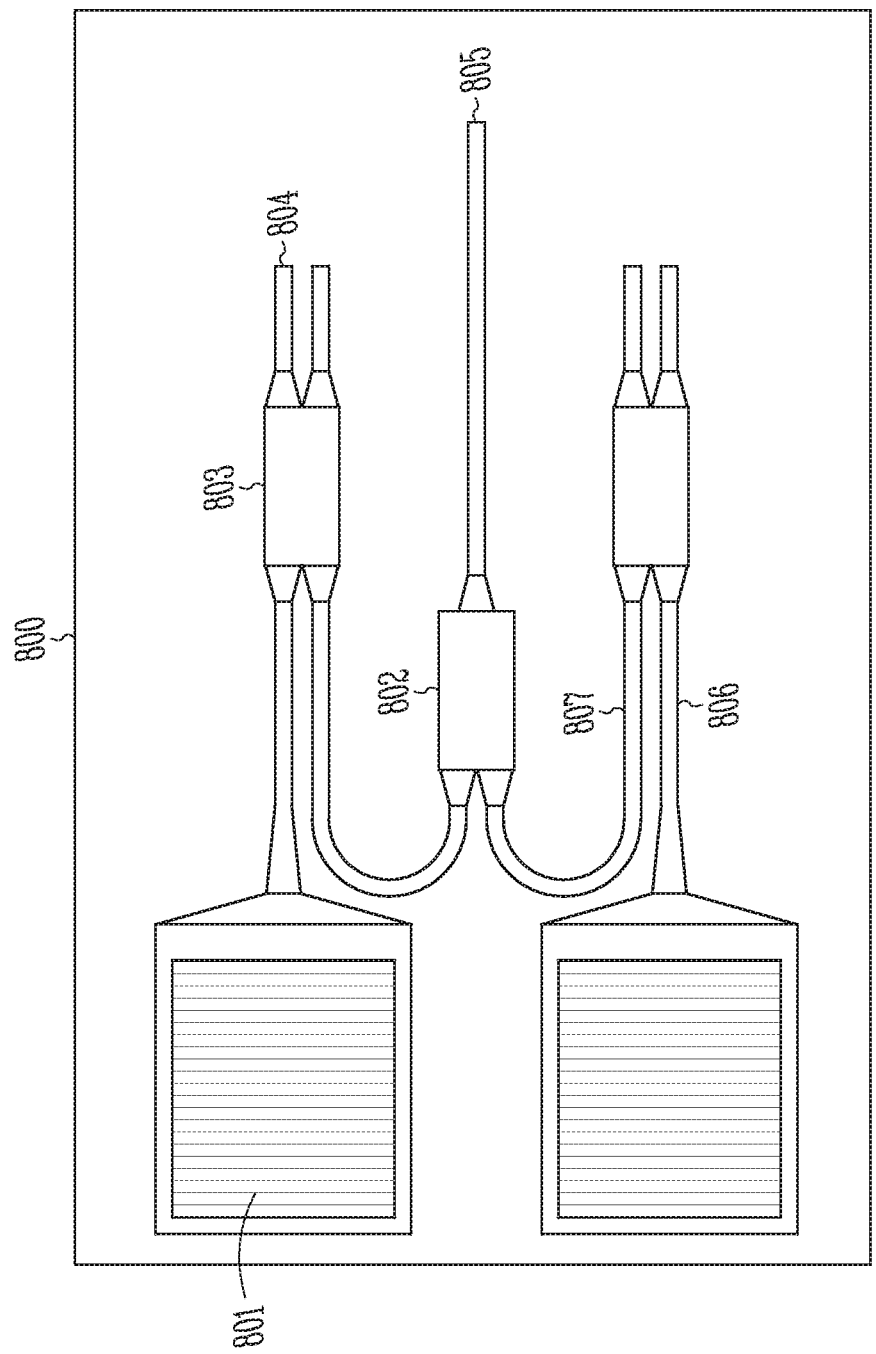

In an example, the waveguide detectors are Germanium grown on Silicon detectors. Alternative designs of the cells 700, 800 and 900 are shown in FIGS. 7B-7D.

Correlation of MEMS Scanner with Detector PIC

Figure 8:
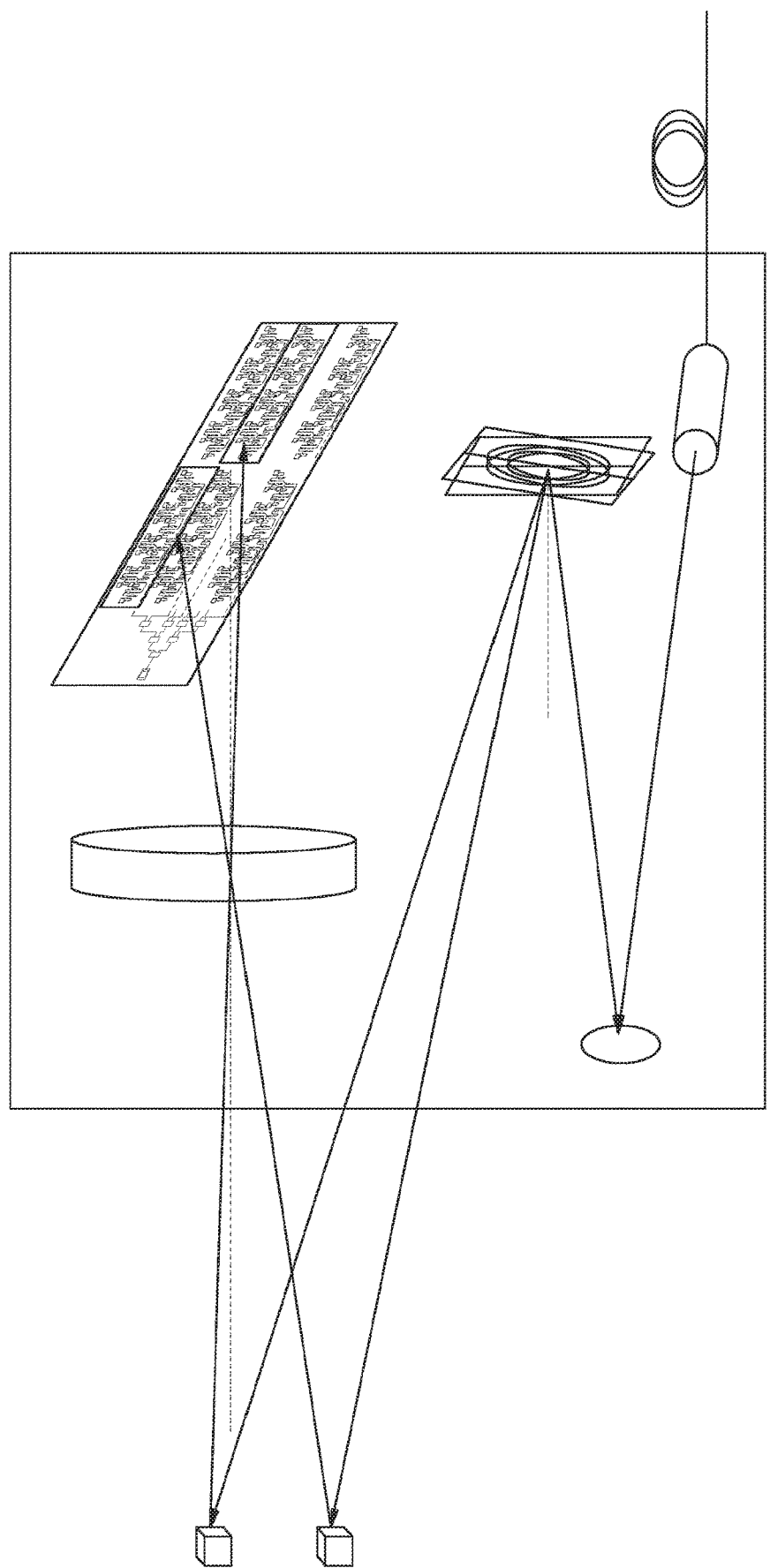
FIG. 8 illustrates an example of MEMS based lidar system.
Figure 9:
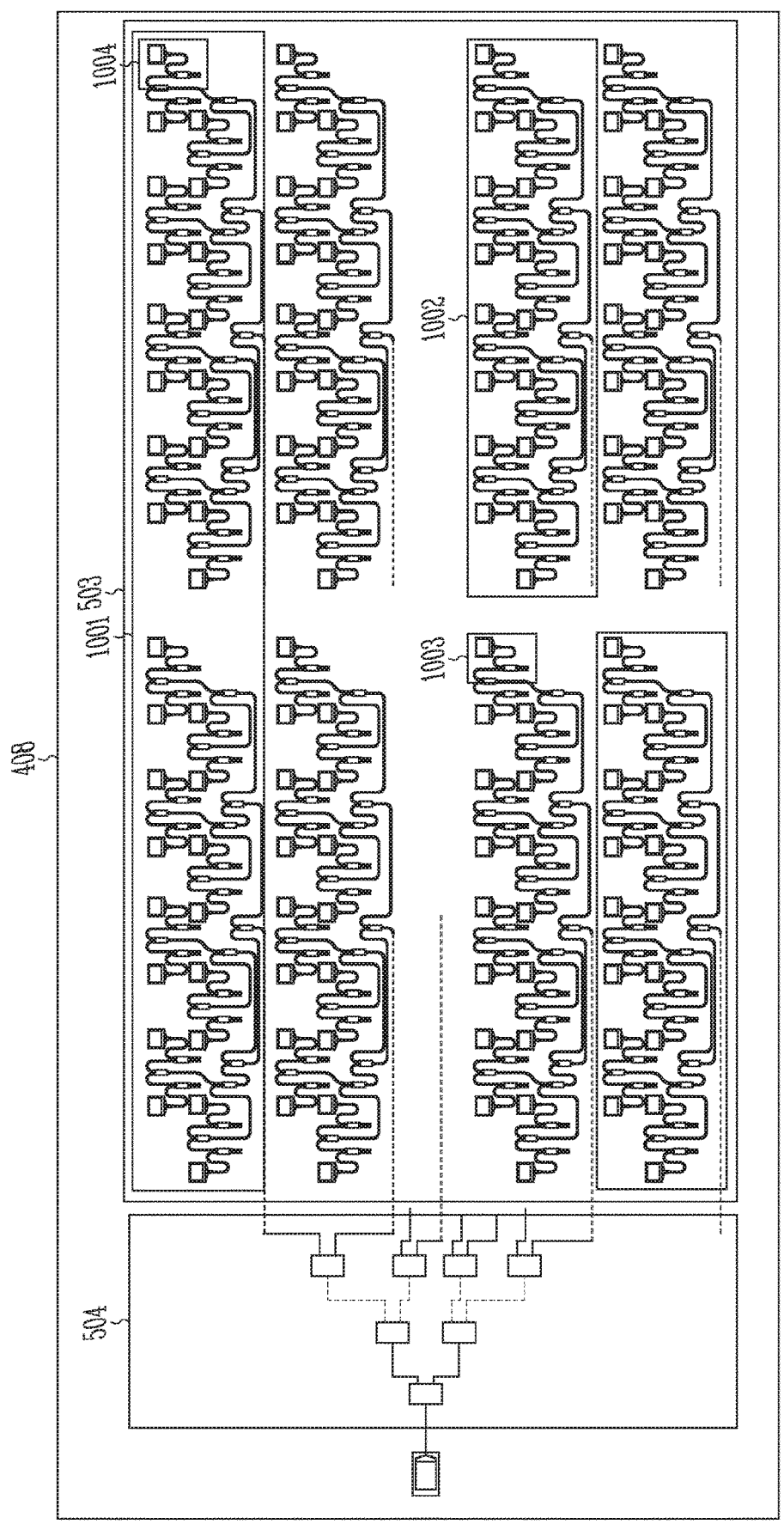
FIG. 9 illustrates an example of a detection array.

For a high density detector array and fixed local oscillator laser power, the available laser light per pixel if one would supply all pixels of the array at all times would be too low, leading to performance degradation as the number of pixels in the array increases. For example, for a small array of 100 pixels, splitting a 100 mW laser using a passive MMI tree into 100 waveguides to provide local oscillator light to the 100 pixels would result in a 1 mW local oscillator signal for each pixel, which can be adequate. In the case of scaling the array to 100,000 pixels, the amount of light per pixel using a 100 mW source and a static MMI tree which supplies all pixels at all times will drop the local oscillator signal that a pixel would receive to only 1 microwatt, leading to degradation in performance of the detector as the signal amplification role of the local oscillator in the heterodyne measurement can be impaired. Due to this performance degradation and taking into account that the return signal can be incident only on a few pixels at any point in time, select sections of the detector array may be sensitized at one time so that only a limited number of pixels in the array are supplied with local oscillator light simultaneously. This approach uses a dynamic local oscillator control technique described earlier. The sensitized block, i.e., the block supplied with local oscillator signal and the position of the MEMS mirror scanner need to be correlated as shown in FIG. 8. Two synchronization techniques are described in FIGS. 9 and 10.

In an example, the local oscillator distribution and control section 504 directs one part of the second optical signal to one section of the array 1001 upon which the return first signal can be currently incident. The second part of the first signal can be used to sample using a probabilistic algorithm the non-sensitized sections of the array 503 such as block 1002 in order to detect discontinuities in the position where the scattered light from the target first signal can be incident on the array. To sensitize a certain block, the switches in the switching block 504 are configured so that they direct local oscillator light to the desired block. Upon detection of a discontinuity in the incidence position on the array of the scattered first signal, the switch array 504 can be reconfigured to continue measurement of the return first signal starting from the identified block 1002.

In another example, a supervisory pulsed channel may be used to periodically sample all blocks of the array to detect a discontinuity in return signal incidence location on the detector array. In an example, the pulsed optical signal has a repetition rate of 1 KHz and peak power of 1 KW. Due to the substantially higher power in the sampling optical signal, the detectors of the array may detect the pulsed signal independent of the presence of the second optical signal local oscillator in the corresponding section of the array. Based on the incidence location on the array information provided by the supervisory channel, the switch array 504 may be configured to sensitize the section of the array upon which the return first optical signal can be incident.

Grating Period Correlation with Angle of Incidence

For a basic rectangular waveguide grating coupler, the period of the grating can be given by:

$$w = \frac{\lambda}{n - \sin(\varphi)}$$

Where w can be the grating period, n can be the effective index of refraction of the light in the waveguide, A can be the wavelength of the optical signal, and φ can be the angle for the −1 diffraction order of the grating. To a first approximation, to maximize coupling into the grating, the period of the grating can be chosen such as the coupling angle of the −1 diffraction order of the grating to coincide with the incidence angle on the grating for the return first signal corresponding to the particular location on the grating.

The coupling gratings which couple the return first signal into the planar circuit for each pixel are highly sensitive to the angle of incidence on the grating and therefore to the angle of incidence on the surface of the array. Loss increases when the incident angle deviates for more than 1-2 deg from the angle of incidence for which the grating has been designed, therefore using the same design of the grating for all pixels will lead to high coupling losses in the areas of the array away from the optimal location. As an example, coupling efficiencies in gratings may drop by 10 dB for angles deviating 10 degrees from the optimal angle. As the field of view of the detector may be of several tens of degrees—in an example it may be 50 degrees—the coupling in an un-optimized grating may lead to degradation in performance.

Figure 11A:
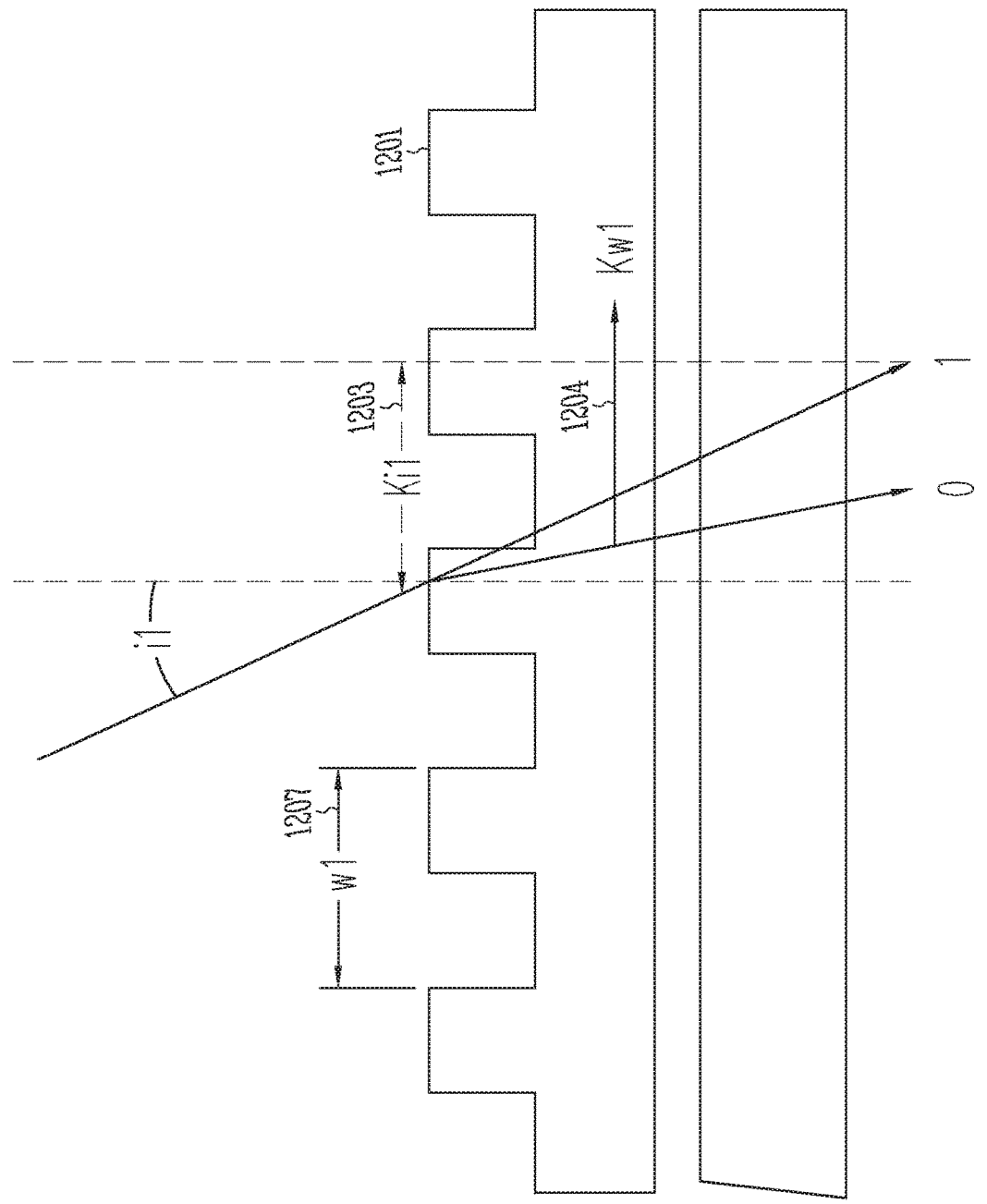

As the return path of the signal can be known and can be defined by the center of the collimating lens and the incident location on the array, the angle of incidence of the return signal on each pixel of the array can be known. To maintain maximum coupling efficiency for the grating couplers at every location on the array, the gratings may be designed with varying parameters such as periods from one section of the array to another. The period, or period function of the grating if the grating is apodized, may be a function of the angle of incidence of the beam on the corresponding section of the array and be optimized to achieve maximum coupling for each pixel. A simple diagram to illustrate the basic principle is shown in FIG. 11 for a constant period grating. In an example, cell 1003 situated close to the center of the array contains grating design 1201 while cell 1004 situated at the edge of the array therefore corresponding to a larger angle of incidence contains grating design 1202. In an example, the grating period 1208 for grating 1202 can be approximately given by:

$$w2 = \frac{\lambda}{n2 - \sin(\varphi 2)}$$

and can be different than the grating period 1207 for grating 1201 approximately given by:

$$w1 = \frac{\lambda}{n1 - \sin(\varphi 1)}$$

in order to achieve the matching condition between guided waveguide mode wave vector 1204 with the −1 diffraction order wave vector 1203 for grating 1201 as well as for waveguide wave vector 1206 with the −1 diffraction order wave vector 1205 for grating 1202. For the above formulas, w1 and w2 are the periods of the two gratings respectively, n1, n2 the effective index of the waveguide gratings, and φ1 and φ2 the angles for the −1 diffraction order for the two gratings (which to a first approximation should match the first signal coupling angle). For apodized gratings, the apodization function may be adjusted to correlate with the angle of incidence.

Variants of the Modular Architecture for Other Applications—Single Chip Integration of Transmitter, Receiver and Laser Source While the above examples relate to automotive and other large form factor platforms, due to the chip scale integration approach of multiple optical functions, the modular system 100 has the versatility to be applicable to other applications in small form factors. In an example the laser light generation module may contain only one laser diode chip that can be integrated with the transmitter PIC 200 containing one or multiple channels and with one or multiple beam steering module examples 401 and detection module examples 402 into a low cost, low form factor package suitable for advanced driver assistance systems (ADAS), drones, and small robotics applications, among other applications.

Figure 12:
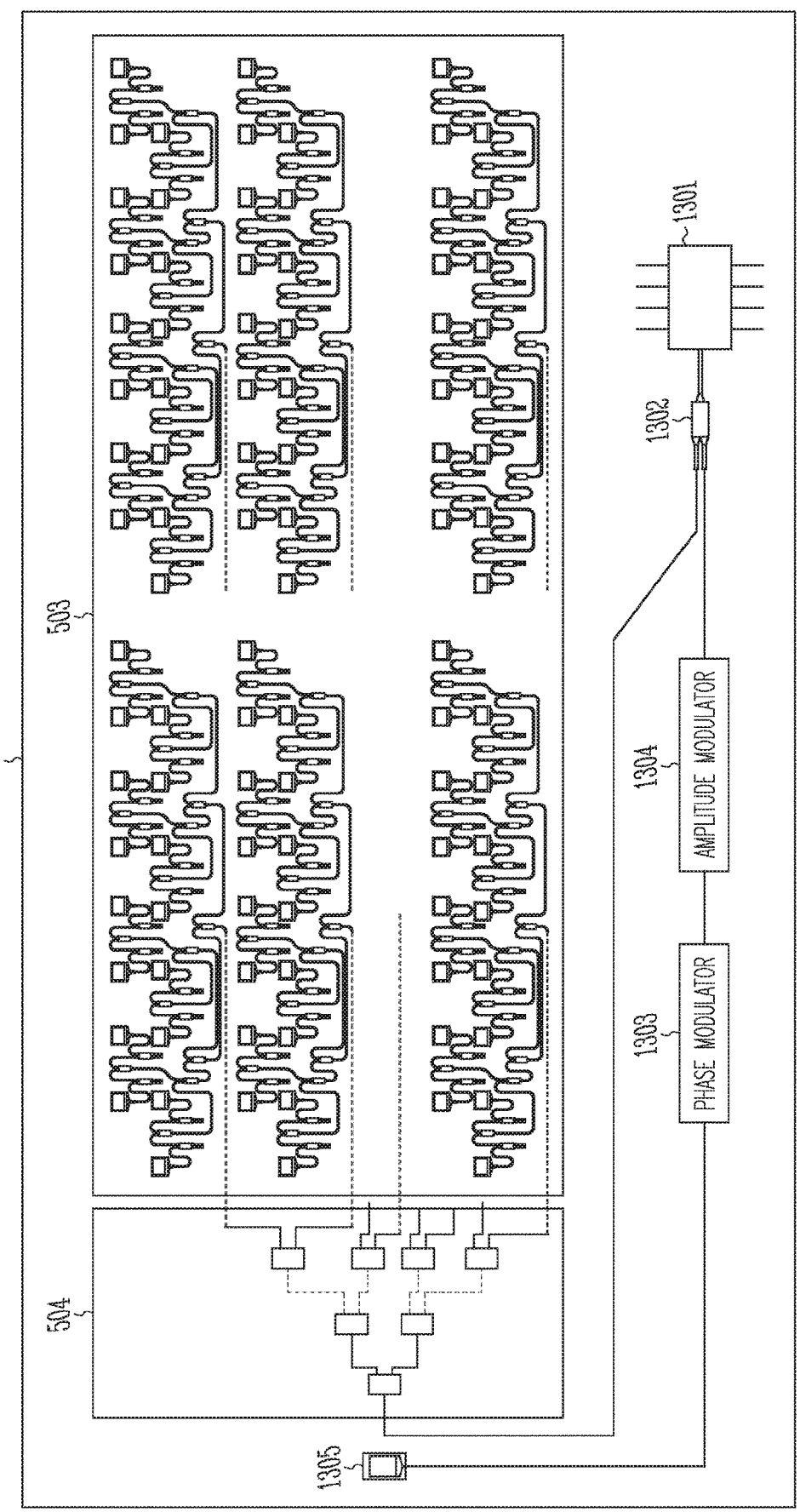
FIG. 12 illustrates an example of a transceiver photonic integrated circuit.

In an example as illustrated in FIG. 12, a laser light source 1301 can be bonded directly on the integrated silicon chip 1300. In an example, the integrated silicon chip 1300 may contain the transmitter functions and the receiver functions monolithically integrated as well as the optical laser light source bonded on the silicon platform. Alternatively, the laser source may be off chip and fiber coupled into the silicon chip through a grating or end coupler.

Figure 13:
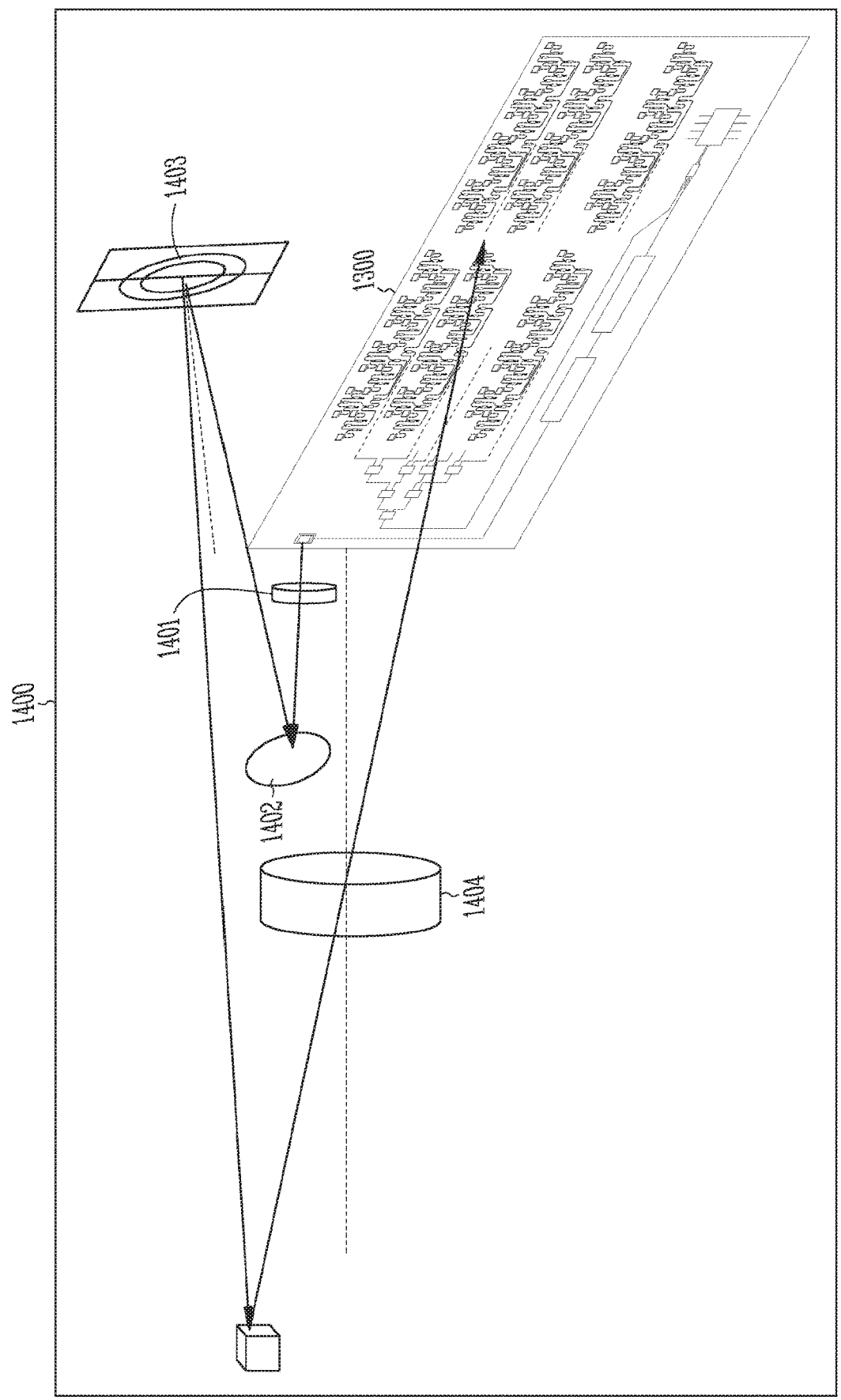
FIG. 13 illustrates an example of a beam steering and transceiver module.

In the illustrated example of FIG. 12, the optical signal from the laser 1301 can be coupled into a silicon waveguide and guided to the input of tap coupler 1302 which splits the optical signal into a first signal directed through the amplitude modulator 1304 and phase modulator 1303 and a second signal directed towards the input to the switch array 504 to provide local oscillator light for the array of sensors 503. The first signal can be coupled out of the chip through the grating coupler 1305. An adiabatic waveguide coupler may be used instead of the grating coupler 1305. In this example, the transmitter and receiver functions may all be integrated on the same chip and the laser source chip may be attached directly to the silicon chip. The chip 1300 may be employed as part of the beam steering and detection module 1400 illustrated in FIG. 13. In the illustrated example, the first optical signal from grating coupler 1305 can be collimated by lens 1401 and directed to mirror 1402. The signal reflected from mirror 1402 can be directed to the MEMS mirror 1403. The first optical signal reflected by MEMS mirror 1403 can be directed towards the target. The mirror executes a rastering or Lissajous pattern to cover the desired field of view. In an example, the field of view can be 25 deg vertical and 50 deg horizontal. The first optical signal reflected from the target can be coupled by the gratings 601 of the sensor array 504, combined with the local oscillator in array 504, and converted into an electrical signal. The example described above uses a silicon on insulator platform for integration, though in other examples other materials such as InP may be used.

Single Chip Solution Architecture Using Phased Array Steering

In the previous example shown in FIG. 12, the steering mechanism may be provided by a MEMS mirror located outside the integrated transmitter receiver (transceiver) chip. An alternative approach for the steering mechanism can be to use an optical phased array of optical micro antennas or emitters. In certain examples, the optical micro antennas can be referred to as optical couplers. In a phased array of optical micro antennas, each antenna may be made by etching a grating into a waveguide that radiates the light out of the waveguide. By using a two-dimensional array of such emitters, e.g., a 32×32 or 64×64 emitter array, an interference pattern may be generated in the far field by the superposition of wavefronts originating from the different emitters. A far field pattern containing one strong central maximum and sidelobes suppressed by 10 dB or more may be obtained in the far field with suitably designed parameters of the emitter array. By controlling the phase of the light emitted by each micro antenna, the central maximum position may be changed, thereby creating essentially a two-dimensional steering mechanism. Larger arrays of emitters such as 128× 128 or smaller such as 16×16 may used. A larger array may create a lower divergence beam and potentially better suppression of the side lobes, though the power required for steering may be higher as the number of phase shifter associated with controlling the antennas increases. A smaller array such as 16×16 may have lower power consumption though also larger beam divergence and less suppression of side lobes for the same inter antenna spacing.

Figure 14:
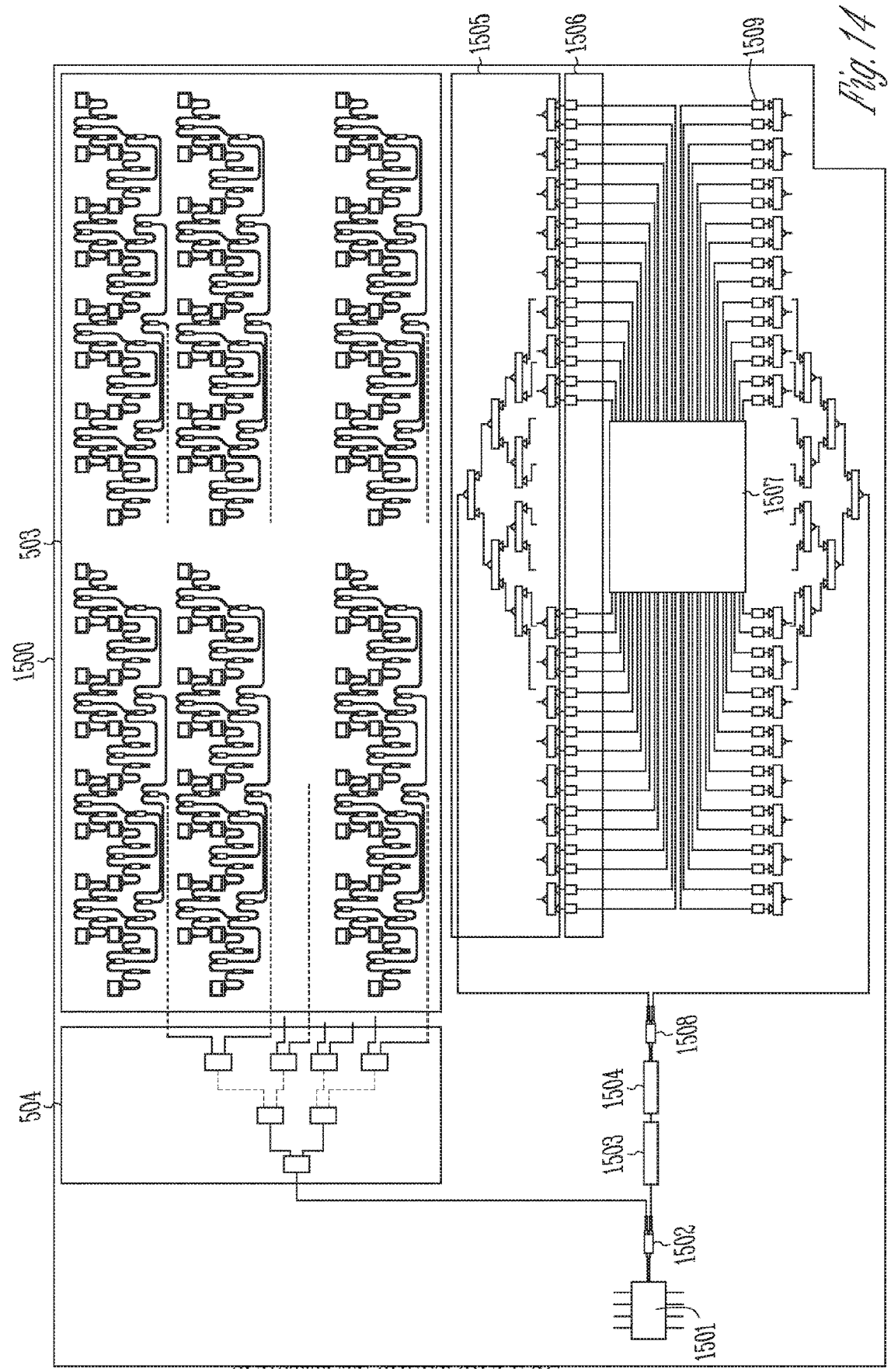
FIG. 14 illustrates an example of an integrated lidar system.

An advantage of a phased array can be that it can be integrated with a transceiver design, e.g., as shown in FIG. 12, creating therefore a single chip LIDAR solution incorporating all three functions on the same semiconductor platform—transmitter, receiver, and beam steering. An example of such a single chip solution (e.g., integrated lidar system) is shown in FIG. 14. In the example, the signal from the laser 1501 can be coupled into the waveguide and directed towards the 1×2 MMI waveguide 1502. The 1×2 MMI waveguide 1502 splits the optical signal into a first optical signal and second optical signal. The first optical signal can be directed to the phase modulator 1503 and amplitude modulator 1504 and then to the input of 1×2 MMI waveguide 1508. The second optical signal can be directed towards the switch array 504 to provide a local oscillator signal to the sensor array 503. The 1×2 MMI waveguide 1508 splits the first optical signal into two equal components directed towards the two 1×2 MMI trees 1505. The MMI trees split the signal into a plurality of equal components. In an example, the upper MMI tree 1505 generates 512 equal signal outputs and the lower MMI tree generates 512 equal signal outputs. Each equal signal output can be directed through a waveguide to one of a plurality of phase modulators 1509. The phase modulators 1509 are part of one of two phase modulation blocks 1506. There can be an upper phase modulation block 1506 coupled with an output of the upper MMI tree 1505, and a lower phase modulation block 1506 coupled with an output of the lower MMI tree 1505. The output of each phase modulator 1509 couples with one of a plurality of micro antennas disposed in an array of micro antennas 1507. Each of the phase modulators 1509 may be independently controlled to independently control the phase of the corresponding optical signal emitted by each of the micro antennas which form the array of micro antennas 1507.

Figure 15:
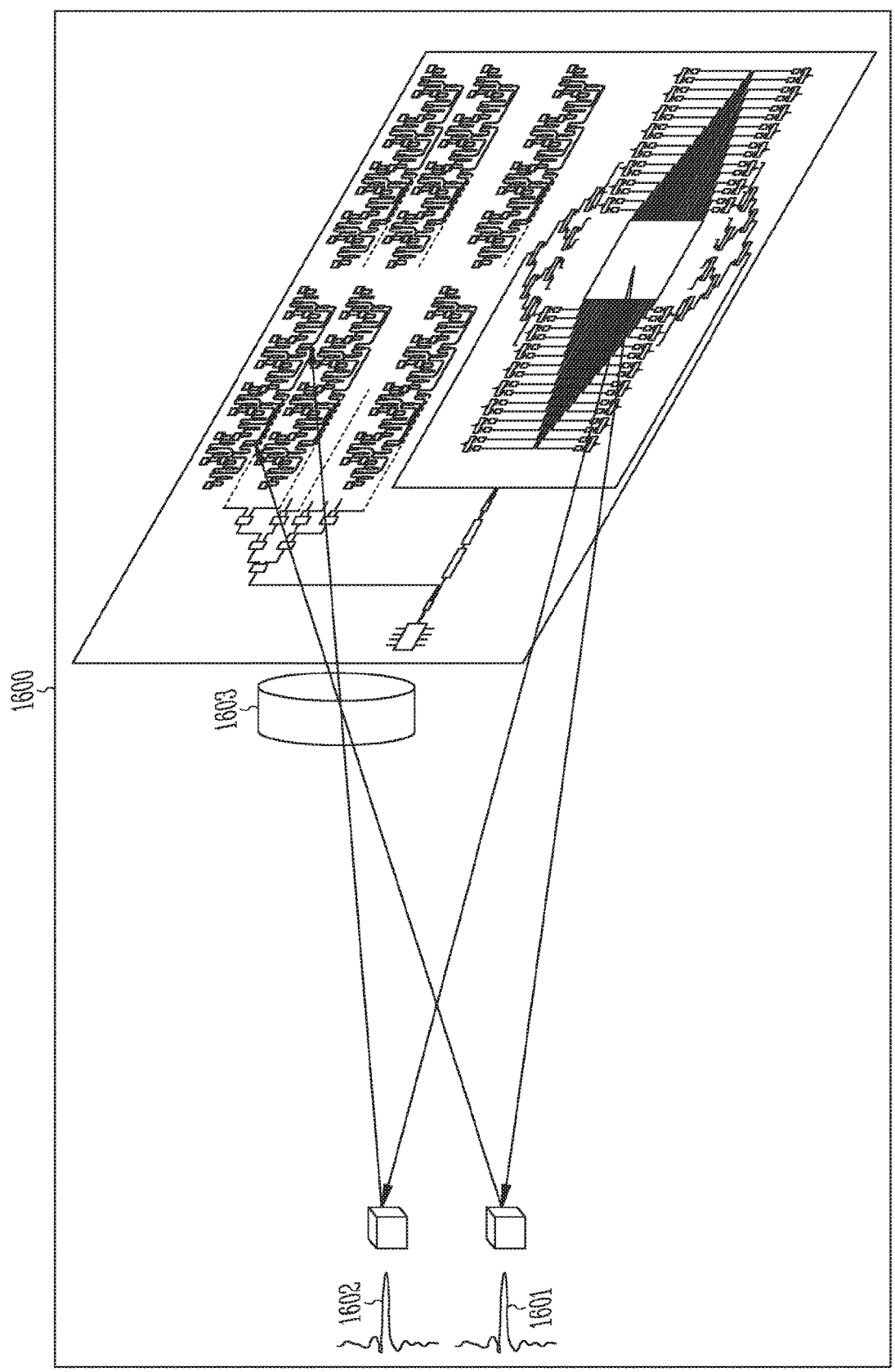
FIG. 15 illustrates an example of operation of an integrated lidar system.

By changing the distribution of the phases of the outgoing optical signals exiting the chip through the array of micro antennas 1507, the optical beam may be directed in the desired direction. The central interference maximum of the optical beam may be controlled to shift position based on the relative phase distribution of the optical signals emitted by the array of micro antennas 1507. An example is shown in FIG. 15. A first phase distribution across the array of optical signals exiting the array of micro antennas 1507 creates interference pattern 1601 in the far field for the first optical signal. A second phase distribution across the array of optical signals exiting the array of micro antennas 1507 creates interference pattern 1602 in the far field for the first optical signal having as a net effect the steering of the beam between the two positions, one position associated with the interference pattern 1601 and the other position associated with the interference pattern 1602. The first optical signal scattered by the target can be collected by lens 1603 and directed towards the sensor array 503 of the system on a chip 1500. In an example, the material system used to create the system on a chip 1500 can be silicon on insulator and the wavelength of operation can be 1550 nm.

System Block Diagram

Figure 16:
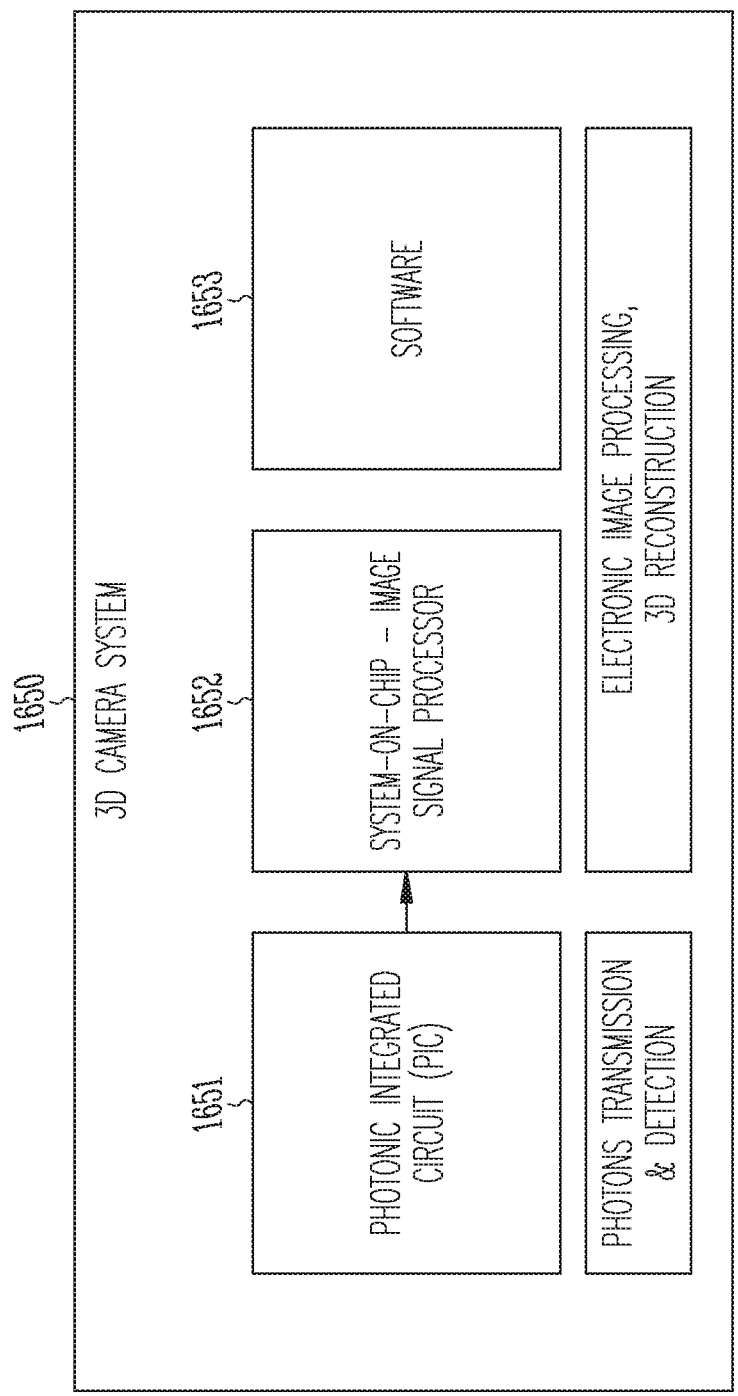
FIG. 16 illustrates an example of an 3D camera module.
Figure 17:
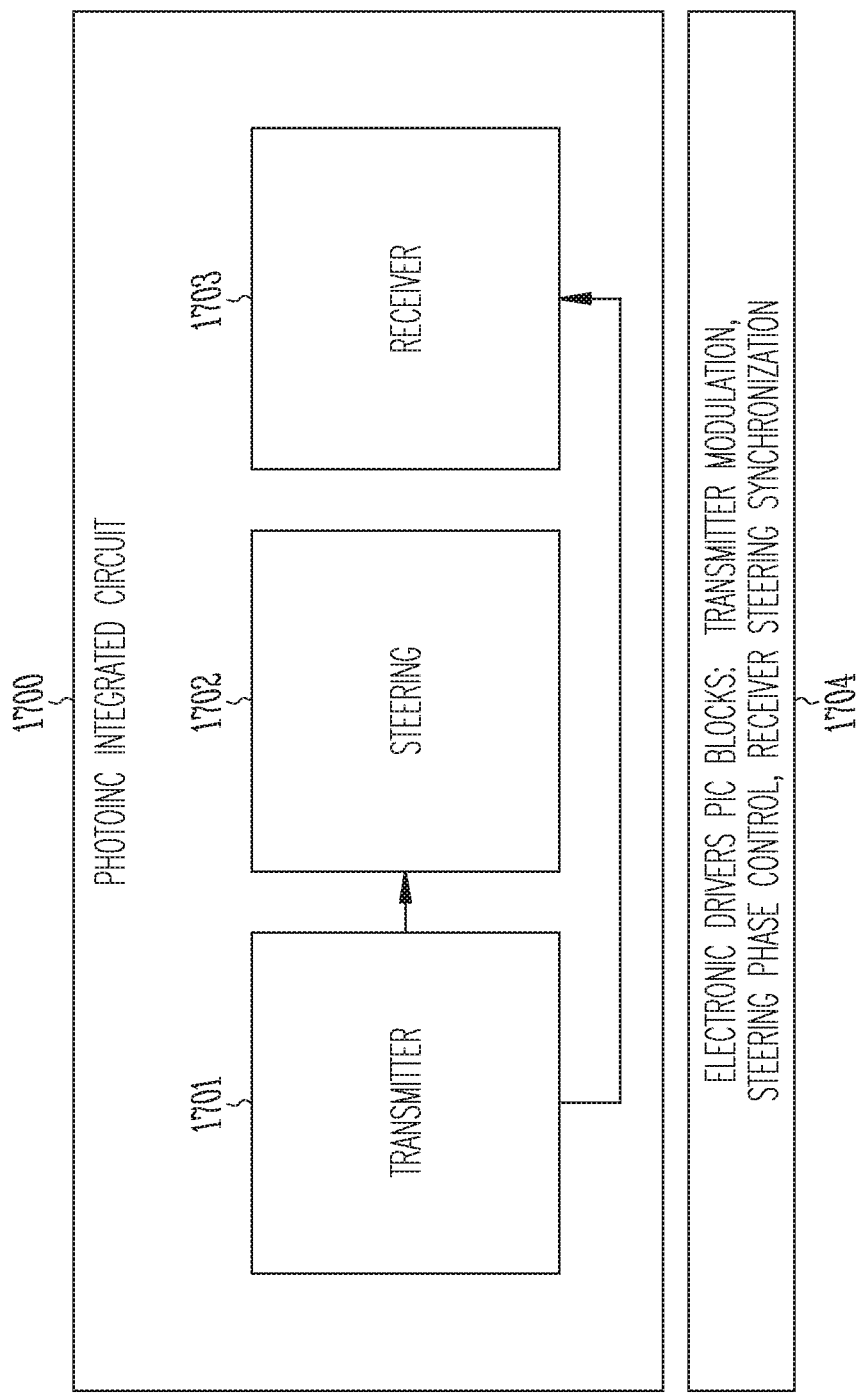
FIG. 17 illustrates an example of a photonic integrated circuit.
Figure 18:
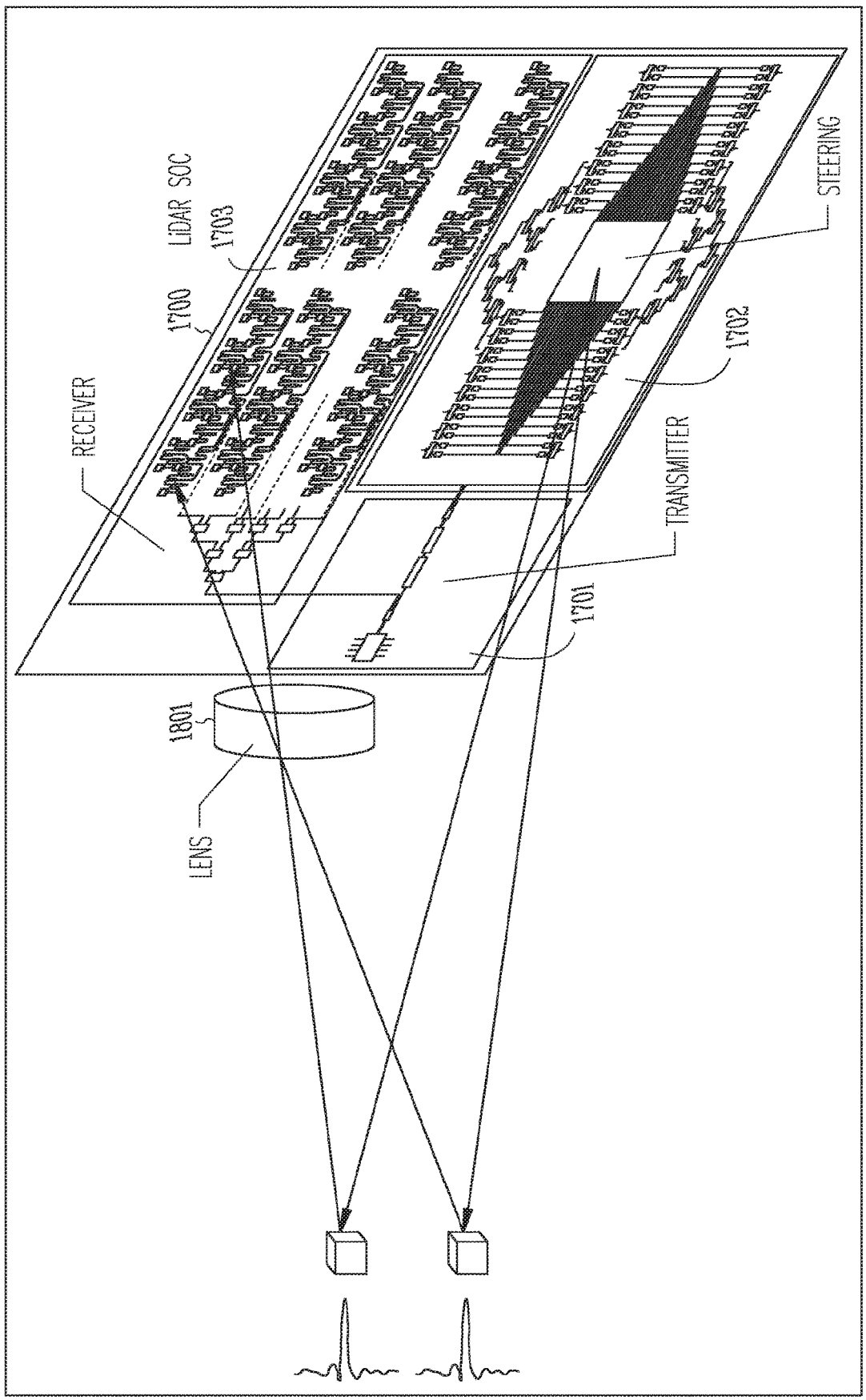
FIG. 18 illustrates an example of operation of a photonic integrated circuit.

FIG. 16 illustrates an example of an optical 3D imaging camera system 1650. An optical signal generation source can produce laser light with defined spectral and power characteristics. The light can be transmitted via optical fiber or through free space propagation to a photonic integrated circuit 1651. The 3D imaging camera system illustrated in FIG. 16 can include a photonic integrated circuit (PIC) 1651, which can perform a plurality of passive and active optical functions to create one or multiple signals with tailored amplitude, phase and spectral characteristics, direct the optical beam towards a target and detect the return signal on an array of sensors. In an example, the PIC 1651 can include a transmitter module 1701 a steering module 1702 and a receiver module 1703 as illustrated in FIG. 17. A functional block containing electrical drivers for the transmitter, steering and receiver blocks, as well as synchronization circuitry 1704 can be integrated on the chip or be separate from the chip. An outbound optical signal with tailored amplitude, phase and spectral characteristics can be generated by the optical signal generation source and the transmitter module 1701, and directed towards a target by steering module 1702 which can be part of the PIC 1700. The optical signal can be converted into an electrical signal by the array of sensors which are part of the receiver module 1703 of the PIC 1700. The plurality of electrical signals generated by receiver module 1703 can be processed by the electronic signal processing module which in an example can include an image signal processor 1652. By analyzing the plurality of electrical signals generated by PIC 1651, information about the location, velocity and reflectivity of targets can be quantified. A plurality of analyses can be performed on the signals generated by image signal processor 1652 with the help of software to create a pointcloud containing velocity, distance and reflectivity information about the surrounding environment. In an example, the optical signal used can be within the 1530 nm to 1565 nm range to take advantage of higher maximum permissible exposure limits, and low background optical noise. In an example, the transmitter, steering and receiver modules can be part of a PIC and can be implemented using a Silicon Photonics platform. A block diagram description of the modular structure is shown in FIG. 16.

Optical Signal Generation Source

In an example, the optical signal generation source can include a DFB or DBR laser, having a single transverse mode and a single longitudinal mode. In one example, the optical signal generation source can have a narrow linewidth corresponding to a long coherence length. In an example, the linewidth of the laser can be less than 250 KHz corresponding to a coherence length in excess of 400m. In another example lasers with linewidths in the range from 10 KHz to 10 MHz can be used and output power can be in the range of 5 mW to 200 mW. In another example a master oscillator, power amplifier configuration can be used to achieve high optical signal power such as in the range of 200 mW to 20 W.

Figure 19:
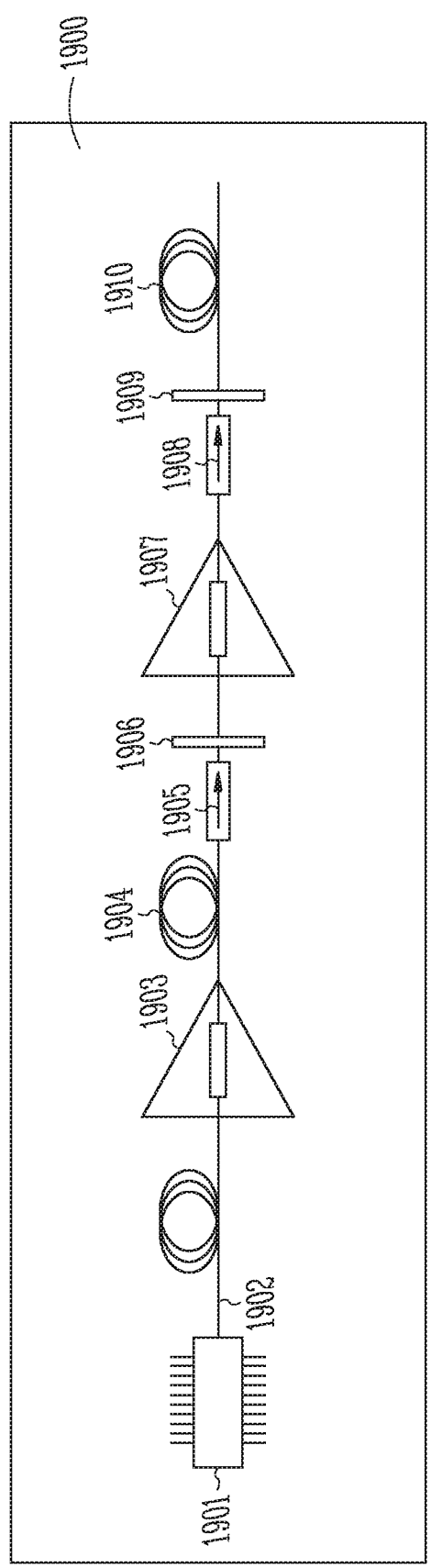
FIG. 19 illustrates an example of a two-stage amplifier.

In an example, the optical signal generation source can include a low optical power master oscillator followed by a one or two stage amplifier. In an example, the master oscillator can include a low power single longitudinal and transverse mode continuous wave diode laser such as a distributed feedback (DFB) laser or distributed Bragg reflector (DBR) laser. FIG. 19 illustrates an example of a two-stage amplifier 1900. In the two-stage amplifier 1900, a signal from a single mode laser 1901 can be coupled into a fiber amplifier 1903 through an optical fiber 1902. The output from a first stage can be guided through a fiber 1904 through isolator 1905 and amplified spontaneous emission (ASE) filter 1906 to a second stage of a fiber amplifier. The output of the second stage of the amplifier can be guided through fiber through isolator 1908 and ASE filter 1909. The first stage of the amplifier can include a single clad or double clad doped fiber amplifier operating in a small signal/high gain regime and the second stage of the amplifier can include a double clad doped fiber amplifier operating in saturation. In an example, the wavelength of operation of the system can be 1550 nm or any other wavelength within the C and L bands of the telecommunications windows. Other wavelengths between 1-2 microns may be used as well. In an example of the system with operation at 1550 nm, the first stage of the fiber amplifier can include an Er or Er/Yb doped fiber amplifier, while the second stage can include an Er/Yb doped fiber amplifier. In an Erbium-doped fiber amplifier designed to provide signal amplification in the vicinity of 1550 nm, the Erbium ion hosted in glass can include atomic levels structure to achieve inversion and therefore lasing action in the wavelength band centered around 1550 nm. The lasing emission band (as well as the pump band) can be determined by the dopant—in this case the Er ion—and the host material. If a different wavelength of operation is desired, in addition to a change in the wavelength of operation of the laser source, a different dopant ion/glass host combination may be used in the fiber amplifier in order to shift the lasing emission band and therefore amplification window of the fiber amplifier to the desired wavelength. An example of such a different case includes a fiber amplifier using a Thulium ion as a dopant for operation around 1.9 to 2 microns wavelength. In an example, the master laser can include a single longitudinal mode DFB or DBR laser, though other types of laser sources may be used. In various examples, other laser light sources or source configurations may be used in the laser light generation module. In an example, the output power of the two-stage amplifier 1900 can be in the range of 200 mW to 5 W.

Optical Signal Processing Module

The signal produced by the laser generation module can be sent through optical fiber or through free space and coupled into the optical signal processing module, which can perform a plurality of passive and active optical functions such as multiplexing, de-multiplexing, wavelength selective coupling, beam splitting, directional switching, polarization splitting, polarization rotation, isolation, detection, and laser wavelength conversion, such as to create one or more optical signals with tailored amplitude, phase, and/or spectral characteristics. In addition, the optical signal processing module can perform the task of implementing the desired modulation scheme of the amplitude and/or the phase of the optical electromagnetic field to achieve the desired range, resolution and accuracy of ranging. The module may be made of discrete components or integrated into a photonic integrated platform, or a PIC. Examples of materials systems for integration include Silicon on Insulator, group III and group V semiconductors, and glass on Silicon. In an example, the optical signal processing module 1700, which in an example can be a PIC, can include a transmitter block 1701, a steering block 1702 and a receiver block 1703.

Figure 20:
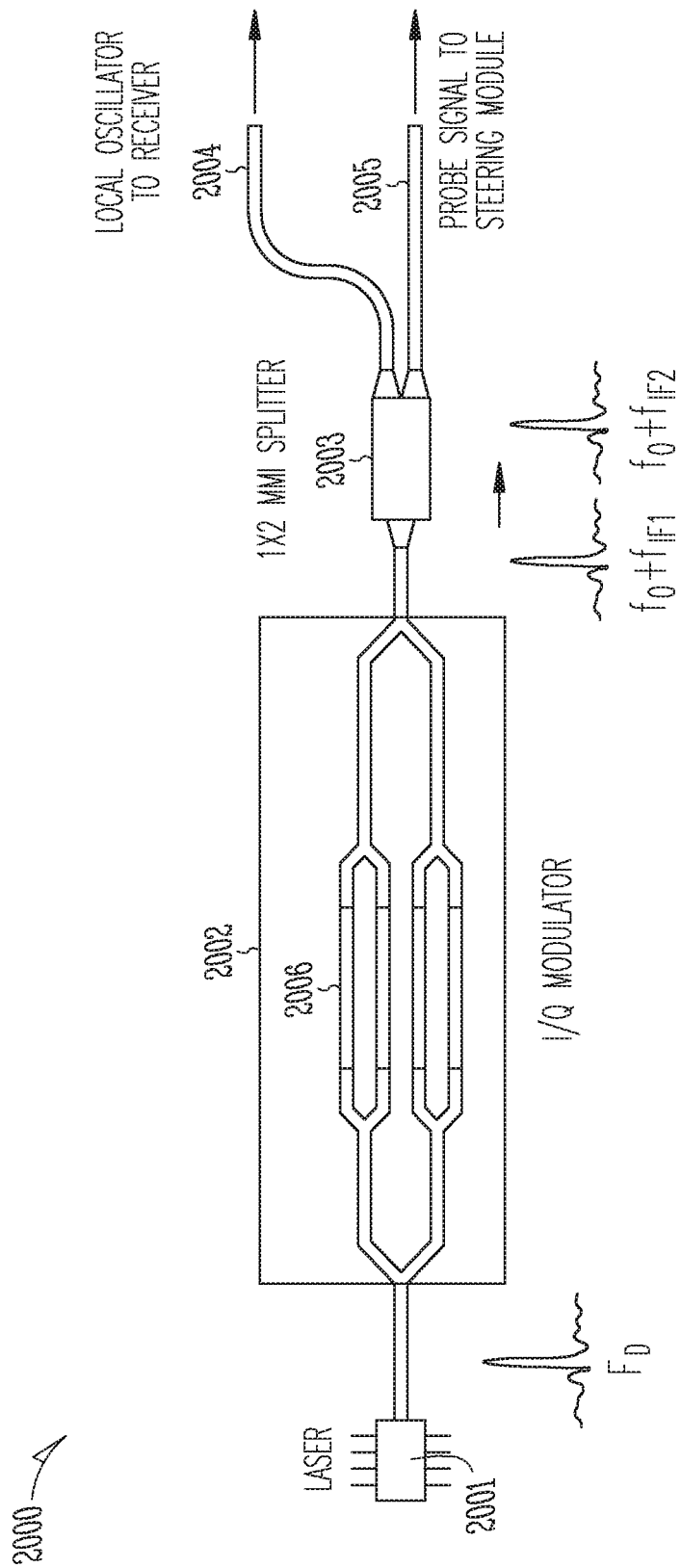
FIG. 20 illustrates an example of an integrated FMCW (frequency modulated continuous wave) transmitter.

In an example, the optical processing module can include a PIC built using Silicon on Insulator technology. In an example, the signal can be coupled into the PIC through a grating coupler, free space coupler or directly butt coupled into the transmitter module which can be part of the PIC. FIG. 20 illustrates an example of an optical transmitter 2000.

The signal from the optical signal source 2001 can be guided through a waveguide to the input of the In phase/Quadrature (I/Q) modulator 2002. The signal from the output of the I/Q modulator 2002 can be split by the 1×2 MMI splitter 2003 into 2 components: one directed through waveguide 2004 to the receiver module and the other to the steering module through waveguide 2005. The I/Q modulator has the role of converting the optical signal of frequency $f_0$ into a linearly frequency chirped signal whose frequency changes linearly between $f_0+f_{IF1}$ to $f_0+f_{IF2}$ during a ramp period of length to. In an example, the frequency of the input optical signal in the I/Q modulator can be approximately 193.54 THz corresponding to 1550 nm wavelength and can be linearly shifted between 193.54 THz+1 GHz and 193.54 THz+11 GHz during a ramp length of 10 microseconds. Other ramp lengths such as 100 ns to 1000 ms can be used, as well as other optical signal wavelengths and frequency chirps such as from 1 MHz to 200 GHz can be used. The width of the frequency modulation can be chosen depending on the desired system resolution and accuracy as resolution and accuracy can be inversely proportional to the modulation bandwidth as shown in the formulas below:

$$\Delta R = c/2B$$

$$\sigma R = Kc/B\sqrt{SNR}$$

Where $\Delta R$ can represent the resolution, c can represent the speed of light, B can represent the chirp bandwidth, $\sigma R$ can represent the accuracy, SNR can represent the signal to noise ratio, and K can represent a proportionality factor depending on the chirp waveform. A variety of technologies such as current injection or depletion in a Si waveguide, electrically or thermally controlled phase shift technology that can be used in a Mach Zehnder interferometer or ring modulator configuration may be implemented as part of the I/Q modulator 2002. In an example, charge controlled phase shifters 2006 can be used in the arms of the two Mach Zehnder modulators which can be part of the I/Q modulator 2002. The output of the I/Q modulator can be split into two components with one directed on chip towards the receiver module to provide local oscillator light, and the other sent towards the steering module to be further directed towards the target. In an example, the transmitter module containing an I/Q modulator can be implemented in a silicon on insulator platform with top layer silicon thickness of 220 nm and waveguide width of 500 nm. For high optical signal power density in the waveguide a nonlinear process known as two photon absorption onsets. While silicon can be transparent at the 1550 nm wavelength due to the energy of the photon being lower than the bandgap, as the power density in the waveguide increases, such as due to the small waveguide cross section, two photons can cooperatively be absorbed to move an electron from the valence band to the conduction band, the absorption of the two photons creating therefore losses for the optical signal. In addition, as the number of electrons in the conduction band increases, a second order effect can come into play—free carrier absorption caused by the accumulated carriers in the conduction band which will absorb energy from the optical field. As a consequence, the absorption in the waveguide can increase and therefore the propagation loss can also increase. For example, for a strip waveguide of height 220 nm and width 450 nm for as low as 10 mW power, onset of two photon absorption can be observed and for 50 mW an additional 3 dB/cm of loss can be expected. The maximum power in each waveguide can be kept below the threshold for the onset of two photon absorption, such as to minimize the loss caused by two photon absorption. In an example, a high optical output power transmitter, such as with output power of 400 mW can be created by operating multiple synchronized I/Q modulators in parallel as shown in FIGS. 21, 22, 23, 24, 25, and 26. Devices with output power in the range of 50 mW to 5 W can also be created by using a smaller or larger number of parallel channels.

Figure 21:
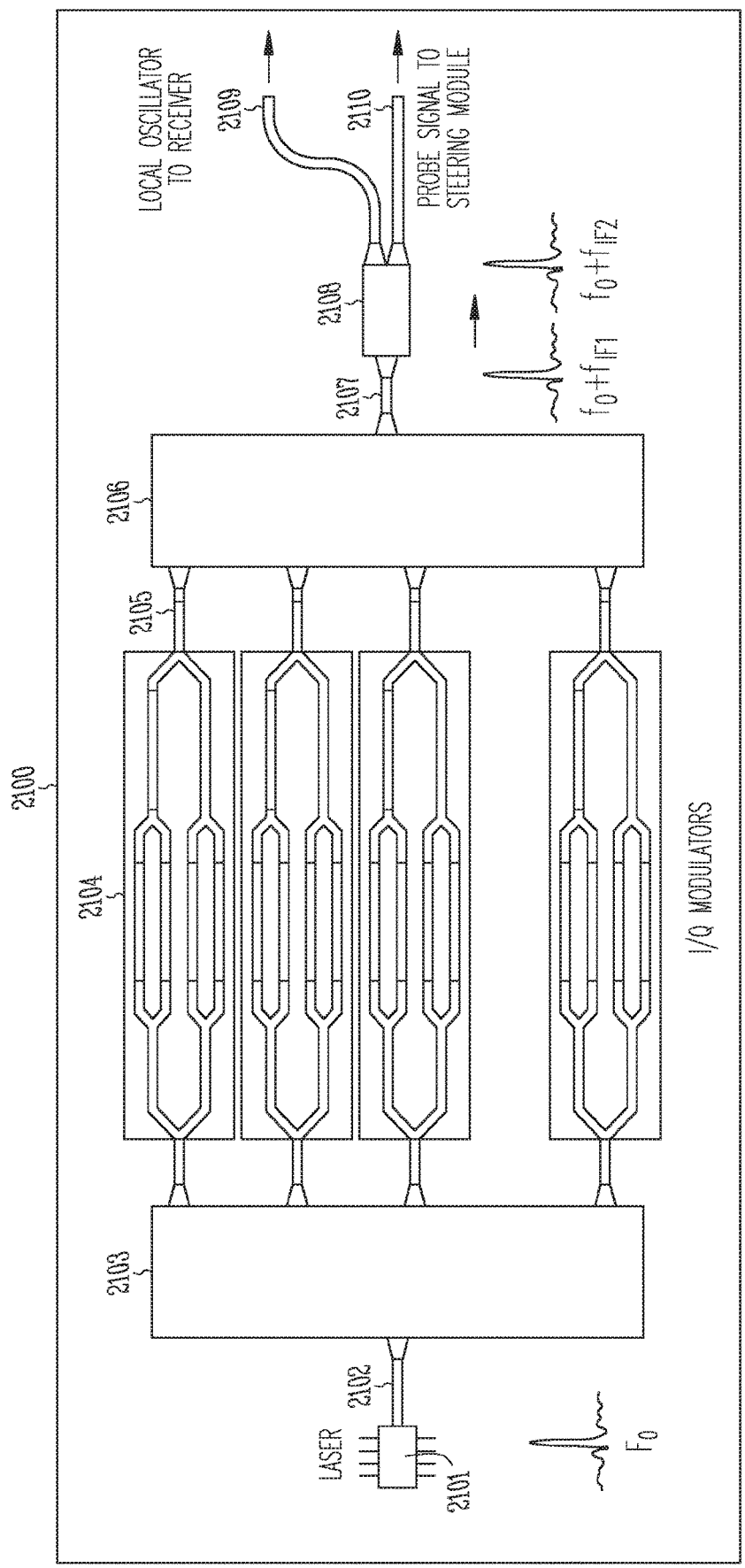
FIGS. 21-26 illustrate examples of a high power FMCW optical transmitter.

As shown in FIG. 21, the optical signal generated by optical signal generation source 2101 can be coupled into waveguide 2102 and directed towards the input of a multimode interference waveguide (MMI) 2103. The MMI 2103 can split the signal of frequency $f_0$ into N optical signals of frequency $f_0$. The signals from the output of the MMI 2103 can each be routed through an I/Q modulator 2104 which can shift the optical signal frequency from $f_0$ to a frequency between $f_0+f_{IF1}$ to $f_0+f_{IF2}$. The output of each I/Q modulator can be directed through a phase shifter 2105 which can make any phase corrections if necessary before being coupled into the N inputs of the MMI 2106. The combined output of MMI 2106 can be routed to a 1×2 MMI splitter 2108 through waveguide 2107 and split into a probe optical signal 2110 that can be routed on chip towards the steering module or an external steering component and a second output 2109 of the 1×2 MMI 2108 can be routed on chip towards the receiver to provide local oscillator for the receiver block.

Figure 22:
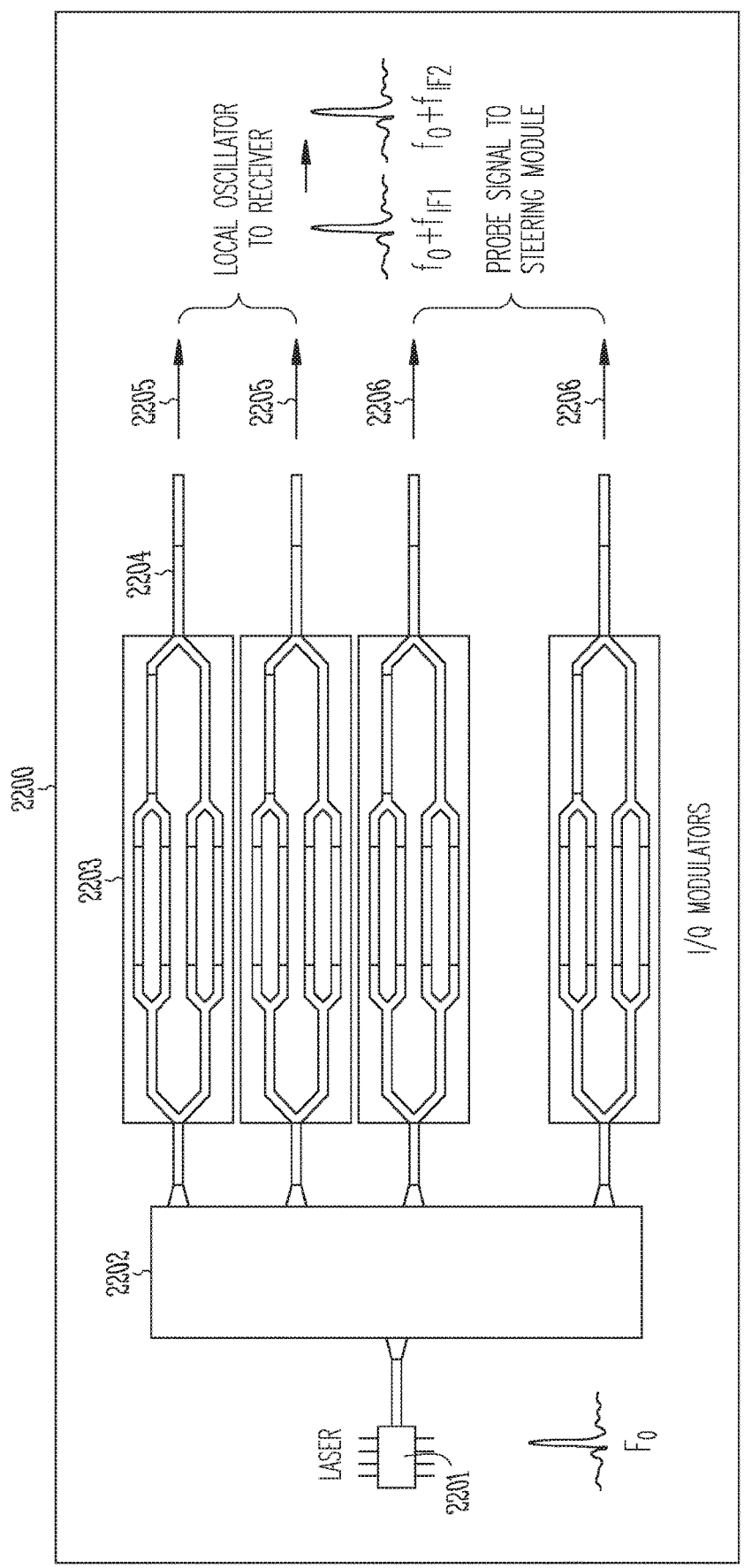
Figure 23:
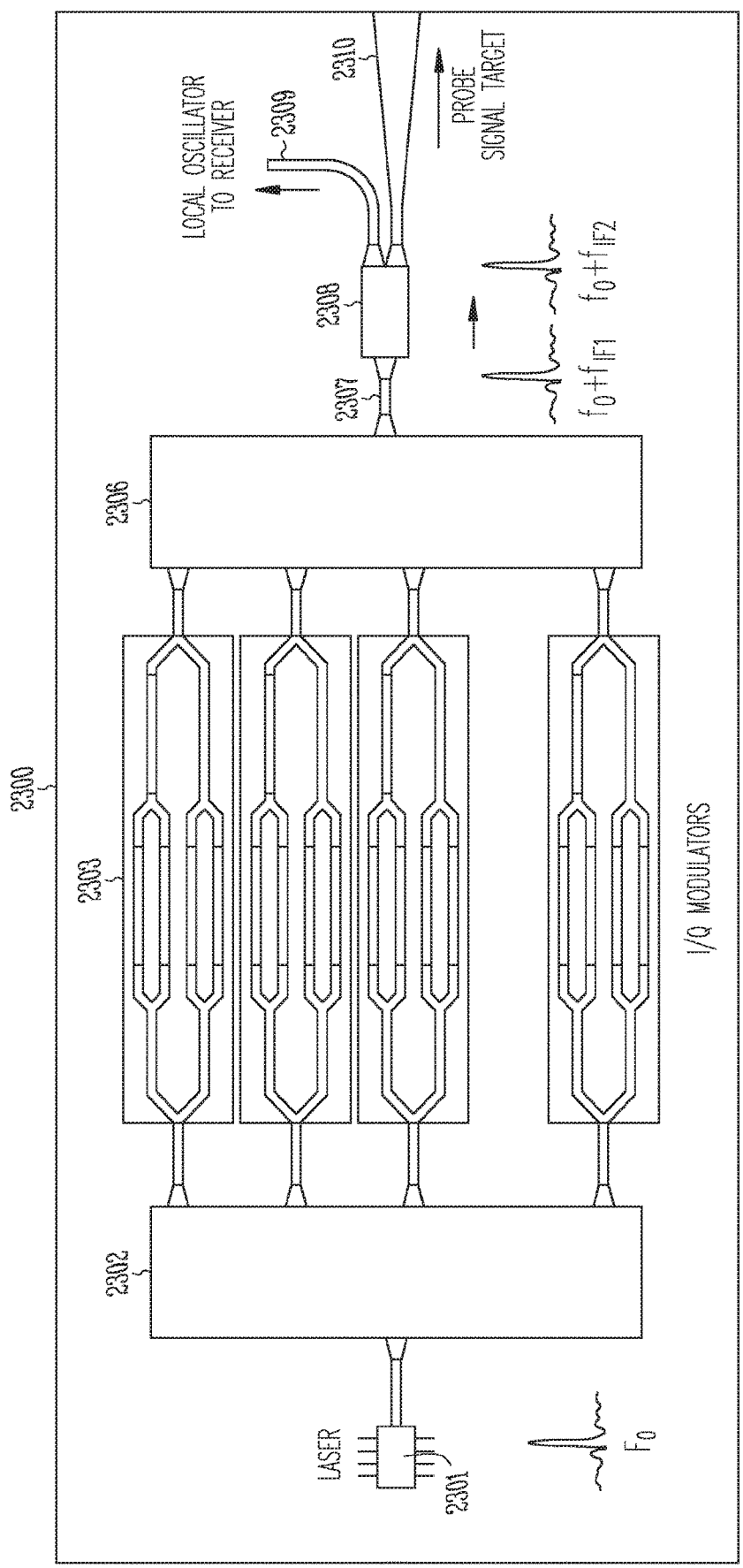
Figure 24:
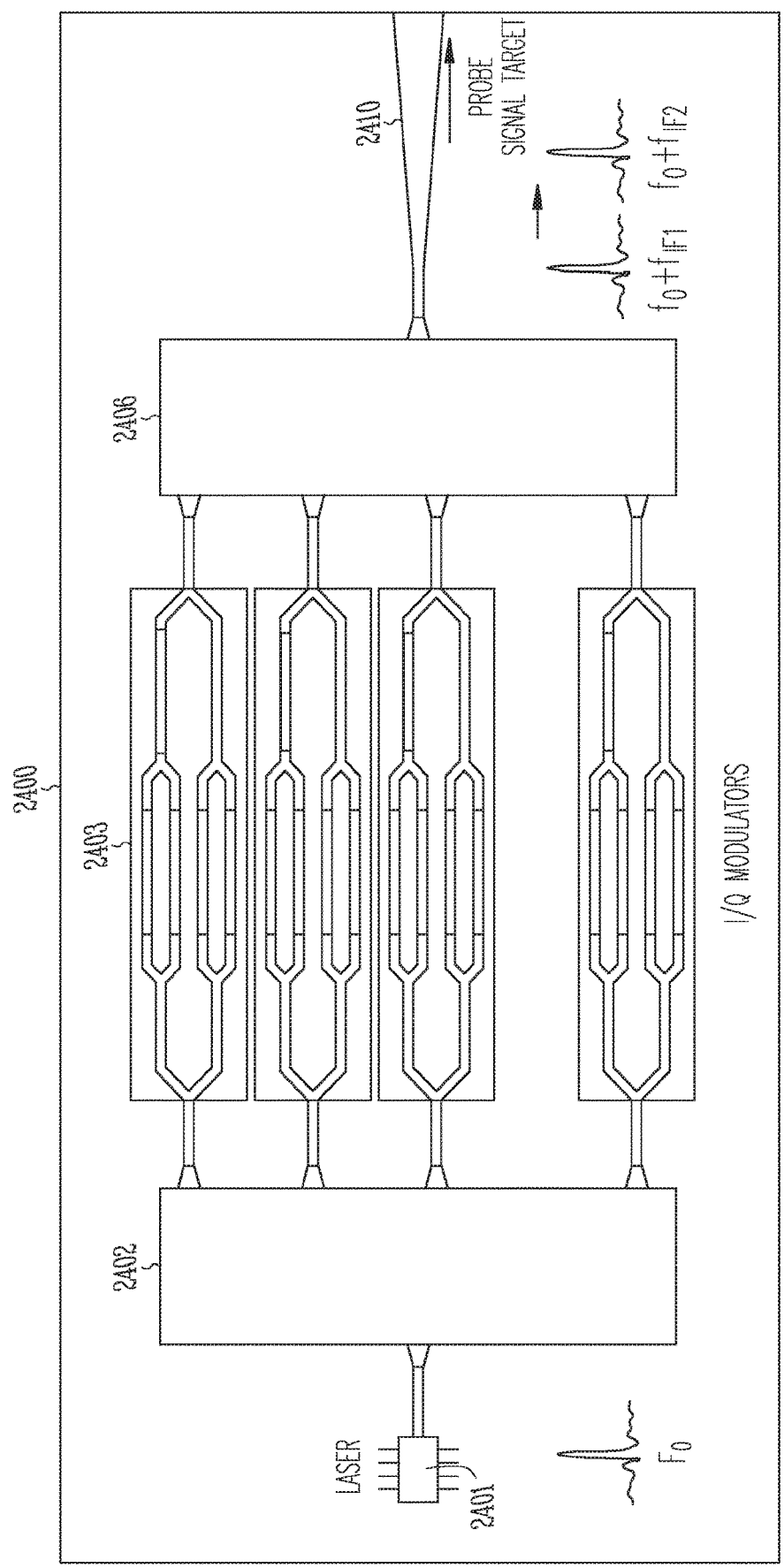

In another example, shown in FIG. 22, the signals exiting the I/Q modulators 2203 are not recombined in order to minimize the length of the waveguide sections where the power density in a waveguide can be above the threshold for which two photon absorption becomes significant. Also, an architecture in which the signals are not recombined can be preferable if the probe signals are directed towards an on chip phased array, and the local oscillator signals are directed towards multiple pixel parts of the coherent array of sensors, as the signals are further split. This architecture reduces the number of components for the on chip optical path and therefore the loss. Another example suitable for off chip steering as for example using a 2 axes mirror for the probe signal or flash illuminating the entire scene, is depicted in FIG. 23 and a standalone higher power transmitter is shown in FIG. 24.

Figure 25:
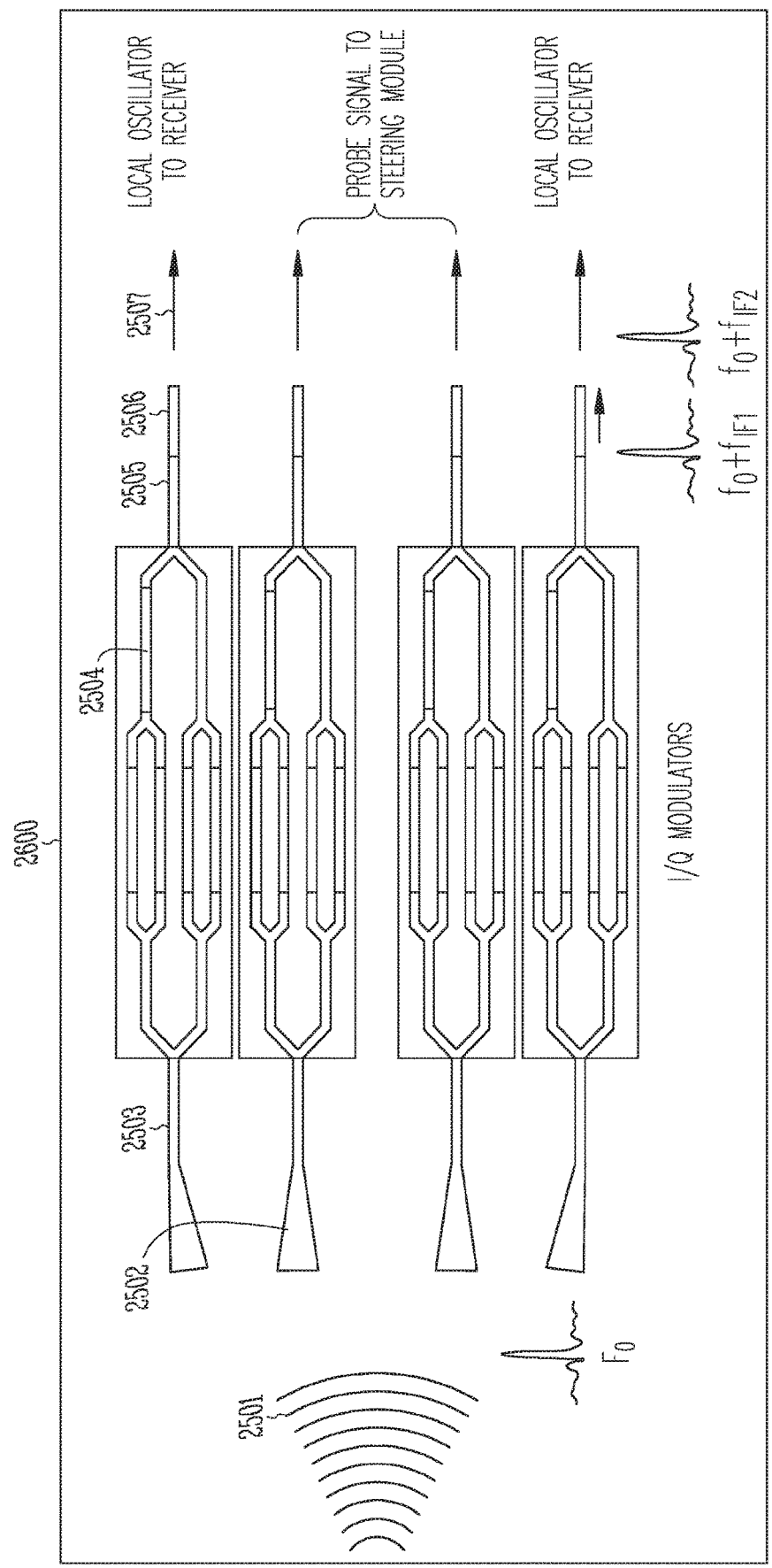

In another example, the transmitter may be implemented using a grating followed directly by a star coupler so that the high-power beam generated by the optical signal generation source can be immediately spread over a larger cross section within the silicon layer avoiding therefore any section where high power density above the two-photon absorption threshold can be achieved. One such architecture is shown in FIG. 25. The example in FIG. 25 shows an implementation where the plurality of optical signals with frequencies between $f_0+f_{IF1}$ and $f_0+f_{IF2}$ are not recombined and sent directly towards the on-chip steering module to provide probe signals to be sent towards the target and on chip receiver to provide for local oscillator light respectively.

Figure 26:
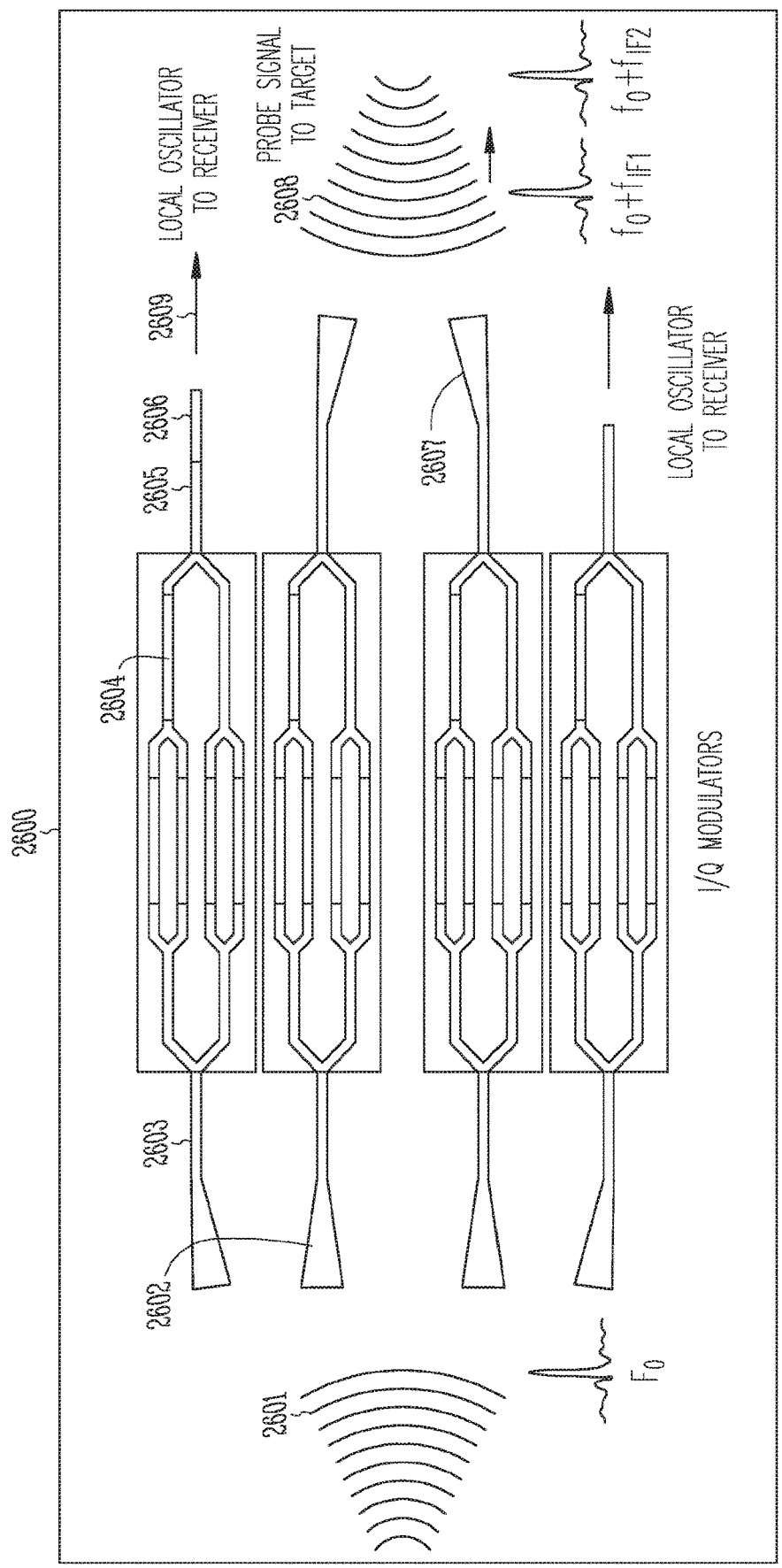
Figure 27:
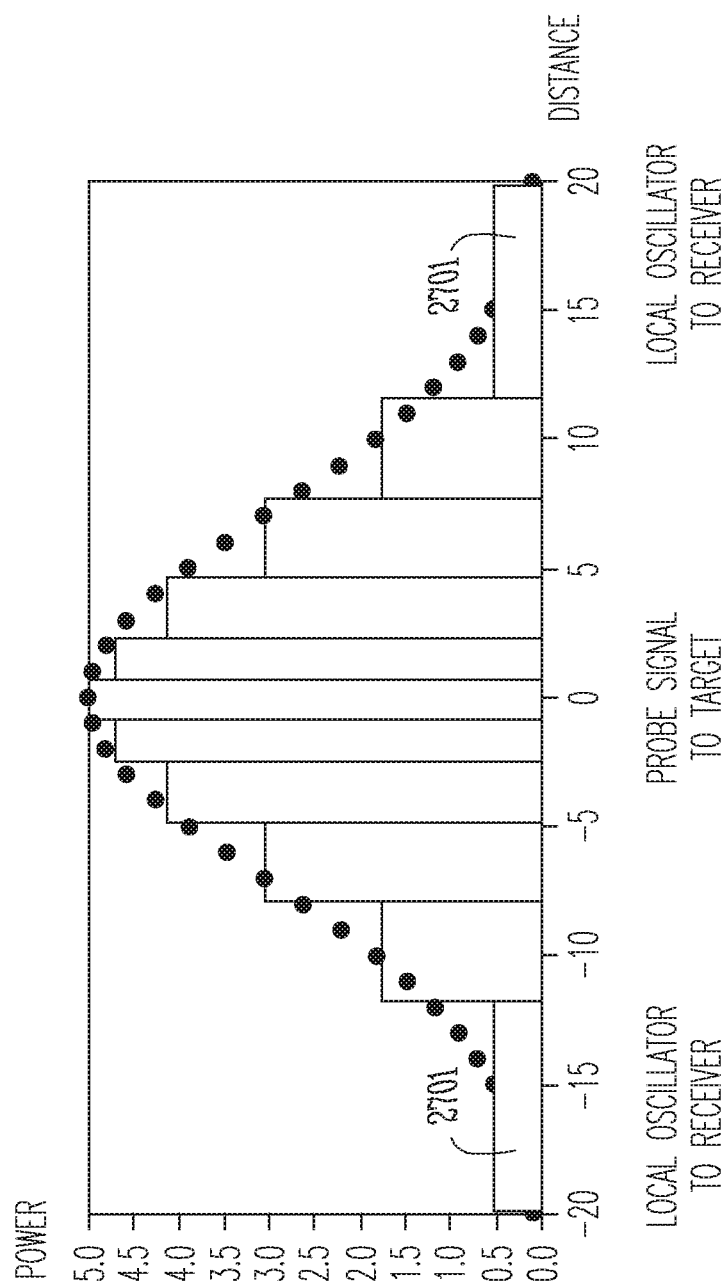
FIG. 27 illustrates an example of a spatial light beam profile in a star coupler.
Figure 28:
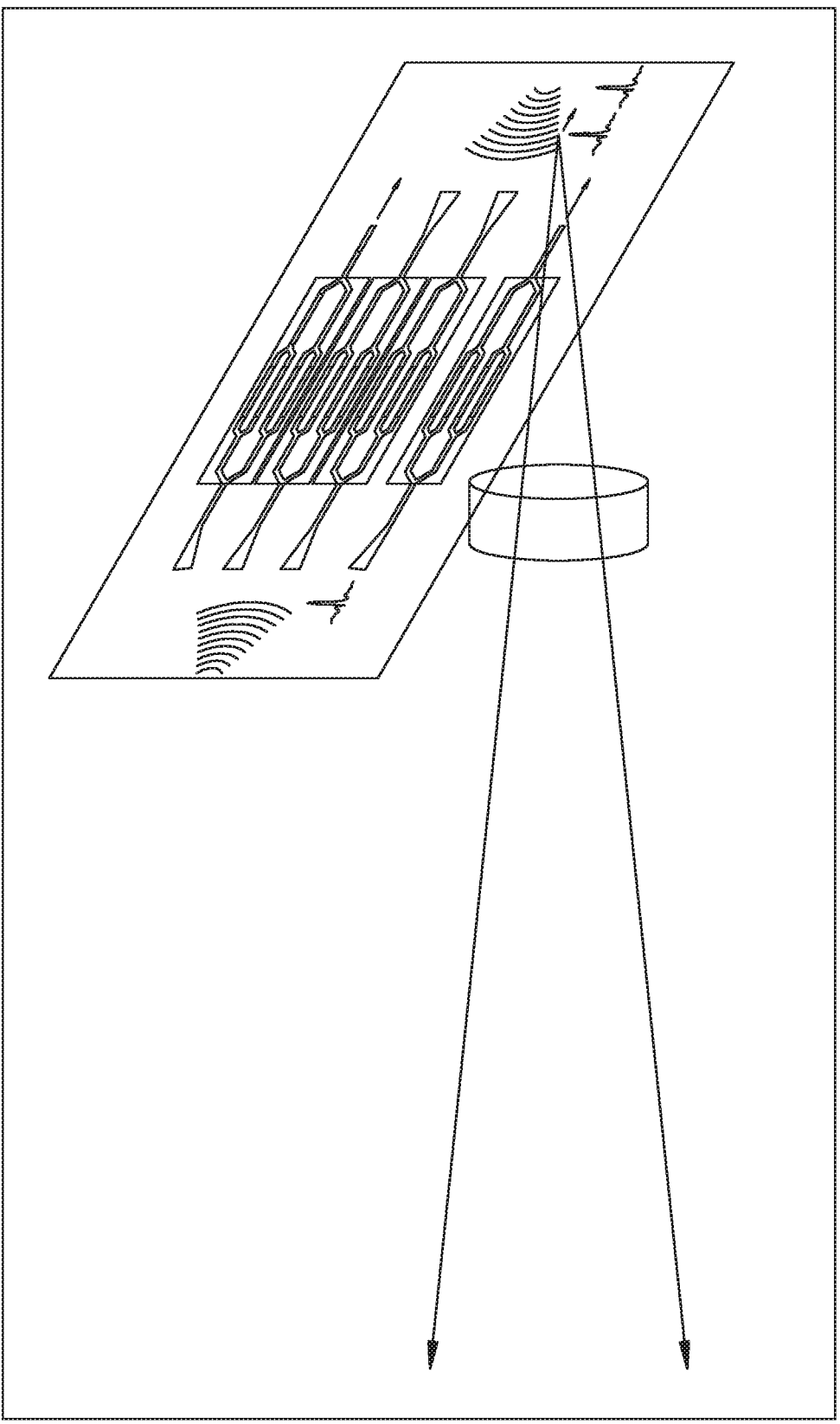
FIG. 28 illustrates an example of operation of a high power optical transmitter.

Another example including an architecture for off chip steering or flash illumination of the scene is shown in FIG. 26. In an external steering configuration, the signal from the optical source can be coupled into the transmitter side of PIC 2600 through the grating coupler 2601, distributed through the star coupler 2602 into the waveguides 2603 and then through I/Q modulators 2604 which perform the frequency chirp and through phase elements 2605 which perform any needed phase adjustments. The probe signal can be collected through star coupler 2607 and coupled out of the chip through the grating 2608 and directed towards a lens for collimation and then to a 2-axis steering mirror for steering or additional lens for tailoring field of view for flash/entire scene illumination. One or more signals 2609 can be routed to the receiver block to be further divided to supply local oscillator light to a plurality of pixels. In a flash configuration, the probe signal can be coupled out of the chip through the grating 2608 and have the divergence tailored with a lens or ensemble of lenses as shown in FIG. 28. In an example, the star coupler 2602 can be designed using unequal cross sections for the input waveguides of the star coupler such as where the Gaussian profile power distribution coming out of the grating can be distributed equally between the parallel I/Q channels 2604. Also by using the two outer channels with very wide bins 2701 as shown in FIG. 27 to collect light to be used for local oscillator for the receiver block a very efficient use of optical power can be achieved and good coupling and therefore optical power efficiency for the outbound probe beam.

Figure 29:
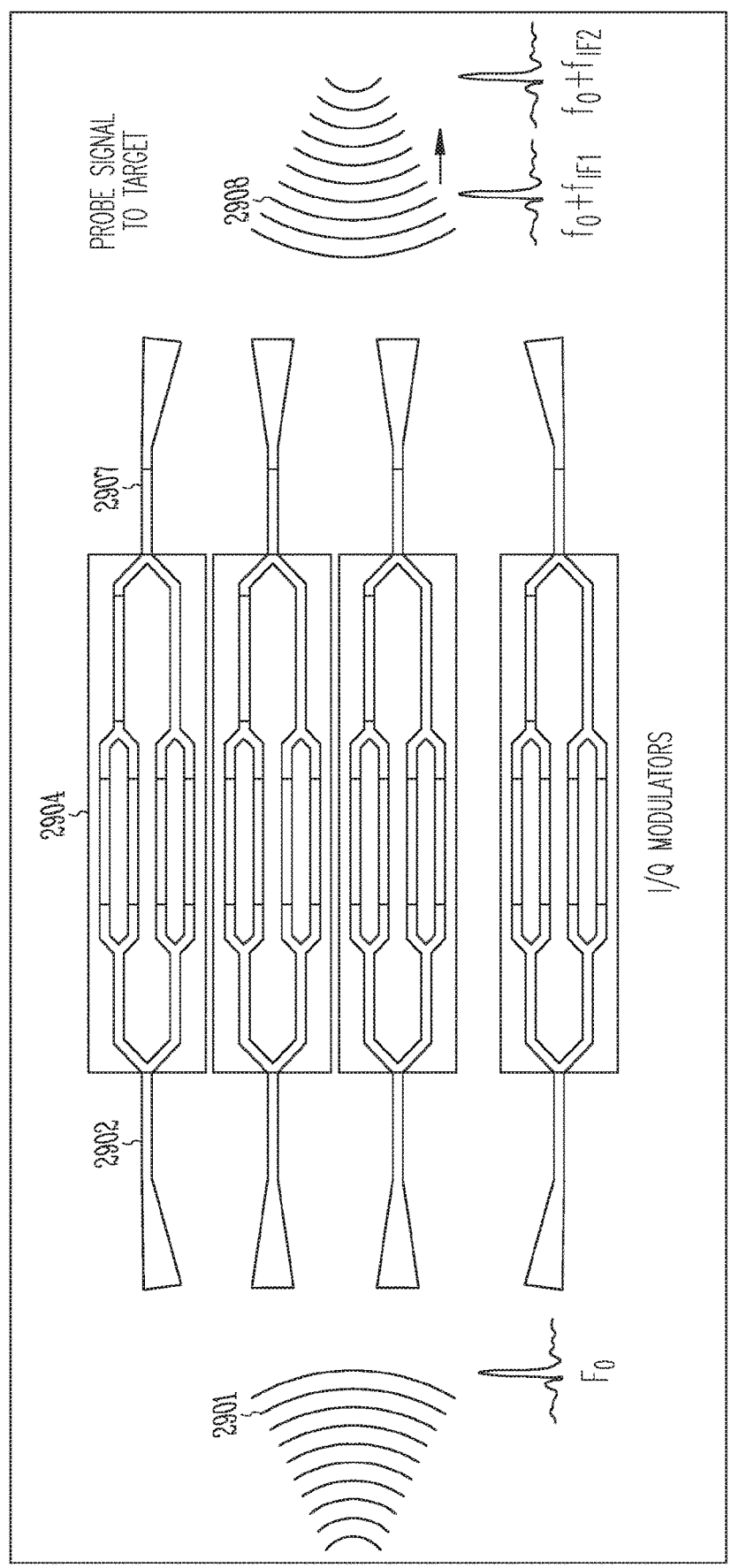
FIG. 29 illustrates an example of a standalone configuration of an I/Q modulator.

In an example, the high power, high speed I/Q modulator can be used in a standalone configuration as shown in FIG. 29 to convert the optical signal of fixed frequency $f_0$ into a chirped optical signal of frequency between $f_0+f_{IF1}$ and $f_0+f_{IF2}$.

In an example, the transmitter block of the PIC may be implemented in silicon on insulator with the top silicon layer being 220 nm or 450 nm thick, buried oxide layer 2 micron thick, though other substrates such as top Si layers in the range from 500 nm to 10 microns and buried oxide layers in the range of 0.5-3 microns may be used. The use of a thicker top silicon layer can be advantageous in certain examples where higher power in the waveguide is desirable, in order to avoid the onset of nonlinear effects such as two photon absorption and self phase modulation. By increasing the waveguide cross section, the power density in the waveguide at fixed input power can decrease and therefore avoid the onset of the aforementioned nonlinear effects. The use of a thicker silicon layer and therefore larger waveguides can have on the other hand the adverse effect of increasing the minimum radius of curvature for the waveguide bends that can be implemented without significant loss. For optimal system design the thickness of the top silicon layer and therefore the cross-sectional area of the waveguide may be chosen to optimize both the onset of nonlinear effects and compactness of design. In another example, different buried oxide thicknesses as well as multilayered designs containing alternating layers of silicon and oxide between the buried oxide and Si epi layer for the grating sections may be used in order to improve the grating to fiber coupling efficiency. In addition to the described example, any other passive or active optical function such as multiplexers, demultiplexers, wavelength selective couplers, beam splitters, switches, polarization splitters, polarization rotators, isolators, detectors, and laser sources may be implemented in the transmitter PIC either monolithically or through hybrid integration.

Figure 30A:
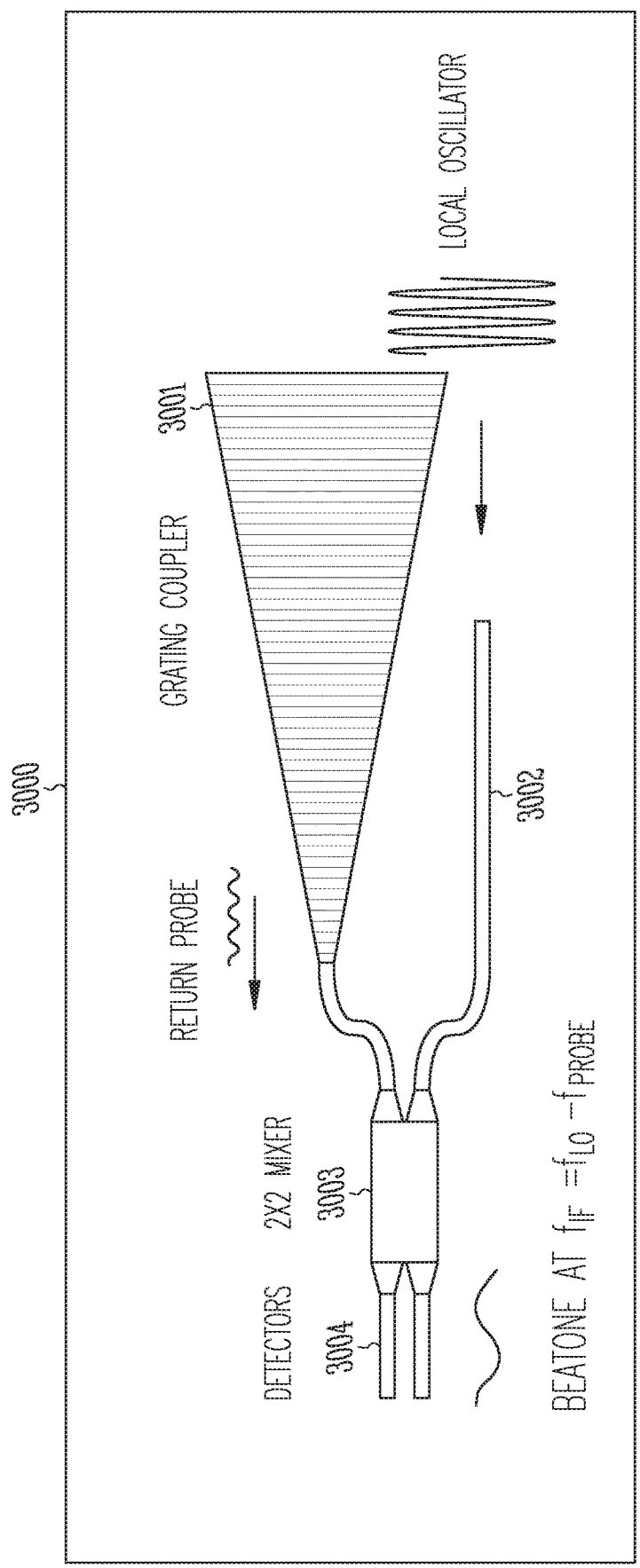
FIGS. 30A-30C illustrate examples of coherent receivers.

In an example, the basic cell of the coherent receiver is shown in FIG. 30A. The weak return probe signal from the target can couple through the grating coupler 3001 in the plane of the chip and can be combined with a strong local oscillator in waveguide 3002 in the 2×2 multiplexer 3003. At the output of each of the 2×2 multiplexer 3003, are two waveguide detectors 3004 which can detect an optical signal at a frequency equal to the difference between the local oscillator and the return. In a coherent detection technique, the use of two detectors in a balanced detection configuration can eliminate the dc component and therefore maximize the signal photocurrent. More specifically, electric fields for the optical field incident on the two detectors can be described by:

$$E1 = \frac{Es + ELO}{\sqrt{2}}$$

$$E2 = \frac{Es - ELO}{\sqrt{2}}$$

where Es and ELO can represent the signal and local oscillator electric field and E1 and E2 are the electric fields on the two detectors.

The photocurrents on the two photodetectors can be represented by:

$$I1(t) = \frac{R}{2} * [Ps(t) + PLO(t) + 2*\sqrt{Ps(t)*PLO} * \cos(\omega IF*t + \theta sig(t) - \theta LO(t))]$$

$$I2(t) = \frac{R}{2} * [Ps(t) + PLO(t) - 2*\sqrt{Ps(t)*PLO} * \cos(\omega IF*t + \theta sig(t) - \theta LO(t))]$$

Figure 30B:
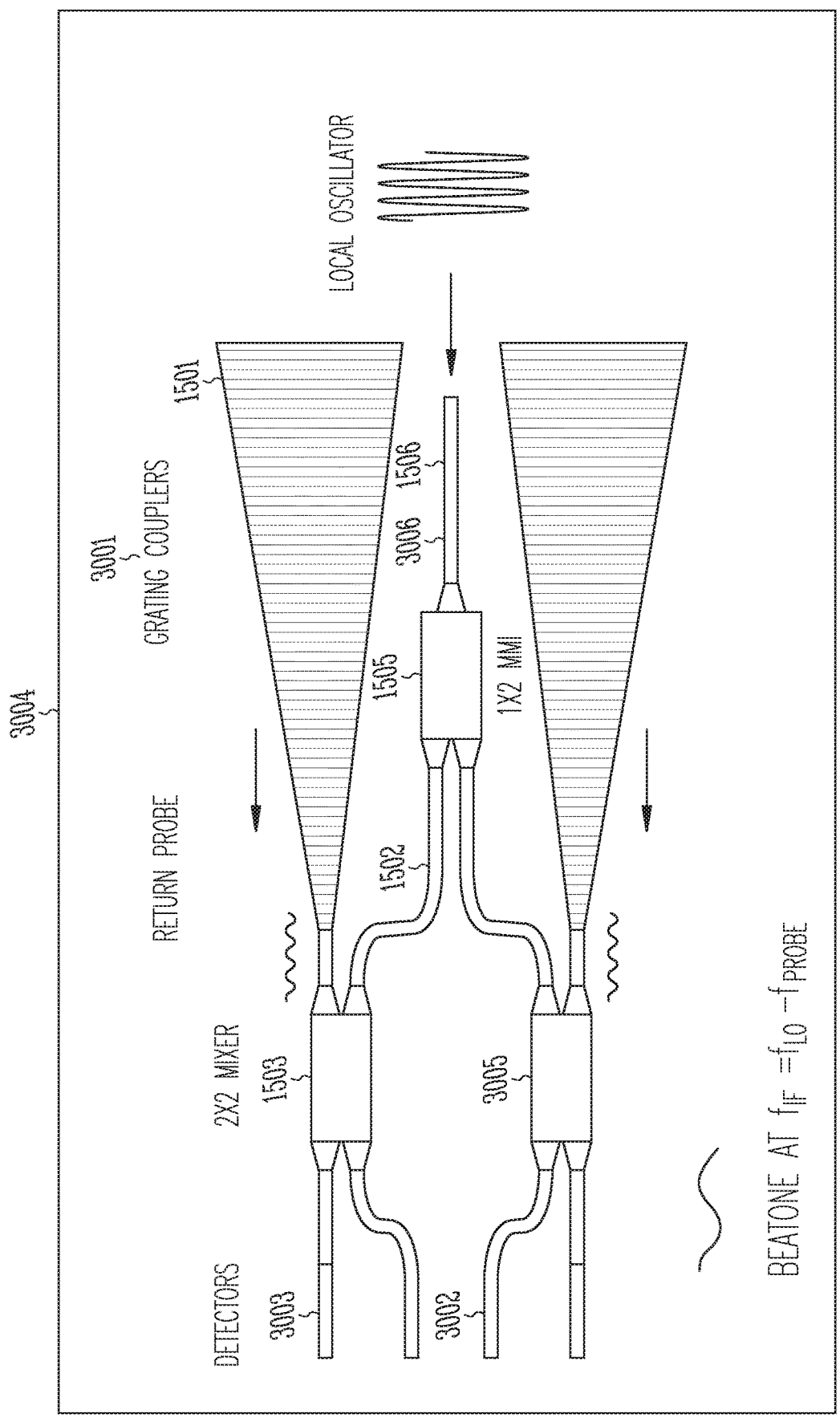

The photocurrent resulting after subtracting the photocurrents of the two detectors can be represented by:

$$I(t) = I1(t) - I2(t) = 2R\sqrt{Ps(t)*PLO}*\cos(\omega IF*t + \theta sig(t) - \theta LO(t))$$

where R can represent the detector responsivity, Ps(t) and PLO(t) can represent the signal and local oscillator optical power respectively, $\omega_{IF}$ can represent the modulation frequency of the optical signal, and $\theta sig(t)$ and $\theta LO(t)$ can represent the time dependent phases of the optical field. One can see that after subtracting one photodetector photocurrent from the other, the fast oscillating terms Ps(t) and PLO(t), which are seen by the detectors as constant (dc) components of the optical signal, can cancel each other, and the result can be a signal photocurrent oscillating at the $\omega_{IF}$ intermediate frequency and with amplitude $2R\sqrt{Ps(t)*PLO}$. In addition to the amplification effect of the higher power PLO component, the amplitude can be doubled, therefore increasing the detection sensitivity. Two configurations for two pixels side by side are shown in FIGS. 30A and 30B.

Figure 30C:
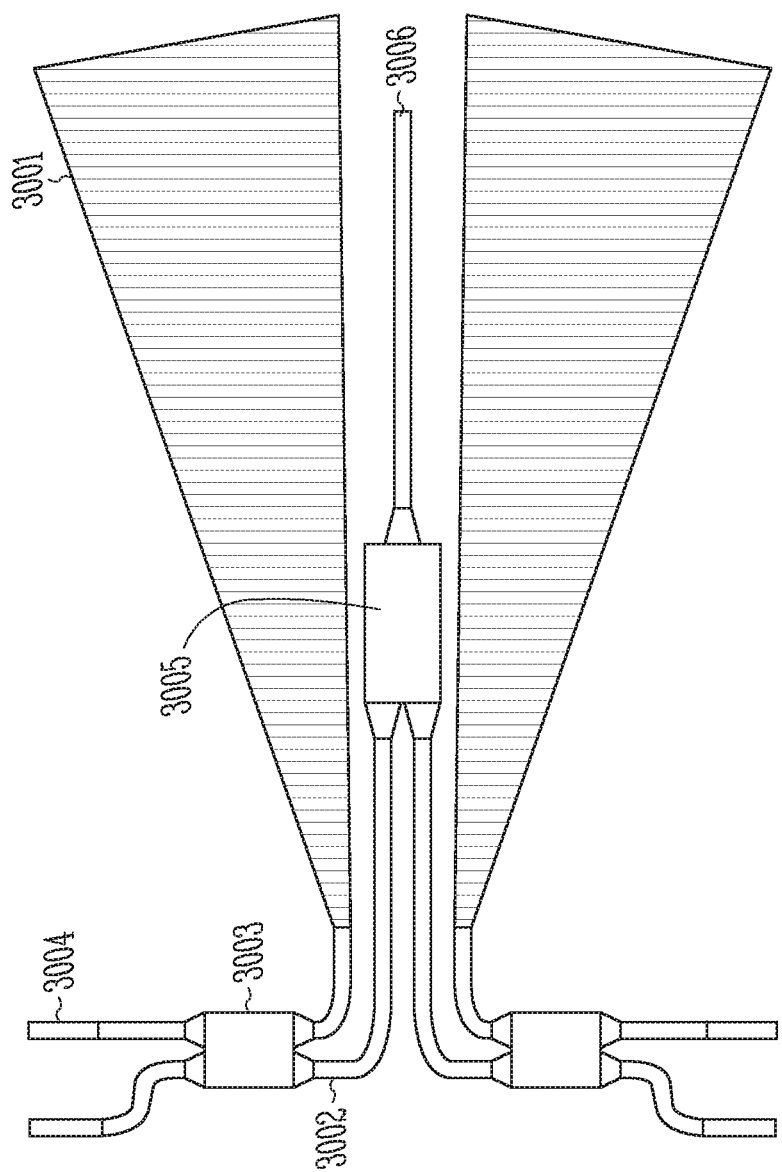
Figure 31:
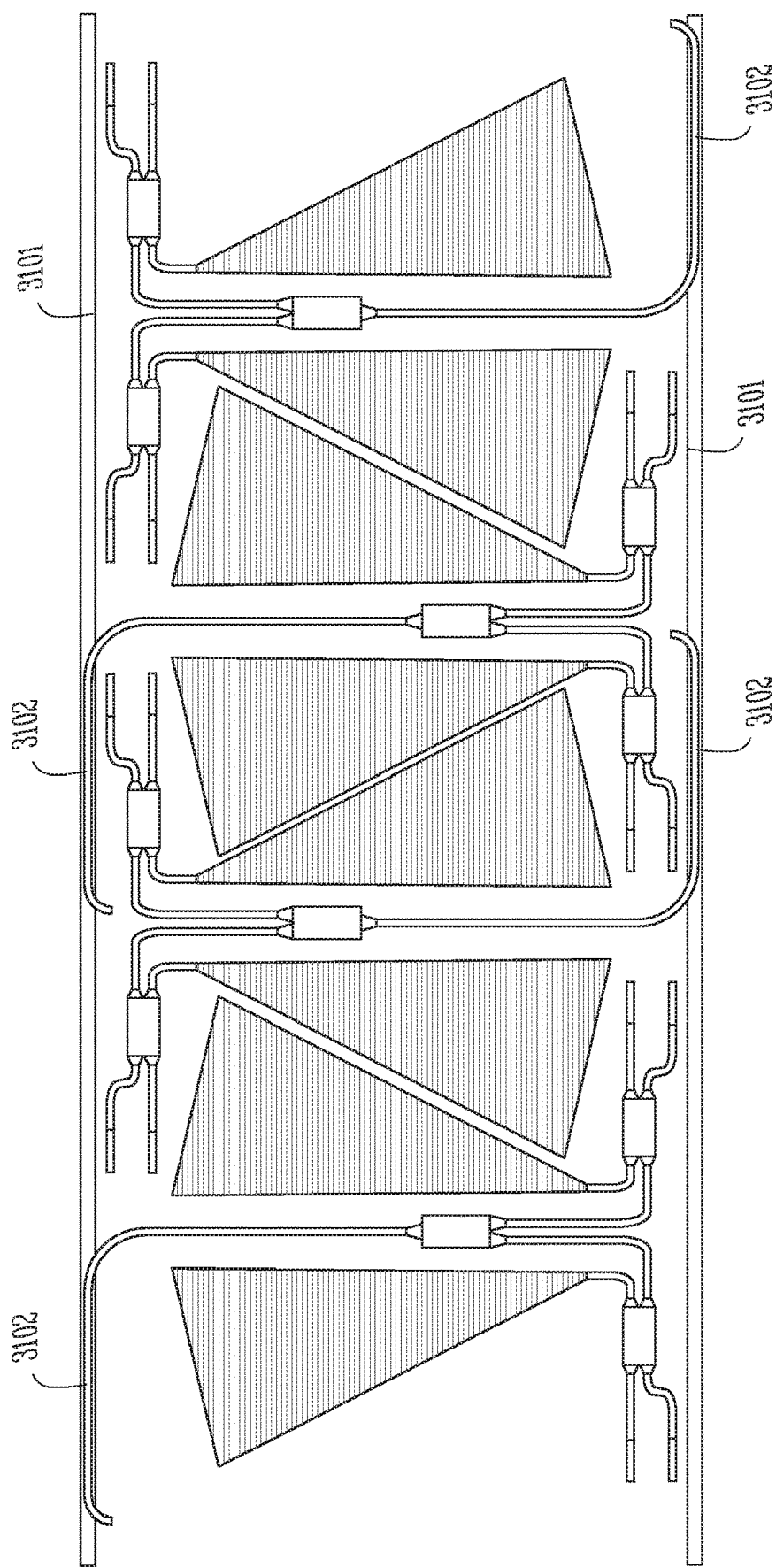
FIGS. 31-32 illustrate examples of pixels together with local oscillator distribution waveguides.
Figure 32:
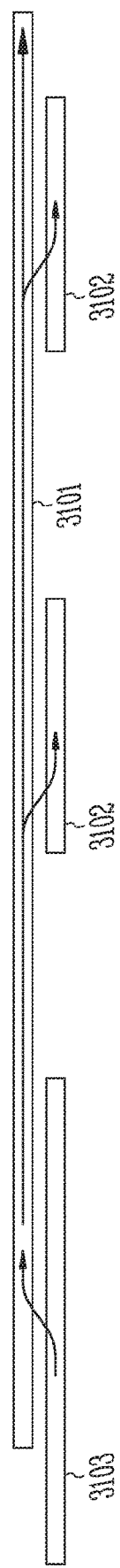
Figure 33:
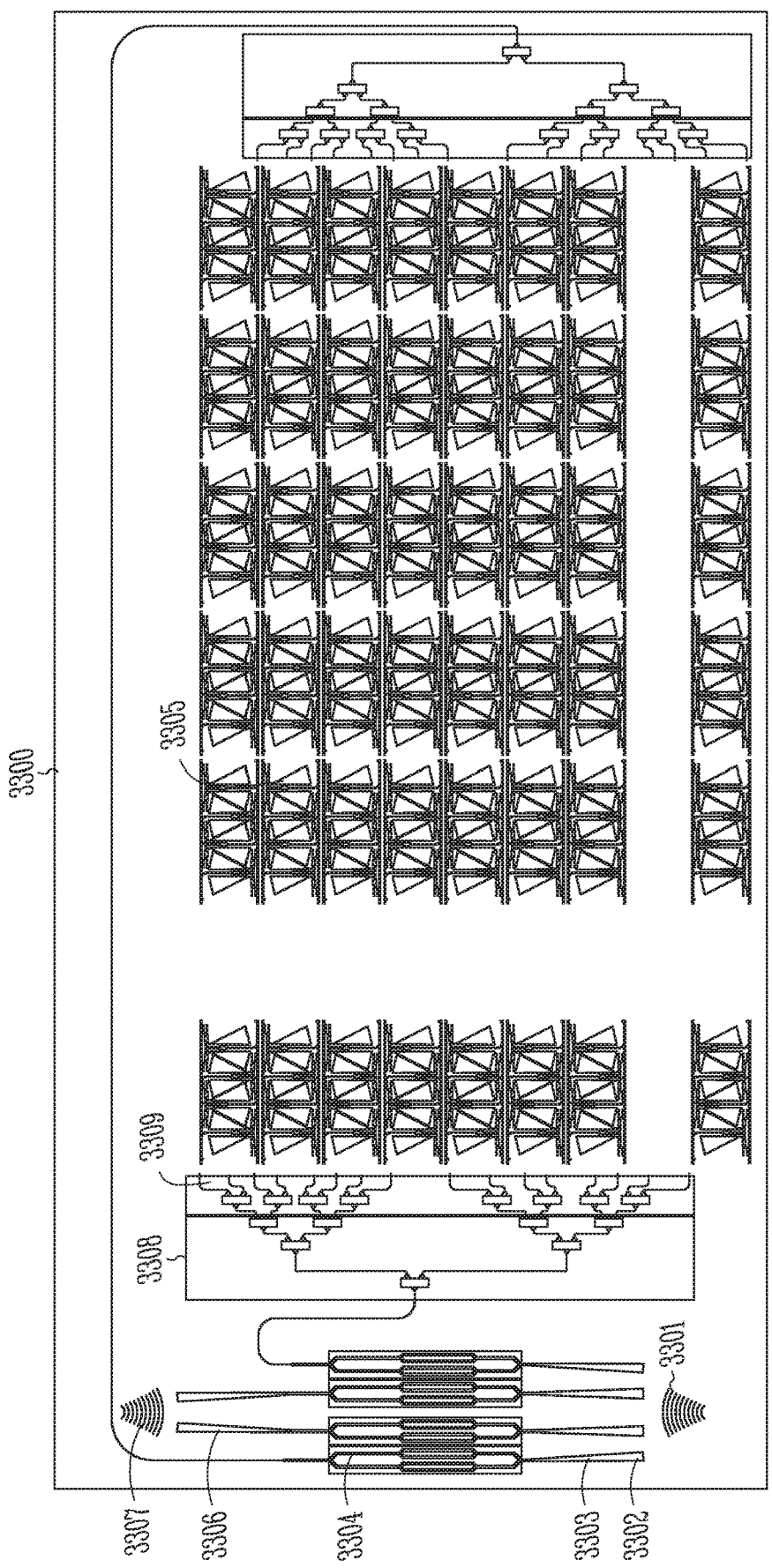
FIG. 33 illustrates an example of a photonic integrated circuit.

One example of the ensemble consisting of a row of pixels together with the local oscillator distribution waveguides is shown in FIG. 31. The architecture in FIG. 30C and FIG. 31 can be used in order to increase the fill factor for the receiver array as only the area of the PIC covered by the grating couplers is able to capture light incident on the array. In an example, the local oscillator light can be evanescently coupled through two waveguides for each row of cells. Local oscillator light can be coupled in waveguide 3101 from waveguide 3103 situated in the same layer as the other elements of the pixel structure 3000 and connected to the local oscillator distribution network such as 3309. A small fraction of light can be evanescently coupled from waveguide 3101 in the waveguides 3102 below through a vertical coupler for each pixel in the row as shown in FIG. 32. Waveguide 3101 can be above the waveguides 3102 and the evanescent coupling between the two waveguides can occur in a vertical plane. The vertical coupler architecture can allow for very precise control of the thickness of the oxide layer separating the two waveguides and together with the variation of the spatial overlap of the two waveguides or length of the coupler can allow for precise light distribution to each pixel.

System Architectures

Depending on the application, different system architectures can be implemented. For example, for short range applications the requirements can be for very low power consumption such as lower than 500 mW or lower, very high accuracy such as 1 mm or lower and small form factor. As a consequence, a flash approach where the entire scene can be illuminated at once is likely more suitable as it can eliminate the power consumption associated with a steering mechanism. The downside of a flash approach can be that the light is spread over multiple pixels, therefore the signal to noise ratio can be reduced, such as which can lead to a reduced range. For applications which require long range a steering mechanism can be necessary in concert with a low divergence beam so that the number of pixels that are covered by the return signal can be kept very low such as as low as one pixel or in the range of 1 to 50 pixels and as a consequence the SNR for each detector can be high as for example higher than 10 dB.

Figure 34:
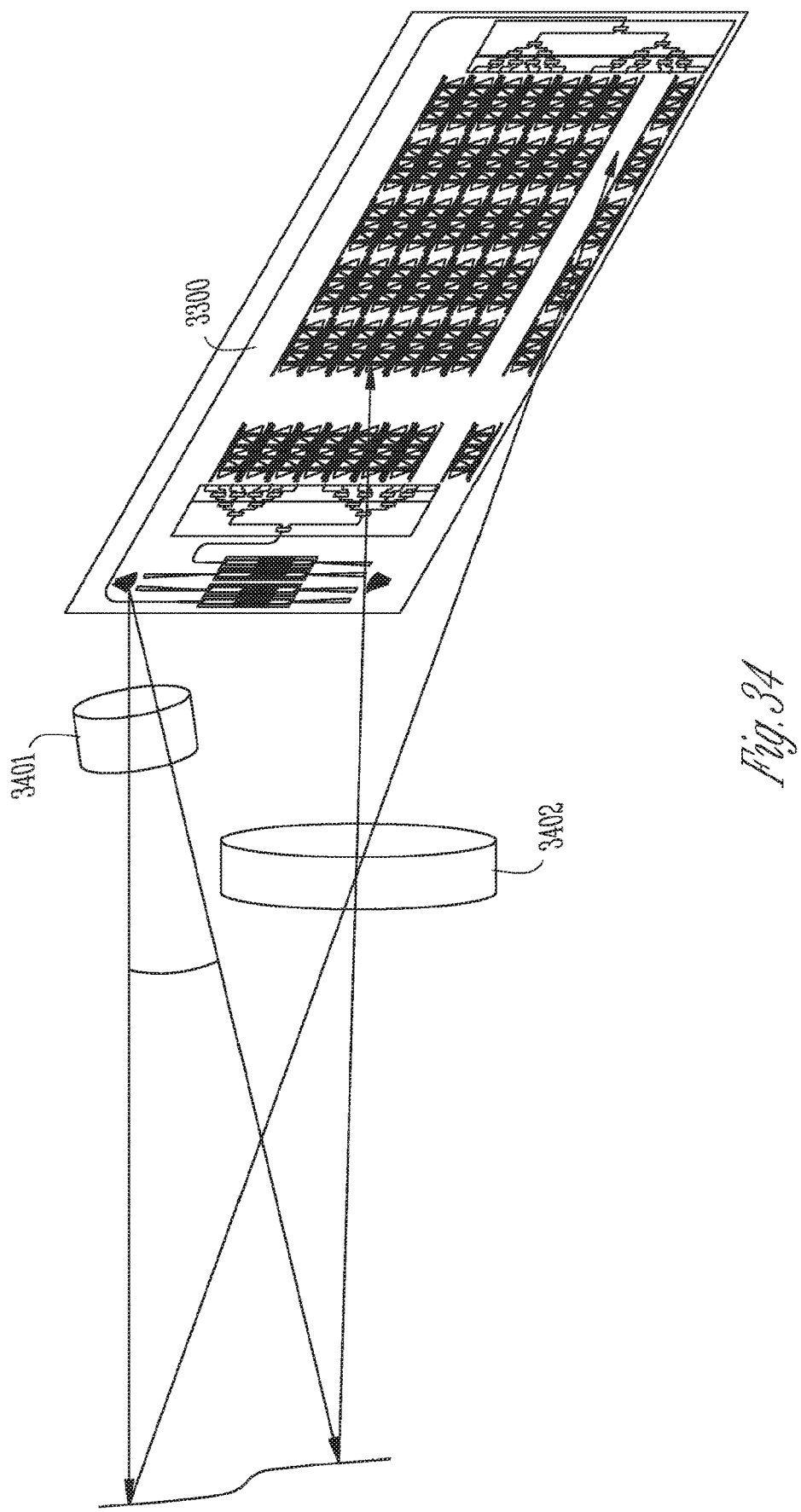
FIG. 34 illustrates an example of operation of a photonic integrated circuit.

The signal from the optical signal generation source can be coupled through coupler 3301 in the plane of the chip and in the star coupler 3302. Light of optical frequency $f_0$ coupled in the tapered waveguides 3303 of the star coupler can be directed to the input of a plurality of I/Q modulators 3304. The I/Q modulators can create a plurality of synchronized optical signals with a linearly chirped frequency between $f_0+f_{IF1}$ and $f_0+f_{IF2}$. A plurality of first chirped optical signals can be directed towards the receiver block 3305 to provide a local oscillator for the receiver array. A plurality of second chirped optical signals can be combined with the help of a star coupler 3306 on a grating coupler 3307 to be coupled out of the chip and provide a second optical signal to be sent towards the target. The second optical signal can be shaped with the help of a lens 3401 as illustrated in FIG. 34 to obtain the optimal divergence and shape for the outbound beam as required by the application from as low as 10 degrees to as high as 90 degrees if used to illuminate the entire scene. The scattered second optical signal incident on the receiver array can be combined on each pixel with a fraction of the first optical signal which can be provided as the local oscillator through the dynamic distribution network as shown in detail in FIG. 30A-30C. The dynamic distribution network can include a block formed by a tree of 1×2 switches 3308 followed by a block composed of a static tree of MMI 1×2 splitters 3309. The first block containing switches can allow for efficient distribution of local oscillator light to only the pixels that are being read, thereby avoiding excessive power consumption as well as heating of the array. For the flash entire scene illumination case, blocks of pixels are read serially in a sequence and at the speed that would allow the frame rate required by the application.

Alternatively, this architecture can be used in conjunction with an external steering mechanism or macroscopic mirrors on galvanic stages. In such a scenario, the second optical signal coupled out of the chip through grating 3307 can be collimated with a lens and sent to the steering mechanism. The lens can collimate the beam to less than 1 degree divergence and as low as 0.1 degrees. The steering mechanism can scan the scene to be imaged. The scattered second optical signal incident on the receiver array can be combined on each pixel with a fraction of the first optical signal which has been provided as the local oscillator through the dynamic distribution network as shown in detail in FIGS. 30A-30C. In this case the dynamic switching mechanism implemented through the tree of 1×2 switches block can be correlated with the steering mechanism in such a way so the block of pixels of the receiver upon which the scattered optical signal can be incident can be simultaneously provided with a local oscillator for maximum amplification through the heterodyne detection mechanism. The pixels being read are determined for the external steering mechanism case by the expected position of the return scattered beam on the detector array as determined by ray tracing through the system.

Figure 35A:
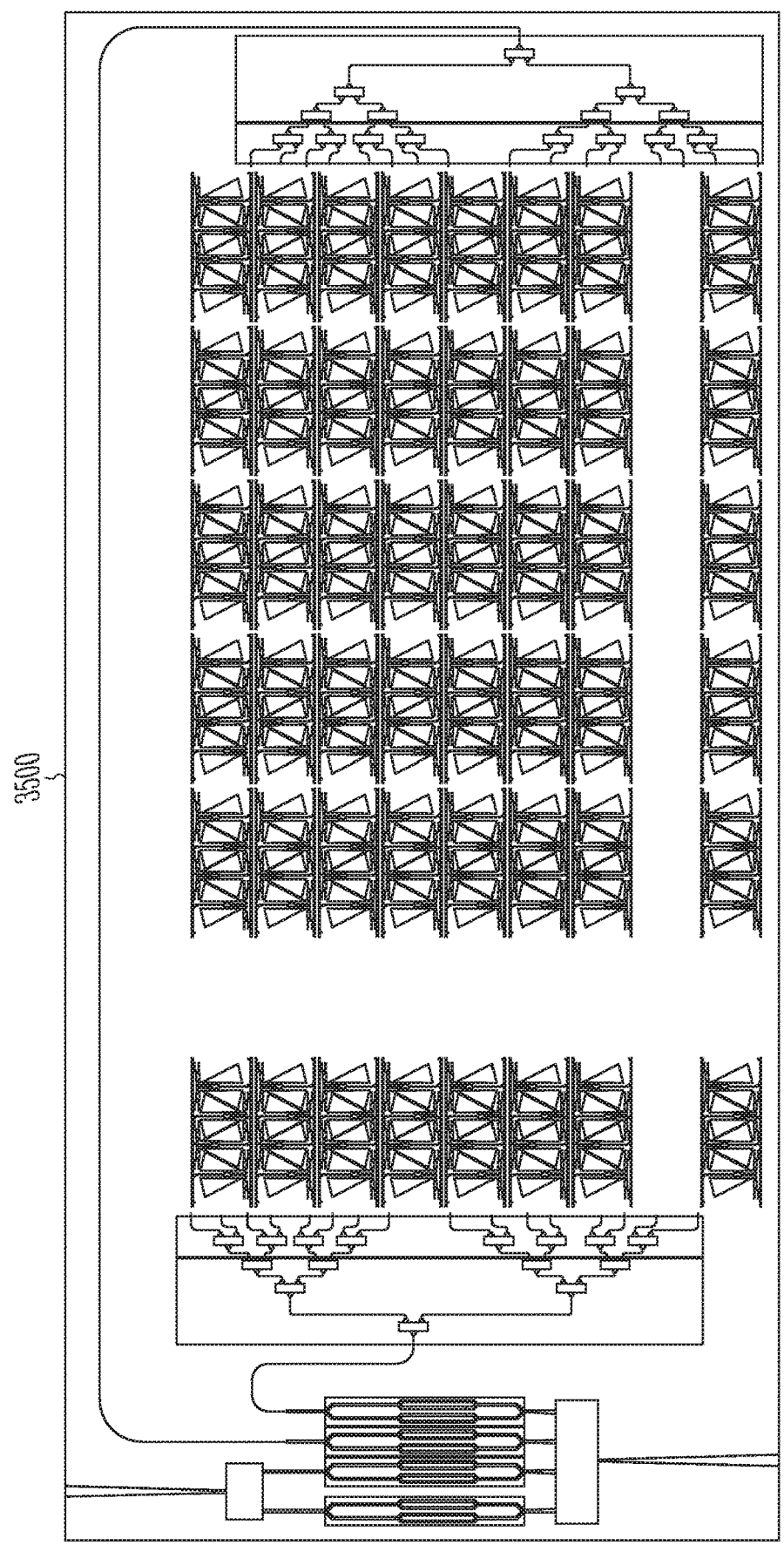
FIGS. 35A-35B illustrate an example of a transceiver.
Figure 35B:
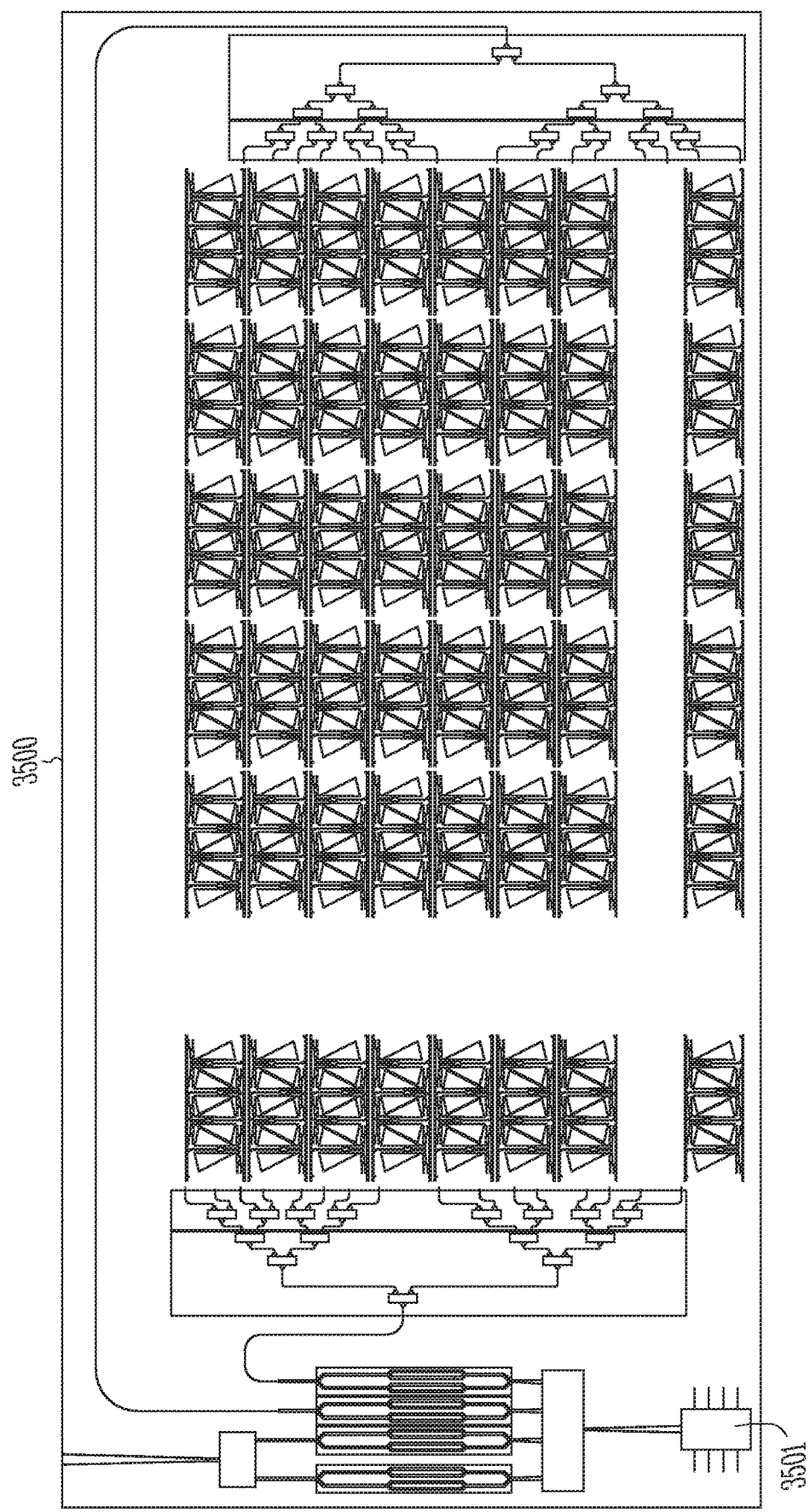
Figure 36:
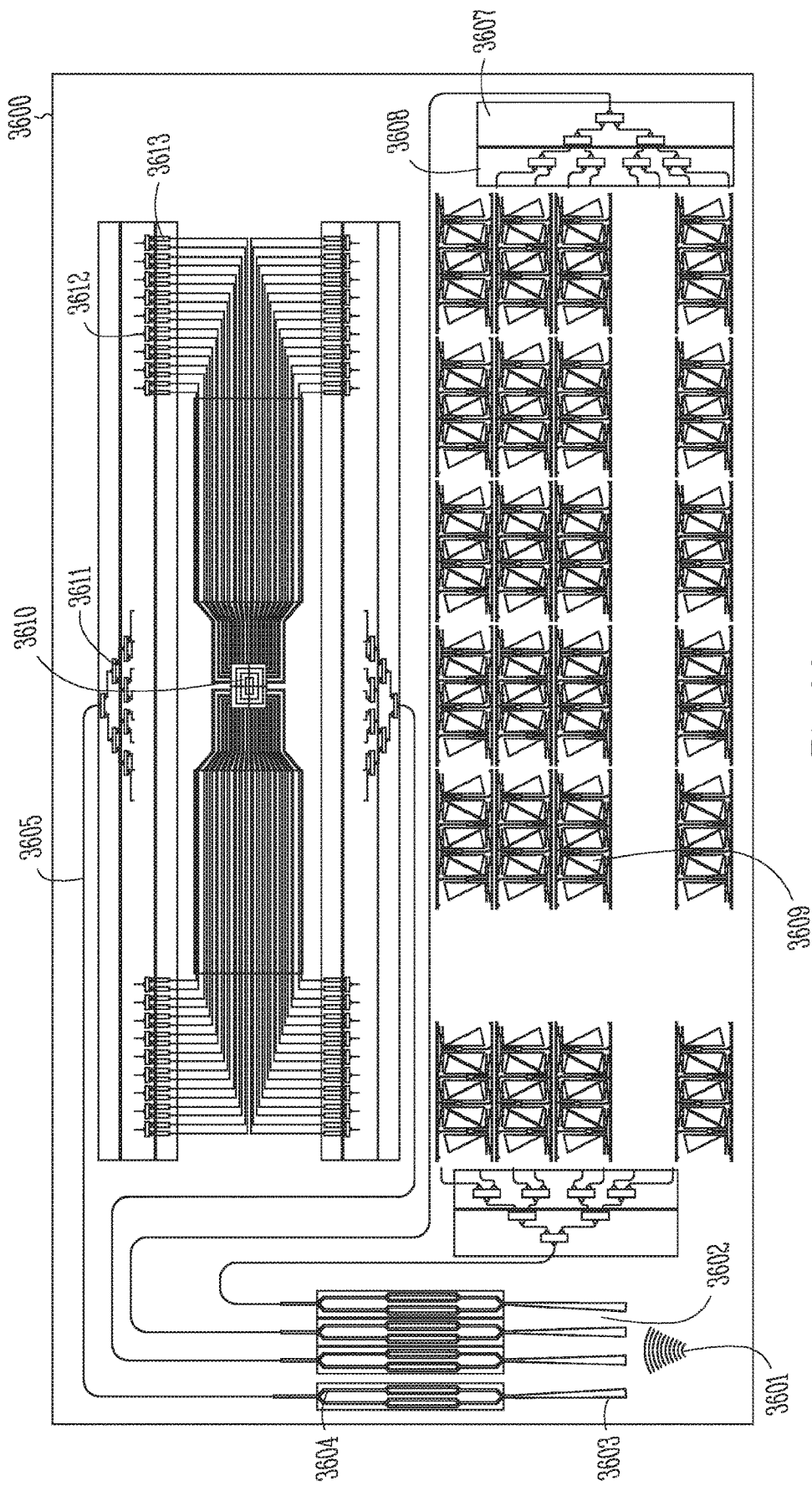
FIG. 36 illustrates an example of an integrated system containing a transceiver and an optical phased array.

Alternate architectures using an MMI instead of a star coupler as well as end couplers or hybrid integration of the laser 3501 with the transceiver 3500 are shown in FIG. 35A and FIG. 35B, respectively In an example, the architecture can include an on-chip, integrated optical phased array as shown in FIG. 36. An advantage of a phased array is that it can be integrated with a transceiver design, e.g., as shown in FIG. 36, creating therefore a single chip LIDAR solution incorporating all three functions on the same semiconductor platform—transmitter, receiver, and beam steering. In a phased array of optical micro antennas, each antenna may be made by etching a grating into a waveguide that radiates the light out of the waveguide. By using a two-dimensional array of such emitters, e.g., a 32×32 or 64×64 emitter array, an interference pattern may be generated in the far field by the superposition of wavefronts originating from the different emitters. A far field pattern containing one strong central maximum and sidelobes suppressed by 10 dB or more may be obtained in the far field with suitably designed parameters of the emitter array. By controlling the phase of the light emitted by each micro antenna, the central maximum position may be changed, thereby creating essentially a two-dimensional steering mechanism.

The signal from the optical signal generation source can be coupled through coupler 3601 in the plane of the chip and in the star coupler 3602 and waveguides 3603. Light of optical frequency $f_0$ coupled in the tapered waveguides 3603 of the star coupler 3602 can be directed to the input of a plurality of I/Q modulators 3604. The I/Q modulators can create a plurality of synchronized optical signals with a linearly chirped frequency between $f_0+f_{IF1}$ and $f_0+f_{IF2}$. A plurality of first chirped optical signals can be directed towards the receiver block 3609 to provide a local oscillator for the receiver array. A plurality of second chirped optical signals are directed towards the steering block which in an example can include an optical phased array 3610. The optical phased array can perform beam shaping and steering on the second optical signal to be sent towards the target. The optical phased array can be composed of a signal distribution tree composed of both active 1×2 switches 3611 as well as 1×2 fixed ratio 50/50 MMI splitters 3612. The second optical signal can be directed from the distribution tree 3611 and 3612 to phase shifters on each waveguide 3613 and then further to the array of optical antennas 3610 which can radiate the light orthogonal to the surface of the array in the direction of the target. The return scattered second optical signal incident on the receiver array can be combined on each pixel with a fraction of the first optical signal which has been provided as the local oscillator through the dynamic distribution network as shown in detail in FIGS. 30A-30C. The dynamic distribution network can be composed of a block formed by a tree of 1×2 switches 3607 followed by a block composed of a static tree of MMI 1×2 splitters 3608. The first block containing switches allows for efficient distribution of local oscillator light to only the pixels that are being read avoiding therefore excessive power consumption as well as heating of the array.

The use of a block of switches 3611 as part of the distribution block for the phased array 3610 instead of a fully passive 1×2 MM Is only distribution tree allows for additional flexibility in beam shaping as the subset of antennas radiating optical signal can be adjusted in real time. In an example, by reducing the number of antennas which emit light, the divergence of the outbound beam may be increased.

Figure 37A:
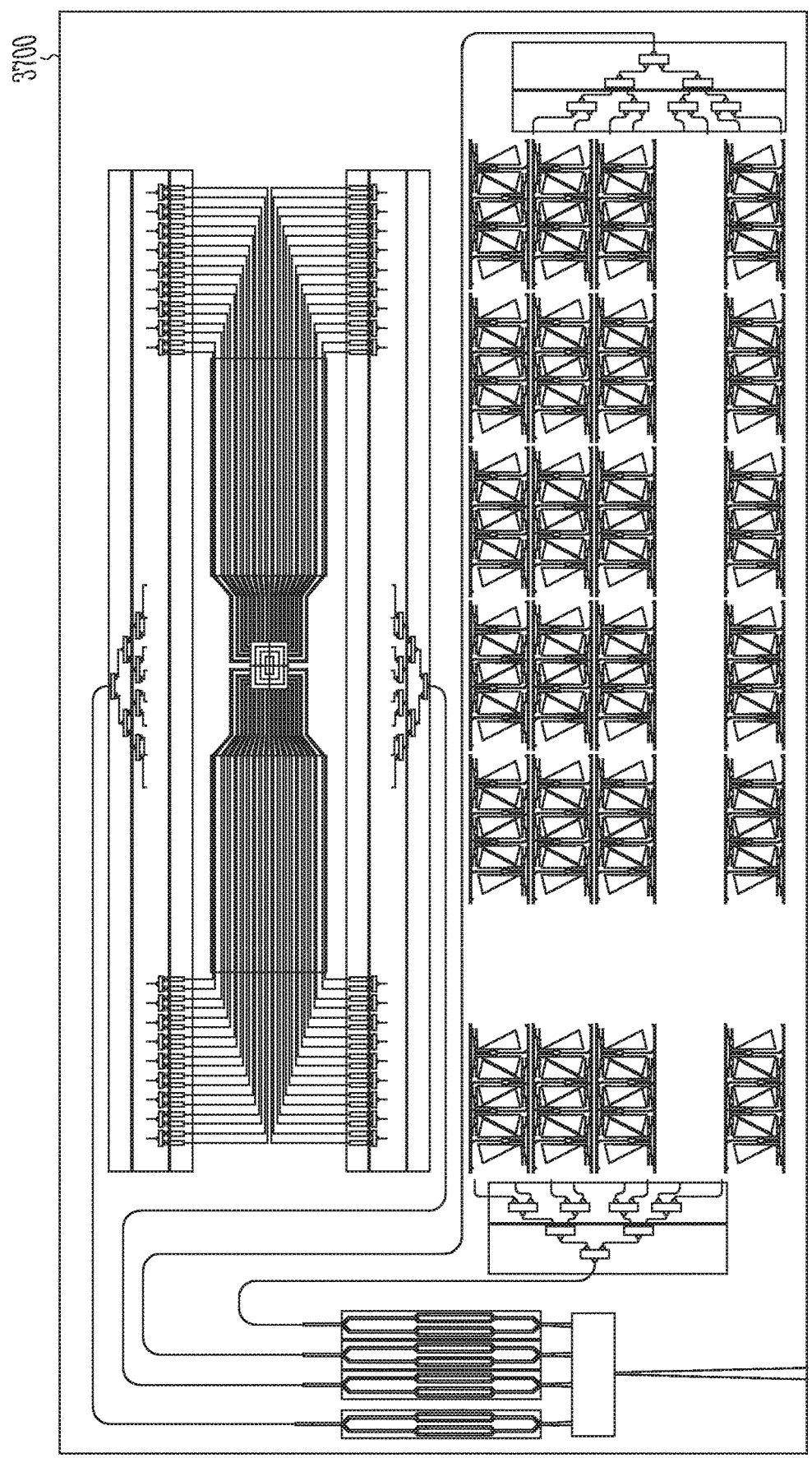
FIGS. 37A-37B illustrate an example of a photonic integrated circuit.
Figure 37B:
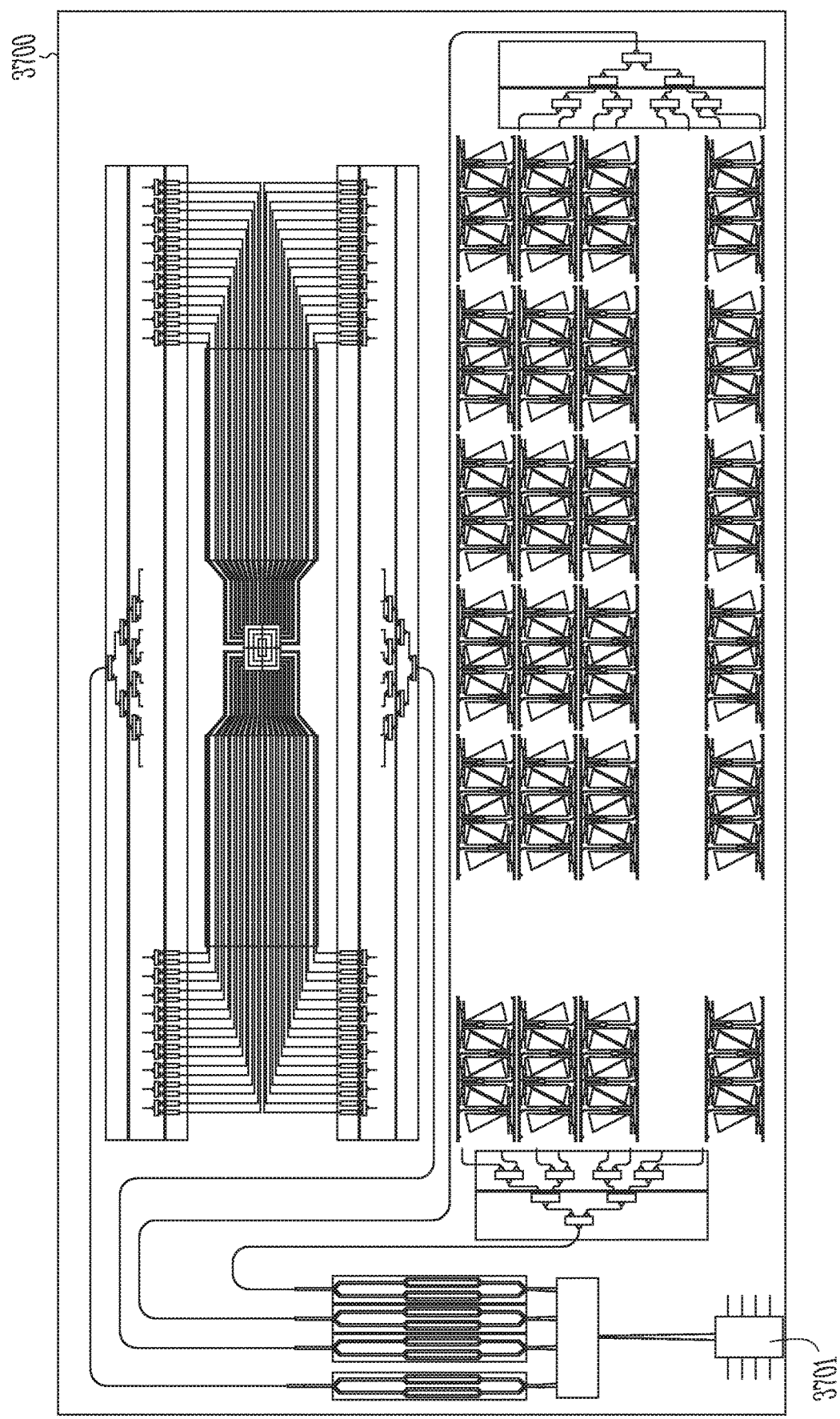

Alternate architectures using an MMI instead of a star coupler as well as end couplers or hybrid integration of the laser 3701 with the 3D imaging system on a chip 3700 are shown in FIG. 37A and FIG. 37B, respectively.

Dynamic Control of Range, Depth, Horizontal and Vertical Resolution

In a frequency modulated continuous wave/coherent imaging array system the total number voxels can be given by the product between the number of pixels and the number of range elements and can be related to the readout rate and chirp ramp by the formula:

$$Npix * \frac{RSI}{\Delta R} = \gamma tr / 2$$

Where $N_{Pix}$ can represent a number of pixels, RSI can represent the difference between the maximum and minimum range, $\Delta R$ can represent the range resolution, $\gamma$ can represent the sensor readout rate and tr can represent the length of the chirp ramp. The maximum range can be determined by the output power of the transmitter and detector amplification factor, the range resolution and accuracy can be determined by the bandwidth of the chirp, and the number of pixels can be configured electronically through the receiver or the steering optical phased array parameters. In an example, the four parameters: output power, chirp bandwidth, beam divergence and chirp ramp temporal length can be dynamically adjusted to obtain the desired imaging resolution, field of view and depth resolution for the 3D imaging system. In an example, the pixel density can be 640×480 the range can be 200 m the range resolution can be 1 cm corresponding to a modulation bandwidth of 15 GHz, the ramp time can be 61.4 ms and the readout rate can be 100 GS/s. One can increase the range resolution to 3 mm by increasing the chirp bandwidth to 45 GHz while reducing the range or number of pixels by a corresponding factor while keeping the chirp ramp length and readout rate constant. Any other combinations of parameters that satisfy the above formula can be used to dynamically adjust the 3D system performance. This dynamic adjustment of parameters can be executed at as low as several hundred nanoseconds allowing therefore point to point parameters adjustment to as long as several seconds for slower changing parameters, such as range of interest, resolution, accuracy, field of view.

Steering Module

The power density in the outbound optical beam can be maintained at a high value in the far field (e.g., several mW per square millimeter), such as to achieve a longer range of the lidar system. In order to achieve a high power density, the outbound optical beam divergence can be maintained at very low levels (e.g., less than 0.5 degrees). Dynamic beam steering of a beam while maintaining a very low divergence may be theoretically possible using an optical phased array (OPA) approach, but the practical implementation can be technologically difficult. From a conceptual perspective a dynamically controlled phased array can achieve the same goal as a variable parameter lens allowing the ability to shape the far field pattern. In the case of an OPA, by independently controlling the phases of a plurality of emitters, the far field pattern can be tailored according to the desired divergence and positioning of the beam. If steering of a constant divergence optical beam is desired, an alternative approach may be used. Instead of shaping each parameter of the beam, through phase control, effectively replicating the function of a lens, a fixed lens can be used, and the origin of the beam or beams emerging from a focal plane can be dynamically changed. By dynamically controlling the emission position in the focal plane, different angles and therefore incidence positions in the far field may be obtained. In an example, as shown in FIG. 38B the outbound optical beam can be coupled out from the focal plane array through grating coupler 3806 therefore being directed by the system at one angle with respect to the lens or by reconfiguring the array, coupled out from the focal plane array through grating coupler 3807 and be directed out of the system at an angle with respect to the lens different from the first angle.

Figure 38A:
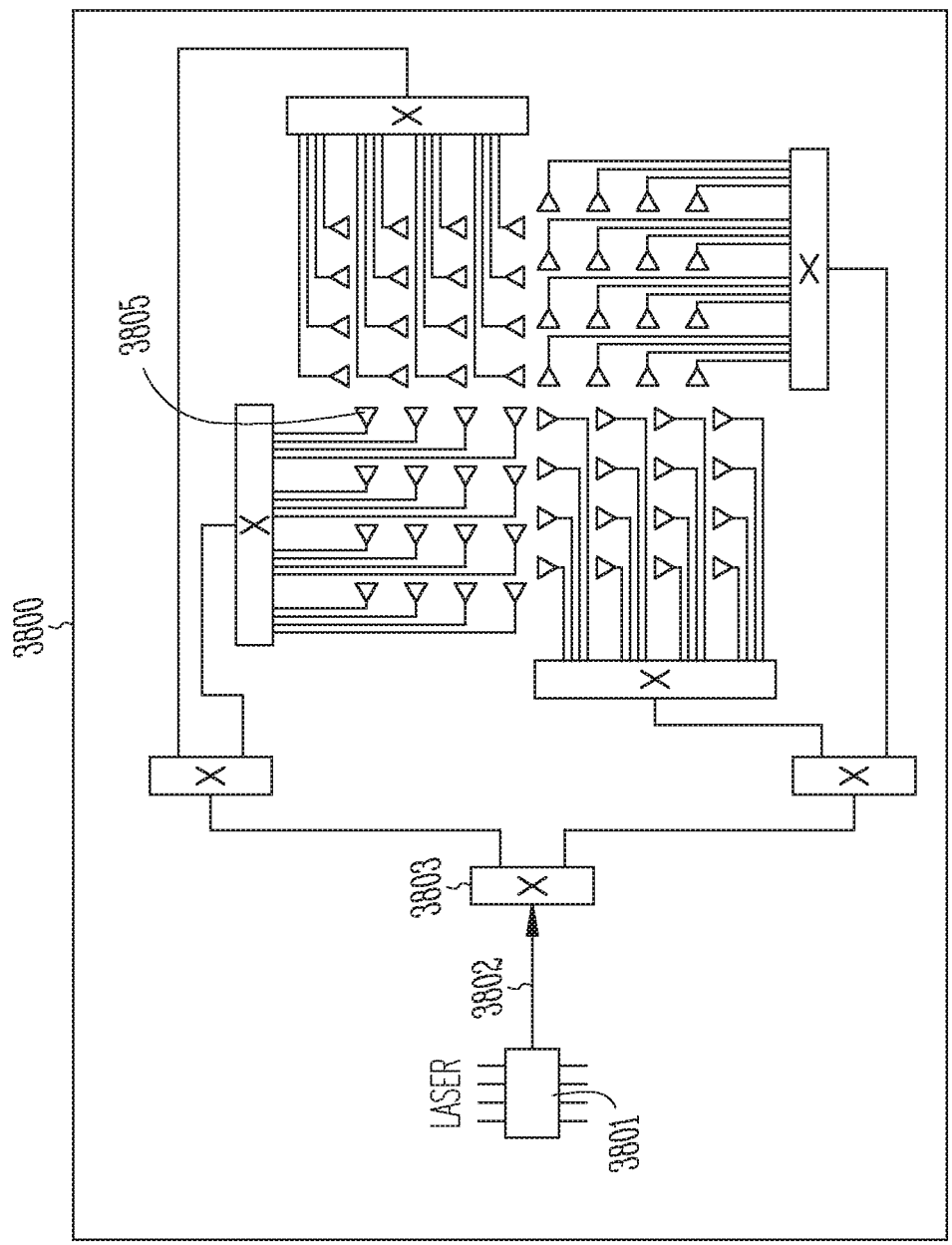
FIG. 38A illustrates an example of a beam steering photonic integrated circuit.
Figure 38B:
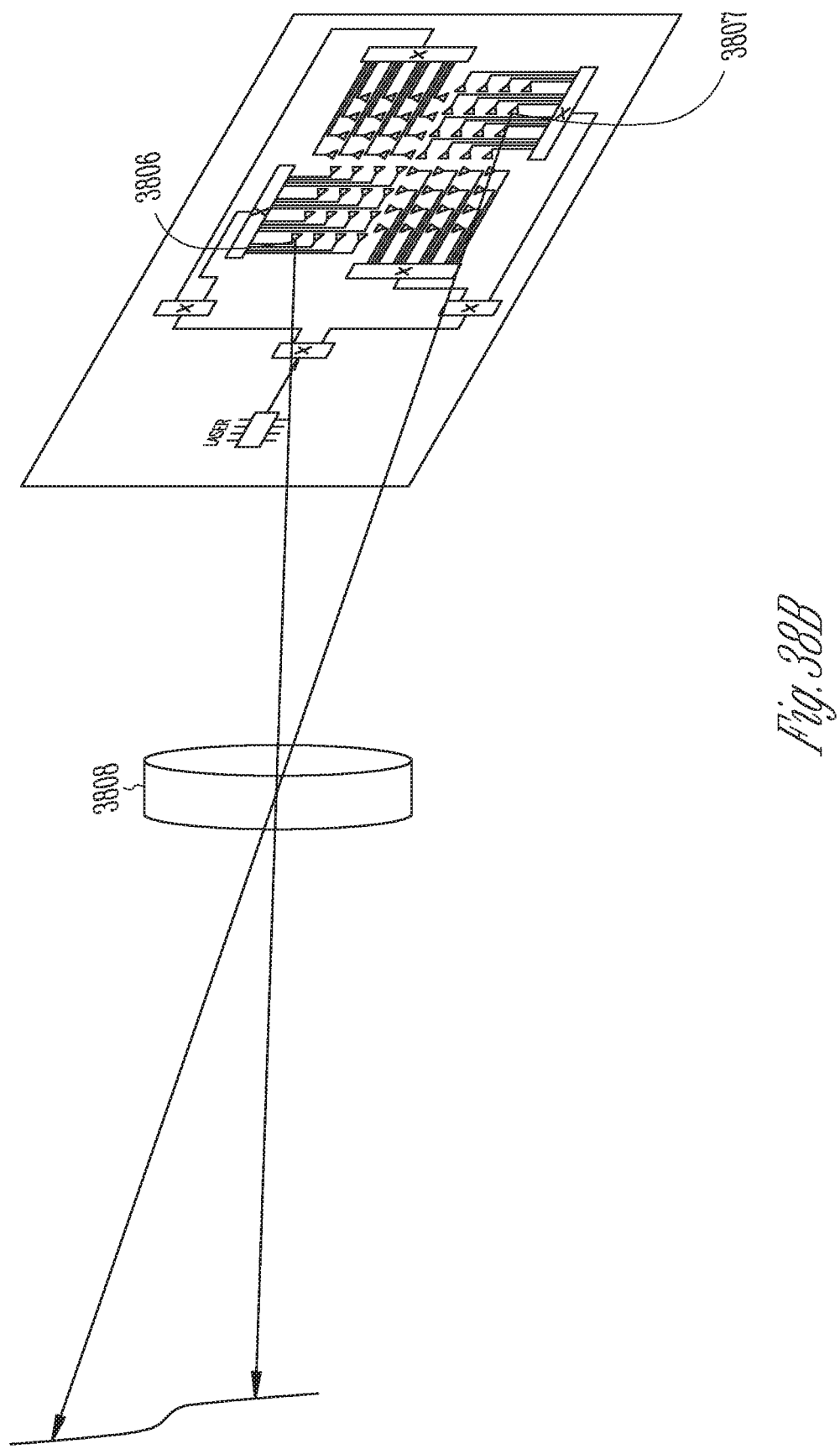
FIG. 38B illustrates an example of operation of a beam steering photonic integrated circuit.
Figure 38C:
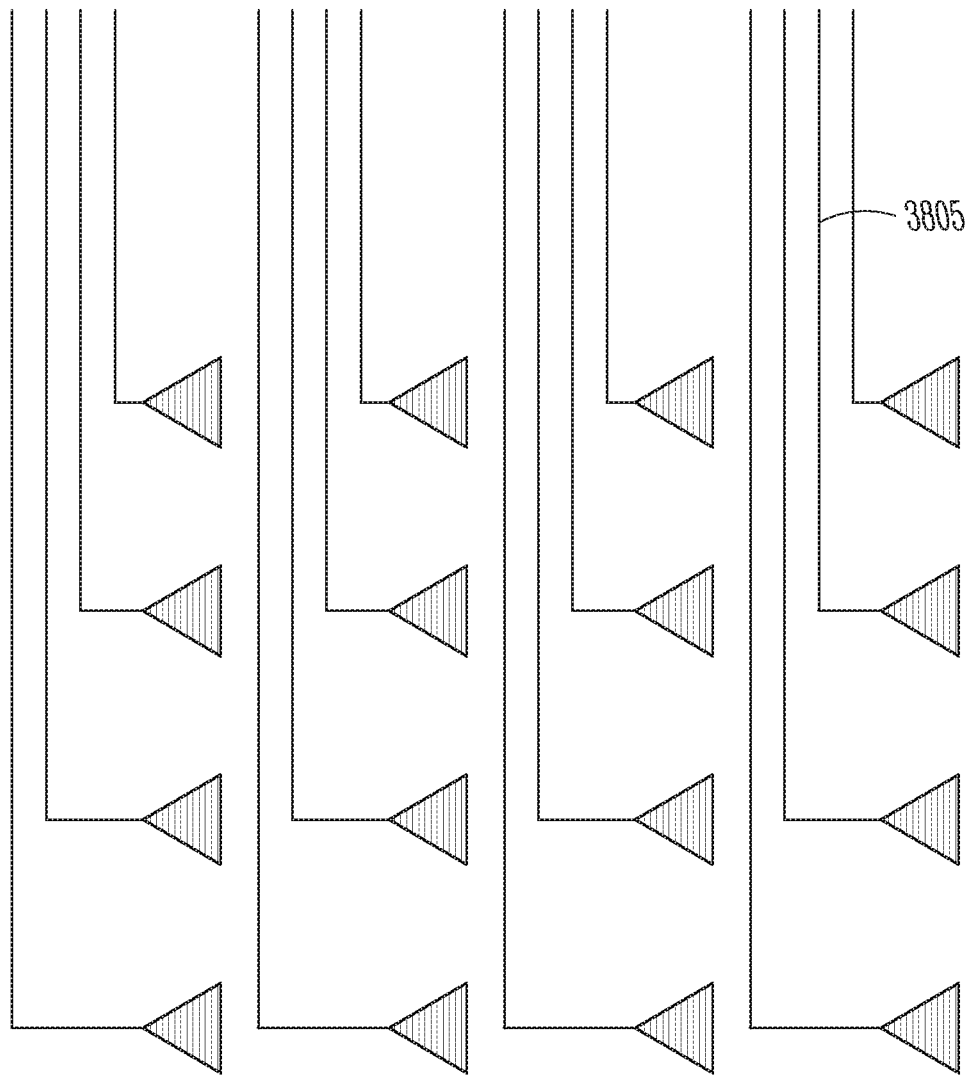
FIG. 38C illustrates an example of an array of grating couplers.

In an example shown in FIG. 38A, the laser beam can be coupled through waveguide 3802 into the input of the ensemble of optical switches 3803. The ensemble of optical switches 3803 may direct the beam towards one or multiple of the grating couplers 3805. The grating couplers can couple the light out of the focal plane array as shown in FIG. 38B. By reconfiguring the ensemble of optical switches, the outbound optical beam may be emitted from different positions in the focal plane and therefore directed at different angles. In an example, the area covered by the grating couplers can be a 6 mm by 6 mm area, though smaller areas such as 1 mm by 1 mm or smaller or larger areas such as 15 mm by 15 mm or larger can be used. In an example, the configuration of the ensemble of optical switches can direct the beam to one grating coupler at a time and can be sequentially reconfigured to direct the outbound beam to each of the grating outbound couplers 3805 creating therefore a two axis angular scan in the far field. In an example the array of grating couplers can be an 8×8 array of couplers therefore allowing for 64 discrete directions for the outbound optical beam. Other array sizes such as from 4 by 4 to 128 by 128 or larger can be created to obtain 16 to 16,384 or more, discrete directions for the outbound optical beam. In addition, by suitably choosing the parameters of the lens 3808, different divergences for the outbound optical beam can be achieved. In an example the lens parameters and positioning may be chosen to provide for a low 0.01 degrees angular divergence. Other lens parameters and positioning with respect to the grating array parameters may be chosen to provide for outbound beam divergence as for example in the range from 0.01 degrees to 30 degrees. In an example, in order to provide 50 degrees field of view, using a 6 mm wide array of gratings a lens with a focal length of 6.43 mm can be used. Other focal lengths, array width and grating array density combinations can be used to create a system with a different field of view and beam steering angular resolution.

Figure 39:
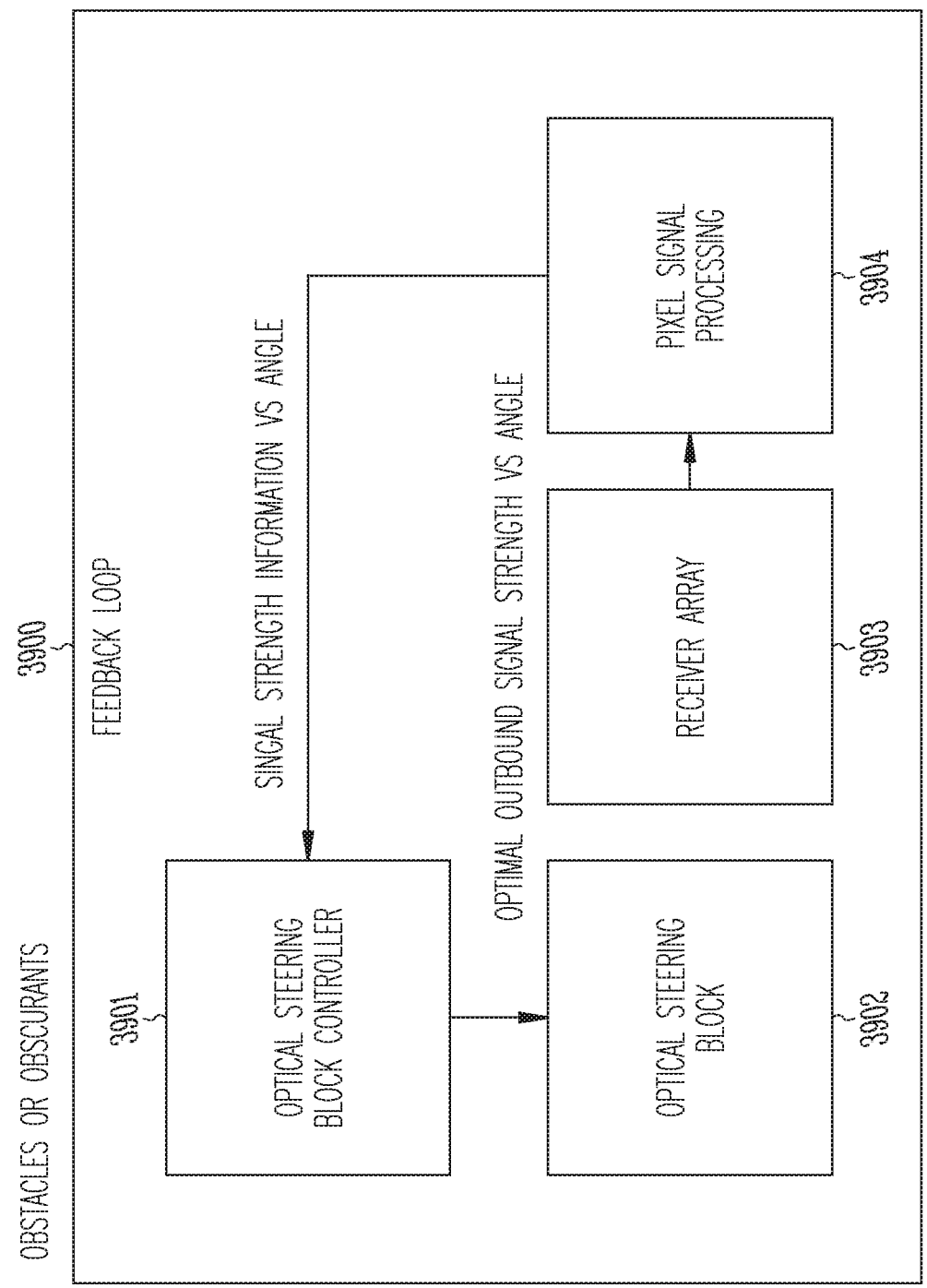
FIG. 39 illustrates an example of a feedback loop for controlling an angle of a light beam.

In an example, the ensemble of switches can be configured in a 1×N configuration with the optical signal being delivered to each of the grating couplers in a serial manner with one grating coupler coupling substantially all of the light of the laser out of the grating at one time. Alternatively, in an example, select switches in the 1×N array of switches can be configured in a 50/50/0 . . . /0 or other ratio configurations such as 10/90/0/ . . . /0 or any other configuration allowing therefore coupling of light out simultaneously at different locations in the focal plane array and with different intensities. Different intensities of the outbound beam may be optimal at different angles based on the expected distance to the target. In an example, at one angle, an obstacle can be located at 2 meters from the emitter and will require substantially less power than detection at a second outbound angle where a first obstacle can be detected at 50 meters from the emitter. By varying the intensity of the outbound laser beam being directed in different directions, the power consumption of the system can be optimized. An example of a feedback loop is illustrated in FIG. 39. The signal detected by the photodetectors of the receiver array 3903 can be processed by the pixel signal processing module 3904 which measures the frequency and amplitude of the return optical field as described in the receiver section. The amplitude or signal strength information can be provided as input to the optical steering block controller 3901 which uses the information to configure the switches 3803 in the optical steering block 3902 such as directions for which a received signal can be weak receive more outbound optical signal power while the directions where received signal can be strong receive less outbound optical signal power in order to achieve optimal signal to noise ratios for all directions. In an example the difference of the received optical power at different angles can be caused by different distance to obstacles, reflectivity of the obstacles or obscurants.

In an example the switches used to create the 1×N switch ensemble can be in one 1×N switch configuration or a tree of N 1×2 switches or any other combination. In an example, the switching mechanism may be thermo optic, carrier depletion or carrier injection in a PN or PIN phase modulator configuration and using a Mach Zehnder or ring switch architectural configuration.

Figure 40A:
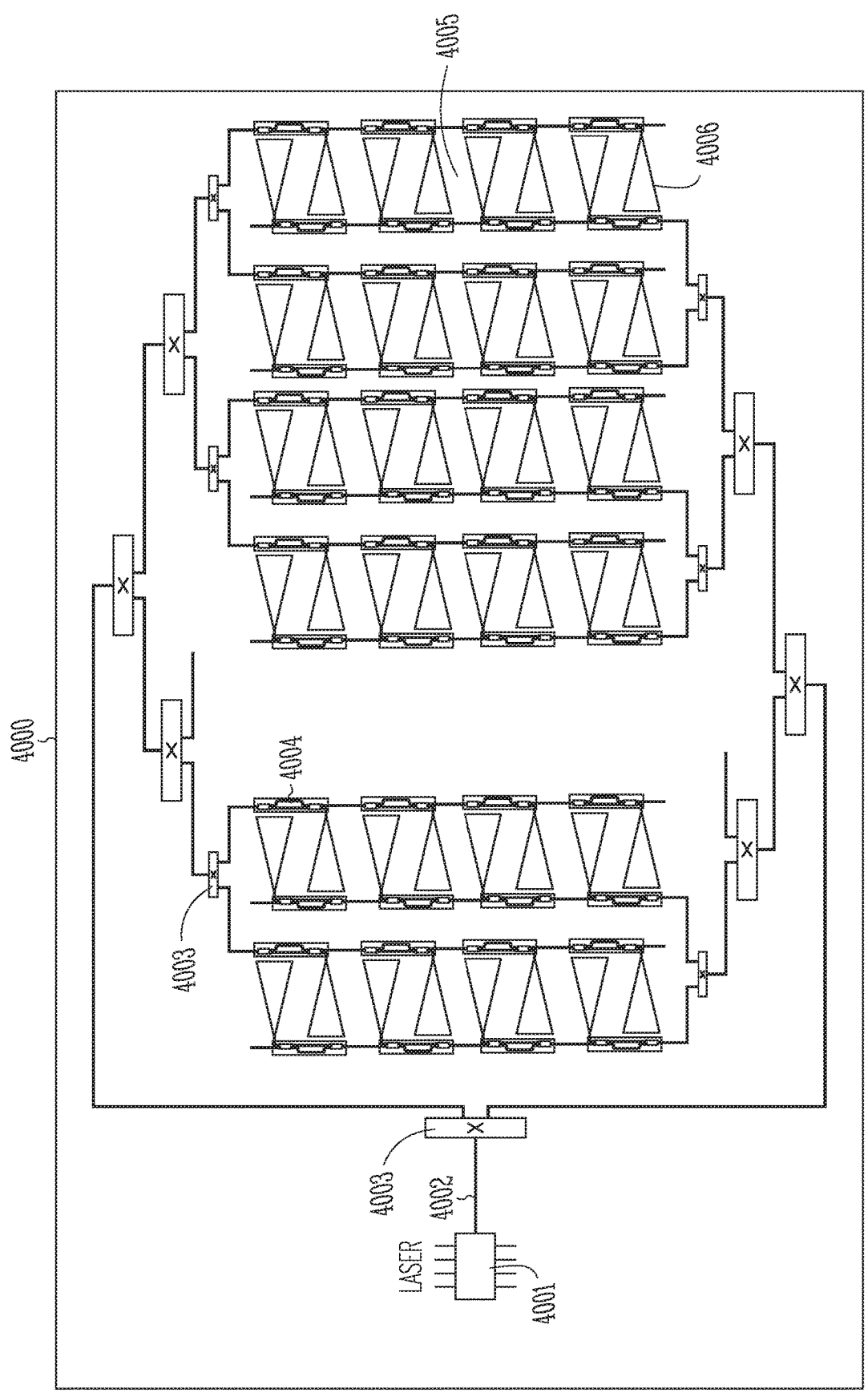
FIGS. 40A-40C illustrate examples of ensembles of switches and grating couplers.
Figure 40B:
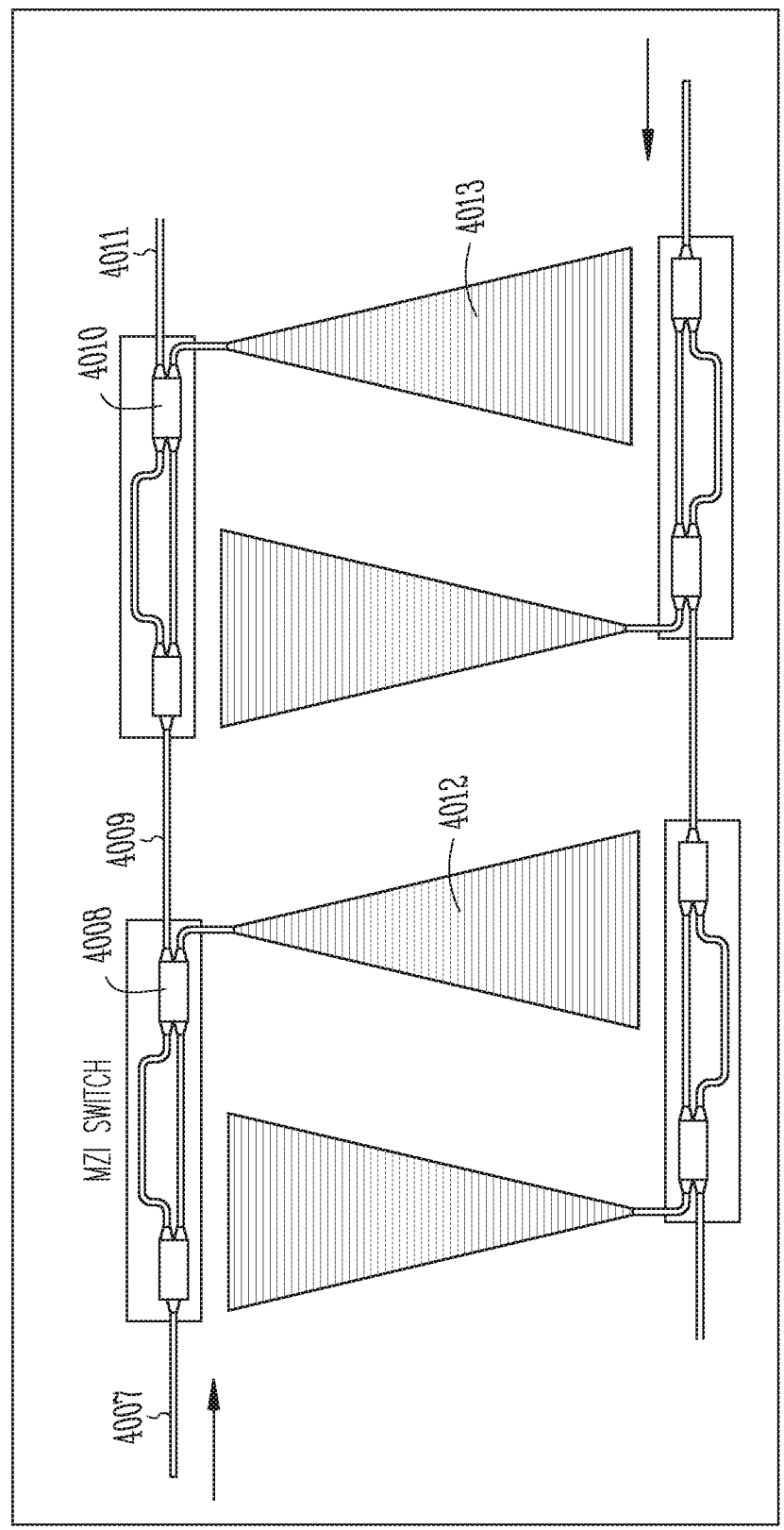
Figure 40C:
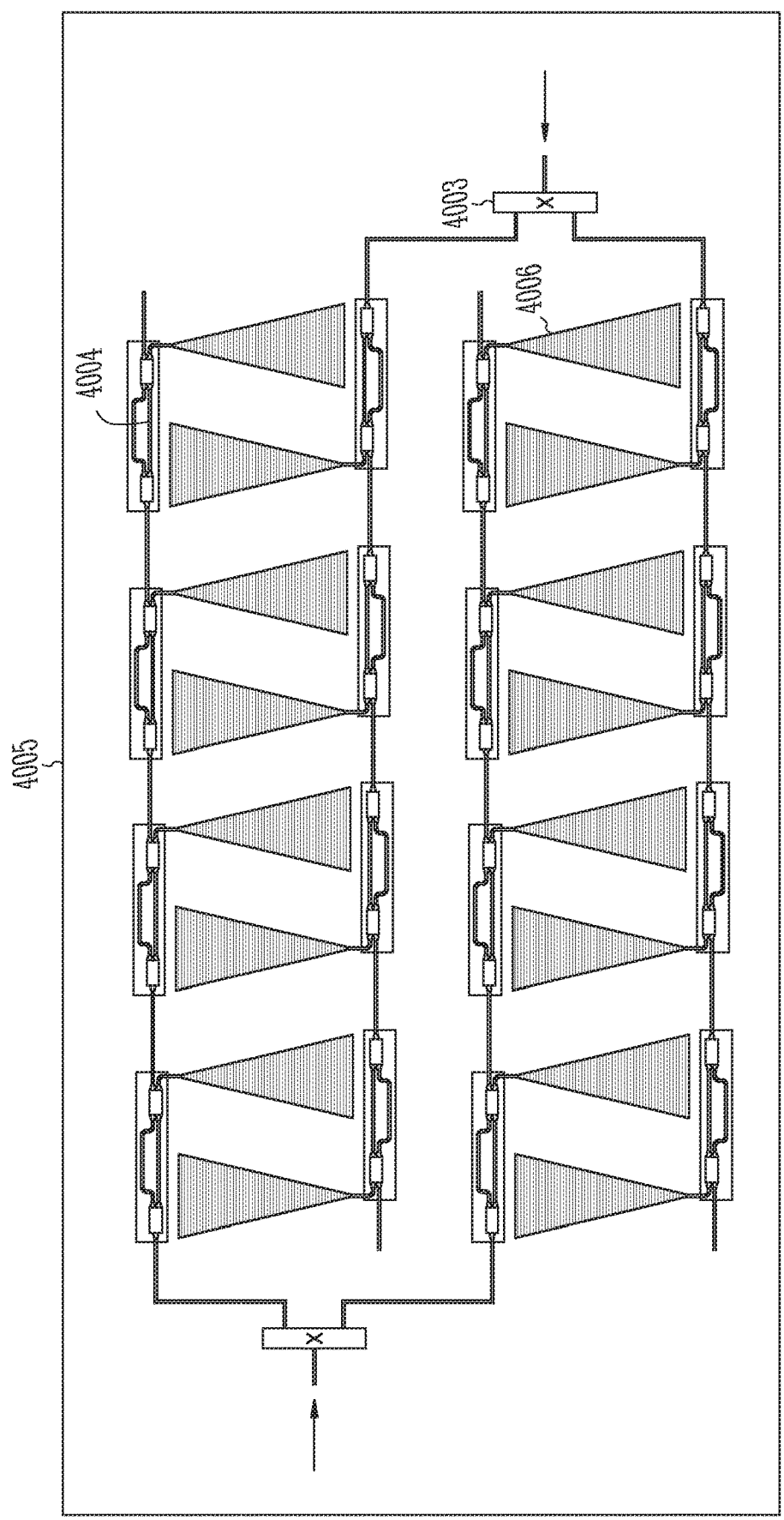

In an example the ensemble of switches may be arranged in a combination of parallel and serial configurations as shown in FIGS. 40A-40C. The optical beam from laser 4001 can be coupled into waveguide 4002 and into the tree of 1×2 switches 4003 which depending on the configuration, can direct the optical signal to one or multiple of the columns of grating couplers 4005. The signal from the switch element 4003 can be coupled through waveguide 4007 into the input of a subsequent 1×2 switch 4008. In one configuration the optical signal exiting the output of switch 4008 can be sent to coupler 4012 and coupled out of the chip. In an alternate configuration of switch 4008, the output of the switch can be directed to waveguide 4009, and further to the input of another switch 4010. In one configuration the switch 4010 can direct the optical signal to the output waveguide connected with output coupler 4013. In another configuration of the switch the optical signal can be directed to output waveguide 4011 and further towards another switch positioned serially.

Figure 41A:
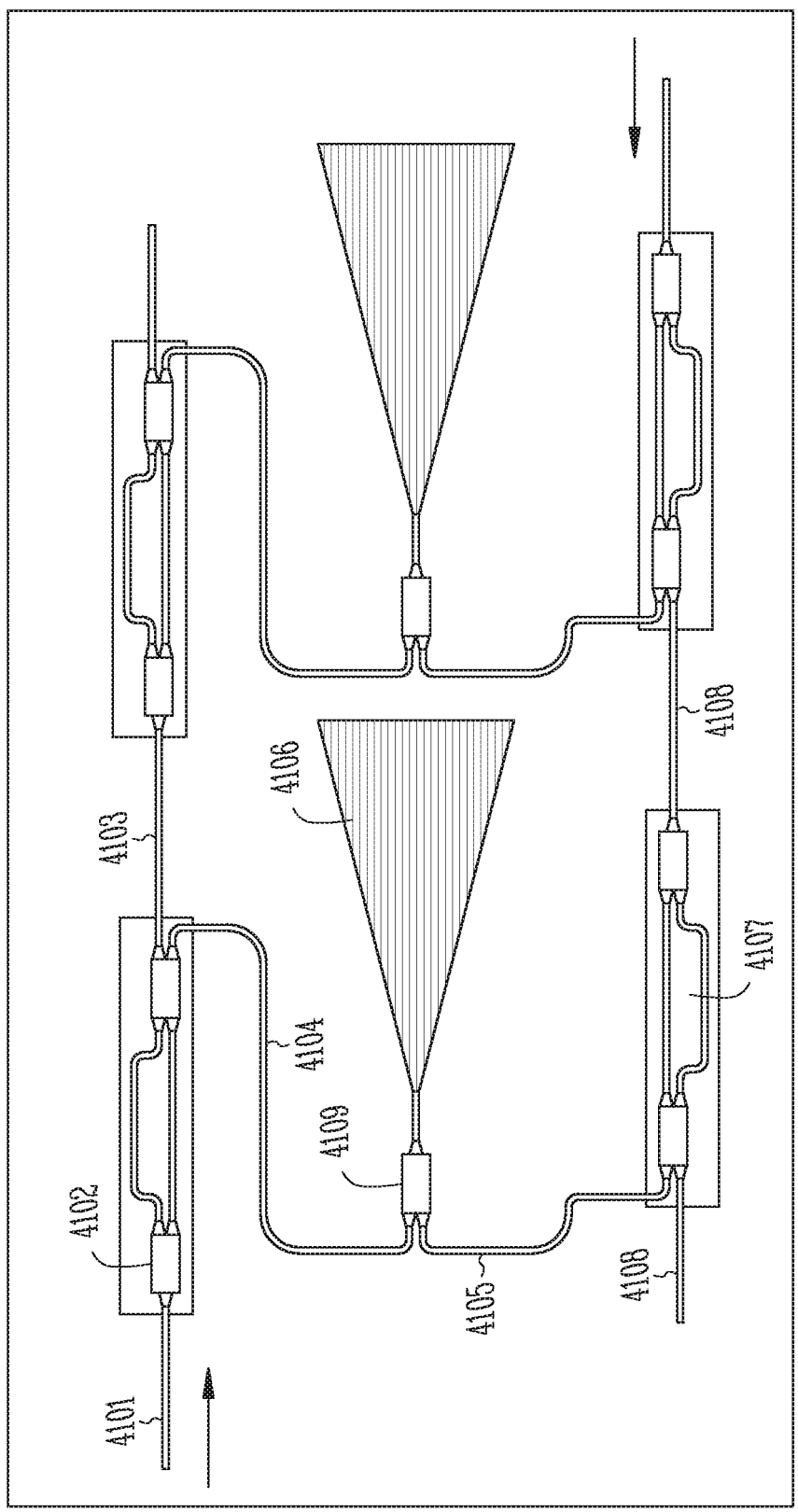
Figure 41C:
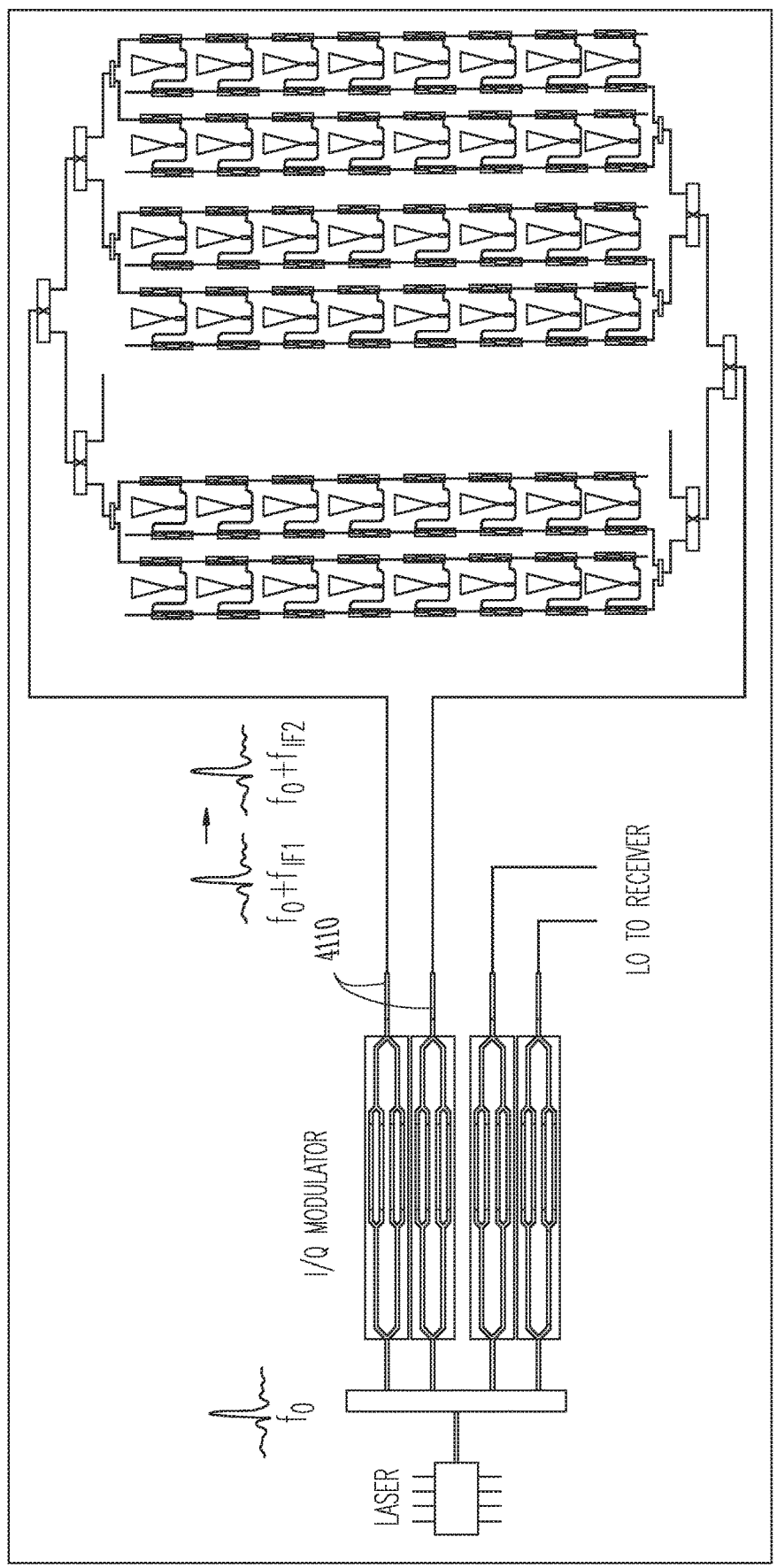

In an example, the optical signals from the two counter-propagating buses may be combined to increase the power radiated from each grating coupler as shown in FIGS. 41A-41B. In this example the optical signal from waveguide 4101 can be directed by switch 4102 into the input waveguide 4104 of a 2×1 MMI combiner. Similarly, the optical signal from waveguide 4108 can be directed by switch 4107 into the input waveguide 4105 of 2×1 MMI combiner 4109. The two signals are combined by the 2×1 MMI combiner 4109 and coupled out of the chip through grating 4106. The phases of the signals combined by the 2×1 coupler 4109 are adjusted using the phase control elements 4110 at the output of the transmitter module.

In an example the switches used to create the 1×N switch ensemble can be in one 1×N switch configuration or a tree of N 1×2 switches or any other combination. In an example, the switching mechanism may be thermos optic, carrier depletion or carrier injection in a PN or PIN phase modulator configuration.

Figure 42:
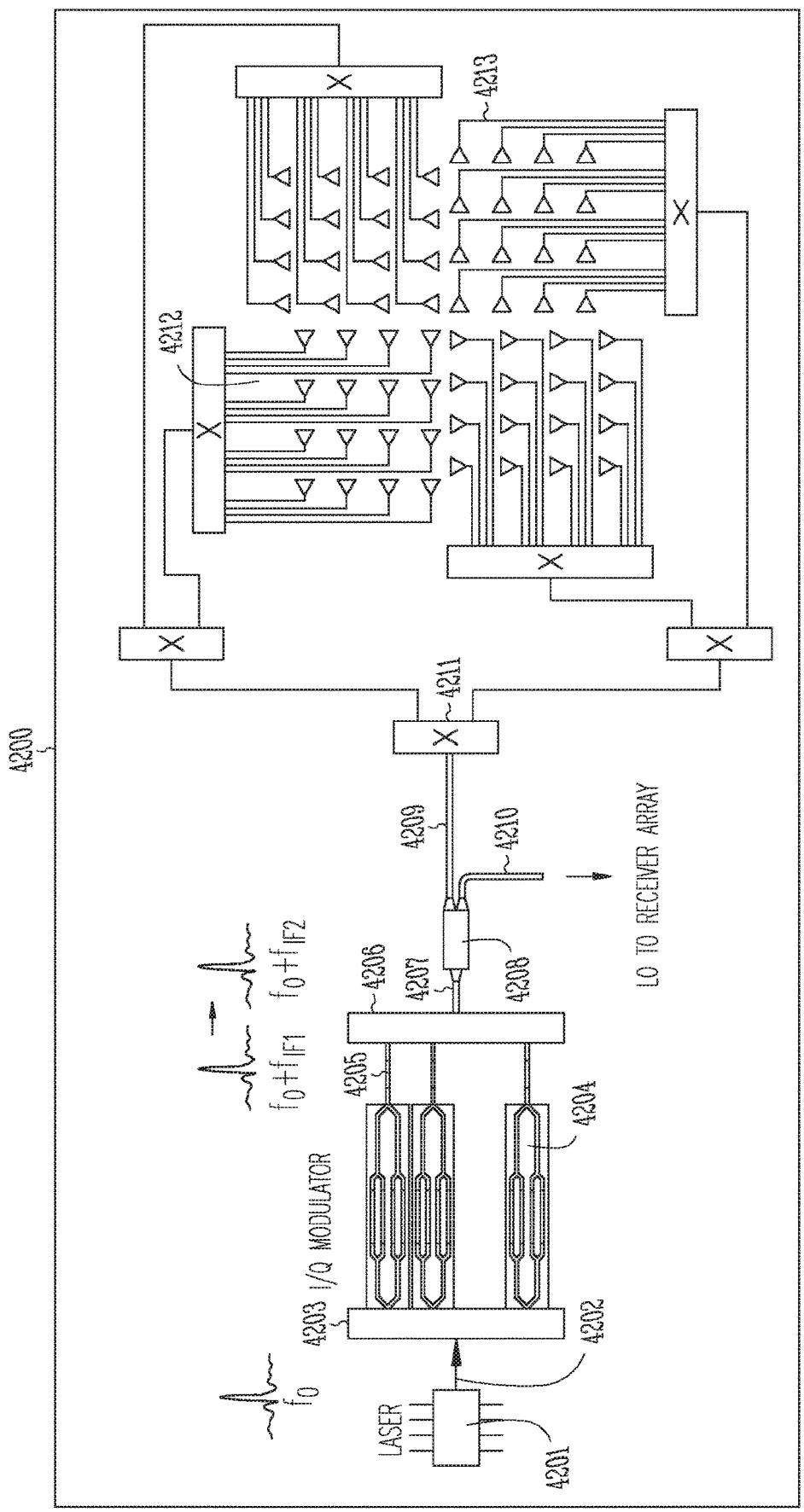
FIGS. 42-44 illustrates an example of a photonic integrated circuit including an integrated on-chip steering mechanism.
Figure 45A:
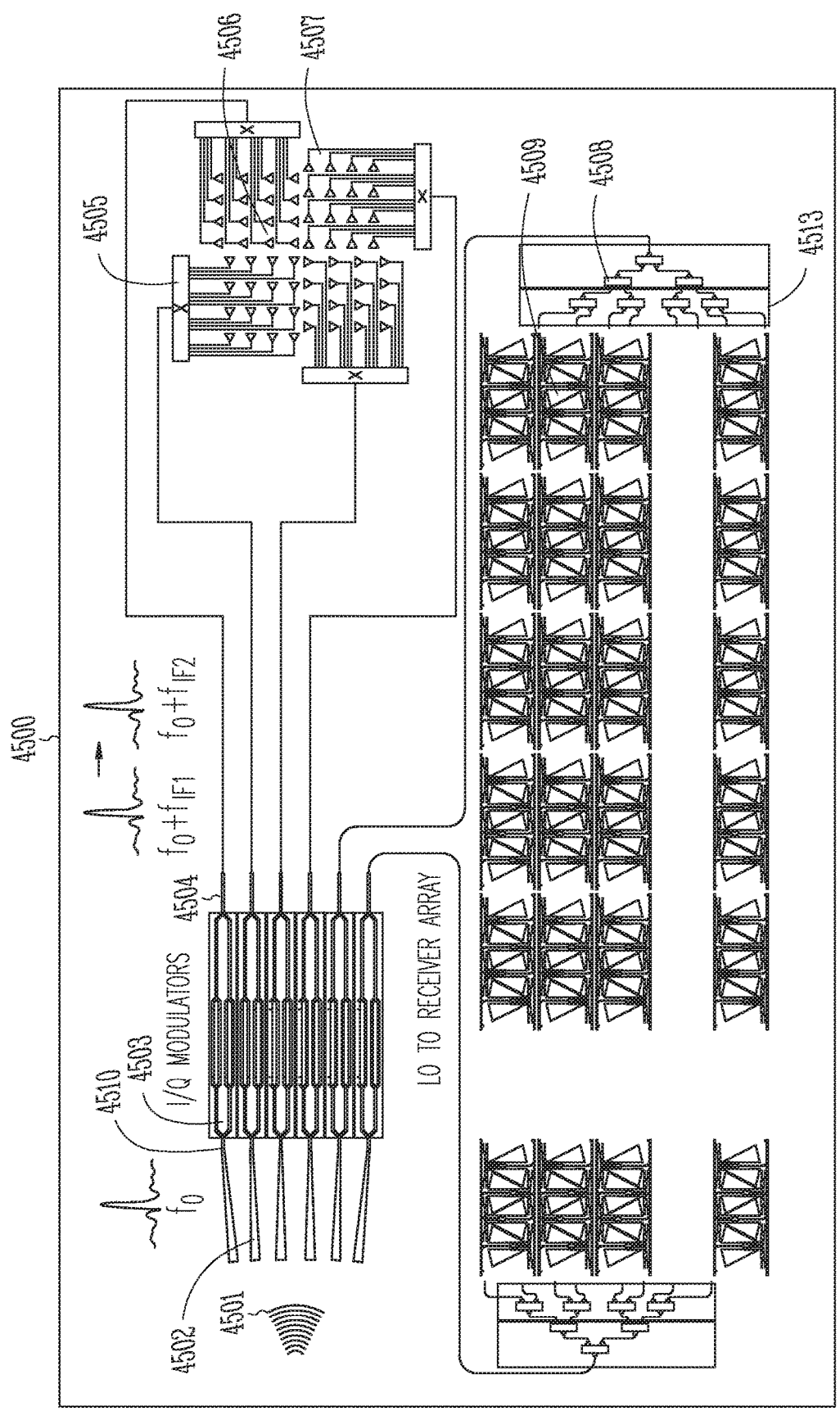
FIGS. 45A-45C illustrate an example of a photonic integrated circuit including an integrated receiver array, transmitter, and digital steering array.
Figure 45B:
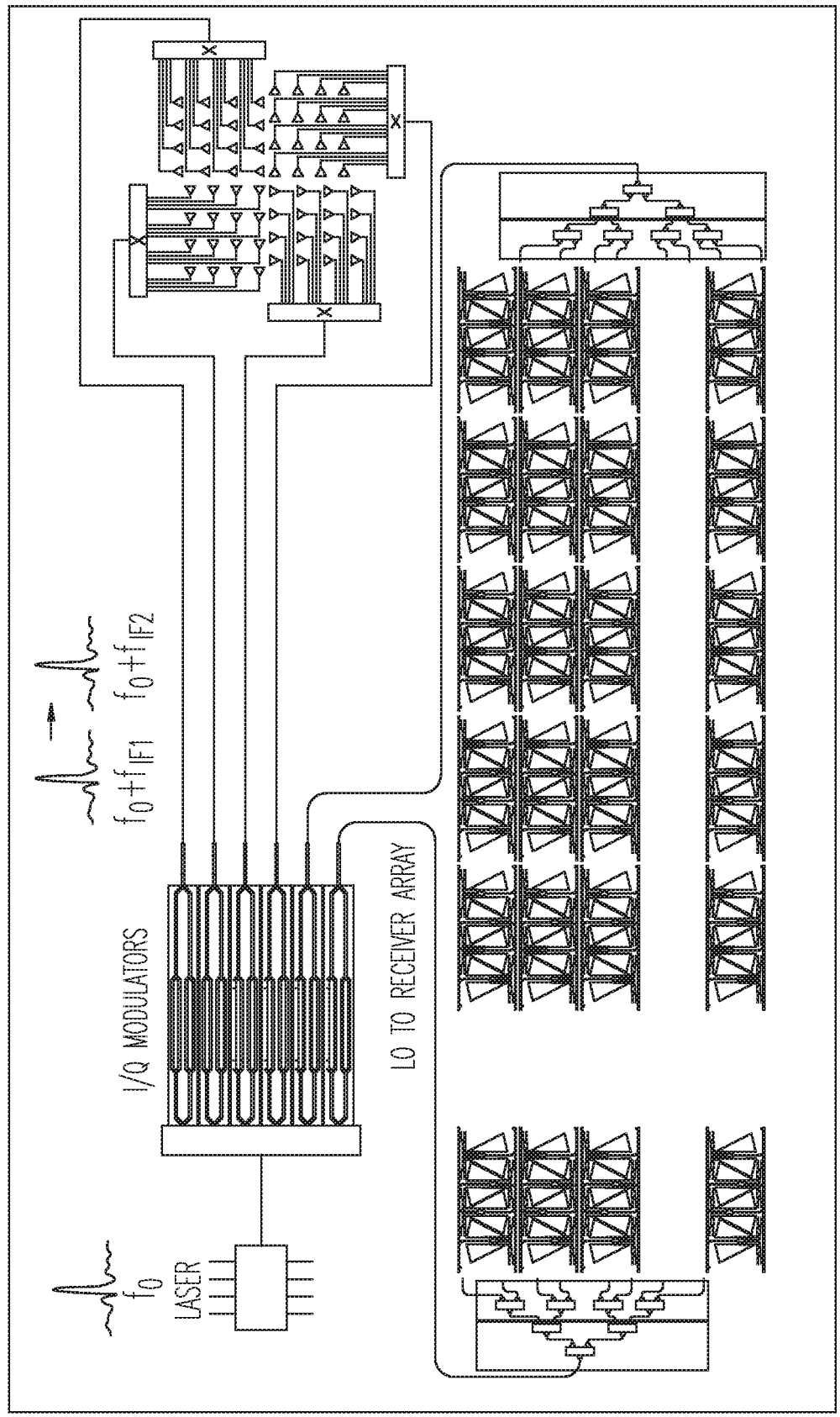
Figure 45C:
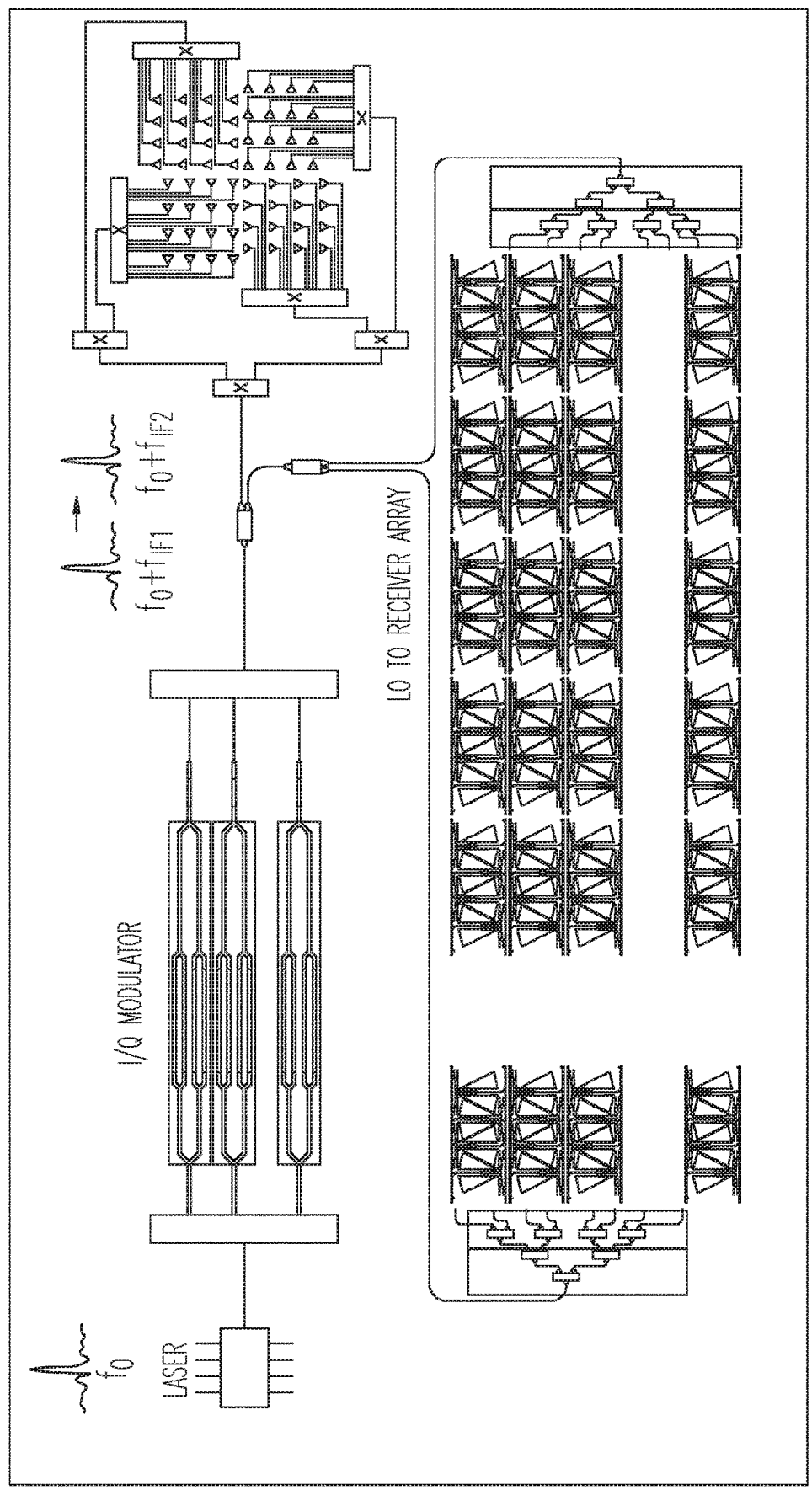

For applications which require long range, a steering mechanism may be necessary in concert with a low divergence outbound beam so that the number of pixels that are covered by the return signal can be kept very low, such as low as one pixel or in the range of 1 to 50 pixels and as a consequence, the SNR for each detector can be high as for example higher than 10 dB. In an example, the architecture can include an on chip, integrated optical steering mechanism as shown in FIG. 42. An advantage of an integrated on-chip steering mechanism is that it can be integrated with a transceiver design, e.g., as shown in FIGS. 45A-45C, creating therefore a single chip LIDAR solution incorporating all three functions on the same semiconductor platform—transmitter, receiver, and beam steering.

Figure 46:
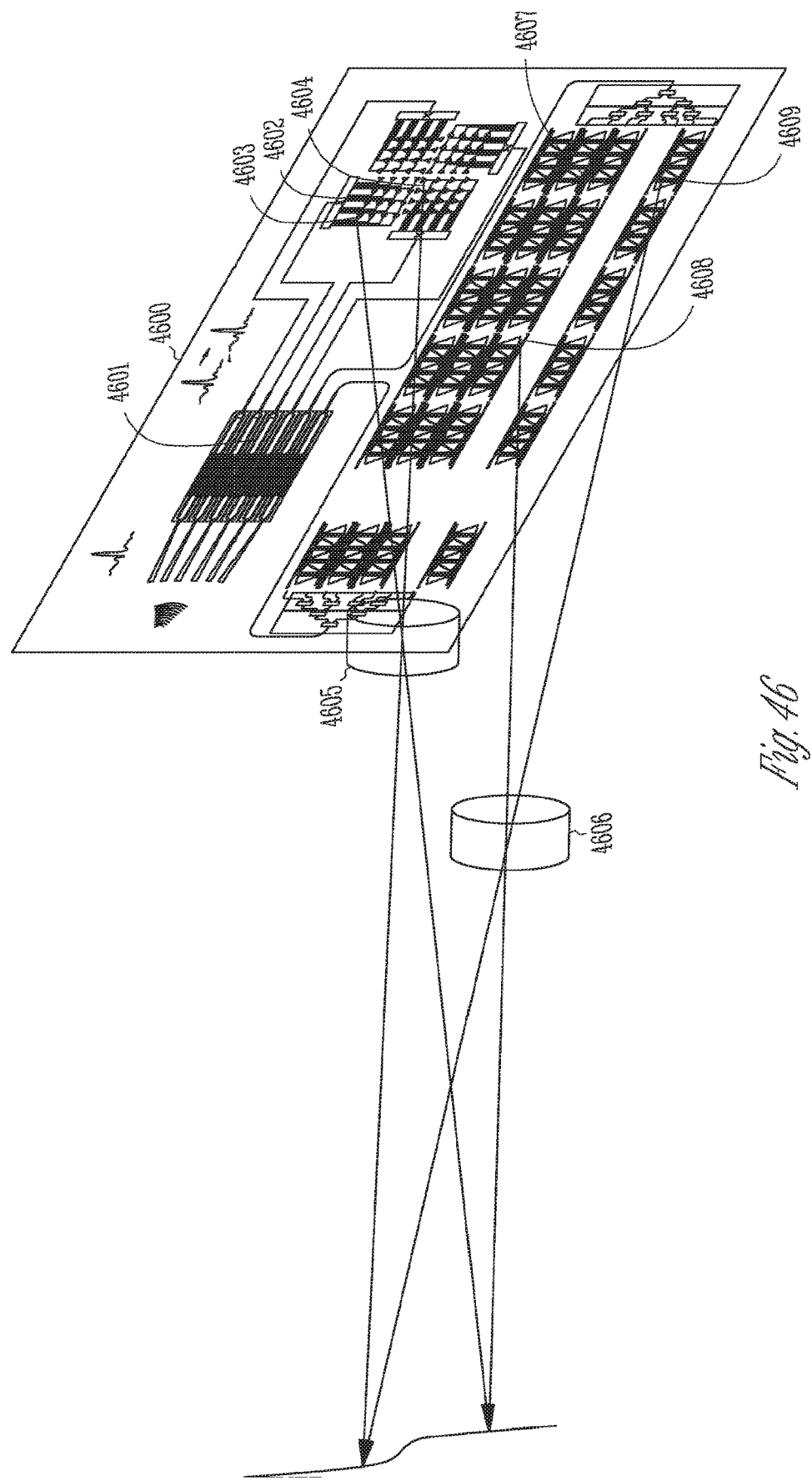
FIG. 46 illustrates an example of operation of a photonic integrated circuit.

The signal from the optical signal generation source 4201 can be coupled through waveguide 4202 in the silicon chip and then into the input of the 1×N MMI coupler 4203. Light of optical frequency $f_0$ coupled out of the N outputs of the 1×N MMI coupler can be directed to the input of a plurality of I/Q modulators 4204. The I/Q modulators can create a plurality of synchronized optical signals with a linearly chirped frequency between $f_0+f_{IF1}$ and $f_0+f_{IF2}$. The plurality of the synchronized optical signals can be combined by the N×1 MMI coupler 4206 and then directed to the input of the 1×2 MMI splitter 4208. A first chirped optical signal coming out of the 1×2 MMI splitter can be directed towards the receiver block through waveguide 4210 to provide a local oscillator for the receiver array. A second chirped optical signal can be directed towards the steering block which in an example can include an ensemble of switches 4211 that can switch the outbound beam to different output gratings 4213 from the array of gratings 4212. The ensemble of switches together with the array of output grating couplers can dynamically control the position of the outbound optical signal origin in the focal plane of the collimating lens as shown in FIG. 46. As a consequence of changing the position of the beam in the focal plane, the outbound collimated beam angle changes accordingly. The digital switching array can be composed of an ensemble of switches and an array of grating couplers. The second optical signal can be directed from the ensemble of switches to any of the grating couplers of the array 4212 which can radiate the light orthogonal or at an angle with respect to the normal to the surface of the array. The light radiated by the grating couplers cab be collimated by the lens and directed in the direction of the target. The return scattered second optical signal incident on the receiver array can be combined on each pixel with a fraction of the first optical signal which has been provided as the local oscillator through the dynamic distribution network as shown in detail in FIGS. 30-33. The dynamic distribution network can be composed of a block formed by a tree of 1×2 switches followed by a block composed of a static tree of MMI 1×2 splitters. The first block containing switches can allow for efficient distribution of local oscillator light to only the pixels that are being read avoiding therefore excessive power consumption as well as heating of the array.

In an example every switch in the ensemble of switches 4211 can be configured in such a way as the totality of the signal in the input waveguide can be directed to only one output waveguide of the switch and from there to only one grating coupler to be coupled out of the grating coupler array. In this example the ensemble of switches can be configured so that light can be sent to each of the grating couplers in the array in a sequential manner and as a consequence the receiver blocks can also be illuminated and read in a serial manner. Such a configuration may be preferred for detecting objects situated at long range such as 50 meters or longer range such as between 50 meters and 400 meters when high power density in the outbound optical beam is desired. In another example the ensemble of switches can be configured so that any other ratio between the output and input signal may be created. In this example multiple gratings can couple light out of the array simultaneously and each grating output power can be different. In this example each grating and therefore each direction may receive the amount of light that can be sufficient to detect an obstacle situated at a shorter range such as 10 meters or 20 meters while other switches may be configured so that the maximum available input power can be delivered to the grating so that the return signal to noise ratio can be sufficient to allow detection of obstacles situated at long range such as between 20 meters and 400 meters.

Figure 43:
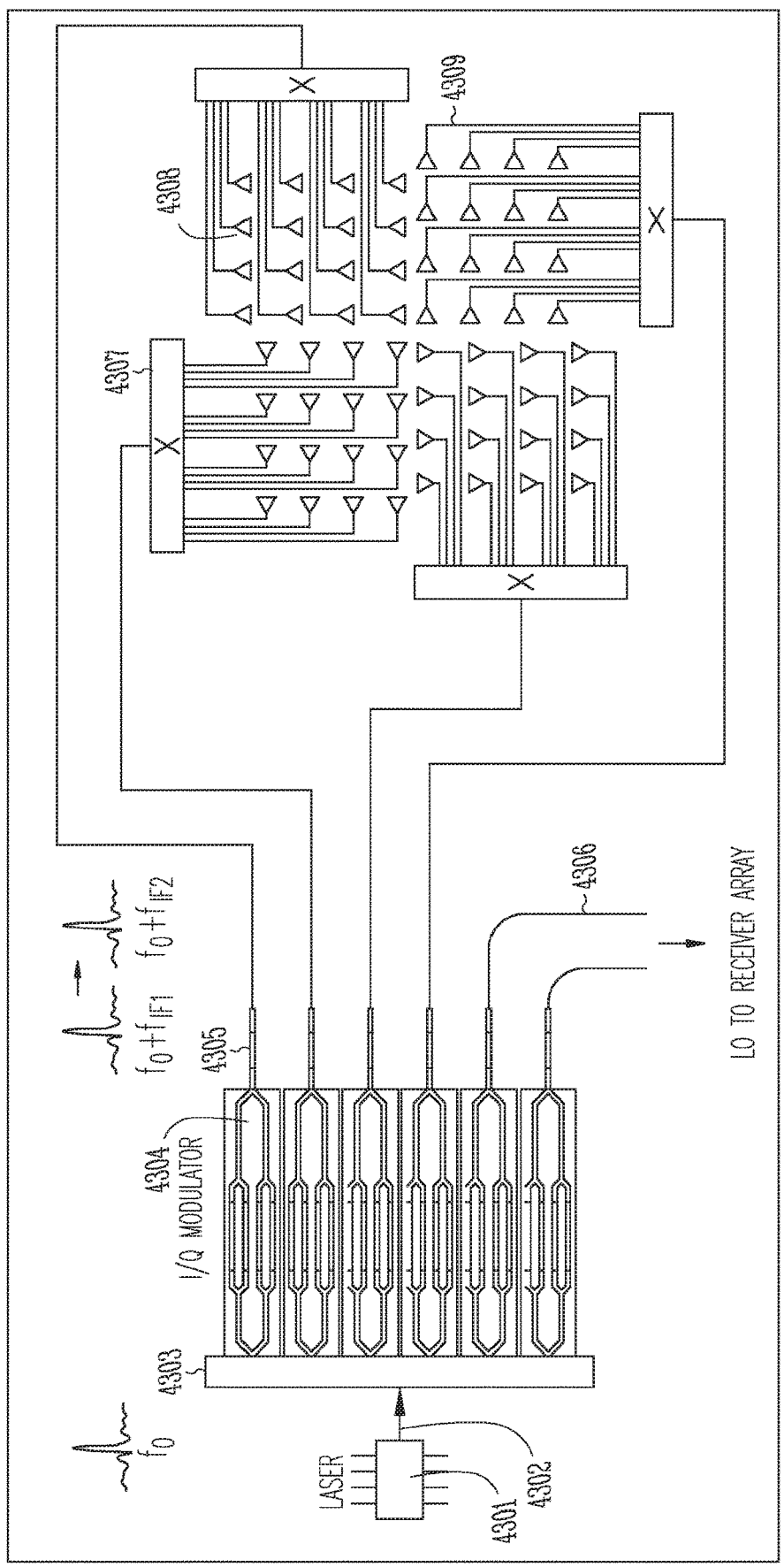
Figure 44:
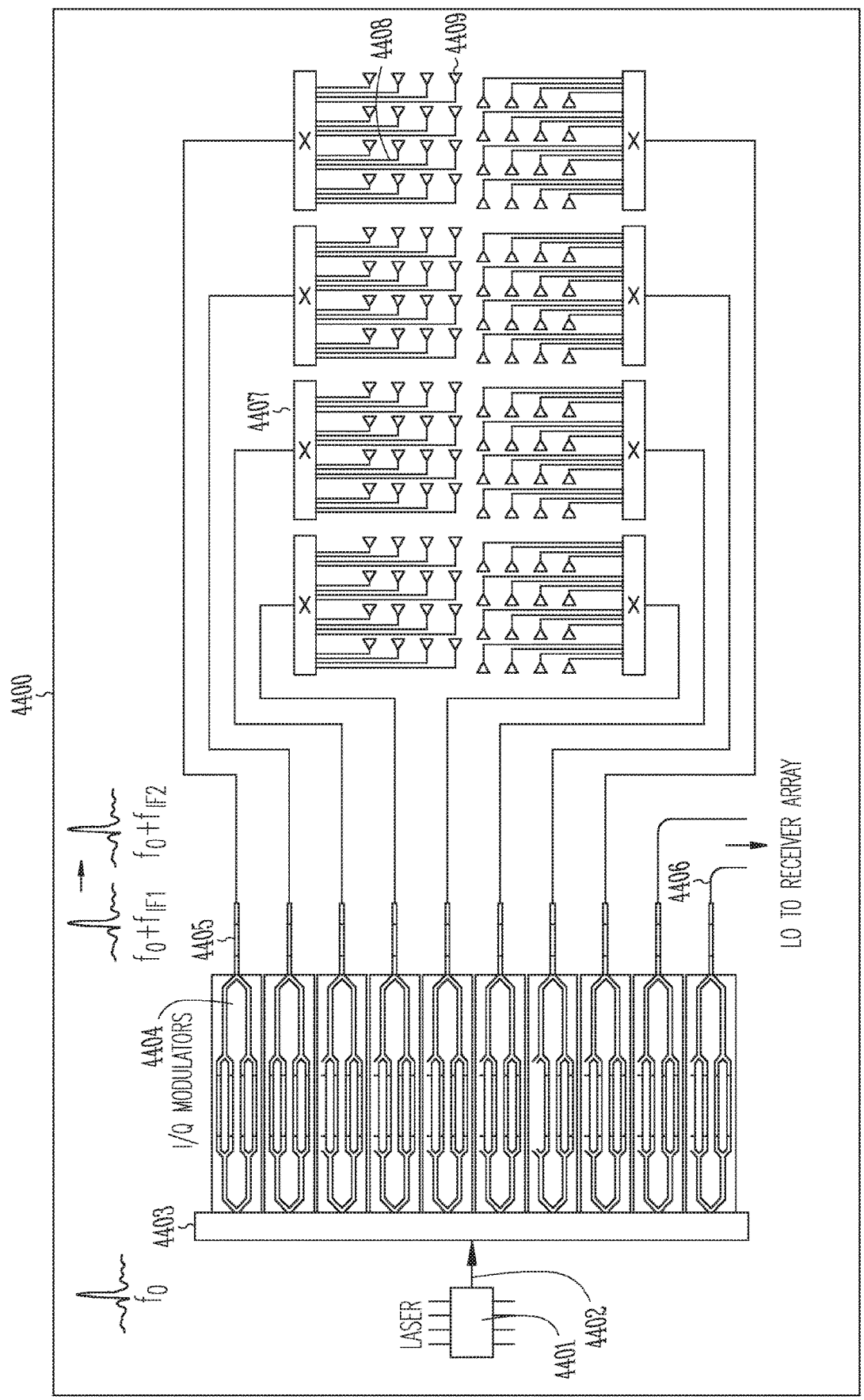

In another example shown in FIG. 43, a plurality of second optical chirped signals from the output of the I/Q modulators 4304 are sent to a plurality of 1×N optical switches 4307, with each I/Q modulator output serving as input for one 1×N switch. Each switch can perform the switching of the optical signal between the N grating couplers which can be part of the array of grating couplers 4308. In an example 4 I/Q modulators can be used to provide the chirped optical signal for 4 arrays of 16 gratings each. In an example a plurality of first optical signals can be directed from the output of the I/Q modulators 4304 through waveguides 4306 to the receiver block to provide local oscillator signal. Other numbers of modulators, such as 8 as shown in FIG. 44 or any number from 1 to 256 modulators can be used to provide chirped optical signal to 1 to 256 arrays of gratings 4408. Also the number of gratings in the array served by one switch may be 16 or any number such as from 4 gratings per array to 4096 gratings per array or more.

In an example shown in FIG. 45A, the receiver array 4509 can also be on the same chip with the transmitter and the digital steering array.

In example shown in FIG. 45A, grating 4501 can be used to couple light into the star coupler 4502 and then further into a multi channel I/Q modulator 4503 and the steering module. In addition the receiver array 4509 can also be integrated on the same chip. This design enables high aggregate output power as multiple modulation channels are used and no high power bottlenecks exist in the design. The signal from the optical signal generation source can be coupled through coupler 4501 in the plane of the chip and in the star coupler 4502 and waveguides 4510. Light of optical frequency $f_0$ coupled in the tapered waveguides 4510 of the star coupler 4502 can be directed to the input of a plurality of I/Q modulators 4503. The I/Q modulators can create a plurality of synchronized optical signals with a linearly chirped frequency between $f_0+f_{IF1}$ and $f_0+f_{IF2}$. A plurality of first chirped optical signals can be directed towards the receiver block 4509 to provide a local oscillator for the receiver array. A plurality of second chirped optical signals are directed towards the steering block which in an example can include a digital reconfigurable grating array. The digital reconfigurable grating array can perform steering on the second optical signal to be sent towards the target. The digital reconfigurable grating array can be composed of an ensemble of reconfigurable switches 4505 and a grating array 4506. The second optical signal can be directed from the I/Q modulators 4503 to the 1×N switches 4505 and then to the array of grating couplers 4506 which can radiate the light orthogonal to the surface of the array in the direction of the target. The return scattered second optical signal incident on the receiver array can be combined on each pixel with a fraction of the first optical signal which has been provided as the local oscillator through the dynamic distribution network as shown in detail in FIGS. 30-33. The dynamic distribution network can be composed of a block formed by a tree of 1×2 switches 4508 followed by a block composed of a static tree of MMI 1×2 splitters 4513. The first block containing switches allows for efficient distribution of local oscillator light to only the pixels that are being read avoiding therefore excessive power consumption as well as heating of the array. A system schematic is shown in FIG. 46.

Alternate architectures using an MMI instead of a star coupler are shown in FIGS. 45B and 45C.

Laser Light Generation Module

In an example the laser can be directly modulated to create short optical laser pulses. In an example the laser pulses are 1 ns long. In various examples a duration of the laser pulses may be within a range of 0.25 to 1 ns in order to reduce the average power and increase the depth measurement accuracy as shorter pulses tend to increase accuracy. In other examples pulse widths from 1-10 ns may be used in order to increase the total pulse energy and therefore provide enough photons for detection in cases where remote obstacles with low reflectivity are to be detected. In an example the laser source may adjust the pulse length from pulse to pulse in order to optimize detection of obstacles within a range of interest.

Optical Signal Processing Module

In an example the optical signal processing module splits the incoming optical signal into multiple channels. The creation of multiple channels which can be sent to different beam steering units around the vehicle from one optical source can be advantageous as it reduces overall system cost. Another function of the optical processing module may be to adjust in real time the peak power of the pulses exiting the optical processing module. This may compensate for the amount of light being scattered back from the targets varying with the distance to the target (e.g., R square dependence where R can represent a distance to a target). Controlling the outbound pulse intensity in real time may facilitate avoiding exceeding (and therefore saturating) the dynamic range of the detectors. This may be achieved using an electrically controlled variable optical attenuator. In an example in addition to controlling the outbound pulse intensity, the modulator may be used to encode a number of bits modulation—a code—different on each pulse so that the detection system can determine the timing and source of each pulse and avoid cross talk.

Figure 47:
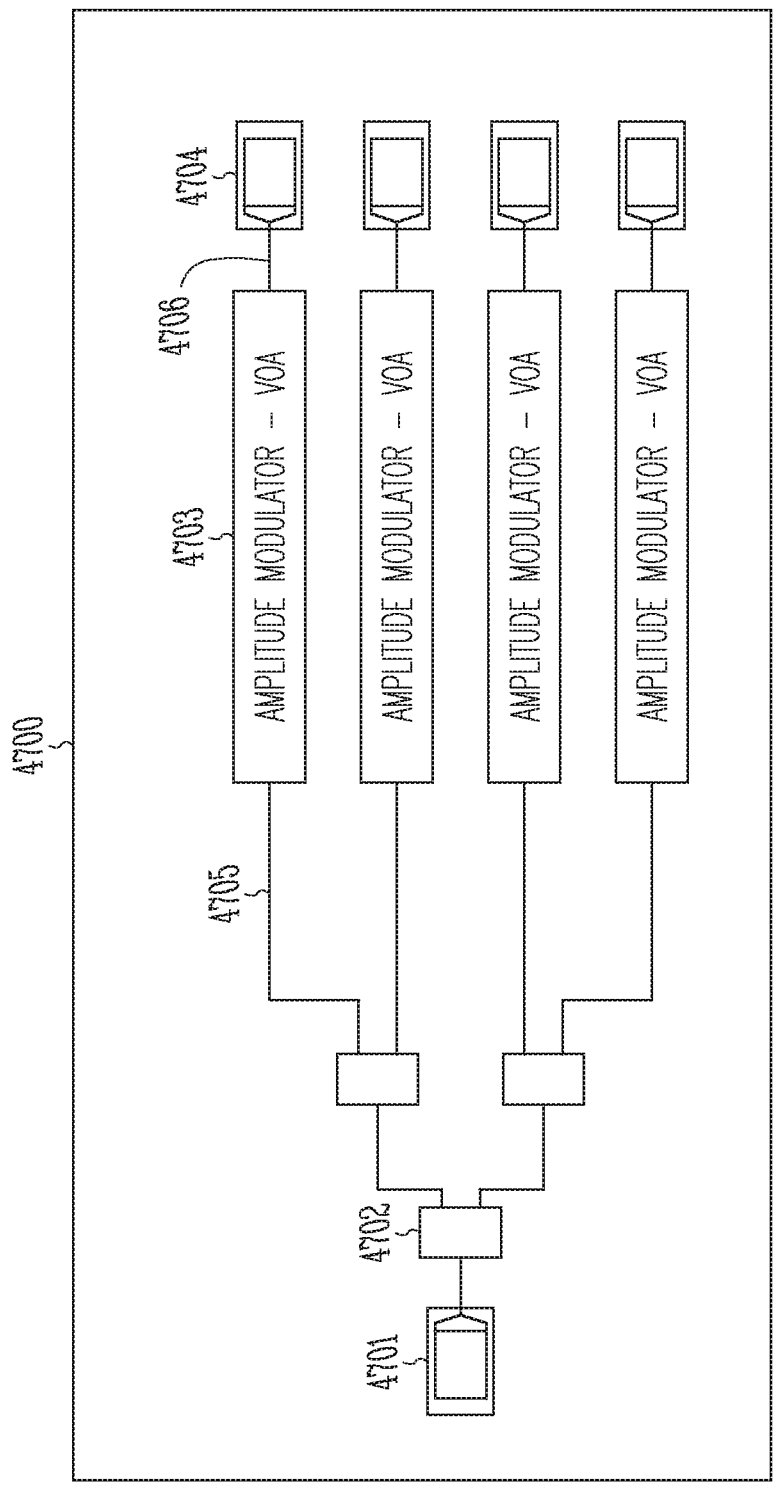
FIG. 47 illustrates an example of an optical processing module.

In an example, the optical processing module 102 includes a PIC 4700 built using Silicon on Insulator technology, as illustrated in FIG. 47. In an example, the signal can be coupled into the PIC 4700 through a grating coupler 4701 and can be guided to an array of 1×2 multimode interference (MMI) waveguides 4702 which split the input signal into a plurality of signals travelling in multiple waveguides. The signal can be guided through each of the waveguides 4705 to the amplitude modulator/variable optical attenuator 4703 which has the role of controlling the intensity of the signal. A variety of technologies such as current injection in a Si waveguide, electrically or thermally controlled Mach Zehnder interferometer, or any other combination that achieves fast amplitude attenuation of the laser light intensity may be implemented. In an example, a charge controlled Mach Zehnder configuration may be used in order to provide intensity attenuation at speeds from a few MHz to 25-30 GHz. After the intensity control elements, the optical signals traveling in waveguides 4706 are coupled out of the PIC through grating couplers 4704. A schematic for an implementation of the PIC for 4 channels is shown in FIG. 47. Other examples may have more or fewer channels. The optimal number of channels depends on the overall system parameters and more specifically the number of modules that are needed to provide full 360 degree coverage around the car as each channel serves one module. Different numbers of modules and therefore channels may be used based on the field of view of each module, degree of redundancy needed in the system, as well as other parameters. In other examples, the input and output grating couplers may be replaced by adiabatically tapered waveguide end couplers.

In an example, the transmitter PIC may be implemented in silicon on insulator with the top silicon layer being 220 nm or 480 nm thick, buried oxide layer 2 micron thick, though other substrates such as top Si layers in the range from 500 nm to 10 microns and buried oxide layers in the range of 0.5-3 microns may be used. The use of thicker top silicon layer can be advantageous in certain examples where higher power in the waveguide is desirable, in order to avoid the onset of nonlinear effects such as two photon absorption and self phase modulation. By increasing the waveguide cross section the power density in the waveguide at fixed input power decreases avoiding therefore the onset of the aforementioned nonlinear effects. The use of a thicker silicon layer and therefore larger waveguides has on the other hand the adverse effect of increasing the minimum radius of curvature for the waveguide bends that can be implemented without significant loss. For optimal system design the thickness of the top silicon layer and therefore the cross sectional area of the waveguide may be chosen to optimize for both the onset of nonlinear effects and compactness of design. In another example, different buried oxide thicknesses as well as multilayered designs containing alternating layers of silicon and oxide between the buried oxide and Si epi layer for the gratings sections may be used in order to improve the grating to fiber coupling efficiency. In addition to the described example, any other passive or active optical function such as multiplexers, demultiplexers, wavelength selective couplers, beam splitters, switches, polarization splitters, polarization rotators, isolators, detectors, and laser sources may be implemented in the transmitter PIC either monolithically or through hybrid integration.

Figure 48:
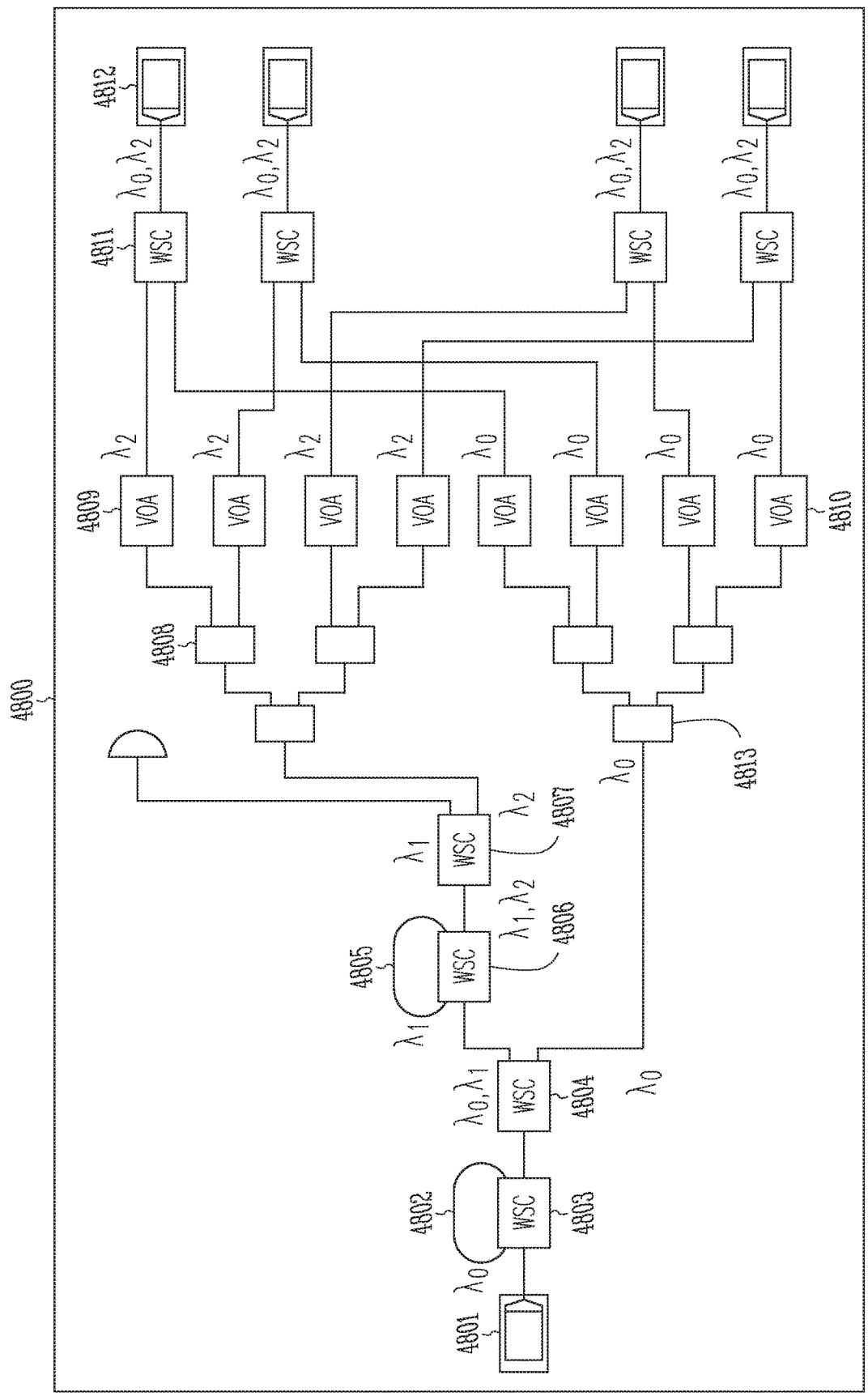
FIG. 48 illustrates an example of a photonic integrated circuit.

In various examples, PICs with different configurations such as the one described in FIG. 48 may be used in order to generate an outbound optical signal at more than one wavelength and create a multispectral LiDAR system. A multispectral LIDAR system may utilize more than one wavelength for the outbound optical signal. The use of more than one wavelength can be advantageous in situations when the propagation loss of the optical signal through the medium varies as the chemical composition of the medium changes or in situations when there can be a need to discriminate between different obstacle types such as soft vs hard obstacles.

In another example the transmitter PIC incorporates a Raman wavelength converter as an additional active functional element in order to generate a second optical wavelength for each channel of the transmitter. The Raman effect is a nonlinear effect in which a photon of light inelastically scatters on a vibrational mode of the crystal and generates as a consequence a photon of lower energy (longer wavelength). For silicon, the frequency/wavelength shift is crystal structure dependent and is 521 cm$^{-1}$. If the intensity of the pump becomes large enough, the process becomes stimulated and an optically pumped laser can be built. In an optically pumped Raman laser a high intensity pump laser can be coupled into a laser cavity which can be a ring or linear cavity which can be designed to satisfy the resonance condition at the Raman shifted wavelength.

In an example as illustrated in FIGS. 2 and 48, the optical signal coming from laser signal generation unit 101 can be coupled though an adiabatically tapered waveguide end coupler or grating coupler 4801 into the transmitter PIC 4800. The signal of wavelength $\lambda 0$ travels to wavelength selective coupler (WSC) 4803 and couples through WSC into the ring resonator 4802. The ring resonator 4802 can be designed such as it meets the resonant condition for the Raman shifted optical signal of wavelength $\lambda 1$—i.e. the cavity has a high Q factor at the Raman wavelength. After one trip through the ring the pump optical signal at wavelength $\lambda 0$ exits the ring through coupler 4803. The output of the ring resonator 4802 containing both the pump signal $\lambda 0$ and the Raman shifted signal of wavelength $\lambda 1$ can be guided to the input of the wavelength selective coupler 4804 which separates the two signals of different wavelengths. The signal of wavelength $\lambda 1$ can be directed towards the input of the WSC 4806 and can be used as pump for the ring resonator 4805 designed to be a resonant cavity for the second order Raman shifted signal $\lambda 2$. The Raman shifted optical signal of wavelength $\lambda 2$ can be separated from the pump signal of wavelength $\lambda 1$ by the wavelength selective coupler 4807. The output at wavelength $\lambda 2$ of WSC 4807 can be directed into the tree of 1×2 MMIs 4808 so that the signal of wavelength $\lambda 2$ can be split into 4 channels. The four optical signals are directed through waveguides to the input of variable optical attenuators 4809. The output of variable optical attenuator 4809 can be directed through a waveguide to the input of the wavelength selective coupler 4811. On the lower arm the output at wavelength $\lambda 0$ of the wavelength selective coupler 4804 can be directed to the input of the 1×2 MMI tree 4813 so that the optical signal at the fundamental wavelength $\lambda 0$ can be divided into 4 channels. The optical signals resulted after the split are directed through waveguides through variable optical attenuators 4810 and then to wavelength selective couplers 4811. The two inputs of wavelength $\lambda 0$ and $\lambda 2$ are combined by the wavelength selective coupler 4811 and directed through a waveguide to the grating or adiabatically tapered waveguide coupler 4812. In an example the grating coupler 4812 has the gratings parameters—period, etch depth, materials composition—designed such as it achieves high efficiency at both $\lambda 2$, $\lambda 0$ wavelengths. While a four channel device has been exemplified, any number of channels, e.g., 6-8 channels or more according to the system design, can be used. In an example the wavelength of operation for the fundamental can be 1550 nm and first Raman shifted $\lambda 1$ can be at 1686 nm and the second Raman shifted wavelength $\lambda 2$ can be 1848 nm. While in the above example a two stage Raman shifted system has been described with output at $\lambda 0$ and $\lambda 2$, other combinations of wavelengths such as a single stage with output at $\lambda 0$ and $\lambda 1$, or a dual stage with output at $\lambda 0$, $\lambda 1$ and $\lambda 2$ or any other combination of Raman harmonics can be created.

Beam Steering Module

Figure 49:
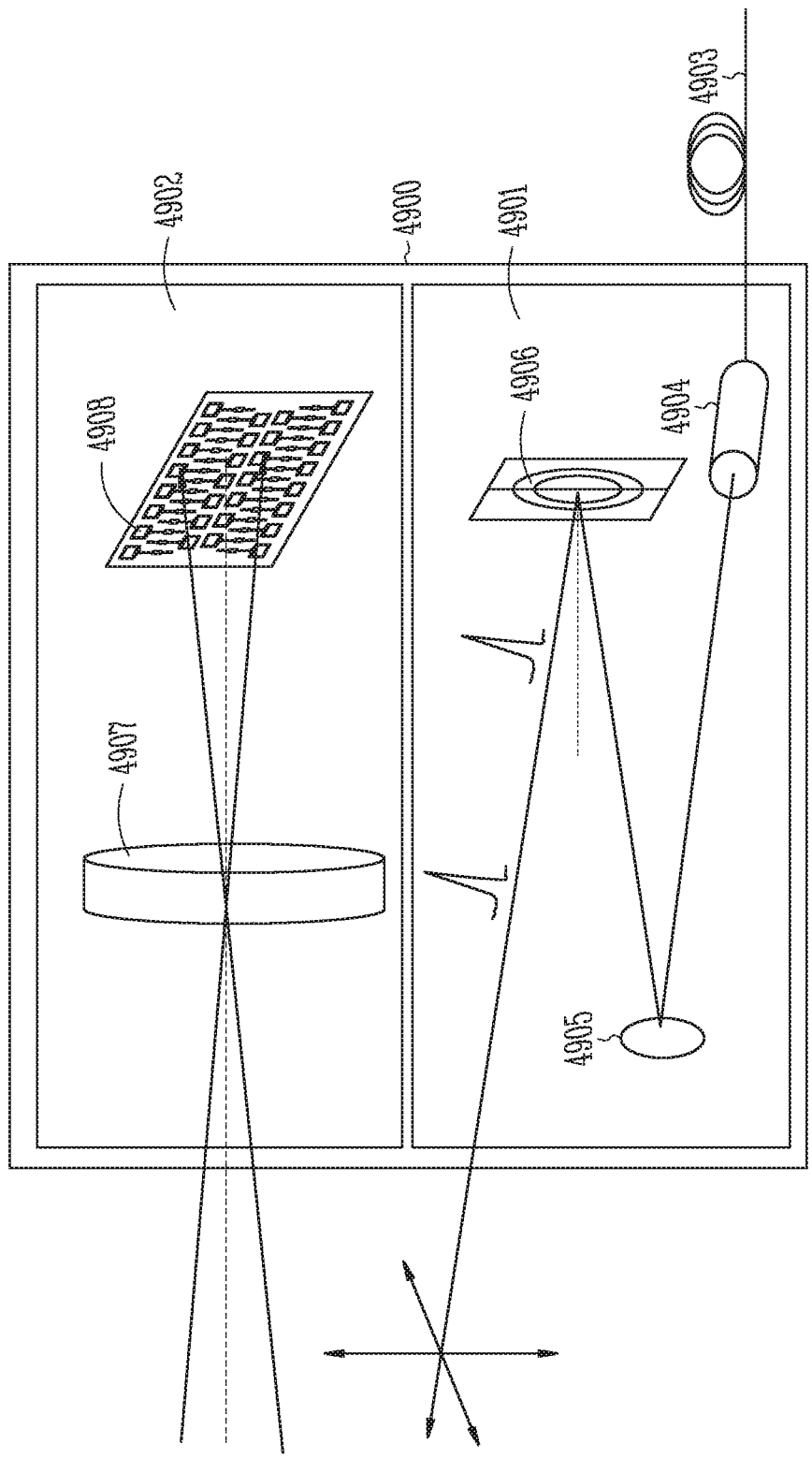
FIG. 49 illustrates an example of operation of a beam steering module.

Each of the multitude of optical signals from grating 204 of the Optical Processing module 200 may be sent through the fiber optic 4903 to a beam steering module 4901 as illustrated in FIG. 49. In an example, the fiber used for transmission can be single mode fiber carrying a 1550 nm laser signal. An example of the beam steering unit is shown in FIG. 49.

The collimator 4904 collimates the light coming out of the fiber 4903, sends it to a fixed mirror 4905 where it can be reflected to MEMS mirror 4906. The MEMS mirror 4906 executes a rastering or Lissajous pattern in the horizontal and vertical direction. In an example, the frequency on the horizontal axis can be 10 KHz and the frequency on the vertical axis can be 10.2 KHz, and those are both resonant frequencies for the mirror. Other ranges, e.g., 10-30 KHz, may be used for the horizontal and vertical. In an example, a rastering pattern can be used in which the horizontal axis can be driven at resonance at high frequency such as in the range of 10-30 KHz while the vertical axis can be driven in a quasi-static regime below the resonant frequency such as between 50 and 100 Hz in accordance with the desired frame rate. Other ranges such as 100 to 500 Hz may be used for the rastering motion in the vertical axis. In another example, both axes are driven at resonance using a sinusoidal function generating a Lissajous pattern. In this case, the driving frequency may be in the range of 10-30 KHz for both the horizontal and vertical axes depending on the physical design of the mirror as the size and geometry of the mirror design determines its resonant frequency. The separation between the driving frequencies determines the frame rate. As such, a preferred separation in frequency between the horizontal and vertical axis motion may be in the range of 50-200 Hz in order to achieve the desired frame rate with a larger separation allowing for easier manufacturing of the mirror. The desired frame rate may be determined according to the overall LIDAR system requirements for a faster or slower image update rate. The operation in this frequency range could be less susceptible to the car mechanical vibrations. In an example, the vertical angle range can be 25 degrees and the horizontal angle range can be 40 degrees. Other ranges such as horizontal angle range between 40 and 80 degrees and vertical angle range between 25 and 90 degrees may be used. The outbound first optical signal beam can be reflected off targets and a portion of the reflected signal beam can be collected by the lens 407 and focused on the detector array 4908.

One or multiple beam steering units may be used in a system, each corresponding to one channel. Different examples having a number of units and therefore a number of channels from 1 to 10 may be used to achieve a desired level of coverage for all areas around the vehicle.

Detection Module

In order to improve detector performance and increase signal to noise ratio in a pulsed regime, one can reduce the window in which we are looking for the signal in any of four dimensions: wavelength range, field of view, time window, and bandwidth. Due to the coupling of the return signal through a grating coupler the image sensors of receiver PIC 4908 can be designed with a very narrow wavelength range and field of view. The grating sensitivity to both angle of incidence on the grating as well as wavelength of operation make grating couplers extremely selective filters of the return light. In addition, adding a high speed electro optic gate would allow time gated detection and application of boxcar techniques when signals are averaged over multiple gates in order to improve signal to noise ratio. In an example the gratings that couple the light into the receiver are designed to have a very narrow wavelength bandwidth such as a 3 dB bandwidth in the range of 1 to 10 nm in order to filter out any light that is not at the wavelength of operation of the receiver. In another example the gratings that couple the light into the receiver are designed to have a very narrow acceptance angle such as a 3 dB bandwidth in the range of 0.25-2 degrees in order to filter out any light that is not within the angle range for the corresponding pixel of the receiver.

The detection module 4902 may comprise a collimating lens or multiple lens imaging assembly 4907 and a receiver PIC 4908. The receiver PIC 4908 may comprise an array of N by M pixels 5000. In an example the number of pixels can be 1024×256 though other pixel densities can be used. In additional examples, the array size may be smaller such as 128 by 128 or larger such as 256×256, 512×512 or 4096× 4096. Other ranges using symmetric or asymmetric designs may be used. A larger array having a larger number of pixels would offer either a wider field of view or a higher resolution depending on the pixel size and pixel design. In addition a large array could capture simultaneously an image corresponding of a large field of view without the need for mechanical movement of the detector.

Figure 50:
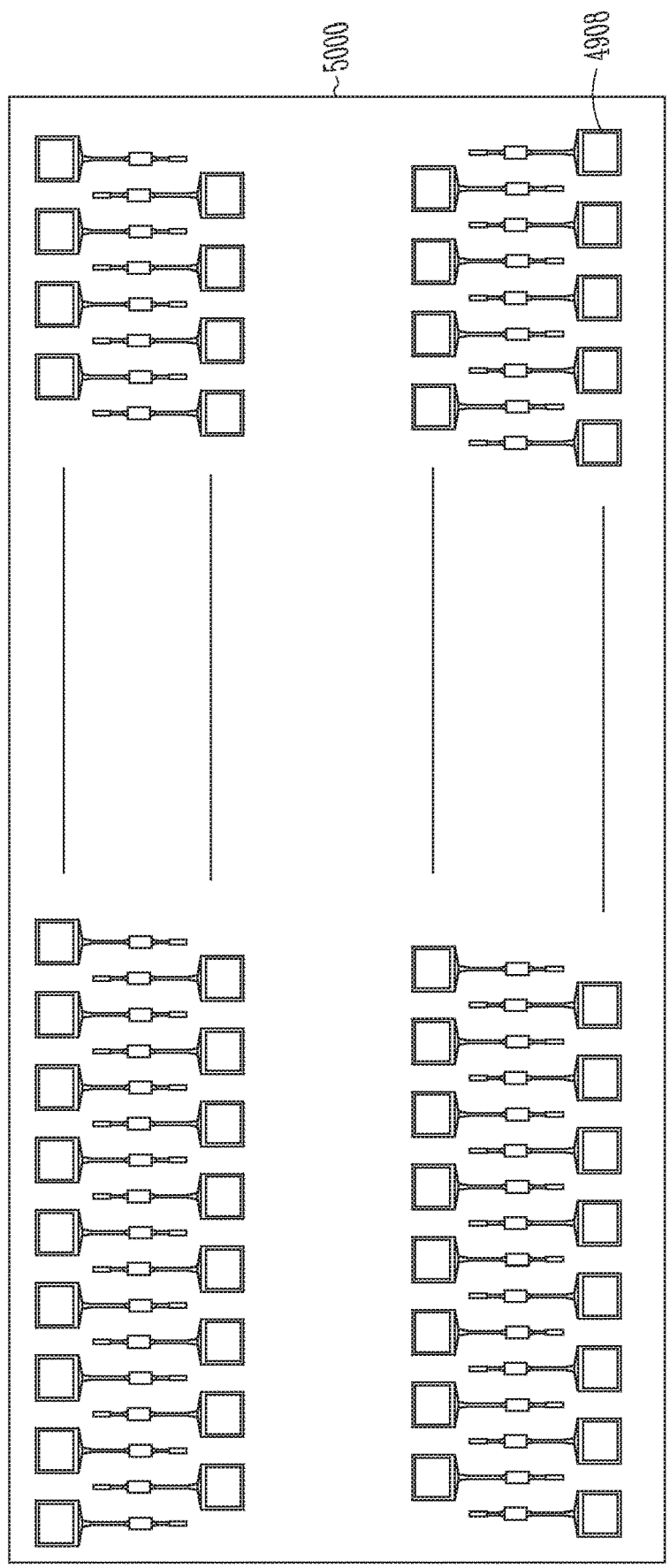
FIG. 50 illustrates an example of a pixel array.

Once each of the optical signals hit a target location as controlled by the corresponding beam steering unit 4901, a portion of the signal scattered from the target may be collected by lens 4907 and focused on the Pixel array 5000 of the receiver PIC 4908, as illustrated in FIG. 50.

A sample cell 5100 may be repeated across the plane of the PIC 4908. A grating coupler 5101 may couple the return light into the planar circuit. The light may be guided through waveguide 5104 to the electro optic time domain gate 5102 and then through waveguide 5105 to the high speed waveguide photodetector 5103. In an example the photodetector 5103 can include an avalanche photodetector (APD). In an example the APD 5103 can include a Germanium detector grown on Silicon. The electro optic gate can be an electro absorption based device or can have a Mach Zehnder configuration such as device 5202 with the phase control being accomplished through charge or thermal effects or a ring modulator structure such as device 5300. In an example the electro optic gate can include a charge based silicon device. In another example the electro optic gate can include a germanium on silicon electro absorption gate or any other material grown or integrated on the silicon platform.

Gated Detection

Figure 51:
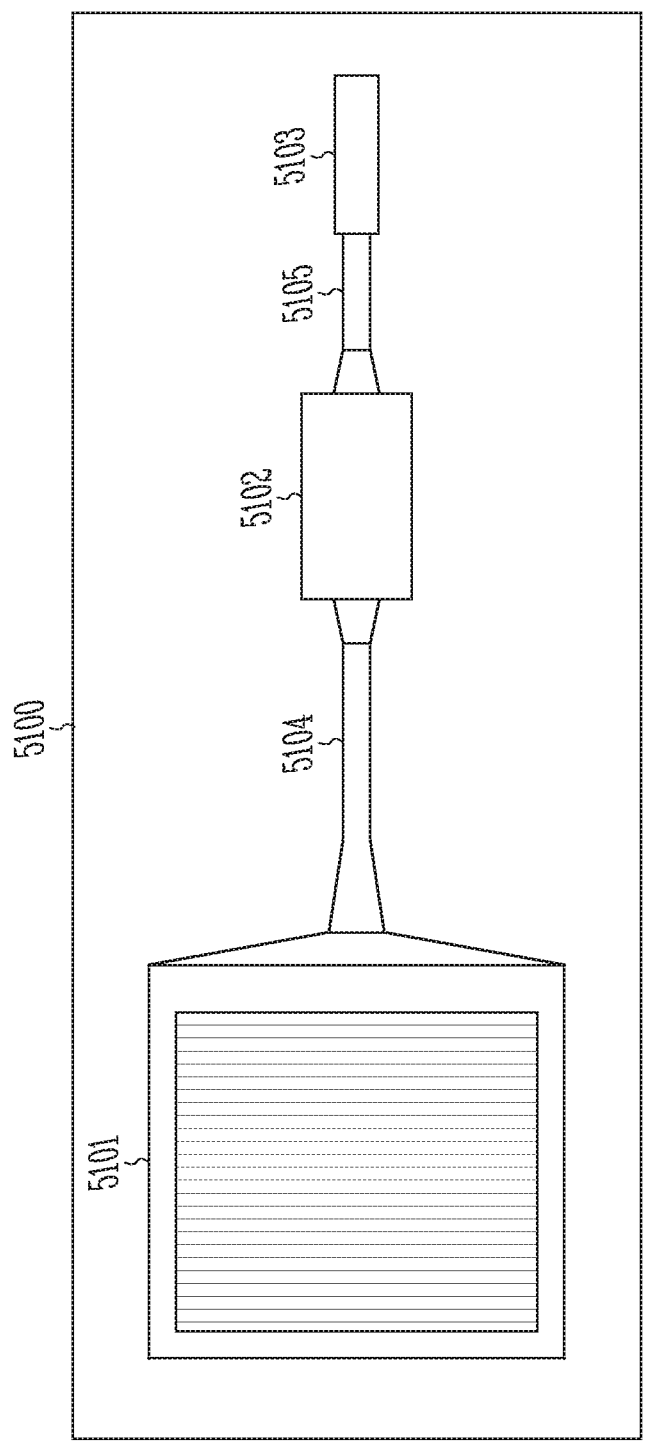
FIGS. 51-53 illustrate an example of a sample cell for a photonic integrated circuit.
Figure 52:
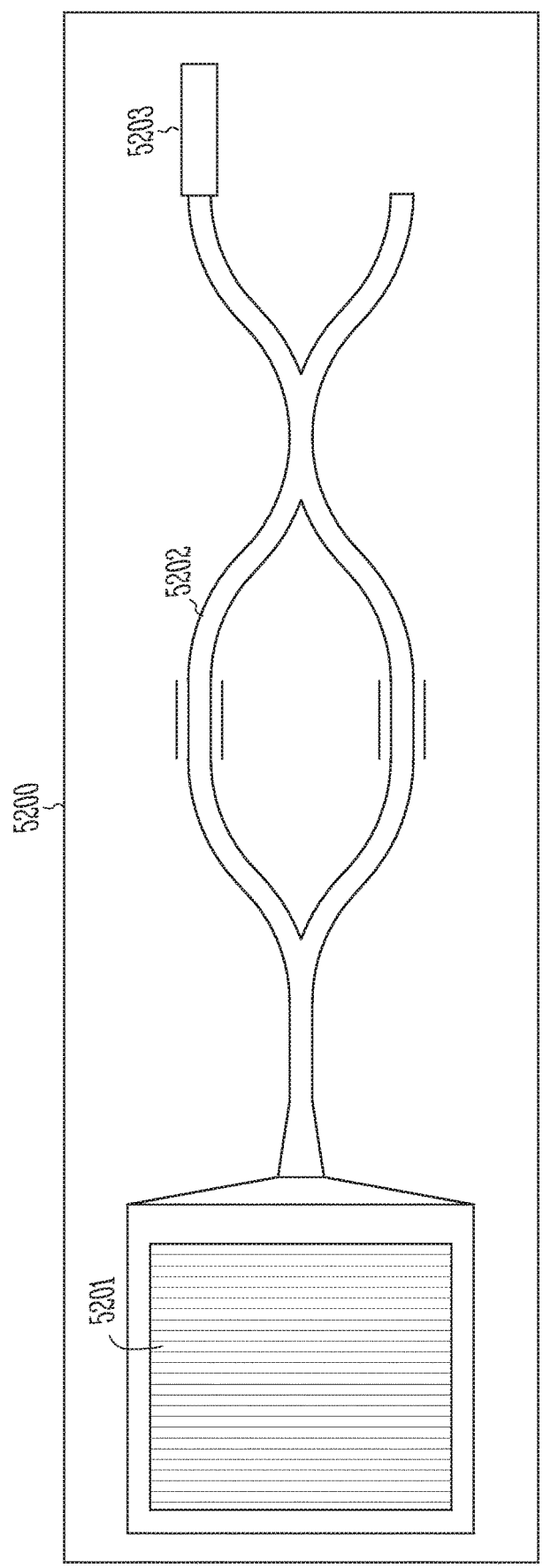
Figure 53:
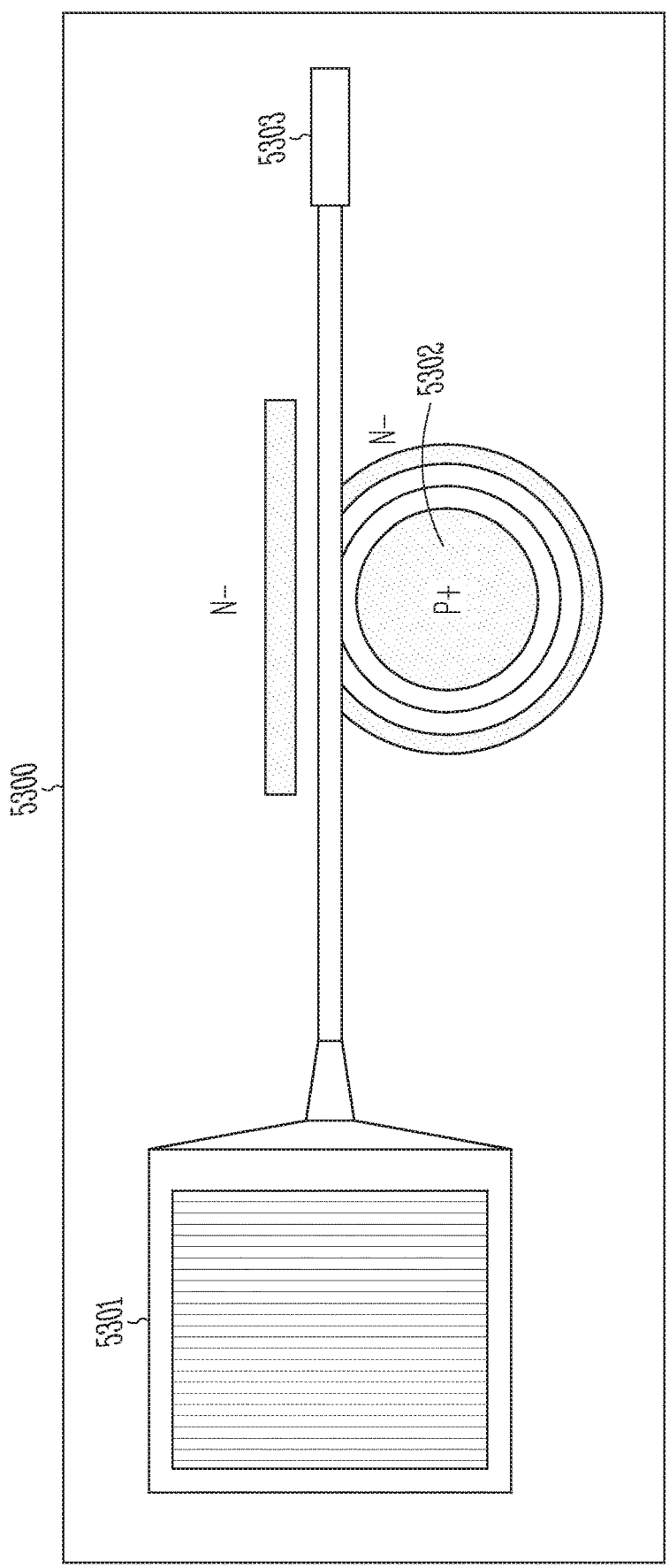
Figure 54:
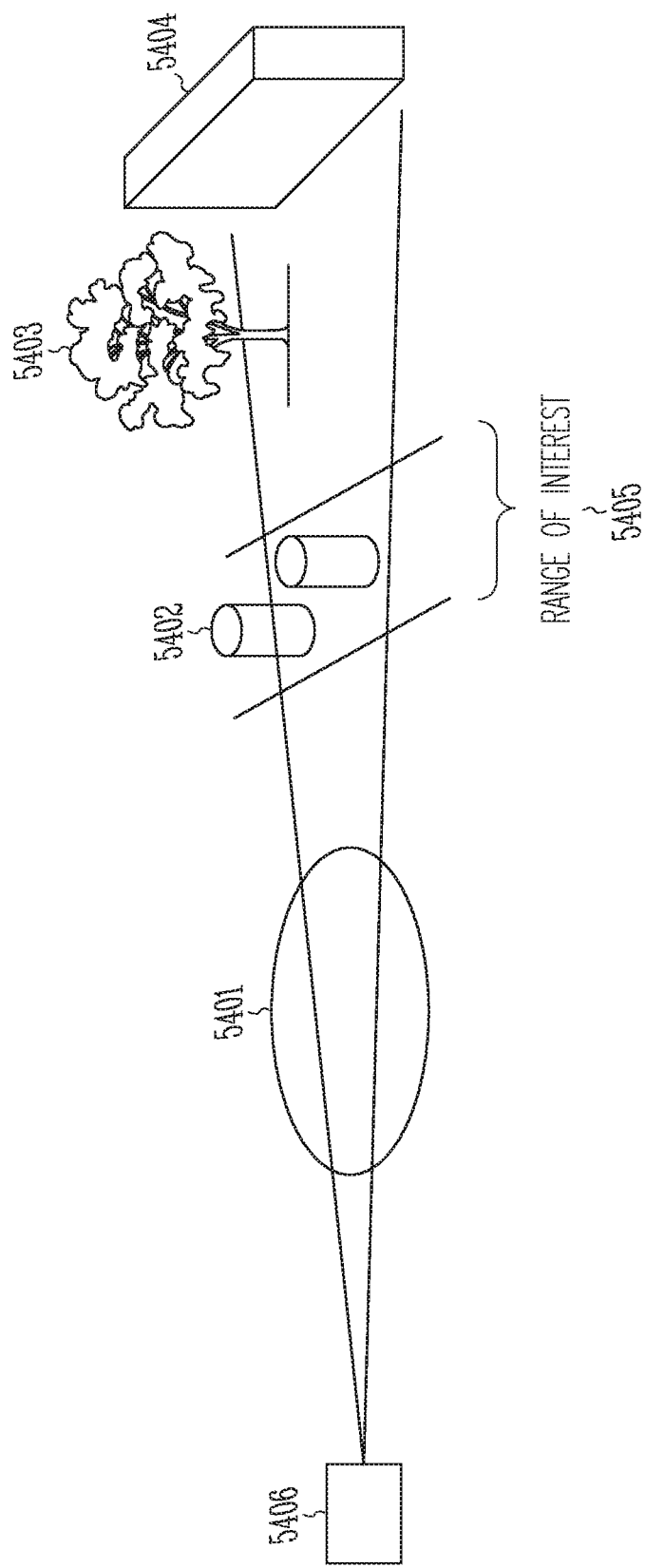
FIG. 54 illustrates an example of time domain gate detection.

Time domain gated detection is a technique in which the detector can be exposed to the return signal for a brief interval correlated with a specific region of interest as shown in FIG. 54. The method can be very effective in situations when within the field of view of the LiDAR system there are multiple obstacles, or obscurants like haze or steam or in general a cluttered background. By opening the gates for the detectors only during the time interval corresponding to the range of interest, the return signal from all other obstacles may be eliminated and the signal to noise ratio may be improved. In an example the high speed gates 5102, 5202 and 5302 may be used to implement gated detection and to adjust the range of interest as desired from pulse to pulse. In an example the gate 5202 can be open during the entire time interval between two outgoing laser pulses resulting in a return signal showing signals from multiple obstacles within the field of view such as the obscurant 5401, obstacles 5402, 5403, and 5404. Assuming that a higher quality detection of the obstacles, as for example a higher signal to noise ratio for the obstacles in region of interest 5405 can be desirable by the robotics system using the input of the LiDAR system, in an example, in the subsequent pulse, the gate 5102 may be open only during the time the return signal from the region of interest around obstacle 5402 can be expected to reach the detector resulting in elimination of all other noise sources within the field of view and improvement in the signal to noise ratio for the range of interest. In an example the gating can be implemented using electro optic gates built directly on the silicon fabric in front of each detector as implemented in pixel array 5000. In an example the scheme can be implemented using a silicon on insulator platform and different modulator designs as described in FIGS. 50 and 51-53. Multiple gates can be setup at different times to interrogate different regions of interest. In an example the gate open during the entire interval between laser pulses may be followed by a gate open during the period corresponding to the range of interest around obstacles 5402, then followed by a gate open for a range of interest corresponding to obstacle 5403, followed by a gate corresponding to a range of interest corresponding to obstacle 5404 and so on. In an example each pixel of pixel array 5000 can include a gated pixel as described in FIGS. 51-53. In an example, the gates for each pixel of the pixel array 5000 may be independently controlled to allow sampling at various depths within the same frame. In an example the array can be dynamically divided into subsets of pixels, each subset having a different time gate leading therefore to the creation of multiple regions of interest, each region of interest corresponding to a subset of pixels that have the same temporal gate.

Geiger Mode (GM) APD Detection

In Geiger mode detection the APD can be biased for a short period of time above the breakdown voltage and as a consequence of the large voltage bias a photon incident on the junction creates an avalanche of carriers. Unlike the linear mode APD regime, in Geiger mode the number of carriers generated is not proportional to the flux of photons incident. Due to the lack of proportionality and their very high gain, GM detectors operate best at very low photon flux—more specifically at less than 1 for the probability of detecting a photon per gate (typically 0.2 probability of photon detection per gate). In this regime the GM APDs approach the "perfect" detector characteristics—i.e., a detector that detects every photon incident upon it. Also due to this, the detector is inherently digital as it records only the presence or absence of an incident photon. For a system operating with an APD detector in Geiger mode, the output can be an ensemble of independent measurements that are analyzed or plotted as a histogram to generate a single range measurement. In addition to the above considerations, due to the high sensitivity and the need to have multiple pulses to contribute to one distance measurement, systems based on GM APDs are advantageous to operate at high repetition rates (e.g., MHz or higher) with very short pulses (e.g., ns or less) and relatively low peak power. The peak power to operate such a system may vary widely depending on the distance between the transmitter and the target. Pulses of 1 ns length and peak powers as low as 20 mW may be used to achieve ranges in excess of 100 meters. Larger peak power such as in the range of 10 to 1000 mW may be used to achieve increased range beyond 100 meters. In addition to controlling the peak power and pulse length of the transmitter, each pixel's high speed gate may be used to further control the amount of light incident on the detectors operated in Geiger mode and tailor the photon incidence probability from pulse to pulse.

In an example, the detectors 5103, 5203, 5303 in the pixel array 5000 are operated in Geiger mode. The modulators 5102, 5202, and 5302 are used to gate the return incident signal on the detector. In an example the digital signal showing the presence or absence of a detected photon on the detector can be processed to create a histogram to determine the existence of an obstacle within the range of interest defined by the temporal gate. In an example, the GM array of detectors can be created on a silicon platform though other material systems such as III-V semiconductors may be used.

Variants of the Modular Architecture for Other Applications—Single Chip Integration of Transmitter, Receiver and Laser Source—CW, Coherent Detection While the above examples relate to automotive and other large form factor platforms, due to the chip scale integration approach of multiple optical functions, an integrated example of the modular system 100 has the versatility to be applicable to other applications in small form factors and potentially in the longer term to low power automotive applications as well. In an example the laser light generation module may contain only one diode laser chip that can be integrated with the transmitter PIC 200 containing one or multiple channels and with one or multiple beam steering modules 401 and detection modules 402 into a low cost, low form factor package suitable for advanced driver assistance systems (ADAS), fully autonomous automotive systems, drones, and small robotics applications, among other applications such as the examples shown in FIGS. 55 and 56.

In an example, the laser light source 5501 can be bonded directly on the integrated silicon chip 5500. In an example, the integrated silicon chip 5500 may contain the transmitter functions and the receiver functions monolithically integrated as well as the optical laser light source bonded on the silicon platform. Alternatively, the laser source may be off chip and fiber coupled into the silicon chip through a grating or end coupler.

Figure 55:
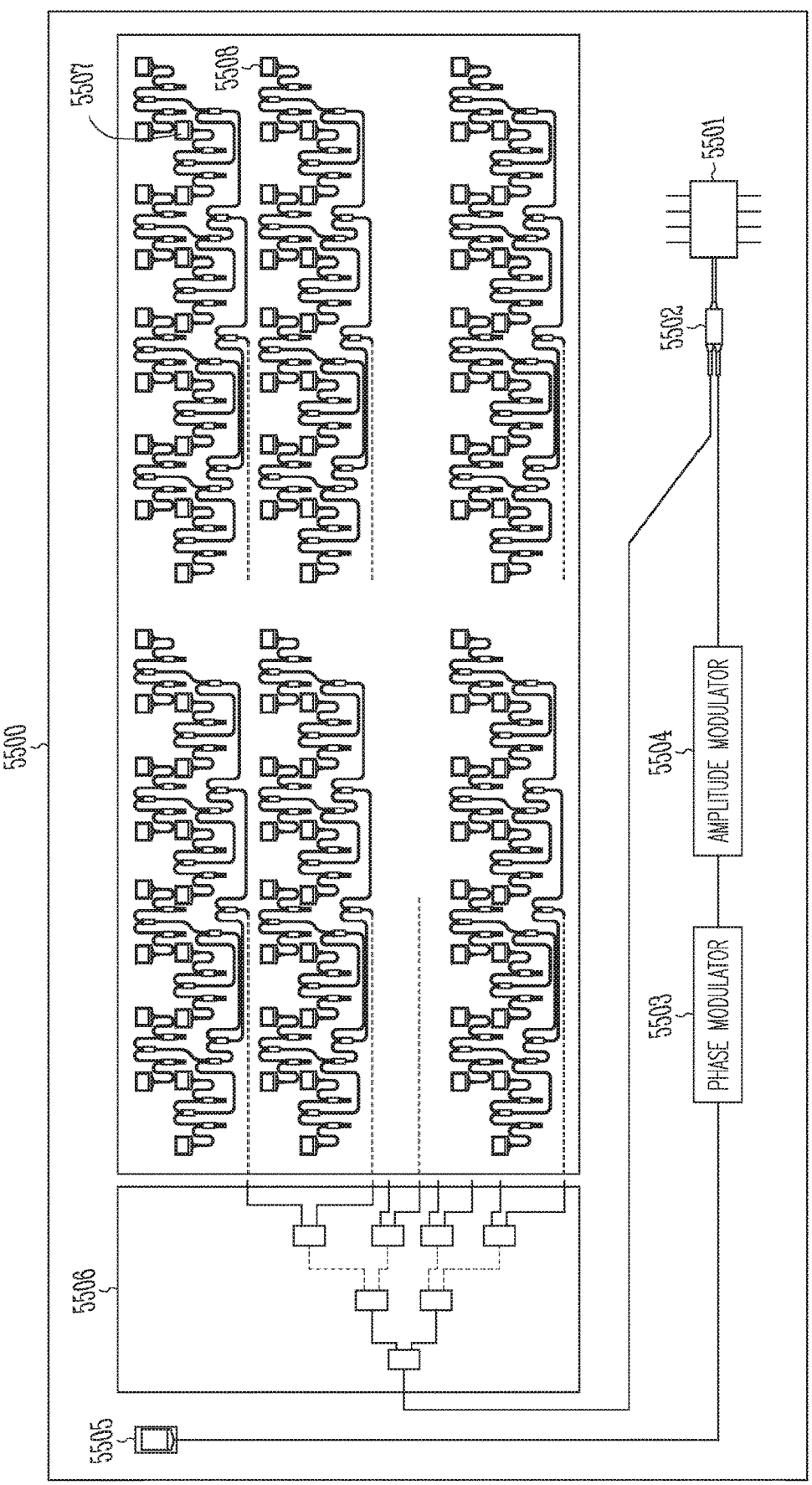
FIG. 55 illustrates an example of a photonic integrated circuit including a light generation module, transmitter module, and receiver module.
Figure 56A:
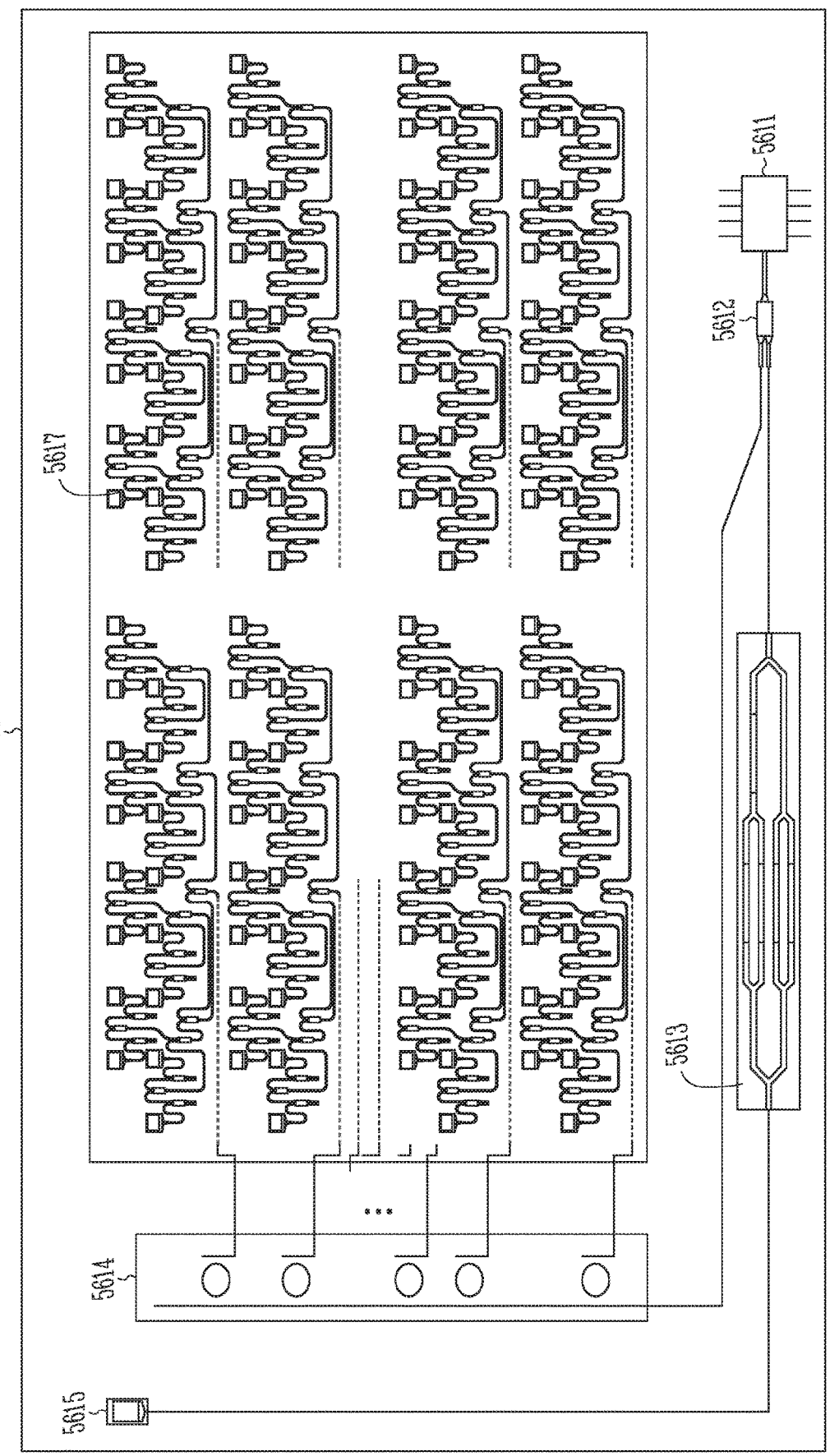
FIG. 56A illustrates an example of a photonic integrated circuit.

In the illustrated example of FIG. 55, the optical signal from the laser 5501 can be coupled into a silicon waveguide and guided to the input of tap coupler 5502 which splits the optical signal into a first signal directed through the amplitude modulator 5504 and phase modulator 5503 and a second signal directed towards the input to the switch array 5506 to provide local oscillator light for the array of sensors 5507.

The first signal can be coupled out of the chip through the grating coupler 5505. An adiabatic waveguide coupler may be used instead of the grating coupler 5505. In this example, the transmitter and receiver functions may all be integrated on the same chip and the laser source chip may be attached directly to the silicon chip. The chip 5500 may be employed as part of the beam steering and detection module 1400 illustrated in FIG. 13. In the illustrated example, the first optical signal from grating coupler 5505 can be collimated by lens 1401 and directed to mirror 1402. The signal reflected from mirror 1402 can be directed to the MEMS mirror 1403. The first optical signal reflected by MEMS mirror 1403 can be directed towards the target. The mirror executes a rastering or Lissajous pattern to cover the desired field of view. In an example, the field of view can be 25 degrees vertical and 50 degrees horizontal. Other ranges such as horizontal angle range between 40 and 80 degrees and vertical angle range between 25 and 90 degrees may be used. The first optical signal reflected from the target can be coupled by the gratings 5508 of the sensor array 5507, combined with the local oscillator in array 5507, and converted into an electrical signal. The example described above uses a silicon on insulator platform for integration, though in other examples other materials such as InP may be used.

Figure 56B:
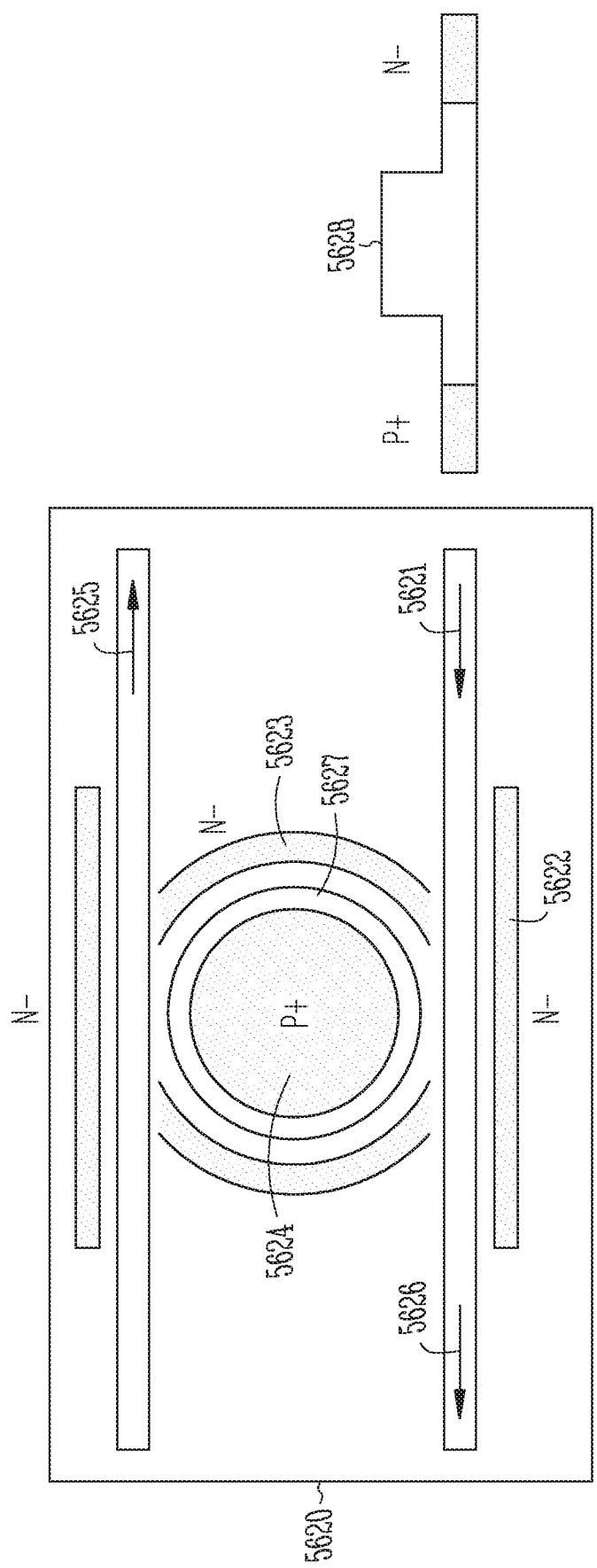
FIG. 56B illustrates an example of a charge controlled switch.

An alternative approach for a single chip integrated configuration can include the use of an in phase/quadrature modulator in the transmitter section to independently modulate the phase and amplitude of the outgoing signal. On the receiver section in an example instead of the tree of 1×2 thermo optic switches one can use a 1×N optical switch composed of N add drop ring structures as described in FIG. 56A. In an example the control structure for the add drop ring can include a PIN diode so that the optical mode travels mostly through an intrinsic waveguide area as shown in FIG. 56B. The advantage of using a PIN charge injection based switch is that it will provide superior speed compared to a tree of thermo optic switches. In addition by using a PIN structure one may also have low loss in the off mode of the switch. In an example the switch can be a 1×128 switch. Other switch configurations such as 1×256, 1×512, 1×1024 or 1×64 may be used for dynamic, serial vs static, simultaneous distribution of the local oscillator signal in the pixel array 5607. For a fixed number of pixels in the array, a larger switch may create the possibility of an array with smaller blocks which are simultaneously provided with local oscillator light while a smaller switch may create larger blocks which are simultaneously supplied with local oscillator optical signal. In the illustrated example of FIG. 56A, the optical signal from the laser 5611 can be coupled into a silicon waveguide and guided to the input of tap coupler 5612 which splits the optical signal into a first signal directed through the in phase/quadrature modulator 5613 and a second signal directed towards the input to the 1×N switch 5614 to provide local oscillator light for the array of sensors 5617. The first signal can be coupled out of the chip through the grating coupler 5615. An adiabatically tapered waveguide coupler may be used instead of the grating coupler 5615. In this example, the transmitter and receiver functions may all be integrated on the same chip and the laser source chip may be attached directly to the silicon chip. The chip 5610 may be employed as part of the beam steering and detection module 1400 illustrated in FIG. 13. In terms of modulation scheme the hardware platform 5610 enables a frequency modulated continuous wave LiDAR platform. Frequency modulated continuous wave LiDAR is a Lidar technique in which the frequency of the optical signal $f_0$ can be shifted to a new frequency $f_0+f_{IF}$ using phase modulation while simultaneously a frequency chirp between $f_0+f_1$ and $f_0+f_2$ can be achieved through a chirped amplitude modulation of the CW laser. The intermediate frequency $f_{IF}$ can be centered within the chirp window at $(f_1+f_2)/2$. In an example $f_{IF}$ can be 3 GHz and the chirp window can be from 1.5 GHz to 4.5 GHz.

Other frequency ranges for the intermediate frequency such as 1-10 GHz may be chosen and chirp may range from 100 MHz to 50 GHz. An I/Q modulator enables one to perform both tasks—the frequency shift as well as the frequency chirp. In an example a frequency modulation technique may be implemented with an integrated transceiver in Silicon on Insulator. Other materials may be used for implementation such as III-V or LiNb or combination of materials.

In an example the structure of the charge controlled 1×N switch 5614 is shown in FIG. 56B. In an example the second signal from the 1×2 MMI splitter 5612 can be directed through wave guide 5621 to the first element 5620 of switch 5614. In an "off" state the optical signal goes through to waveguide 5626. In an "on" state, a voltage can be applied between the doped sections and charge can be injected in the coupling section between waveguide 5621 and ring resonator 5627 generating a change in index of refraction. As a consequence of the charge induced change in index of refraction, the second optical signal can be directed towards waveguide 5625.

Figure 57B:
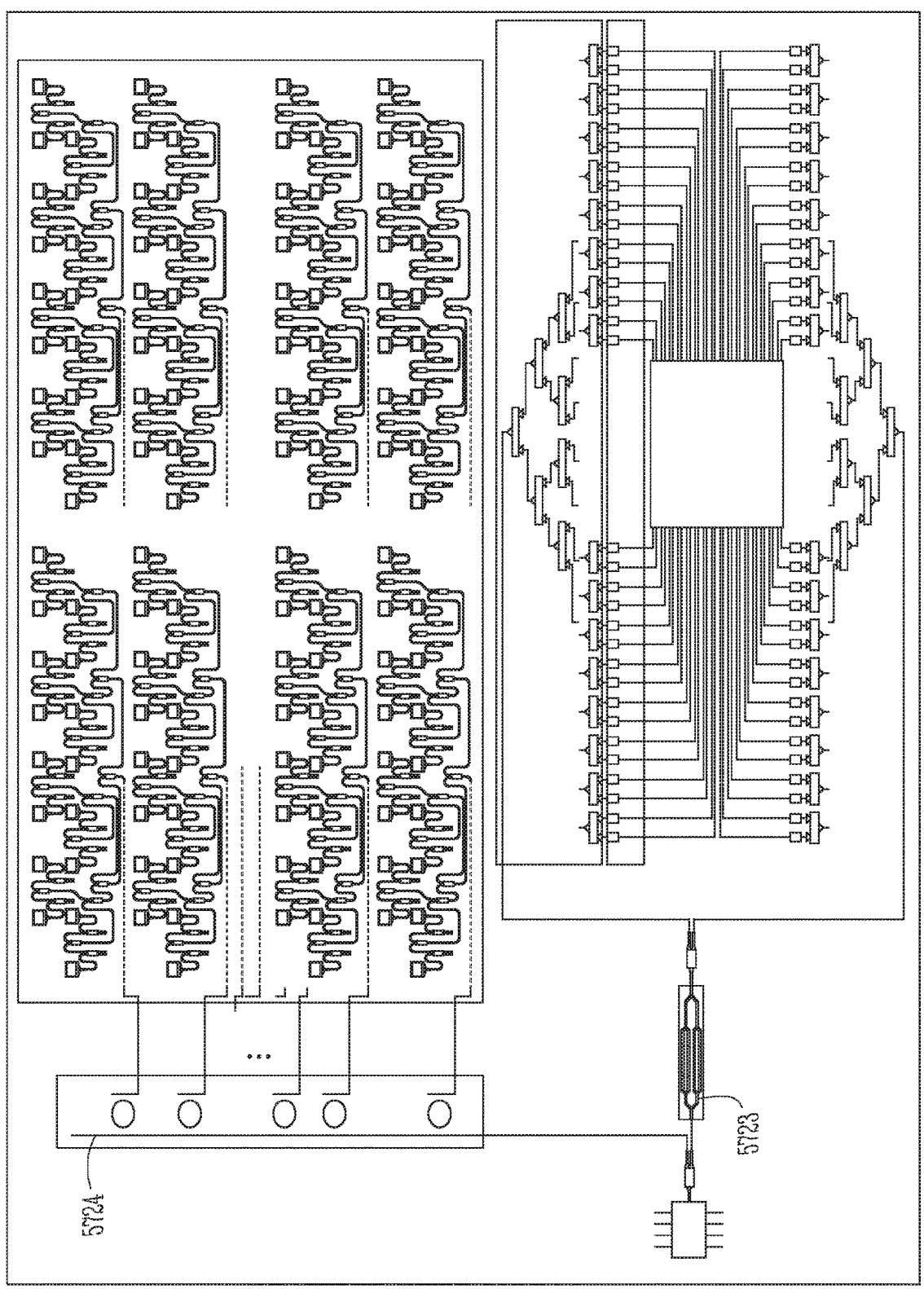

In another example shown in FIG. 57B, instead of the combination of phase modulator 5703 and amplitude modulator 5704, an in phase/quadrature modulator 5723 can be used, and instead of the switch array 5711, a 1×N switch 5724 can be used. The in phase/quadrature modulator 5723 and the 1×N switch 5724 may operate on the same principles and serve the same purpose as IQ modulator 5613 and 1×n switch 5614, more specifically the IQ modulator may be used to implement a frequency modulation continuous wave scheme and the charge controlled 1×N switch provides for fast switching for the local oscillator optical signal within an optimal loss budget.

Phased Array Architecture

Figure 58A:
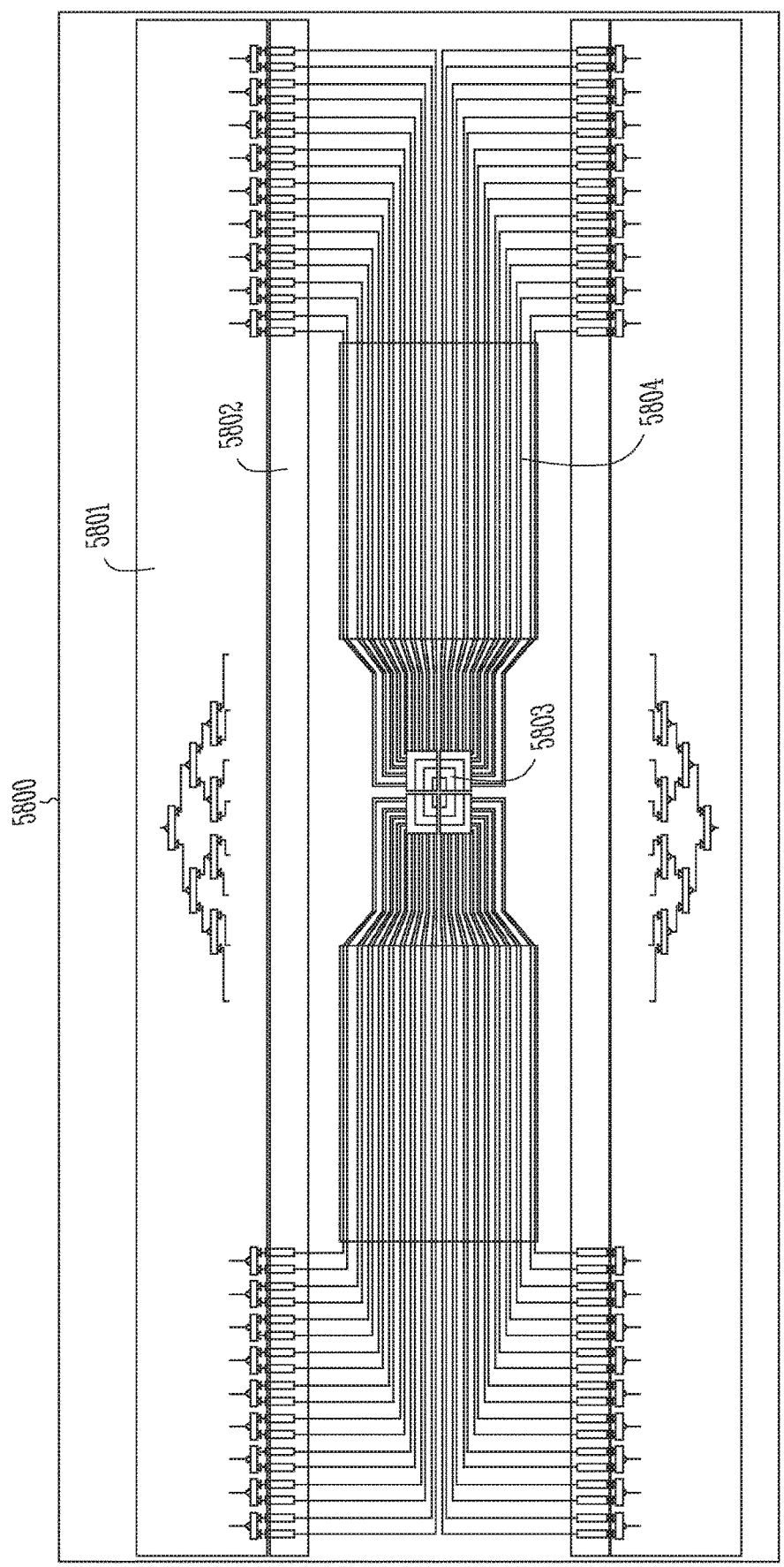
FIG. 58A-G illustrate examples of a phased array architecture.
Figure 58B:
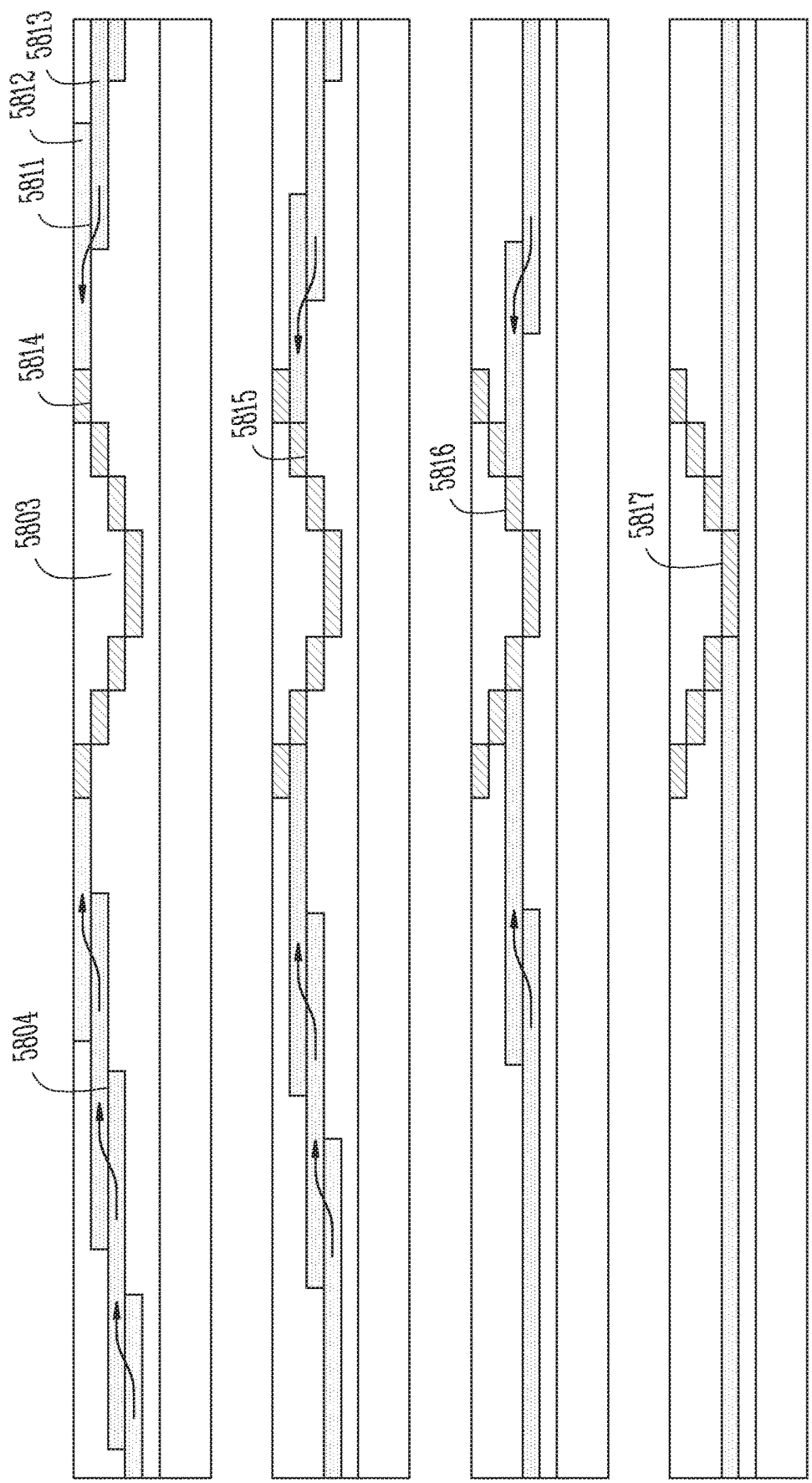
Figure 58C:
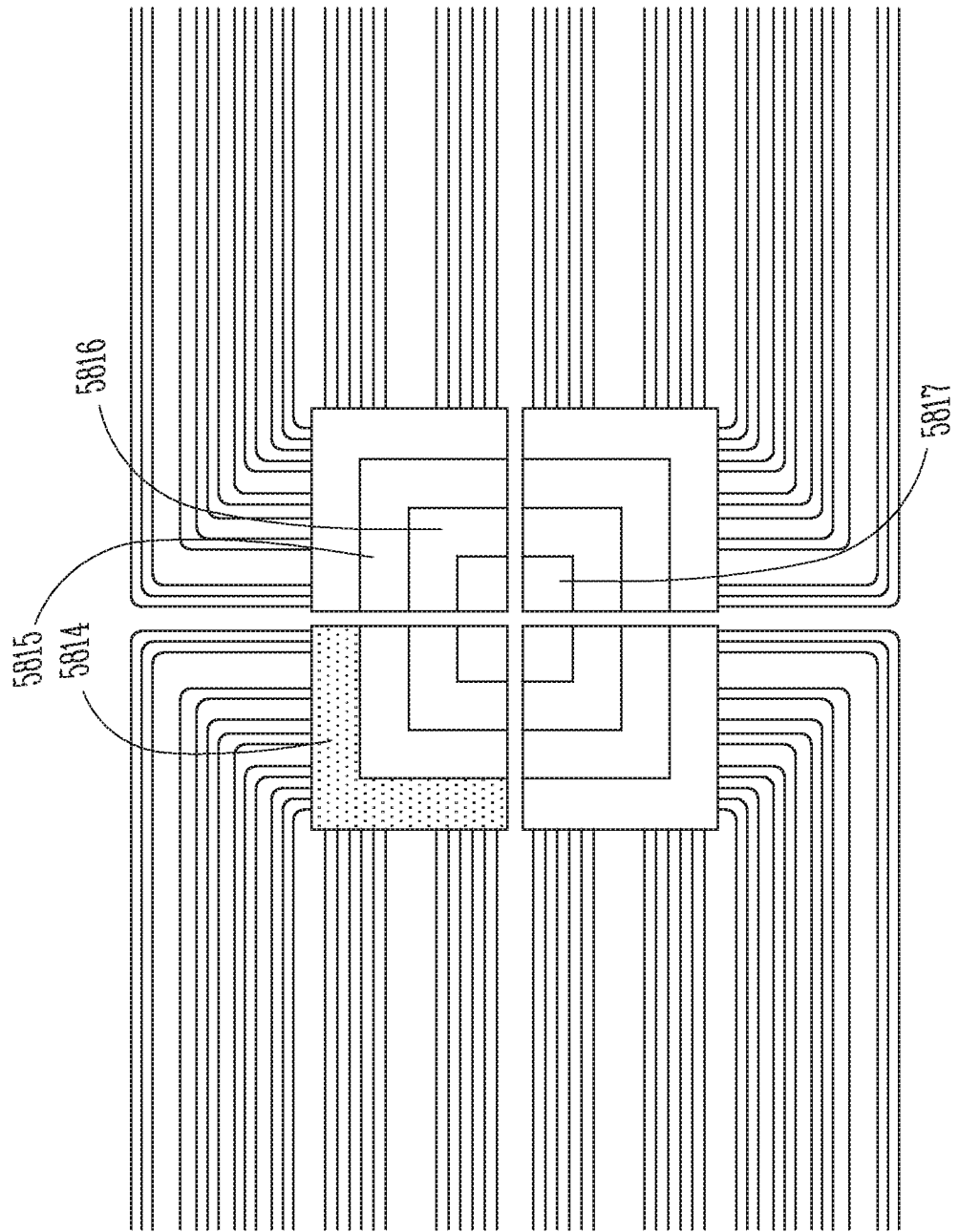
Figure 58D:
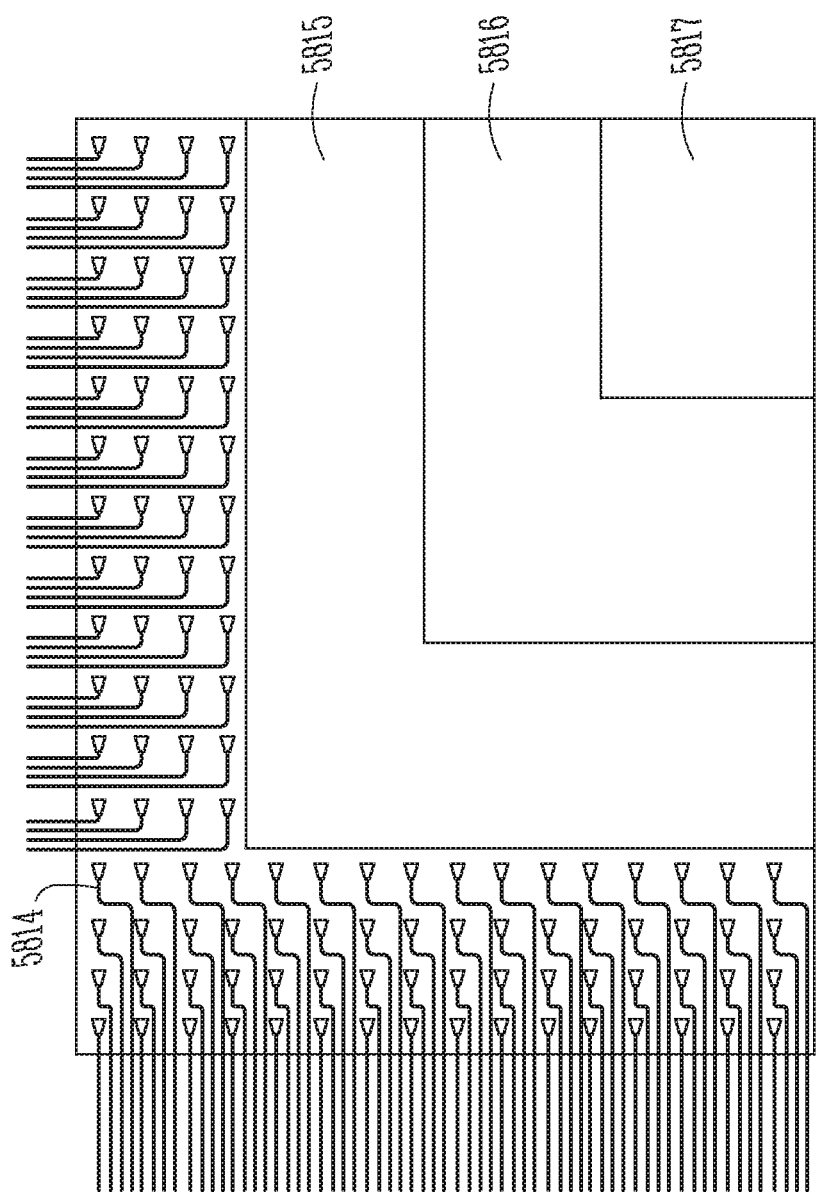
Figure 58H:
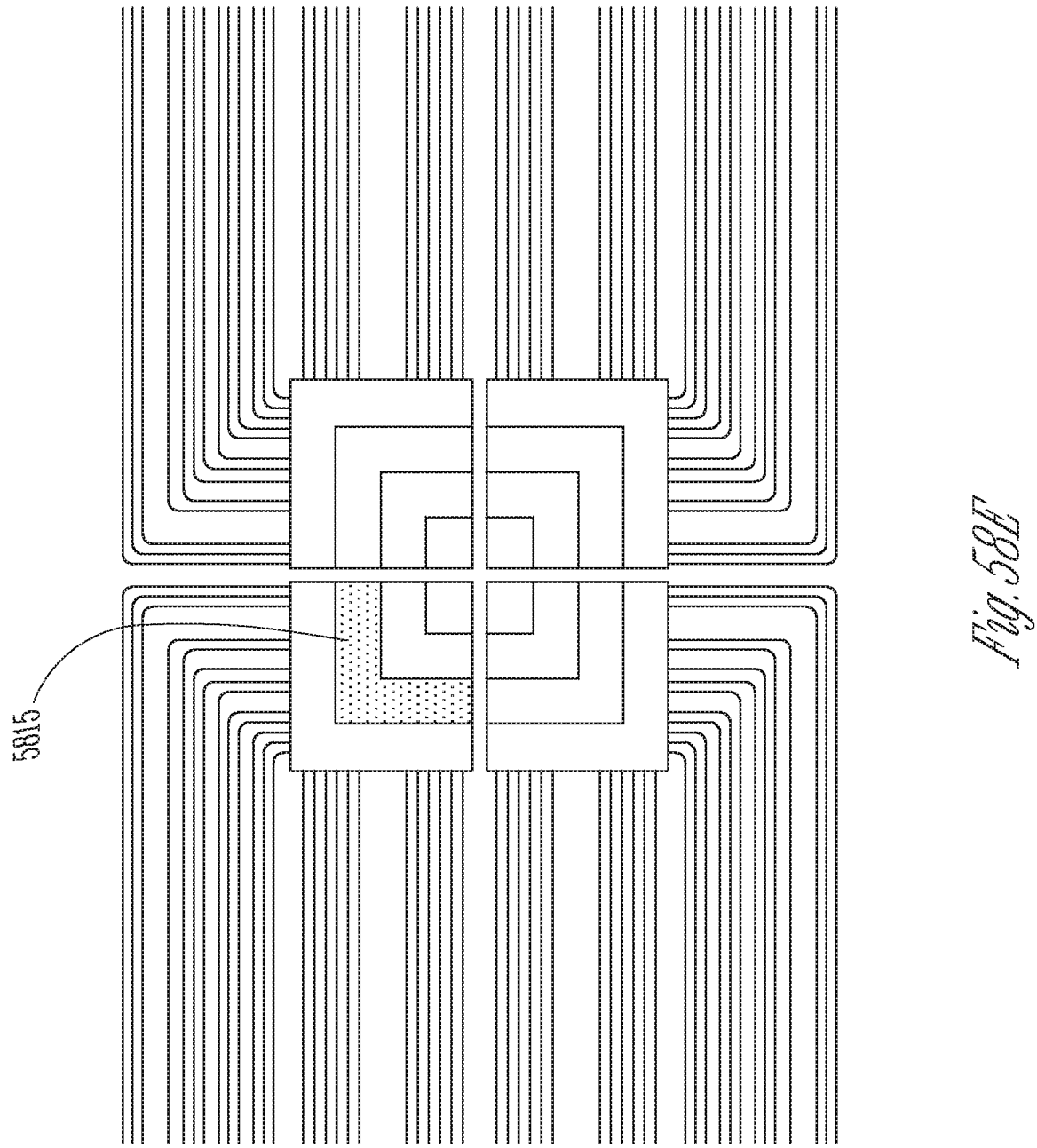
Figure 58G:
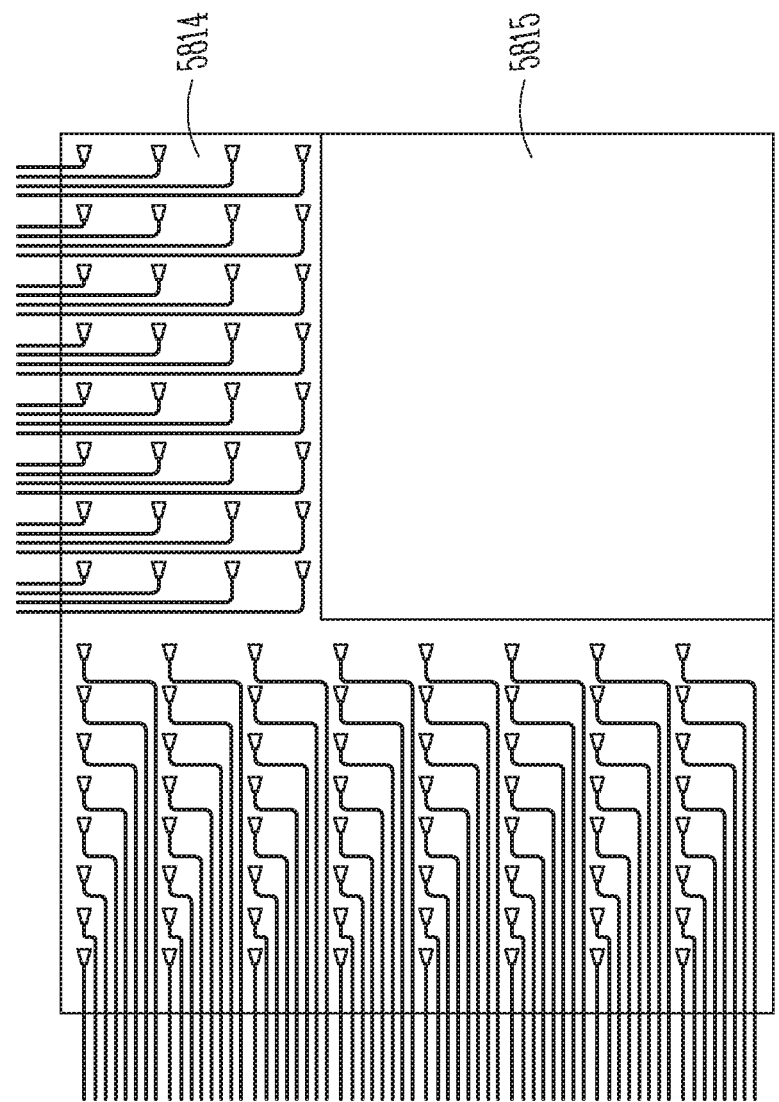

Optical phased arrays have a few competing design parameter specifications in order to reach the performance characteristics desired to achieve low loss and efficient beam steering. The far field pattern of the optical field generated by a phased array shows a central peak followed by side lobes on either side of the central peak. The separation between the central peak and the side lobes define the maximum steering angle. The angle of separation between the central peak and the side lobes can be given by the formula:

$$\sin(\Delta\emptyset) = \frac{\lambda}{d}$$

where $\Delta\emptyset$ can be the angle between the central maximum and the first side lobe, $\lambda$ can be the wavelength of light and $d$ can be the separation between the antennas. As one can see in order to achieve a large separation between the central peak and the side lobes and therefore a large steering angle, the separation between antennas should be kept to only a few wavelengths. On the other hand in order to increase the energy concentrated in the central peak, a large number of antennas can be desirable. Finally in order to control the steering, a waveguide guides the light from the phase shifter to each of the antennas. The competing parameter specifications of large number of antennas in the array, small separation between the antennas, and access to the antennas through waveguides makes scaling the intrinsically two-dimensional structure difficult. One option to overcome this problem includes the creation of a multilayered antenna array. In an example, concentric square rings of antennas are placed in different vertical layers with the inner square being on the lowest layer while the outer square ring being in the top layer of the structure. As illustrated in FIG. 58A, the upper and lower phase modulator blocks 5802, the upper and lower MMI trees 5801 are all situated in the lowest crystalline silicon layer. After the phase control takes place in the block of modulators 5802, the signals from select waveguides are coupled vertically into the higher layer through successive vertical couplers over section 5804. Simultaneous achievement of vertical coupling in section 5804 without coupling in section 5803 where the waveguides could achieve overlap may be facilitated by adjusting the coupling lengths in section 5804. To achieve separation between the central peak and the sidelobes in excess of 15 degrees and therefore steering angle of more than 15 degrees, separation between the antennas may be very small, for example, between 4 and 5 microns. As a consequence, the width of one of the square rings and therefore the vertical overlap sections in section 5803 may be of the order a few tens of microns. In an example, the vertical couplers in section 5804 are designed to have coupling lengths of the order of more than 1000 microns making therefore the parasitic coupling in section 5803 negligible. Different ranges of coupling lengths such as 400 to 4000 microns may be used as long the ratio between the coupling length in section 5804 and the overlap of the waveguides in section 5803 can be larger than 10 so that the parasitic coupling between two waveguides in two different adjacent vertical layers over section 5803 can be negligible such as 10% or less. In an example the oxide layer 5811 thickness between the successive layers can be such that the coupling length of the mode from waveguide 5812 to waveguide 5813 is 2000 microns. In an example the horizontal separation between antennas in section 5803 can be 5 microns in both directions. In each layer, the rectangular ring of antennas may have four rings of antennas separated by 5 microns from each other. Different separations between the antennas may be used such as from 3 to 50 microns as well as unequal separation between antennas. Also, different numbers of rings within one layer may be used such as in a range from 4 to 20 rings per layer.

As a consequence, the maximum overlap between waveguides accessing the antennas in layer 5812 and the waveguides accessing the antennas in layer 5813 may be 60 microns, though with optimal routing this overlap can be further reduced. Optimal routing of waveguides in two vertical layers of section 5803 may be obtained when one minimizes the parasitic coupling of the optical signal between two waveguides situated in adjacent vertical layers. The condition may be achieved when the length of waveguide overlap for which the oxide layer thickness separating the waveguides can be minimized. In an example where vertical coupling length of the optical mode between waveguides 5812 and 5813 can be 2000 microns, the parasitic coupling in section 5803 is expected to be negligible. Ratios of the coupling length in section 5804 and overlap in section 5803 higher than 10 may lead to small or negligible parasitic coupling. The example shown in FIGS. 58C-58F, and show a 32×32 phased array of antennas. In the example the antennas are positioned in 4 concentric sets of rings, each set being situated in one layer. Each set contains 4 rings separated by 5 microns each. Such an array of antennas is expected to give side lobes and therefore a steering angle of approximately 18 degrees. Larger arrays of emitters such as 128×128, 64×64 or smaller such as 16×16 may be used. A larger array may create a lower divergence beam and potentially better suppression of the side lobes though the power required for steering may be higher as the number of phase shifters associated with controlling the antennas increases. A smaller array such as 16×16 may have lower power consumption though also larger beam divergence and less suppression of side lobes for the same inter antenna spacing.

Examples of layout of the antennas and access waveguides to the antennas as shown in FIGS. 58C-58F for the two top layers 5814 and 5815 respectively. In an example, the 3 access waveguides are routed between each two of the outermost antennas. In an example the spacing between two consecutive antennas can be 5 microns and the center to center spacing between the access waveguides can be 1.25 microns. As the close separation such as sub-micron between waveguides can be maintained only for a short distance, such as a few microns up to tens of microns, the parasitic coupling between access waveguides is expected to be negligible such as at 10% or less.

In another example, other separations between antennas may be chosen to satisfy the requirements for the steering angle for the phased array steering angle that determines the field of view of the LiDAR system. In an example the separation between the antennas can be variable over the array of antennas in order to achieve high side lobe suppression and larger separation between the central maximum and the side lobes such as more than 15 degrees in the far field pattern or a variable angular divergence of the beam. In another example, in addition to the separation between antennas, the phase of the optical signal emitted by each antenna and the amplitude of the optical signal emitted by each antenna can be varied in order to achieve the desired pattern in the far field. In an example, by adjusting the amplitude and phase of the optical signal emitted by each antenna in the array, the optical signal characteristics in the far field are adjusted in real time including angle with respect to the normal to the array, divergence of the beam, and shape of the beam cross section at the point of incidence on the target.

Asymmetric Phased Array

In another example, the separation between antennas can be different for the x and y axis to correspond to the steering angle specifications in the two directions for a LiDAR system—typically the horizontal steering angle specifications are significantly larger than the vertical steering angle specifications. In an example, a 10 micron spacing can be chosen for the separation between antennas to correspond to a 9 degrees side lobe separation and therefore 18 degrees field of view angle on the vertical direction, and 5 micron spacing can be chosen for the separation between the antennas to correspond to a 18 degrees of separation between the central peak and the side lobes and therefore a 18 degrees field of view angle in the horizontal direction. Other ranges for the separation between the antennas can be chosen such as from 3 to 50 microns which would lead to different steering angle ranges as shown in the formula:

$$\sin(\Delta\emptyset) = \frac{\lambda}{d}$$

In another example, other separations between antennas may be chosen to satisfy the overall specifications for the field of view of the LiDAR system. In an example, the separation between the antennas can be variable over the array of antennas in order to achieve the desired far field pattern. In another example, in addition to the separation between antennas, the phase of the optical signal emitted by each antenna and the amplitude of the optical signal emitted by each antenna can be varied in order to achieve the desired pattern in the far field. In an example, by adjusting the amplitude and phase of the optical signal emitted by each antenna in the array, the optical signal characteristics in the far field are adjusted in real time including angle with respect to the normal to the array, divergence of the beam, and shape of the beam cross section at the point of incidence on the target.

While the phased array designed above and integration with the receiver and transmitter modules are shown for an example of the continuous wave coherent detection based system, in another example, the phased array 5801 can be integrated with the pixel array 5000 and with the transmitter 200 on the same chip as shown in FIG. 59 for a pulsed system using direct intensity detection.

Figure 60:
FIG. 60 illustrates a method of operation of a transmitter module.

FIG. 60 illustrates a method 6000 for providing a frequency chirped light beam. A continuous wave light source can be used to provide a light beam (step 6010). The light beam can be coupled to a planar waveguide and divided into a first portion and a second portion (step 6020). A first portion of the divided light beam can be modulated in phase (step 6030). A second portion of the divided light beam can be modulated in quadrature (step 6040). The first modulated portion and the second modulated portion can be combined to form a frequency chirped light beam (step 6050). A phase shift can be provided to the combined light beam to adjust a phase of the frequency chirped light beam. A relative phase offset can be reduced between the N modulated light beams of the divided light beam. A power of the light beam can be reduced to less than a power level corresponding to the waveguide cross section at which an onset of nonlinear effects occurs. A power of the light beam can be reduced to less than approximately 50 mw to reduce non-linear losses.

Figure 61:
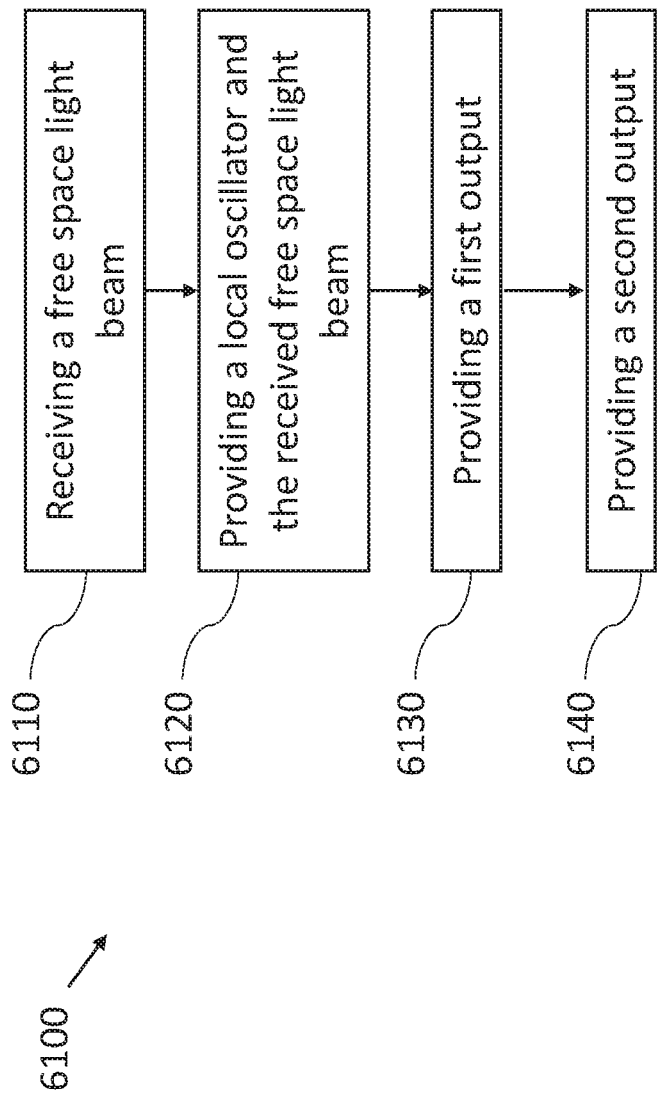
FIG. 61 illustrates a method of operation of a balanced receiver.

FIG. 61 illustrates a method 6100 for detecting a frequency and a phase of a light beam using a photonic integrated circuit. A portion of a free space light beam can be received using a grating coupler (step 6110). A local oscillator and the received portion of the free space light beam can be provided to a signal mixer (step 6120). A first output corresponding to a sum of the free space light beam and the local oscillator can be provided (step 6130). A second output corresponding to a difference between the local oscillator and the free space light beam can be provided (step 6140). The local oscillator can be provided to a plurality of mixers substantially simultaneously. The local oscillator can be sequentially provided to a plurality of signal mixers. The first output can be converted to an electrical signal, the second output can be converted to a second electrical signal, and a difference between the first electrical signal and the second electrical signal can be used to provide a detected signal having reduced noise. A plurality of grating couplers can be provided, wherein a grating period, duty cycle or two-dimensional topology of the plurality of grating couplers varies with position on a photonic circuit to accommodate different angles of incidence of received free space light. Free space light corresponding to an $m^{th}$ diffraction order can be coupled using a first grating coupler, and free space light corresponding to an $n^{th}$ diffraction order can be coupled using a second grating coupler adjacent to the first grating coupler. A corresponding portion of a free space light beam can be received for a subset of the plurality of signal mixers and electrical signals provided by the plurality of signal mixers can be simultaneously processed. Multiple beat frequencies or phases can be simultaneously or sequentially detected. Free space light beams of different wavelengths can be received simultaneously.

Figure 62:
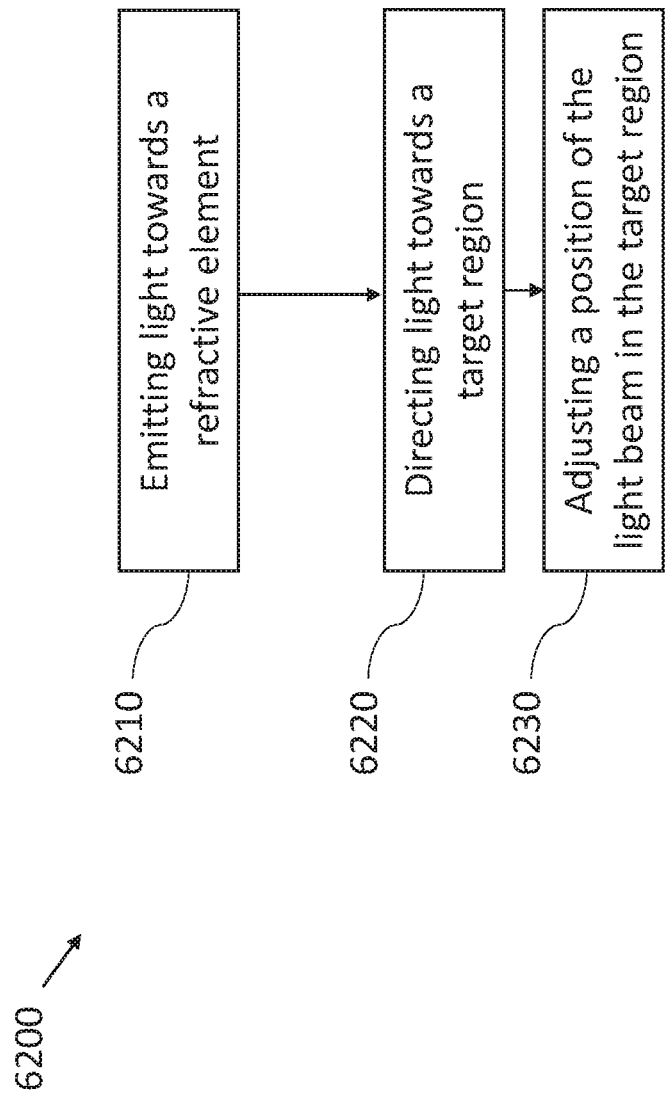
FIG. 62 illustrates a method of operation of a steering module.

FIG. 62 illustrates a method 6200 for providing dynamic steering of a light beam. A spatial arrangement of grating couplers can be used to emit a light beam towards a refractive optical element (step 6210). The light beam can be directed towards a target region using the refractive optical element (step 6220). A position of the light beam can be adjusted in the target region by selecting which of the grating couplers in the spatial arrangement of grating couplers emits light towards the refractive optical element (step 6230). The spatial arrangement of grating couplers can be partitioned into groups having different orientations. A position of a light beam can be adjusted in two dimensions by selecting which of the grating couplers in the spatial arrangement of grating couplers emits light towards the refractive optical element. A focal length and position of the refractive optical element can be selected to provide a divergence of the light beam of less than about 0.1 degrees. A Mach Zehnder switch or a ring based switch can be used to select which of the grating couplers in the spatial arrangement of grating couplers emits light towards the refractive optical element. A divergence angle of the light beam can be adjusted using the refractive optical element.

Figure 63:
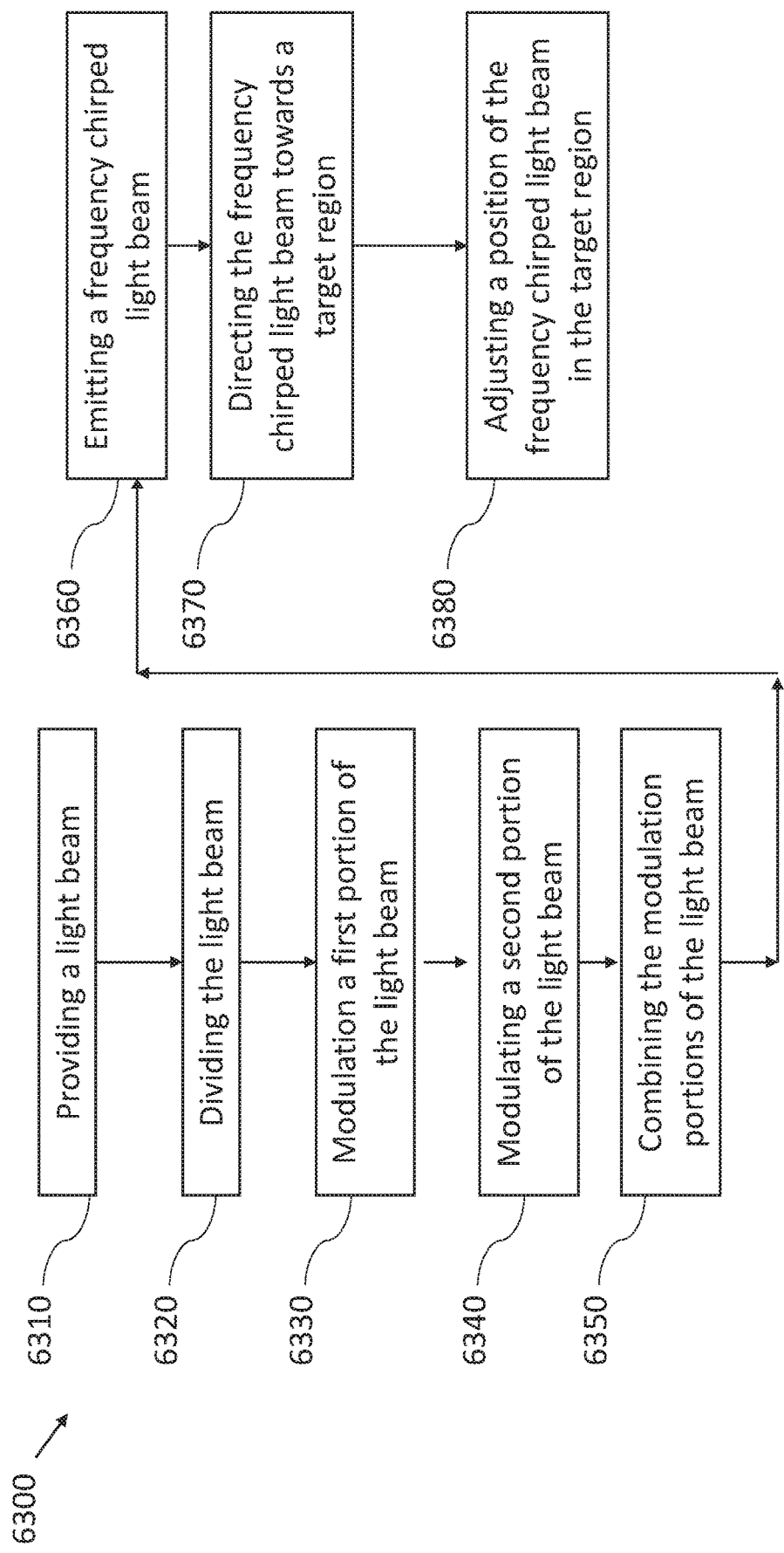
FIG. 63 illustrates a method of operation of an integrated FMCW scanning transmitter.

FIG. 63 illustrates a method 6300 for dynamically steering a frequency chirped light beam. A continuous wave light source can be used to provide a light beam (step 6310). The light beam can be coupled into a planar waveguide and divided into a first portion and a second portion (step 6320). The first portion of the divided light beam can be modulated in-phase (step 6330). The second portion of the divided light beam can be modulated in-quadrature (step 6340). The modulated first portion of the divided light beam and the modulated second portion of the divided light beam can be combined to form a frequency chirped light beam (step 6350). A spatial arrangement of grating couplers can be used to emit the frequency chirped light beam towards a refractive optical element (step 6360). The frequency chirped light beam can be directed towards a target region using the refractive optical element (step 6370). A position of a frequency chirped light beam in the target region can be adjusted by selecting which of the grating couplers in the spatial arrangement of grating couplers emits light towards the refractive optical element (step 6380).

Figure 64:
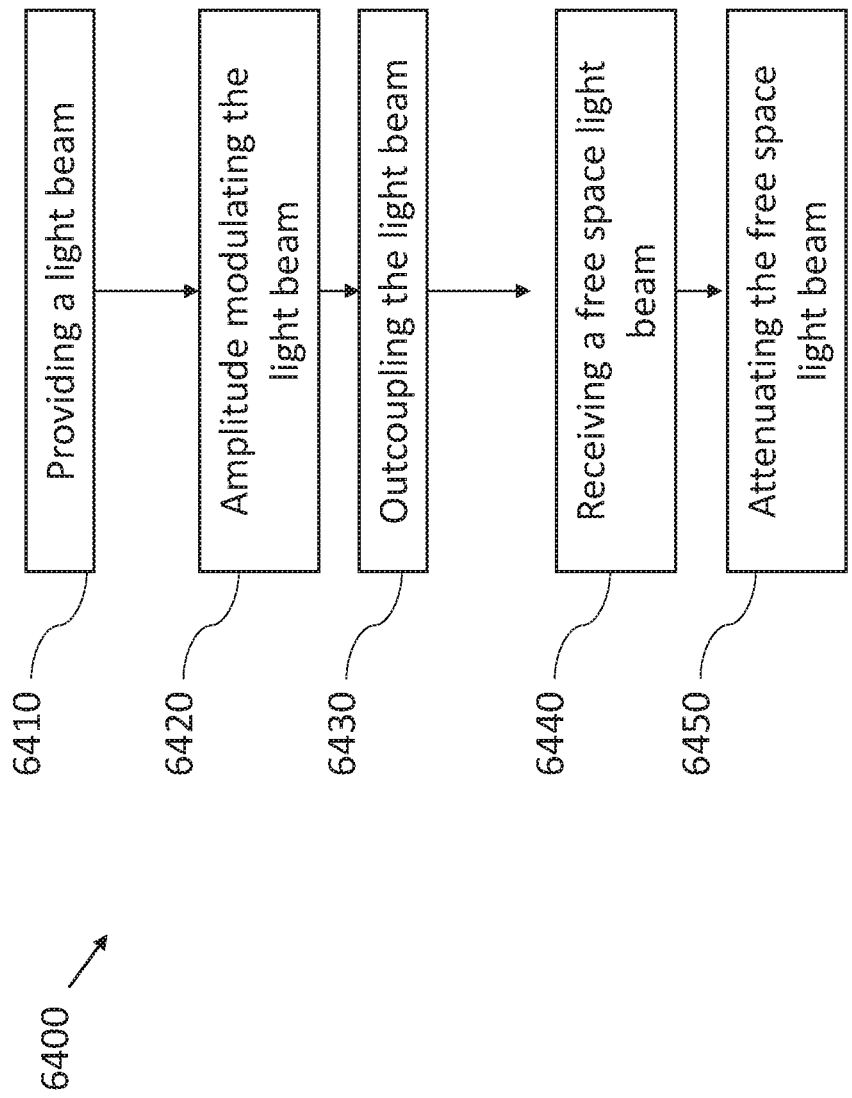
FIG. 64 illustrates a method of operation of an integrated amplitude modulated transceiver.

FIG. 64 illustrates a method 6400 for providing an amplitude modulated light beam and detecting a received free space light beam from a target region. A light beam can be provided and coupled to a plurality of amplitude modulators in a semiconductor photonic circuit (step 6410). The light beam can be amplitude modulated using one or more amplitude modulators (step 6420). The amplitude modulated light beam can be coupled out of the semiconductor photonic circuit and towards a target region (step 6430). A portion of a free space light beam can be received from the target region using one or more grating couplers (step 6430). The received portion of the free space light beam can be attenuated to reduce saturation of a corresponding detector using one or more signal amplitude modulators (step 6440).

Figure 65:
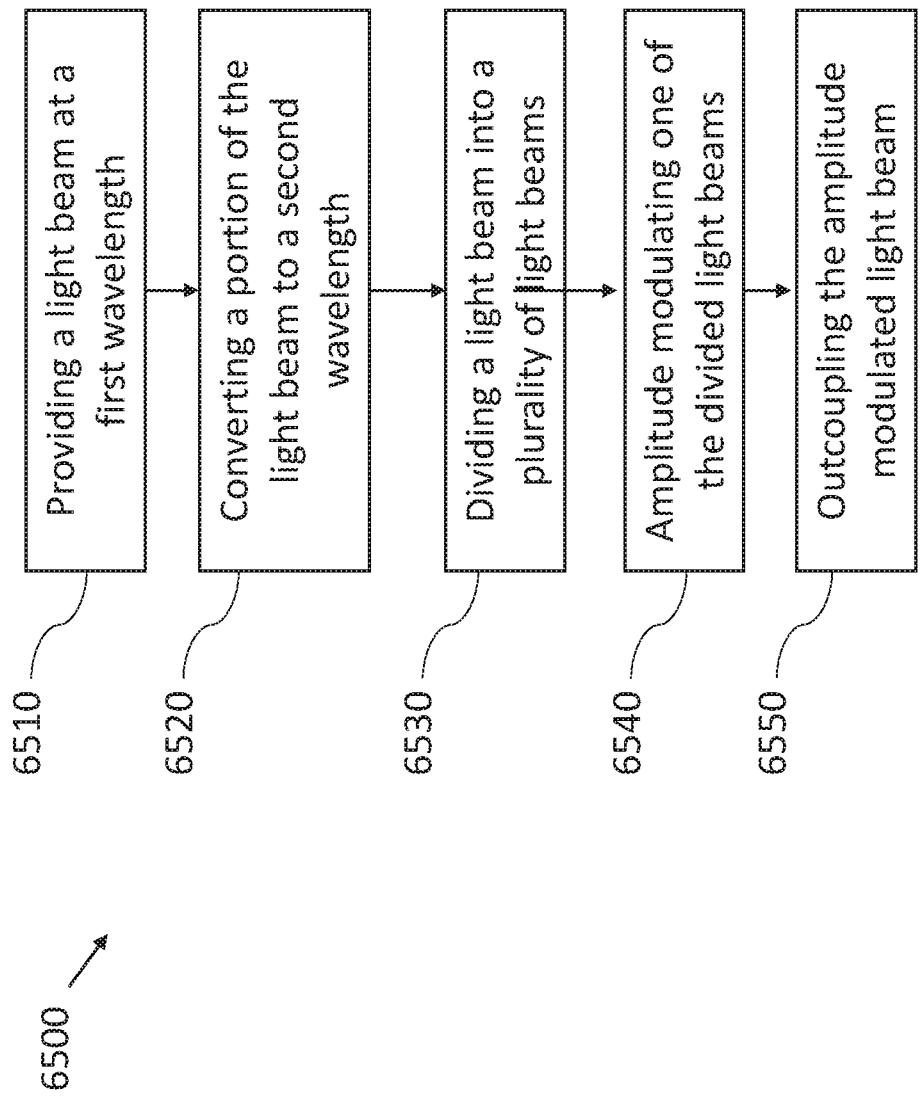
FIG. 65 illustrates a method of operation of a multi wavelength amplitude modulated transmitter.

FIG. 65 illustrates a method 6500 for generating a plurality of optical beams having a second wavelength from a plurality of optical beams having a first wavelength through stimulated Raman scattering. A light beam can be provided at a first wavelength and the light beam coupled to a wavelength selective coupler configured to combine or separate two different wavelengths (step 6510). A tuning ring resonator can be used to provide a Q factor of greater than 100,000 at a wavelength corresponding to a Raman shifted harmonic and using the ring resonator to convert a portion of light at the first wavelength to a second wavelength corresponding to the Raman shifted harmonic (step 6520). A light beam having a wavelength corresponding to the Raman shifted harmonic can be divided into a plurality of light beams of the same wavelength (step 6530). The divided light beam can be amplitude modulated using one or more amplitude modulators (step 6540). A light beam received from the one or more amplitude modulators can be coupled out of the semiconductor photonic circuit and towards a target region (step 6550).

The above detailed description includes references to the accompanying drawings, which form a part of the detailed description. The drawings show, by way of illustration, specific examples in which the invention may be practiced. These examples are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other examples may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples may be combined with each other in various combinations or permutations. The scope of the invention should be determined with reference to the appended claims, along with the full scope of equivalents to which such claims are entitled.

The invention claimed is:

1. A semiconductor photonic circuit for steering a light beam, the semiconductor photonic circuit comprising:
    a continuous wave light source coupler for providing a light beam from a light source;
    a splitter configured to divide the light beam from the continuous wave light source coupler into a first portion and a second portion;
    a first modulator configured apply in-phase modulation of the first portion of the light beam;
    a second modulator configured to provide quadrature modulation of the second portion of the light beam;
    an outcoupler configured to combine outputs of the first modulator and second modulator to form a frequency chirped light beam;
    a focal plane array of grating couplers in two dimensions, at least one of the grating couplers being configured to receive light from a waveguide and emit the received light towards a refractive optical element, the refractive optical element being configured to direct the emitted light towards a target region; and
    one or more optical switches configured to adjust a position of a light beam in the two dimensions in the target region by selecting grating couplers in the focal plane array of grating couplers that receive light from the waveguide.

2. The semiconductor photonic circuit of claim 1 comprising silicon.

3. The semiconductor photonic circuit of claim 1 comprising a compound semiconductor.

4. The semiconductor photonic circuit of claim 1 wherein a wavelength of the light beam is in a range from 1300-1600 nanometers.

5. The semiconductor photonic circuit of claim 1 wherein the continuous wave light source coupler, the splitter, the first modulator, the second modulator, the outcoupler, the focal plane array of grating couplers, and the one or more optical switches are monolithically integrated.

6. The semiconductor photonic circuit of claim 1 wherein the outcoupler provides light for one optical switch.

7. The semiconductor photonic circuit of claim 1, further comprising:
    one or more phase shifters configured to adjust a phase of the first portion or the second portion of the light beam.

8. The semiconductor photonic circuit of claim 7, wherein the one or more phase shifters comprise a first phase shifter that phase shifts the first portion of modulated light from the first modulator and a second phase shift that phase shifts the second portion of modulated light from the second modulator.

9. A method for processing light using a semiconductor photonic circuit, the method comprising:
    generating a light beam using a continuous wave light source;
    dividing, using a splitter, the light beam into a first portion and a second portion;
    modulating, using a first modulator, the first portion of the light beam in-phase;
    modulating, using a second modulator, the second portion of the light beam in-quadrature;
    generating a frequency chirped light beam by combining the modulated first portion and the modulated second portion of the light beam;
    using a focal plane array of grating couplers in two dimensions to emit the frequency chirped light beam towards a target region using a refractive optical element;
    receiving a portion of a free space light beam from the target region using a grating coupler; and
    adjusting, using one or more optical switches, a position of a light beam in the two dimensions the target region by selecting grating couplers in the focal plane array of grating couplers that receive light.

10. The method of claim 9, further comprising:
providing a local oscillator and the received portion of the light beam from the grating coupler to a signal mixer.

11. The method of claim 10, further comprising:
providing a first output corresponding to a sum of a free space light beam field and a local oscillator light beam field and a second output corresponding to a difference between the free space light beam field and the local oscillator light beam field.

12. The method of claim 9, wherein the semiconductor photonic circuit comprises silicon.

13. The method of claim 9, wherein the semiconductor photonic circuit comprises a compound semiconductor.

14. The method of claim 9, wherein a wavelength of the light beam is in a range from 1300-1600 nanometers.

15. The method of claim 9, wherein the continuous wave light source, the splitter, the first modulator, the second modulator, an outcoupler, the focal plane array of grating couplers, and the one or more optical switches are monolithically integrated.

16. The method of claim 15, wherein the outcoupler provides light for one optical switch.

17. The method of claim 9, further comprising:
one or more phase shifters configured to adjust a phase of the first portion or the second portion of the light beam.

18. The method of claim 17, wherein the one or more phase shifters comprise a first phase shifter that phase shifts the first portion of modulated light from the first modulator and a second phase shift that phase shifts the second portion of modulated light from the second modulator.

\* \* \* \* \*

UNITED STATES PATENT AND TRADEMARK OFFICE
CERTIFICATE OF CORRECTION

PATENT NO. : 11,585,899 B2
APPLICATION NO. : 16/489915
DATED : February 21, 2023
INVENTOR(S) : Remus Nicolaescu It is certified that error appears in the above-identified patent and that said Letters Patent is hereby corrected as shown below:

On the Title Page

On page 2, in Column 2, under "Other Publications", Line 15, delete "1810715.6," and insert --18710715.6,-- therefor In the Drawings On sheet 23 of 91, Fig. 17, reference numeral 1700, Line 1, delete "PHOTOINC" and insert --PHOTONIC-- therefor In the Specification In Column 1, Line 7, delete "International." and insert --International-- therefor In Column 13, Line 18, delete "transimpedence" and insert --transimpedance-- therefor In Column 25, Line 60, delete "A" and insert --$\lambda$-- therefor In Column 31, Line 10, delete "to." and insert --$t_0$.-- therefor In Column 34, Line 32, delete "$\omega_{IF}$" and insert --$\omega$IF-- therefor In Column 34, Line 39, delete "$\omega_{IF}$" and insert --$\omega$IF-- therefor In Column 35, Line 16, delete "as as" and insert --as-- therefor In Column 37, Line 3, delete "MM Is" and insert --MMIs-- therefor In Column 37, Line 26, delete "$N_{Pix}$" and insert --$N_{pix}$-- therefor Signed and Sealed this
Eighteenth Day of April, 2023

Katherine Kelly Vidal
*Director of the United States Patent and Trademark Office*

CERTIFICATE OF CORRECTION (continued)
U.S. Pat. No. 11,585,899 B2

In Column 44, Line 12, delete "Δ0" and insert --$\lambda_0$-- therefor

In Column 44, Line 17, delete "λ1—i.e." and insert --$\lambda_1$—i.e.-- therefor In Column 44, Line 20, delete "λ0" and insert --$\lambda_0$-- therefor In Column 44, Line 21, delete "λ0" and insert --$\lambda_0$-- therefor In Column 44, Line 22, delete "λ1" and insert --$\lambda_1$-- therefor In Column 44, Line 25, delete "λ1" and insert --$\lambda_1$-- therefor In Column 44, Line 28, delete "λ2." and insert --$\lambda_2$.-- therefor In Column 44, Line 29, delete "λ2" and insert --$\lambda_2$-- therefor In Column 44, Line 30, delete "λ1" and insert --$\lambda_1$-- therefor In Column 44, Line 31, delete "λ2" and insert --$\lambda_2$-- therefor In Column 44, Line 33, delete "λ2" and insert --$\lambda_2$-- therefor In Column 44, Line 38, delete "λ0" and insert --$\lambda_0$-- therefor In Column 44, Line 41, delete "λ0" and insert --$\lambda_0$-- therefor In Column 44, Line 45, delete "λ0 and λ2" and insert --$\lambda_0$ and $\lambda_2$-- therefor In Column 44, Line 51, delete "λ2, λ0" and insert --$\lambda_2$, $\lambda_0$-- therefor In Column 44, Line 55, delete "λ1" and insert --$\lambda_1$-- therefor In Column 44, Line 56, delete "λ2" and insert --$\lambda_2$-- therefor In Column 44, Lines 58-59, delete "λ0 and λ2," and insert --$\lambda_0$ and $\lambda_2$,-- therefor In Column 44, Line 60, delete "λ0 and λ1," and insert --$\lambda_0$ and $\lambda_1$,-- therefor In Column 44, Line 61, delete "λ0, λ1 and λ2" and insert --$\lambda_0$, $\lambda_1$ and $\lambda_2$-- therefor In Column 48, Line 39, after "5507.", delete "¶"

In Column 50, Line 7, delete "1×n" and insert --1×N-- therefor

CERTIFICATE OF CORRECTION (continued)
U.S. Pat. No. 11,585,899 B2

In Column 50, Line 31, delete "A" and insert --$\lambda$-- therefor

In Column 51, Line 19, after "layer.", delete "¶"